US011117468B2

(12) United States Patent
Fujita et al.

(10) Patent No.: US 11,117,468 B2
(45) Date of Patent: Sep. 14, 2021

(54) DISPLAY DEVICE FOR VEHICLE

(71) Applicant: DENSO CORPORATION, Kariya (JP)

(72) Inventors: Katsumi Fujita, Kariya (JP); Kouzou Ono, Kariya (JP); Shota Nojiri, Kariya (JP); Takuo Yamamoto, Obu (JP); Shizuo Nagata, Obu (JP); Yuuki Uekubo, Obu (JP); Masashi Nakamura, Obu (JP); Kouta Fukutomi, Obu (JP); Tadaaki Ishimaru, Kariya (JP)

(73) Assignee: DENSO CORPORATION, Kariya (JP)

( * ) Notice: Subject to any disclaimer, the term of this patent is extended or adjusted under 35 U.S.C. 154(b) by 112 days.

(21) Appl. No.: 16/395,314

(22) Filed: Apr. 26, 2019

(65) Prior Publication Data

US 2019/0248240 A1 Aug. 15, 2019

Related U.S. Application Data

(63) Continuation of application No. PCT/JP2017/033185, filed on Sep. 14, 2017.

(30) Foreign Application Priority Data

Nov. 8, 2016 (JP) ............................ JP2016-218281
Nov. 8, 2016 (JP) ............................ JP2016-218282
(Continued)

(51) Int. Cl.
*G01D 11/00* (2006.01)
*B60K 35/00* (2006.01)
(Continued)

(52) U.S. Cl.
CPC .............. *B60K 35/00* (2013.01); *G01D 11/28* (2013.01); *G01D 13/04* (2013.01); *G01D 13/22* (2013.01);
(Continued)

(58) Field of Classification Search
CPC ........ B60K 2370/341; B60K 2370/698; B60K 2370/1531; B60K 2370/332;
(Continued)

(56) References Cited

U.S. PATENT DOCUMENTS 5,964,515 A 10/1999 Ikeuchi et al.
6,149,279 A 11/2000 Ikeuchi et al.
(Continued)

FOREIGN PATENT DOCUMENTS

JP S55039284 Y 9/1980
JP H08159818 A 6/1996
(Continued)

*Primary Examiner* — William J Carter
*Assistant Examiner* — Omar Rojas Cadima
(74) *Attorney, Agent, or Firm* — Harness, Dickey & Pierce, P.L.C.

(57) ABSTRACT

A display device for a vehicle includes: a dial plate having an indicator portion corresponding to vehicle information on a viewing side; an image display panel disposed on a back side of the dial plate opposite to the viewing side to luminescently display an image; and a light transmissive display plate that includes a reflective portion disposed on the viewing side of the dial plate to reflect a light from a light source to the viewing side. A region of the dial plate, which faces the image display panel, is set to have a light transmission property to transmit the image of the image display panel through the region of the dial plate.

18 Claims, 93 Drawing Sheets

(DISPLAY TYPE C)

(30) Foreign Application Priority Data

| | | |
|---|---|---|
| Nov. 8, 2016 | (JP) | JP2016-218283 |
| Nov. 8, 2016 | (JP) | JP2016-218284 |
| Dec. 5, 2016 | (JP) | JP2016-236157 |
| Jan. 24, 2017 | (JP) | JP2017-010424 |
| Apr. 28, 2017 | (JP) | JP2017-089368 |
| Aug. 8, 2017 | (JP) | JP2017-153486 |

(51) Int. Cl.

| | |
|---|---|
| ***G01D 13/04*** | (2006.01) |
| ***F21V 8/00*** | (2006.01) |
| ***G01D 13/22*** | (2006.01) |
| ***G01D 11/28*** | (2006.01) |

(52) U.S. Cl.
CPC ........ *G02B 6/0036* (2013.01); *B60K 2370/16* (2019.05); *B60K 2370/176* (2019.05); *B60K 2370/23* (2019.05); *B60K 2370/27* (2019.05); *B60K 2370/331* (2019.05); *B60K 2370/52* (2019.05); *B60K 2370/695* (2019.05); *B60K 2370/698* (2019.05)

(58) Field of Classification Search
CPC .......... B60K 2370/336; B60K 2370/20; B60K 2370/23; B60K 2370/27; G01D 11/28; G01D 7/06; G02F 1/1336; G02F 2001/133374; G09F 9/35; G09G 2320/0686; G09G 3/003; G09G 3/36; B60Q 3/14; G02B 6/0018; G02B 6/002; G02B 6/0036
See application file for complete search history.

(56) References Cited

U.S. PATENT DOCUMENTS

| | | | |
|---|---|---|---|
| 6,210,011 | B1 | 4/2001 | Ikeuchi et al. |
| 2016/0189345 | A1 | 6/2016 | Fujita et al. |
| 2016/0221440 | A1 | 8/2016 | Tane et al. |
| 2017/0072800 | A1 | 3/2017 | Fujita |
| 2017/0129336 | A1 | 5/2017 | Hisada et al. |
| 2017/0144544 | A1* | 5/2017 | Fujita ................ G02F 1/133504 |
| 2018/0229605 | A1 | 8/2018 | Fujita et al. |

FOREIGN PATENT DOCUMENTS

| | | | |
|---|---|---|---|
| JP | H9-318400 | A | 12/1997 |
| JP | H09318399 | A | 12/1997 |
| JP | H10-207408 | A | 8/1998 |
| JP | H11353920 | A | 12/1999 |
| JP | 2000-293122 | A | 10/2000 |
| JP | 2000-337930 | A | 12/2000 |
| JP | 2001312233 | A | 11/2001 |
| JP | 2002-071394 | A | 3/2002 |
| JP | 2002156251 | A | 5/2002 |
| JP | 2002-340629 | A | 11/2002 |
| JP | 2002-365097 | A | 12/2002 |
| JP | 2005-091218 | A | 4/2005 |
| JP | 2007187576 | A | 7/2007 |
| JP | 2008122214 | A | 5/2008 |
| JP | 2009042121 | A | 2/2009 |
| JP | 2009096063 | A | 5/2009 |
| JP | 2009186400 | A | 8/2009 |
| JP | 2010048614 | A | 3/2010 |
| JP | 2010091337 | A | 4/2010 |
| JP | 2010-190599 | A | 9/2010 |
| JP | 2010-266409 | A | 11/2010 |
| JP | 2011-008035 | A | 1/2011 |
| JP | 2012032286 | A | 2/2012 |
| JP | 2013080120 | A | 5/2013 |
| JP | 2013137440 | A | 7/2013 |
| JP | 2013170993 | A | 9/2013 |
| JP | 2013203333 | A | 10/2013 |
| JP | 5594525 | B2 | 9/2014 |
| JP | 2014177166 | A | 9/2014 |
| JP | 2014220208 | A | 11/2014 |
| JP | 2015020498 | A | 2/2015 |
| JP | 2015071369 | A | 4/2015 |
| JP | 2015083965 | A | 4/2015 |
| JP | 2015107164 | A | 6/2015 |
| JP | 2016013813 | A | 1/2016 |
| JP | 2016053585 | A | 4/2016 |
| JP | 2016057101 | A | 4/2016 |
| JP | 2016114423 | A | 6/2016 |
| JP | 2016121890 | A | 7/2016 |
| JP | 2016121891 | A | 7/2016 |
| JP | 2016122002 | A | 7/2016 |
| JP | 2016122022 | A | 7/2016 |
| JP | 2016128777 | A | 7/2016 |
| JP | 2016141366 | A | 8/2016 |
| WO | WO-2018088023 | A1 | 5/2018 |

* cited by examiner (DISPLAY TYPE A)

(DISPLAY TYPE A)

(DISPLAY TYPE B)

(DISPLAY TYPE C)

(DISPLAY TYPE C)

(DISPLAY TYPE D)

(DISPLAY TYPE D)

(DISPLAY TYPE E)

(VIEWING SIDE)

(BACK SIDE)

Title: DISPLAY DEVICE FOR VEHICLE
Inventors: Katsumi FUJITA et al.
Attorney Docket No.: 4041J-003524-US-CO

DISPLAY DEVICE FOR VEHICLE

CROSS REFERENCE TO RELATED APPLICATIONS

This application is a continuation application of International Patent Application No. PCT/JP2017/033185 filed on Sep. 14, 2017, which designated the United States and claims the benefit of priority from Japanese Patent Application No. 2016-218281 filed on Nov. 8, 2016, Japanese Patent Application No. 2016-218282 filed on Nov. 8, 2016, Japanese Patent Application No. 2016-218283 filed on Nov. 8, 2016, Japanese Patent Application No. 2016-218284 filed on Nov. 8, 2016, Japanese Patent Application No. 2016-236157 filed on Dec. 5, 2016, Japanese Patent Application No. 2017-010424 filed on Jan. 24, 2017, Japanese Patent Application No. 2017-089368 filed on Apr. 28, 2017, and Japanese Patent Application No. 2017-153486 filed on Aug. 8, 2017. The entire disclosures of all of the above applications are incorporated herein by reference.

TECHNICAL FIELD

The present disclosure relates to a display device for a vehicle.

BACKGROUND ART

A display device includes a transmissive illumination type dial plate on which numerals and scales corresponding to rotation speeds as vehicle information are printed, and a liquid crystal display panel for displaying various types of vehicle information. The dial plate and the liquid crystal display panel are flush with each other and disposed side by side, and a transparent display plate having a reflective portion for reflecting a light from a light source to a viewing side and displaying information superimposed on a display content of the dial plate and the liquid crystal display plate is disposed on the viewing side.

SUMMARY

According to an aspect of the present disclosure, a display device to be mounted on a vehicle includes a dial plate, an image display panel that is disposed on a back side of the dial plate opposite to a viewing side to luminescently display an image; and a light transmissive display plate that includes a reflective portion disposed on the viewing side of the dial plate to reflect a light from a light source to the viewing side. A region of the dial plate, which faces the image display panel, is set to have a light transmission property to transmit the image of the image display panel through the region of the dial plate.

BRIEF DESCRIPTION OF DRAWINGS

FIG. 20 is a diagram illustrating a control of light emitting devices according to the fourth embodiment, and shows a case in which a moving object image is faded in.

FIG. 120 is an enlarged view of a portion CXX of FIG. 119.

FIG. 121 is an enlarged view of a portion CXXI of FIG. 112.

FIG. 122 is a cross-sectional view taken along a line CXXII-CXXII of FIG. 121.

FIG. 123 is a cross-sectional view taken along a line CXXIII-CXXIII of FIG. 112.

FIG. 124 is an enlarged view of a portion CXXIV of FIG. 123.

FIG. 125 is a cross-sectional view taken along a line CXXV-CXXV of FIG. 102.

FIG. 126 is a diagram illustrating a state of assembling the light irradiation unit to a holding case according to the fourteenth embodiment.

FIG. 127 is a diagram corresponding to FIG. 102 in Modification 1.

FIG. 128 is an exploded perspective view showing a display device for a vehicle according to a fifteenth embodiment.

FIG. 129 is a cross-sectional view schematically showing a display device for a vehicle according to the fifteenth embodiment.

FIG. 130 is a schematic diagram illustrating a difference between a case in which the light transmissive display plate is flat and a case in which the light transmissive display plate is curved.

FIG. 131 is a front view illustrating a pattern according to the fifteenth embodiment.

Figure 132:
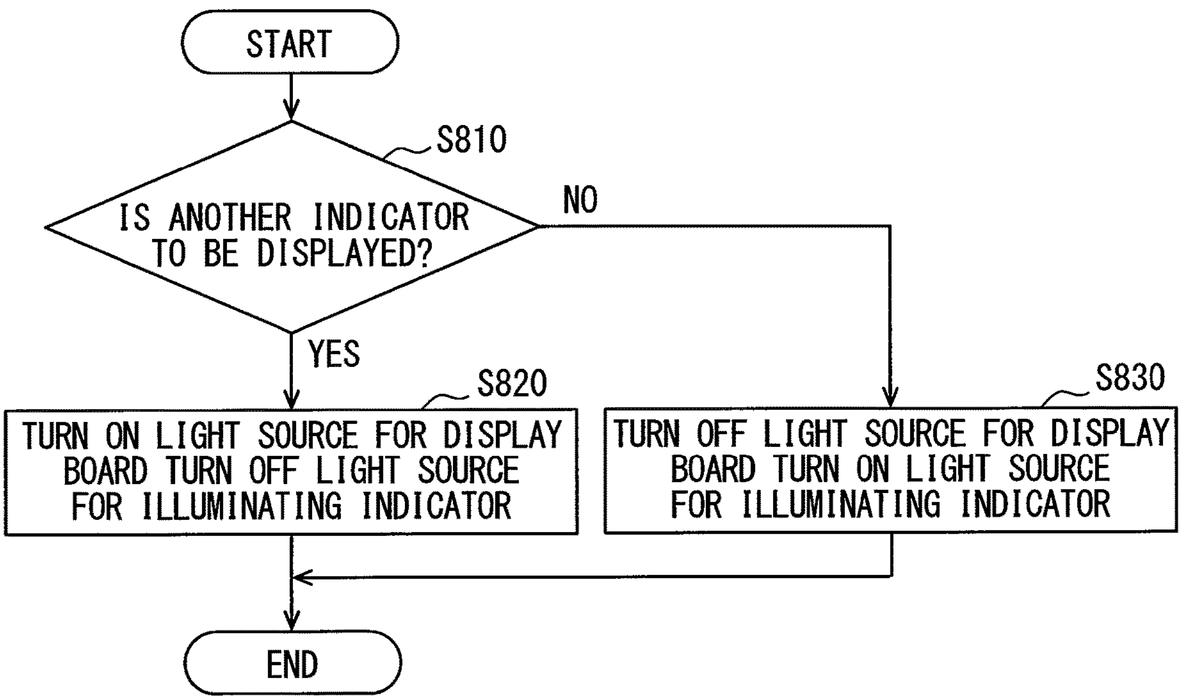

FIG. 132 is a flowchart of the display device according to the fifteenth embodiment.

Figure 133:
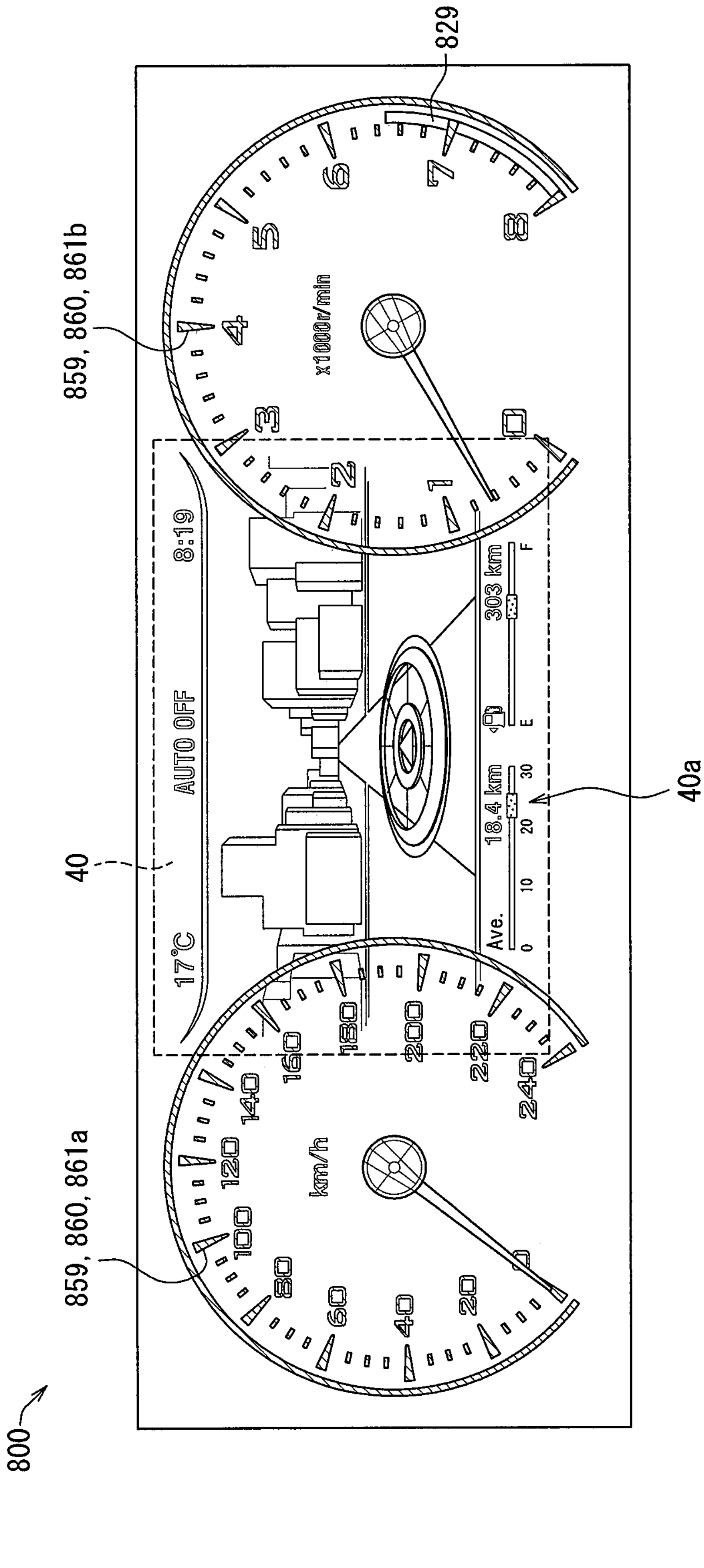

FIG. 133 is a front view showing the display device of the fifteenth embodiment, and shows one example of display.

Figure 134:
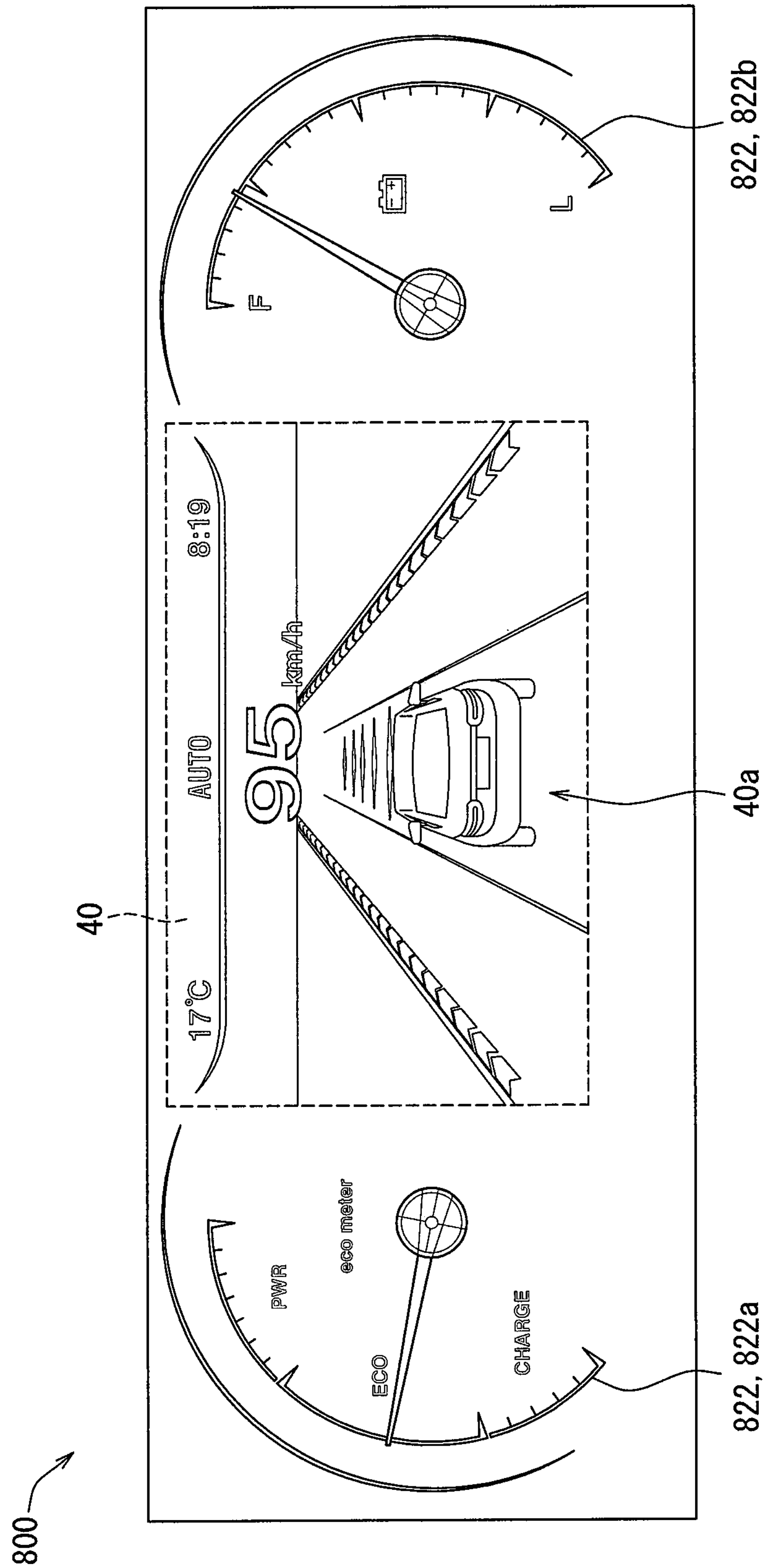

FIG. 134 is a front view showing the display device of the fifteenth embodiment, and shows another example of display.

DETAILED DESCRIPTION

To begin with, examples of relevant techniques will be described.

When a dial plate and a liquid crystal display panel are flush with each other and disposed side by side, there is no sense of relative depth between the dial plate and the liquid crystal display panel. When a distance between a reflective portion of the transparent display plate and the liquid crystal display panel is uniquely determined according to a position of the dial plate, a relative sense of depth between the transparent display plate and the liquid crystal display plate in combination is comparatively limited.

Since the sense of depth leads to a stereoscopic effect of the display, the conventional art suffers from such an issue that the relative stereoscopic effect between the display of the dial plate and the reflective portion and the display of the liquid crystal display panel is poor, and in particular, the display having various variability which is unique to the liquid crystal display panel and the reflective portion cannot effectively lead to the stereoscopic effect.

The present disclosure provides a display device for a vehicle, capable of improving a relative stereoscopic effect between a display of a dial plate and a reflective portion and a liquid crystal display panel.

According to an aspect of the present disclosure, a display device to be mounted on a vehicle includes:

a dial plate having an indicator portion corresponding to vehicle information on a viewing side;

an image display panel that is disposed on a back side of the dial plate opposite to the viewing side to luminescently display an image; and a light transmissive display plate that includes a reflective portion disposed on the viewing side of the dial plate to reflect a light from a light source to the viewing side.

A region of the dial plate, which faces the image display panel, is set to have a light transmission property to transmit the image of the image display panel through the region of the dial plate.

Since the image display panel is not flush with the dial plate in a side-by-side manner, but is disposed on a back side of the dial plate, a sense of depth of the image display panel with respect to the dial plate and the light transmissive display plate is increased in comparison with the side-by-side manner. The image of the image display panel can reach the direction of the light transmissive display plate through the light transmissive region of the dial plate. As described above, with an increase in the sense of depth of the image display panel, a special effect of improving the relative stereoscopic effect in the combination of the display by the dial plate and the reflective portion of the light transmissive display plate and the display of the image display panel can be expected.

According to an aspect of the present disclosure, a display device to be mounted on a vehicle, includes:

a dial plate that displays an indicator portion corresponding to vehicle information on a viewing side;

an image display panel that luminescently displays an image on the viewing side; and a light transmissive display plate that includes a reflective portion which is disposed on the viewing side of the dial plate and the image display panel to reflect a light from a light source to the viewing side.

The reflective portion includes a plurality of reflective elements that reflects the light from the light source to the viewing side, and are arrayed along an extending direction of the light transmissive display plate to configure a pattern.

The pattern includes an outer peripheral pattern that is linearly formed in a region of the light transmissive display plate, which corresponds to an outer peripheral portion of the indicator portion to border the indicator portion.

An end portion of the outer peripheral pattern extends to a region of the light transmissive display plate, which faces the image display panel, and the image display panel displays an extended image linearly provided to further extend the end portion of the outer peripheral pattern as the image.

According to the above configuration, the image display panel displays, as an image, an extended image provided in a linear shape so as to further extend an end portion of an outer peripheral pattern. Since the extended image appears to be continuous with the outer peripheral pattern, a sense of unity is obtained between the indicator portion, the reflective portion, and the image display panel while obtaining a stereoscopic effect.

According to an aspect of the present disclosure, a display device to be mounted on a vehicle, includes:

an image display panel that luminescently displays an image on a viewing side; and a light transmissive display plate that includes a reflective portion which is disposed on the viewing side of the image display panel and reflects a light from a light source to the viewing side.

The reflective portion includes a plurality of reflective elements that reflects the light from the light source to the viewing side, is arrayed along an extending direction of the light transmissive display plate to configure a pattern. The pattern includes a contour pattern representing an exterior contour of a display object, and the image display panel displays an internal image representing an internal state of the display object as the image by superimposing the internal image of the display object on the contour pattern.

According to the above configuration, the image display panel displays, as an image, an internal image in which an internal state of a display object is expressed, superimposed on a contour pattern in which an exterior contour of the display object is expressed. According to the superimposed display described above, since the contour pattern is displayed as if the contour pattern protrudes to a viewing side, an occupant of the vehicle can accurately recognize the display object by the exterior contour. Since the internal state is separately displayed on the back side, the occupant of the vehicle can accurately recognize the internal state while avoiding a confusion with the exterior contour. In this manner, a display with high visibility can be realized by leveraging the stereoscopic effect.

Embodiments of the present disclosure will be described hereafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

Figure 1:
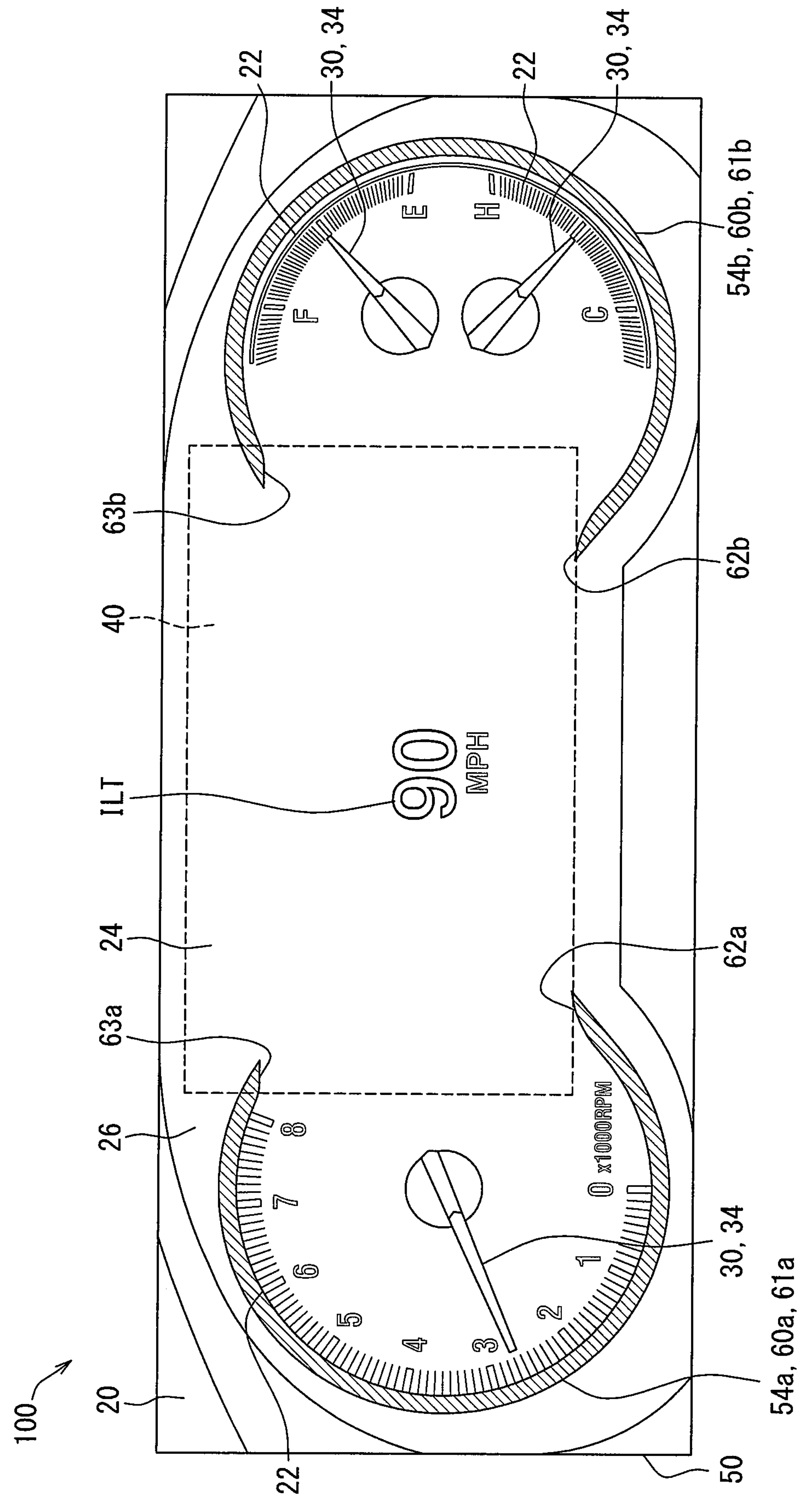
FIG. 1 is a front view showing a display device for vehicle according to a first embodiment, and shows an example of display in the case of a display type A.
Figure 2:
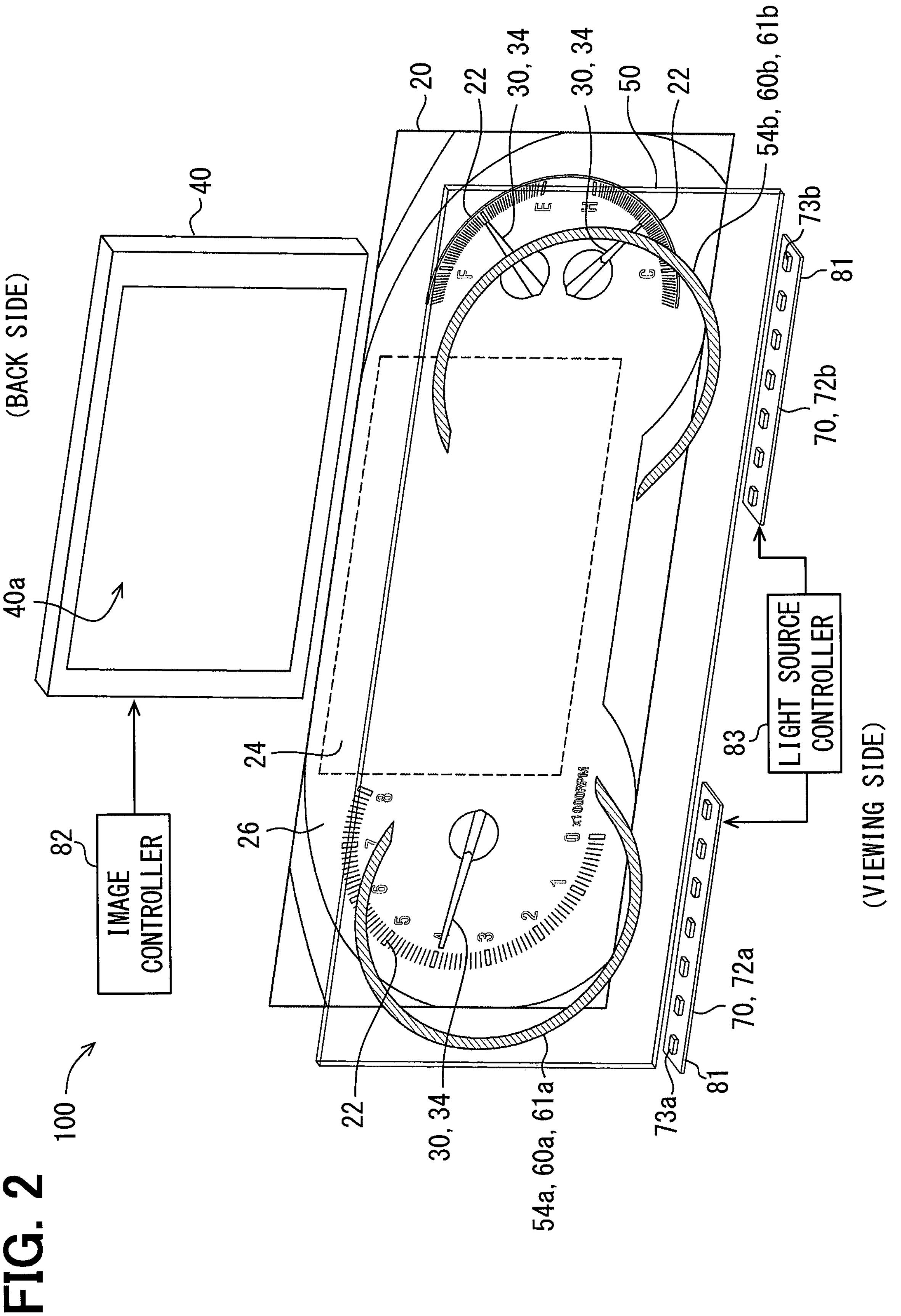
FIG. 2 is an exploded perspective view showing the display device according to the first embodiment.
Figure 3:
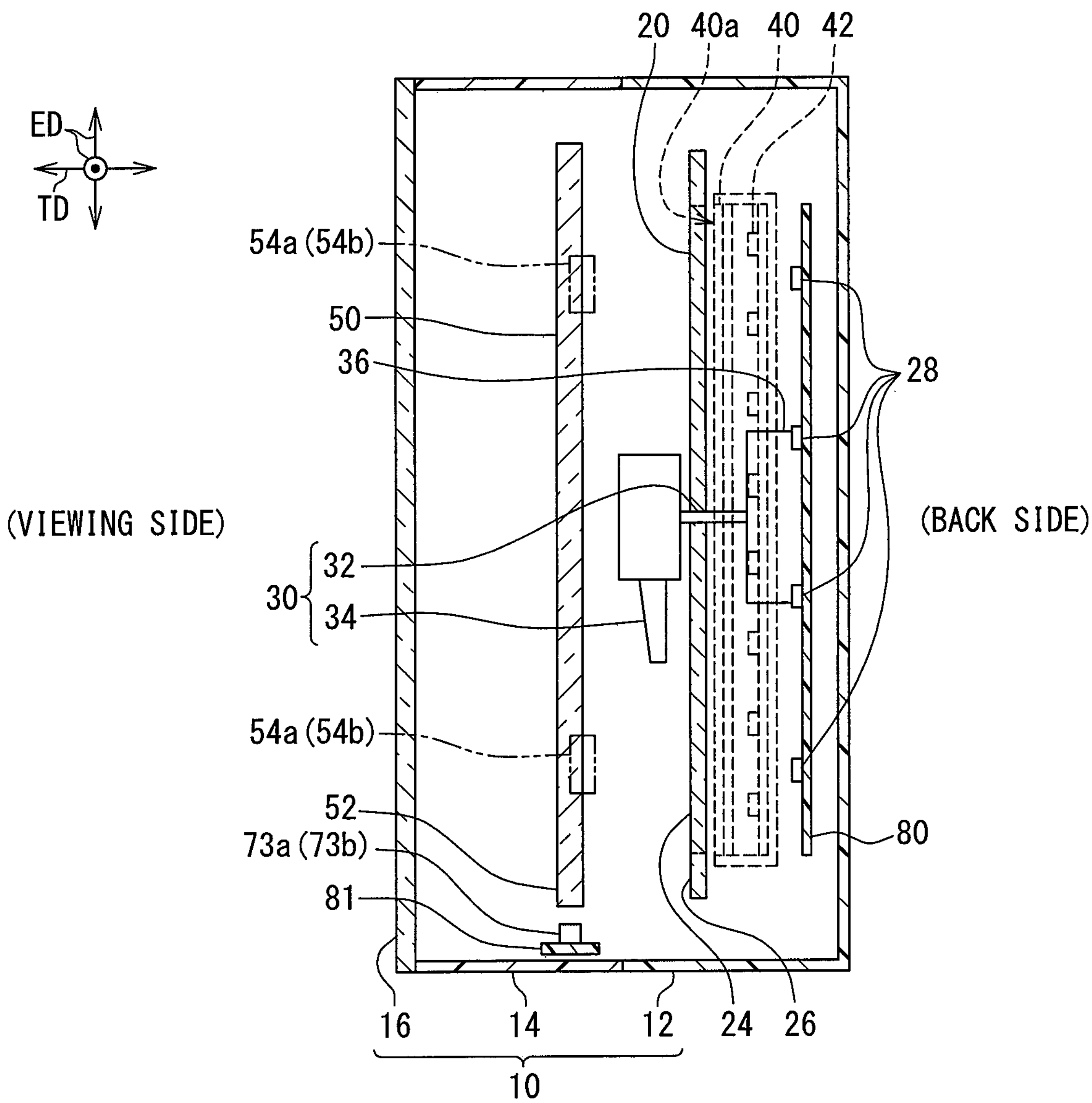
FIG. 3 is a cross-sectional view schematically showing the display device according to the first embodiment.

As shown in FIG. 1, a vehicle display device 100 according to a first embodiment is mounted on a vehicle, and is installed on an instrument panel facing a seat on which an occupant who visually recognizes the device 100 is seated. The vehicle display device 100 is capable of displaying vehicle information toward a viewing side where the occupant is to be positioned. The vehicle on which the vehicle display device 100 is mounted is, for example, a hybrid vehicle including both an engine and an electric motor as driving units. As shown in FIGS. 2 and 3, the vehicle display device 100 described above includes a case portion 10, a dial plate 20, a pointer 30, an image display panel 40, an image controller 82, a light transmissive display plate 50, a display plate light source 70, and a light source controller 83. The case portion 10 includes a rear case 12 and a window plate 14 each having a light shielding property, and a light transmissive plate 16 that is disposed closest to a viewing side in the device 100 and has a light transmission property. The light transmissive plate 16 is formed in a plate-shape and made of a semi-light transmissive resin such as colored acrylic resin. The transmittance of the light transmissive plate 16 is set to about 30% by smoke-like coloring, but may be set to an arbitrary value of 30% or more.

The dial plate 20 is disposed on a back side of the light transmissive plate 16 and the light transmissive display plate 50. The back side is a side opposite to the viewing side. The dial plate 20 is formed in a flat plate-like shape by partially applying a semi-light transmissive or light shielding printing on a surface of a base material on the viewing side, which is made of a light transmissive synthetic resin, for example. The printing may be replaced with coating.

The dial plate 20 configured as described above has an indicator portion 22 corresponding to vehicle information on the viewing side. The indicator portion 22 is surrounded by the light shielding printing on the dial plate 20 and is subjected to transmissive printing to form a contour of an indicator such as characters or scales. The indicator portion 22 of the dial plate 20 may include characters, scales, or marks corresponding to the vehicle information, and may not necessarily include characters even with a name of "dial plate".

The indicator portion 22 is illuminated from the back side by an indicator illumination light emitting device 28 mounted on a main circuit board 80 which is placed on the back side of the dial plate 20.

Further, in the indicator portion 22 of the present embodiment, characters and scales representing the engine speed are disposed in a left region of the dial plate 20, characters and scales representing a remaining fuel level are disposed in an upper right region, and characters and scales representing a water temperature of an engine coolant water are disposed in a lower right region, in accordance with the pointer 30 to be described later.

Three pointers 30 are provided in total, one corresponding to the left region of the dial plate 20, one corresponding to the upper right region, and one corresponding to the lower right region. Each pointer 30 integrally includes a coupling portion 32 and an indicating portion 34. The coupling portion 32 is disposed through a through hole provided in the dial plate 20, and is coupled to a rotation shaft of a stepping motor 36 held by the main circuit board 80. The indicating portion 34 is disposed between the dial plate 20 and the light transmissive display plate 50, and has a needle shape. The indicating portion 34 of each pointer 30 rotates in accordance with an output of the stepping motor 36, and indicates each of the indicator portions 22 disposed in a partial ring shape in the left and right regions of the dial plate 20 to thereby display vehicle information.

In the present embodiment, the pointer 30 corresponding to the left region displays the engine speed as the vehicle information. The pointer 30 corresponding to the upper right region displays the remaining fuel level as the vehicle information. The pointer 30 corresponding to the lower right region displays the water temperature of the engine coolant water as the vehicle information.

The image display panel 40 is disposed between the main circuit board 80 and the dial plate 20 so as to face a back side of the dial plate 20. A gap is provided between the dial plate 20 and the image display panel 40. In the present embodiment, the image display panel 40 is disposed corresponding to a central region of the dial plate 20. For that reason, the image display panel 40 is placed so as to be sandwiched between displays by the left and right pointers 30.

The image display panel 40 according to the present embodiment is a liquid crystal panel using thin film transistors, and employs an active matrix type liquid crystal panel formed of multiple liquid crystal pixels disposed in a two-dimensional direction. The image display panel 40 is illuminated by a backlight 42 from a back side of the image display panel 40 to emit a display light from a rectangular display surface 40*a* facing the viewing side to the viewing side, to thereby luminescently display an image.

The image controller 82, which is particularly shown in FIG. 2, is mounted on, for example, the main circuit board 80, and has at least one processor, one memory, and one input/output interface. The processor can control an image of the image display panel 40 through the input/output interface with execution of a computer program stored in the memory, for example.

In this example, in the central region of the dial plate 20 which faces the image display panel 40, a light transmissive base material of the dial plate 20 is exposed because no printing is performed. Therefore, the central region of the dial plate 20 is set as a transmissive region 24 having a light transmission property so that the display light of the image of the image display panel 40 is transmitted through the central region. The transmissive region 24 is disposed in a size slightly smaller than that of the display surface 40*a*. Such a transmissive region 24 is surrounded by a light shielding region 26 having a light shielding property by black printing, so that a contour of the transmissive region 24 is formed in a rectangular shape.

The light transmissive display plate 50 is formed in a flat plate-like shape and made of, for example, a synthetic resin having a light transmission property. The light transmissive display plate 50 is disposed on the viewing side of the dial plate 20 and the pointer 30, and is provided substantially in parallel with the dial plate 20. For that reason, an extending direction ED of the light transmissive display plate 50 is along an extending direction of the display surface 20*a* and an extending direction of the dial plate 20, and a plate thickness direction TD of the light transmissive display plate 50 is along a direction perpendicular to the display surface 20*a* and a plate thickness direction of the dial plate 20. The plate thickness direction TD of the present embodiment substantially coincides with a direction perpendicular to the surface having the largest area of the light transmissive display plate 50. The light transmissive display plate 50 has a substantially rectangular shape so as to cover the entire surface of the dial plate 20 from the viewing side.

As shown in FIG. 2, the display plate light source 70 has two light emitting portions 72*a* and 72*b* which are separated from each other in the left and right directions. The light emitting portions 72*a* and 72*b* are arrayed along the outer edge portion 52. More specifically, each of the light emitting portions 72*a* and 72*b* is formed by arraying multiple light emitting devices 73*a* and 73*b* each emitting a light source light along the outer edge portion 52 of the light transmissive display plate 50. Each of the light emitting devices 73*a* and 73*b* is a light emitting diode mounted on a light source circuit board 81, and is connected to a power supply to emit a light. In particular, according to the present embodiment, each of the light emitting devices 73*a* and 73*b* is a multicolor light emitting diode. Therefore, the display plate light source 70 according to the present embodiment includes a color light source.

More specifically, each of the light emitting devices 73*a* in the light emitting portion 72*a* faces a side surface of the outer edge portion 52 on a lower side of the outer edge portion 52 of the light transmissive display plate 50. Similarly, each of the light emitting devices 73*b* in the light emitting portion 72*b* faces a side surface of the outer edge portion 52 on a lower side of the outer edge portion 52 of the light transmissive display plate 50. When the light emitting devices 73*a* and 73*b* emit the light source light toward the opposing side surfaces, the light source light proceeds from the lower side toward the upper side inside the light transmissive display plate 50. The light source lights of the light emitting devices 73*a* and 73*b* that enter the inside of the light transmissive display plate 50 through the outer edge portion 52 are adapted to illuminate illumination ranges that are partially shifted from each other in the extending direction ED. It is preferable to place the display plate light source 70 so as not to be visible to an occupant, but a part of the front view is illustrated by a solid line for the purpose of description.

The light source controller 83 is mounted on the main circuit board 80, for example, and has at least one processor, a memory, and an input/output interface. The processor can control the display plate light source 70 through the input/output interface, for example, with execution of a computer program stored in the memory. More specifically, the light source controller 83 can switch on and off the light emitting devices 73*a* and 73*b* of the display plate light source 70. The light source controller 83 can change the emission colors of the light emitting devices 73*a* and 73*b* to various colors. In particular, in the present embodiment, the light source controller 83 switches on and off each of the light emitting portions 72*a* and 72*b* and changes an emission color of each light emitting unit. As shown in FIGS. 1 to 4, the light transmissive display plate 50 has reflective portions 54*a* and 54*b* in partial regions. In particular, in the present embodiment, two reflective portions 54*a* and 54*b* are disposed in correspondence with the left and right light emitting portions 72*a* and 72*b*. In FIGS. 1 and 2, regions indicated by the reflective portions 54*a* and 54*b* are hatched with oblique lines.

Figure 4:
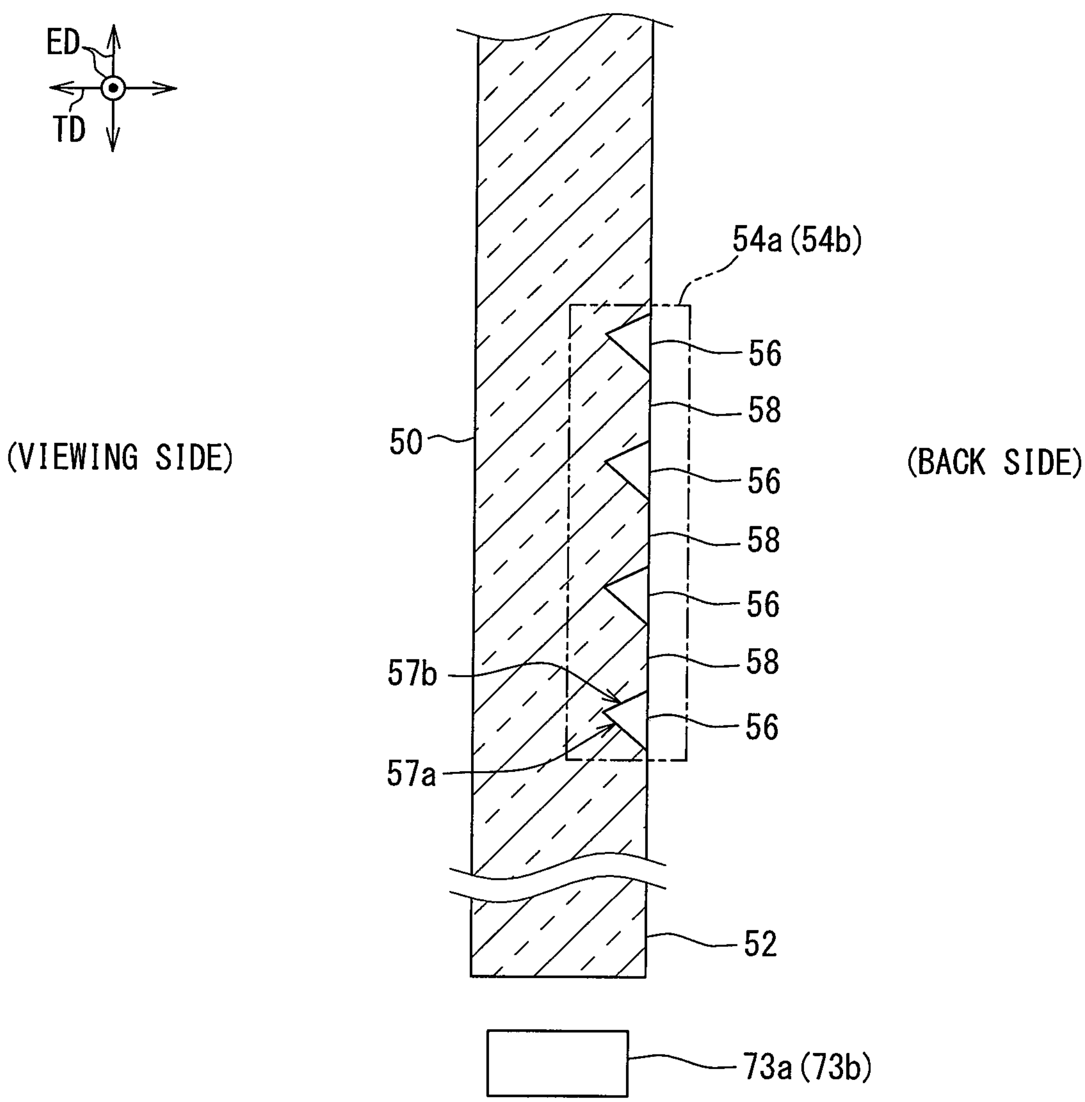
FIG. 4 is a cross-sectional view schematically showing a light transmissive display plate according to the first embodiment.
Figure 5:
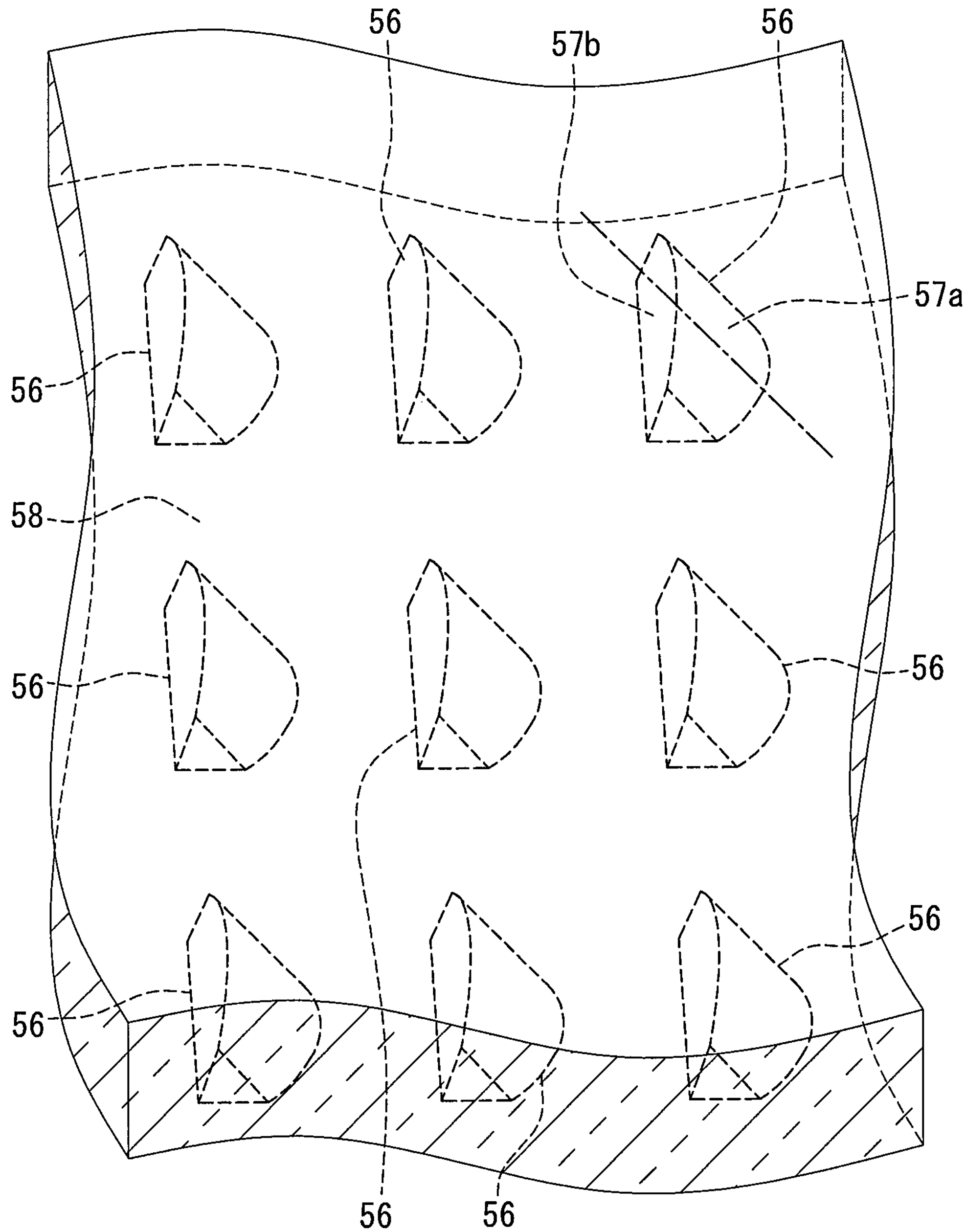
FIG. 5 is a perspective view schematically showing reflective elements in an enlarged manner according to the first embodiment.

More specifically, as shown in FIGS. 4 and 5, each of the reflective portions 54*a* and 54*b* has multiple reflective elements 56 aligned along the extending direction ED of the light transmissive display plate 50. Each of the reflective elements 56 is set to a fine size, and is formed in a concave hole shape recessed from the back side of the light transmissive display plate 50 to the inside of the display plate 50. Each reflective element 56 has a reflection surface 57*a* and an inclined back surface 57*b*.

The reflection surface 57*a* is disposed in a direction facing the light emitting portion 72*a* or 72*b* of the reflective element 56. The reflection surface 57*a* is formed in a curved surface shape. The reflection surface 57*a* extends in an inclination direction inclined with respect to the plate thickness direction TD of the light transmissive display plate 50. The inclination direction is preferably set in a range of, for example, 39 to 45 degrees with respect to the plate thickness direction TD.

The inclined back surface 57*b* is provided to face an opposite side to the reflection surface 57*a*, and is disposed back-to-back with the reflection surface 57*a*. The inclined back surface 57*b* is formed in a plane shape inclined by, for example, 25 degrees with respect to the plate thickness direction TD. In other words, an inclination angle of the inclined back surface 57*b* is set to be smaller than an inclination angle of the reflection surface 57*a*.

In each of the reflective portions 54*a* and 54*b*, the reflective elements 56 are disposed one by one, and separated from each other, through a flat portion 58 formed flat along the extending direction ED of the light transmissive display plate 50. In particular, in the present embodiment, the density of the reflective element 56 in each of the reflective portions 54*a* and 54*b* is substantially the same at each other at each location, and a shape of the reflective element 56 is also substantially the same as each other at each location.

When the light source light reaches the reflective portion 54*a* from the light emitting portion 72*a* of the display plate light source 70, the light source light is reflected to the viewing side by the reflection surface 57*a* of each reflective element 56 facing the light emitting portion 72*a*. Similarly, when the light source light reaches the reflective portion 54*b* from the light emitting portion 72*b* of the display plate light source 70, the light source light is reflected to the viewing side by the reflection surface 57*a* of each reflective element 56 facing the light emitting portion 72*b*. Therefore, as shown in FIGS. 1 and 2, when the light emitting portion 72*a* corresponding to one reflective portion 54*a* is turned on, the pattern 60*a* configured by the reflective elements 56 arrayed in the reflective portion 54*a* is displayed in a light state. Similarly, when the light emitting portion 72*b* corresponding to one reflective portion 54*b* is turned on, the pattern 60*b* configured by the reflective elements 56 arrayed in the reflective portion 54*b* is displayed in the light state.

The patterns 60*a* and 60*b* of the present embodiment are outer peripheral patterns 61*a* and 61*b* disposed symmetrically with respect to each other corresponding to the left and right regions, respectively. The outer peripheral pattern 61*a* configured by the reflective portion 54*a* is formed in a linear shape in an region of the light transmissive display plate 50 corresponding to the outer peripheral portion of the indicator portion 22 on the left side so as to border the indicator portion 22, and, for example, is formed in an arc shape. Both end portions 62*a* and 63*a* of the outer peripheral pattern 61*a* extend to an region of the light transmissive display plate 50 facing the image display panel 40. The outer peripheral pattern 61*b* formed by the reflective portion 54*b* is formed in a linear shape in a region of the light transmissive display plate 50 corresponding to the outer peripheral portion of the indicator portion 22 on the left side so as to border the indicator portion 22, and, for example, is formed in an arc shape. Both end portions 62*b* and 63*b* of the outer peripheral pattern 61*b* extend to a region of the light transmissive display plate 50 facing the image display panel 40.

Figure 6:
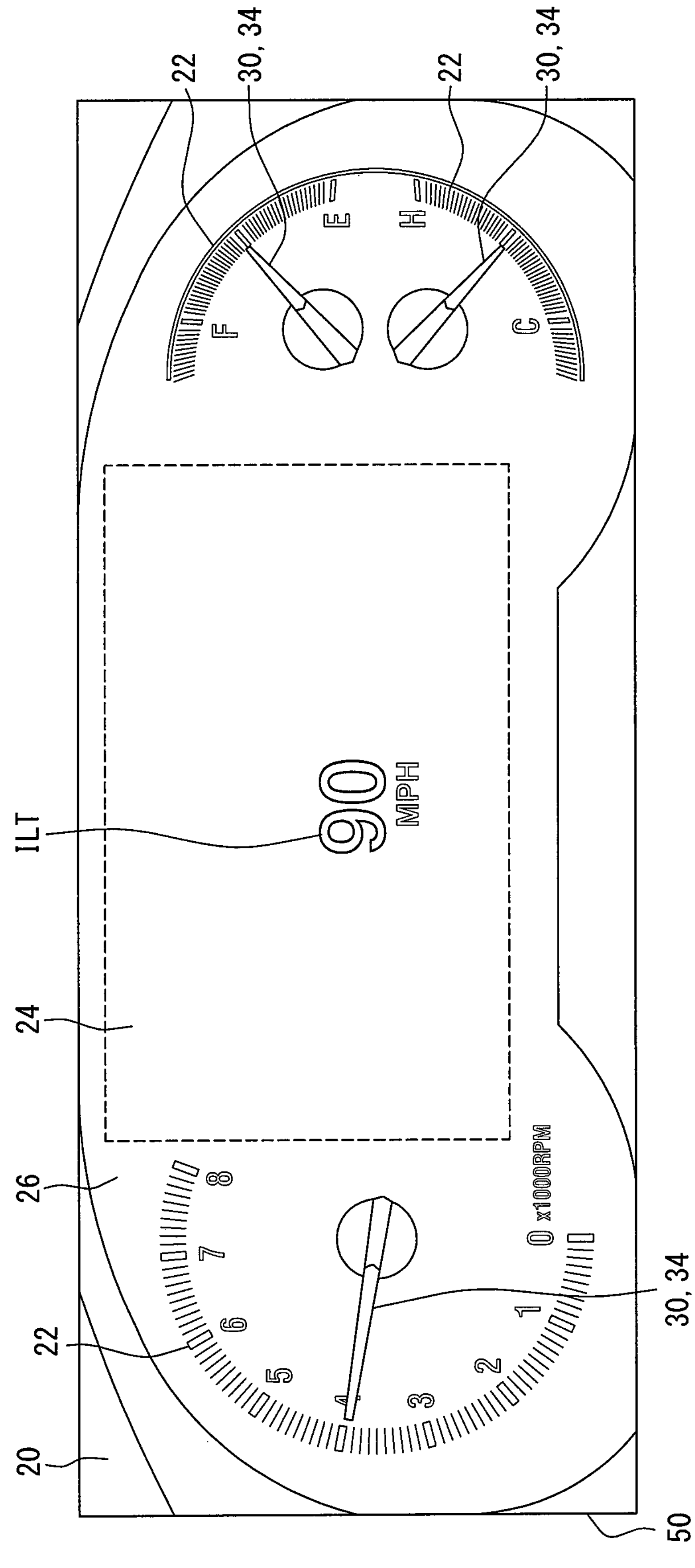
FIG. 6 is a front view showing the display device according to the first embodiment, and shows a case in which a light source for a display plate is turned off.

The outer peripheral patterns 61*a* and 61*b* are not only switched between display and non-display in accordance with turning on and off of the respectively light emitting portions 72*a* and 72*b*, but also can be displayed by individually changing the color with the inclusion of color light sources. As shown in FIG. 6, when the light emitting portions 72*a* and 72*b* are turned off and not displayed, the respective outer peripheral patterns 61*a* and 61*b* are hardly visually recognized from the viewing side due to the setting of the size, the density, and the like of the reflective element 56.

The turning on and off of the light emitting portions 72*a* and 72*b* and the color change are controlled in cooperation with the image displayed by the image display panel 40. The display type of the image can be selected and set according to a preference of the occupant by, for example, a switching switch provided in the vehicle, and there is also a display type which is temporarily changed according to a mode of the vehicle and a situation of a perimeter monitoring by a periphery monitoring device of the vehicle.

A display type A shown in FIG. 1 is a display type for digitally displaying a speed of the vehicle as the vehicle information in the image by the character image ILT. When an economy mode is not selected in the vehicle, the light emitting portions 72*a* and 72*b* emit white light, so that the outer peripheral patterns 61*a* and 61*b* are also displayed in white. On the other hand, when the economy mode is selected, the color of each of the light emitting portions 72*a* and 72*b* is changed so as to emit green light, for example, and each of the outer peripheral patterns 61*a* and 61*b* is also displayed in green. The economy mode is, for example, a mode in which a vehicle control is performed so as to reduce the engine speed to a lower level.

Figure 7:
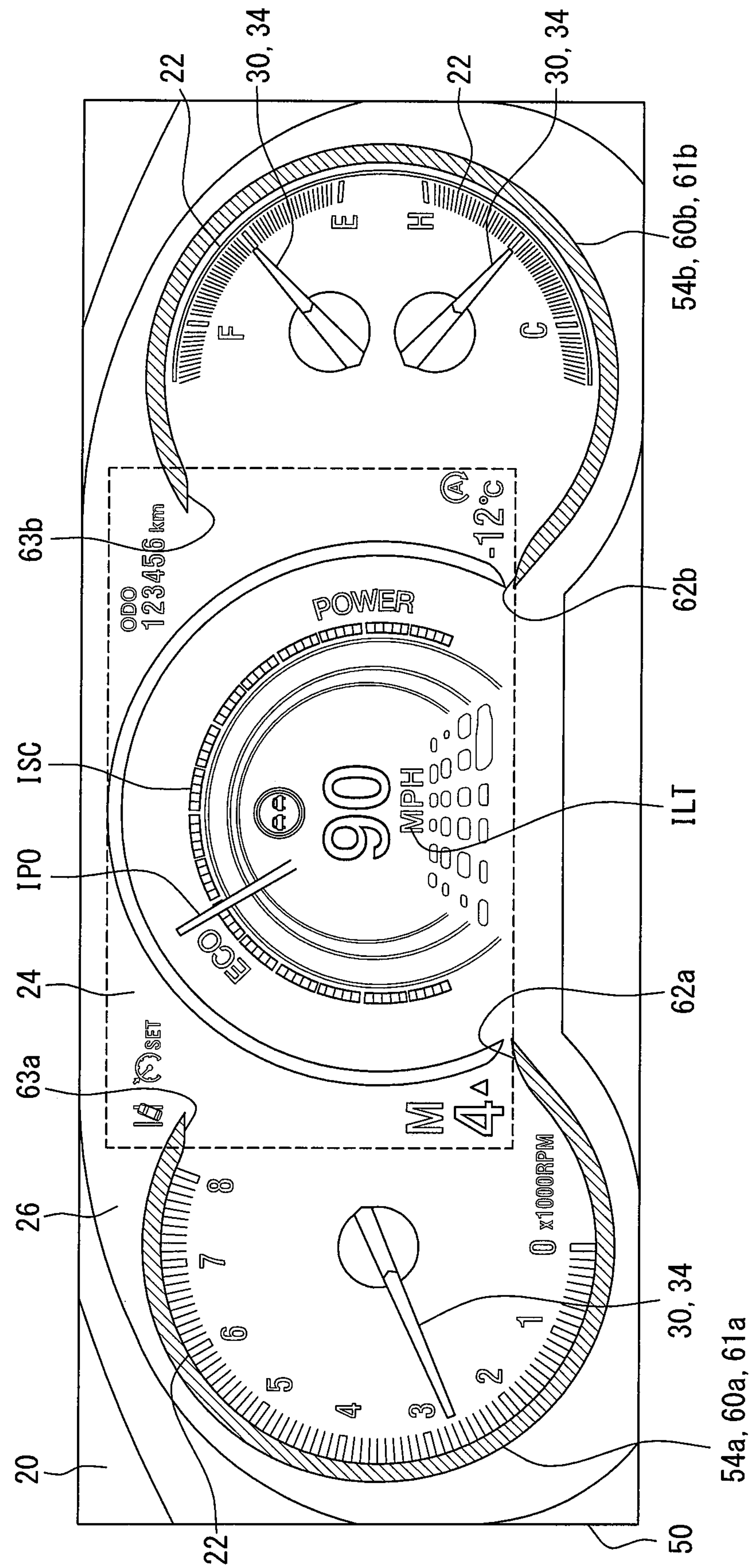
FIG. 7 is a front view showing the display device according to the first embodiment, and shows an example of display in the case of a display type B.

A display type B shown in FIG. 7 is a display type in which the speed of the vehicle as the vehicle information is digitally displayed in the image by the character image ILT, and a current value of an electric motor as the other vehicle information is displayed in an analog manner by a pointer image IPO indicating the scale image ISC. When an economy mode is not selected in the vehicle, the light emitting portions 72*a* and 72*b* emit white light, so that the outer peripheral patterns 61*a* and 61*b* are also displayed in white. On the other hand, when the economy mode is selected, the color of each of the light emitting portions 72*a* and 72*b* is changed so as to emit green light, for example, and each of the outer peripheral patterns 61*a* and 61*b* is also displayed in green.

Figure 8:
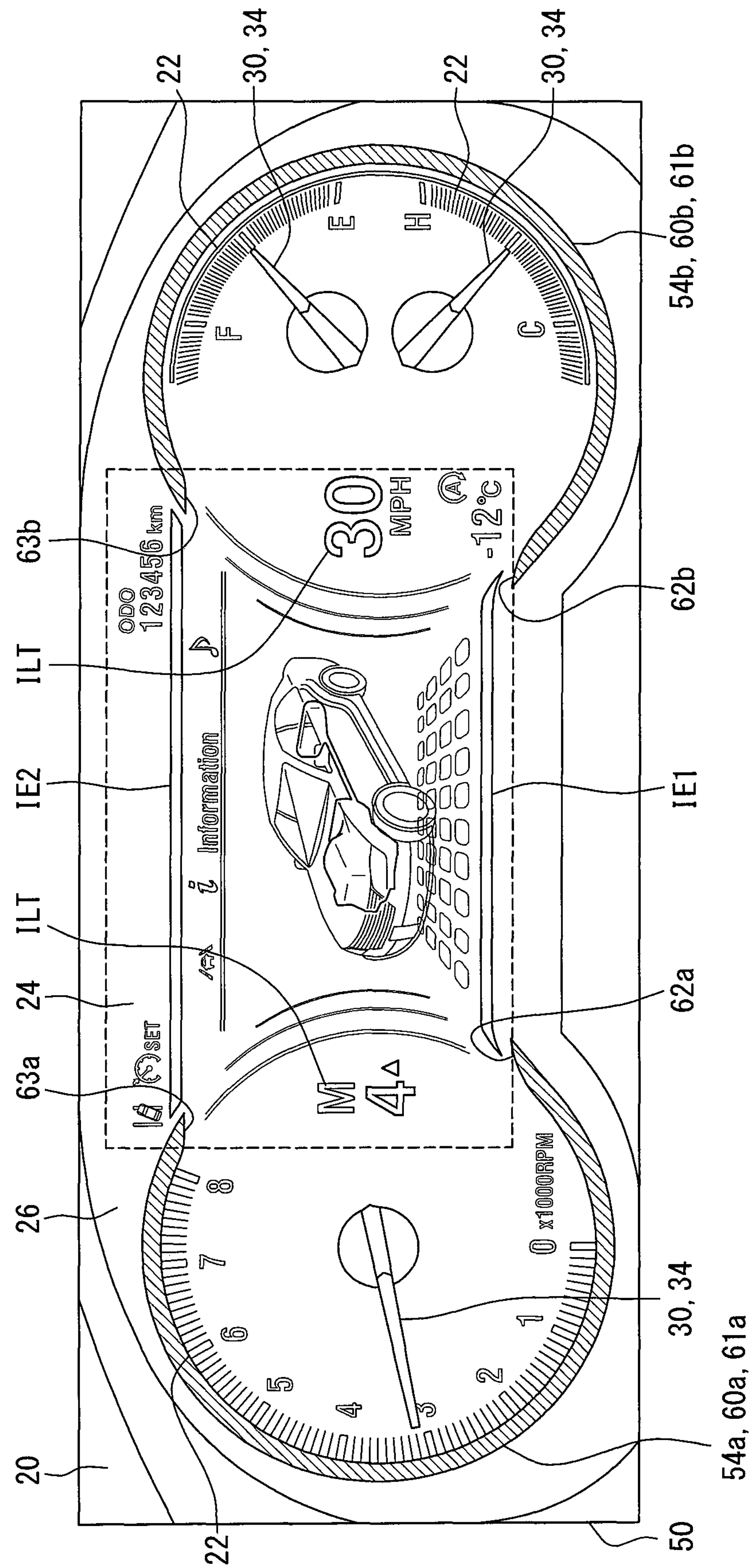
FIG. 8 is a front view showing the display device according to the first embodiment, and shows an example of display in the case of a display type C.
Figure 9:
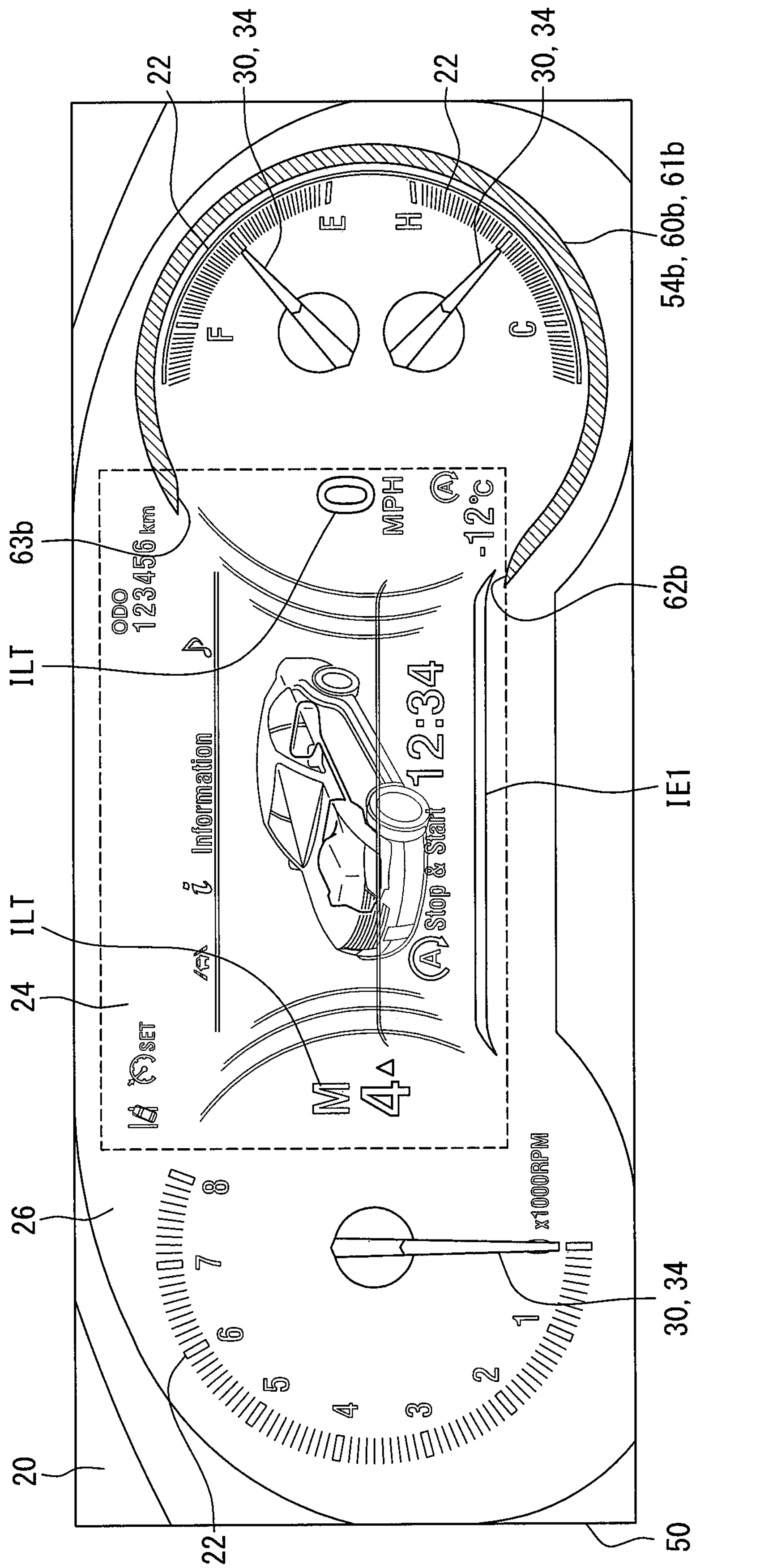
FIG. 9 is a front view showing the display device according to the first embodiment, and shows an example of display in the case of the display type C.

A display type C shown in FIGS. 8 and 9 is a display type in which a gear position is displayed on the left side of the display surface 40*a*, the speed of the vehicle is displayed on the right side by the character image ILT, and various kinds of information are displayed at the center of the display surface 40*a*.

In the display type C, when an idle stop mode is not selected in the vehicle, as shown in FIG. 8, the light emitting portions 72*a* and 72*b* emit white light, so that the outer peripheral patterns 61*a* and 61*b* are also displayed in white. At that time, the image display panel 40 further extends the end portions 62*a* and 62*b* on the lower side of the respective outer peripheral patterns 61*a* and 61*b*, and displays an extended image IE1 provided in a linear shape so as to connect the lower end portions 62*a* and 62*b* to each other. In addition, the image display panel 40 further extends the end portions 63*a* and 63*b* on the upper side of the respective outer peripheral patterns 61*a* and 61*b*, and displays an extended image IE2 provided in a linear shape so as to connect the lower end portions 63*a* and 63*b* to each other.

On the other hand, as shown in FIG. 9, when the idle stop mode is selected in the vehicle, the left-side light emitting portion 72*a* is turned off, whereby the left-side outer peripheral pattern 61*a* is not displayed, and the right-side light emitting portion 72*b* is turned on in white, whereby the right-side peripheral pattern 61*b* is displayed in white. Accordingly, the extended image IE1 is not displayed, and the extended image IE2 remains displayed. The idle stop mode of the vehicle is a mode in which the vehicle control is performed so as to automatically and temporarily stop the engine, for example, when the vehicle stops for waiting for a traffic signal to change.

Figure 10:
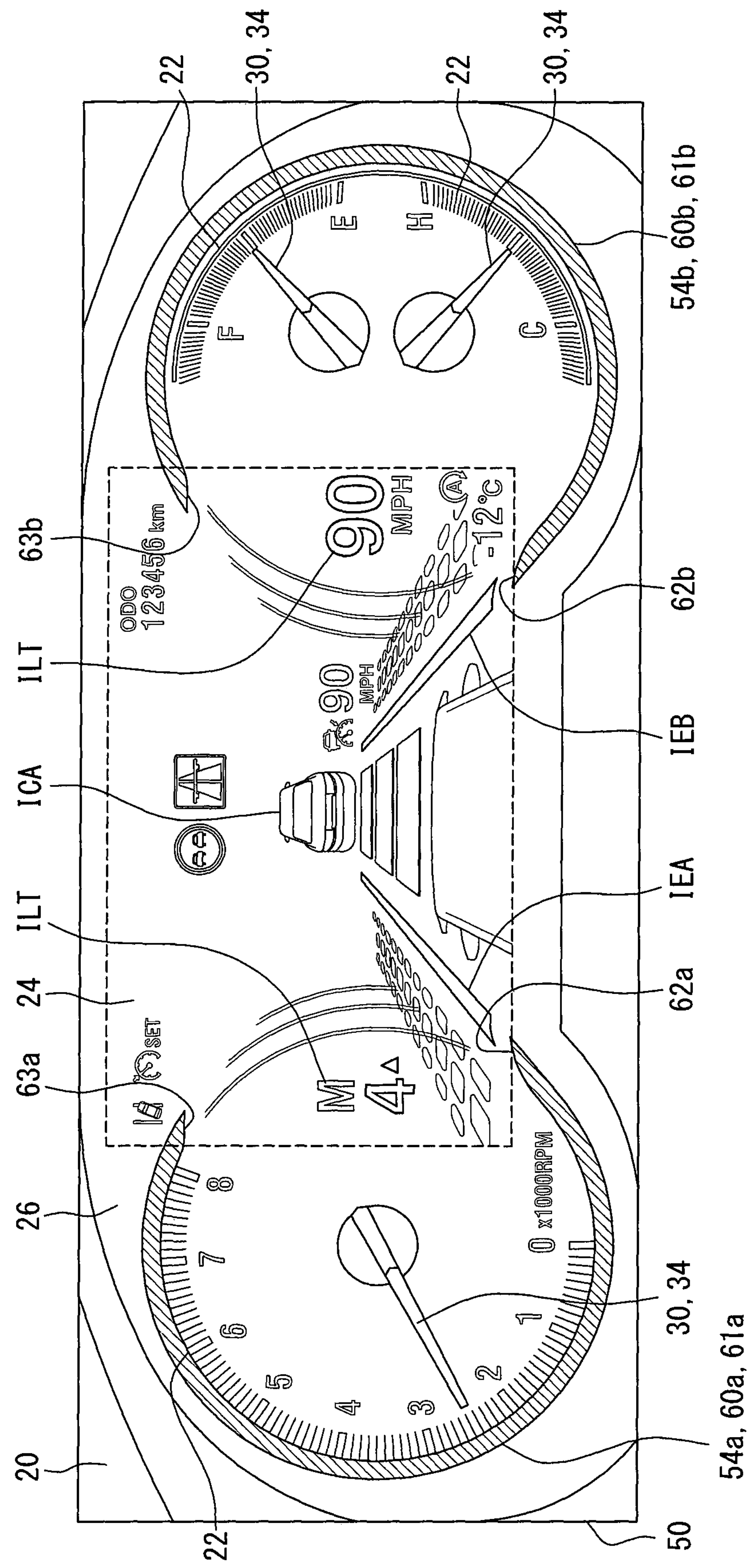
FIG. 10 is a front view showing the display device according to the first embodiment, and shows an example of display in the case of a display type D.
Figure 11:
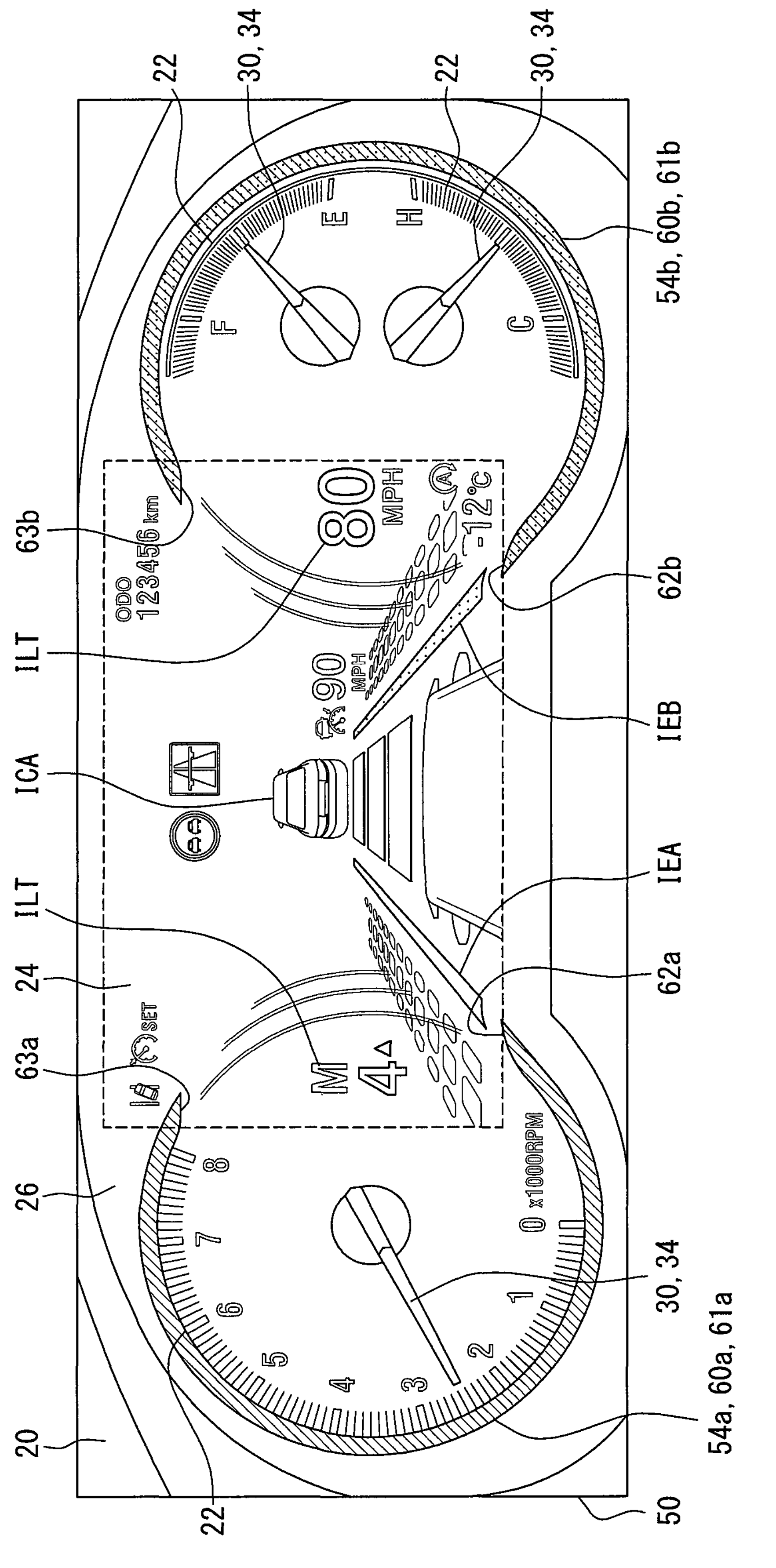
FIG. 11 is a front view showing the display device according to the first embodiment, and shows an example of display in the case of the display type D.

Further, as shown in FIGS. 10 and 11, when an auto cruise mode is set in the vehicle as a display type D, a gear position is displayed on the left side of the display surface 40*a*, and the speed of the vehicle is displayed on the right side by the character image ILT, and a state of the road, for example, whether or not another vehicle exists in the front side of the host vehicle is displayed in the center of the display surface 40*a*. In this display, the image display panel 40 displays an extended image IEA provided in a linear shape so as to further extend the lower end portion 62*a* of the end portions 62*a* and 63*a* of the outer peripheral pattern 61*a*. Similarly, the image display panel 40 displays an extended image IEB provided in a linear shape so as to further extend the lower end portion 62*b* of the end portions 62*b* and 63*b* of the outer peripheral pattern 61*b*. Each of the extended images IEA and IEB extends linearly from the respective end portions 62*a* and 62*b* toward a center of a display surface 40*a* while sandwiching the vehicle image ICA in the display of the situation of a road between the left and right sides, so that each of the extended images IEA and IEB can be recognized by the occupant as an image representing an outer line of a roadway (for example, a lane line).

The extended images IEA and IEB and the outer peripheral patterns 61*a* and 61*b* are displayed in white as shown in FIG. 10 when the periphery monitoring device does not detect an obstacle in the periphery. On the other hand, when the periphery monitoring device detects an obstacle at a side outside the vehicle, only the extended image on the side where the obstacle is detected and the outer peripheral pattern are changed in color to amber (orange) as shown in FIG. 11. For example, in FIG. 11, since the obstacle is detected on the right side outside the vehicle, the color is changed to amber (orange) only in the right extended image IEB and the outer peripheral pattern 61*b*. In FIG. 11, the color changed portion is hatched by dots.

Figure 12:
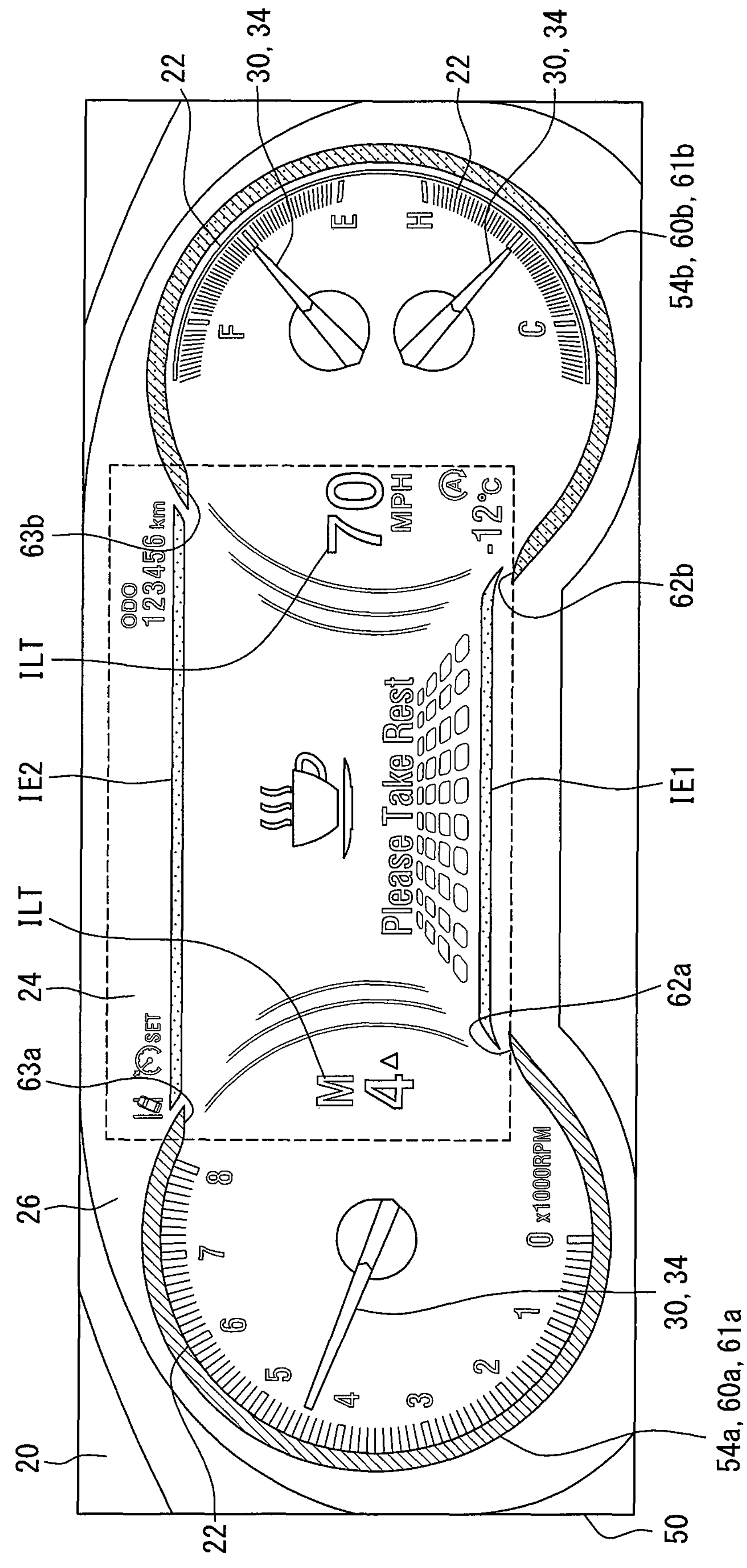
FIG. 12 is a front view showing the display device according to the first embodiment, and shows an example of display in the case of a display type E.

Further, as shown in FIG. 12, as a display type E, when the vehicle continues to travel on an expressway for a long period of time, the gear position is displayed on the left side of the display surface 40*a*, the speed of the vehicle is displayed on the right side, and an image for urging a break is displayed at the center of the display surface 40*a*. At that time, the image display panel 40 further extends the end portions 62*a* and 62*b* on the lower side of the respective outer peripheral patterns 61*a* and 61*b*, and displays an extended image IE1 provided in a linear shape so as to connect the lower end portions 62*a* and 62*b* to each other. In addition, the image display panel 40 further extends the end portions 63*a* and 63*b* on the upper side of the respective outer peripheral patterns 61*a* and 61*b*, and displays an extended image IE2 provided in a linear shape so as to connect the lower end portions 63*a* and 63*b* to each other. For this reason, the image for urging a break is visually recognized as if the entire circumference of the extended images IE 1 and IE 2 and the outer peripheral patterns 61*a* and 61*b* is surrounded. The extended images IE1 and IE2 and the outer peripheral patterns 61*a* and 61*b* are displayed in amber (orange) for reminder.

As described above, the vehicle display device 100 performs display in which the image of the image display panel 40 and the patterns 60*a* and 60*b* formed by the reflective element 56 are displayed in cooperation with each other.

The operation and effects of the first embodiment described above will be described below.

Since the vehicle display device 100 is configured as in the first embodiment, the image display panel 40 is not flush with the dial plate 20 in a side-by-side manner, but is disposed on the back side of the dial plate 20. As a result, a sense of depth of the image display panel 40 with respect to the dial plate 20 and the light transmissive display plate 50 is increased in comparison with the side-by-side manner. The image of the image display panel 40 can reach the direction of the light transmissive display plate 50 through the transmissive region 24 of the dial plate 20. As described above, with an increase in the sense of depth of the image display panel 40, a special effect of improving the relative stereoscopic effect in the combination of the display by the dial plate 20 and the reflective portions 54*a* and 54*b* of the light transmissive display plate 50 and the display of the image display panel 40 can be expected.

Further, according to the first embodiment, the multiple reflective elements 56 are aligned in the extending direction ED of the light transmissive display plate 50 to configure the patterns 60*a* and 60*b*. Since the patterns 60*a* and 60*b* are displayed as if the patterns 60*a* and 60*b* protrude from the image display panel 40 toward the viewing side, the stereoscopic effect becomes more special.

According to the first embodiment, the image display panel 40 displays the extended images IEA, IEB, IE 1, and IE 2 provided in a linear shape so as to further extend the end portions of the linear outer peripheral patterns 61*a* and 61*b* as images. Since the extended images IEA, IEB, IE1, and IE2 appear to be continuous with the outer peripheral patterns 61*a* and 61*b*, a sense of unity is obtained between the indicator portion 22, the reflective portions 54*a* and 54*b*, and the image display panel 40 while giving the stereoscopic effect.

In addition, according to the first embodiment, since the light source 70 includes a color light source capable of changing the colors of the patterns 60*a* and 60*b*, various appearance according to the situation while giving the stereoscopic effect can be produced.

Second Embodiment

Figure 13:
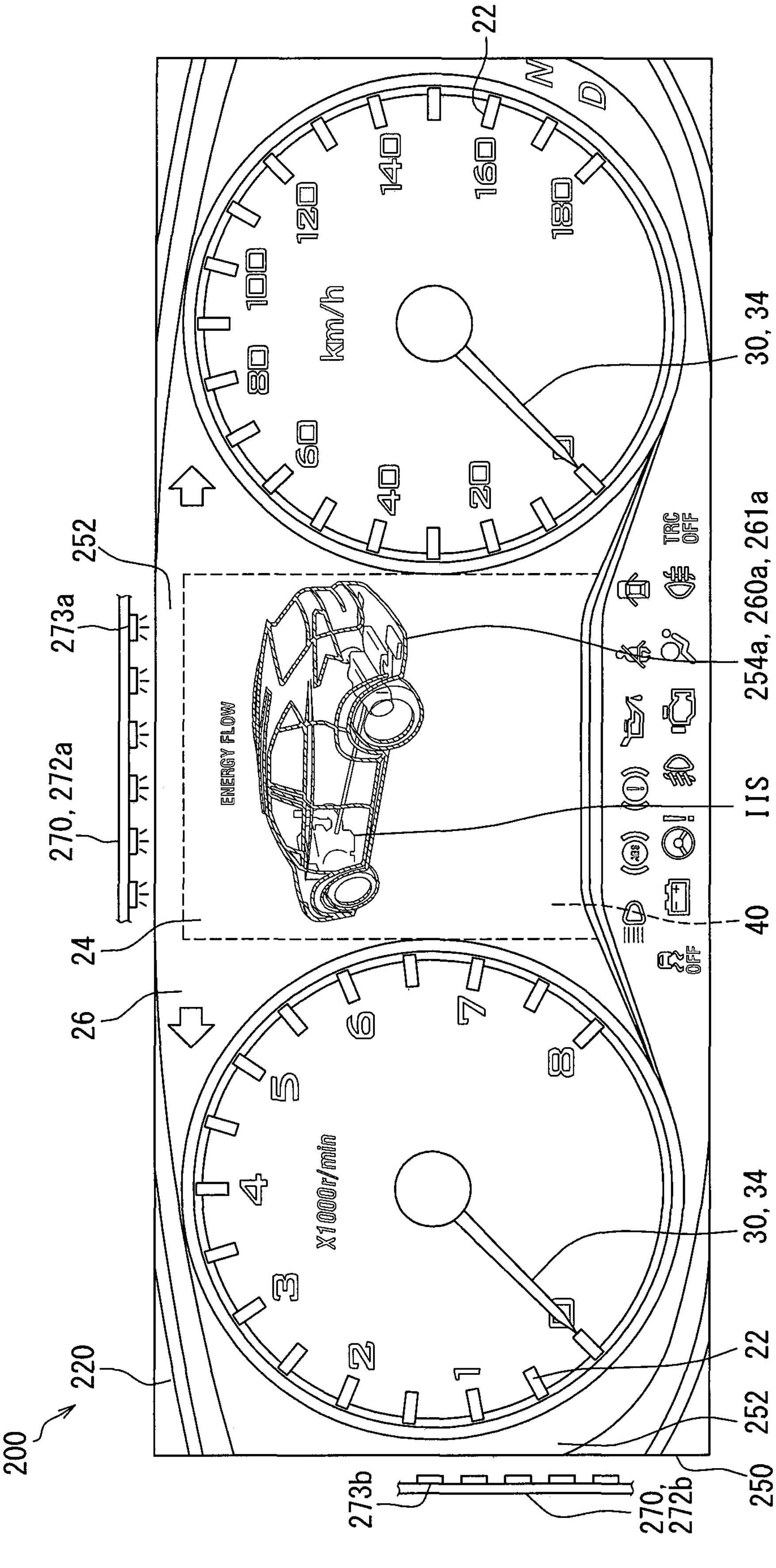
FIG. 13 is a front view showing a display device for a vehicle according to a second embodiment, and shows one example of display.
Figure 14:
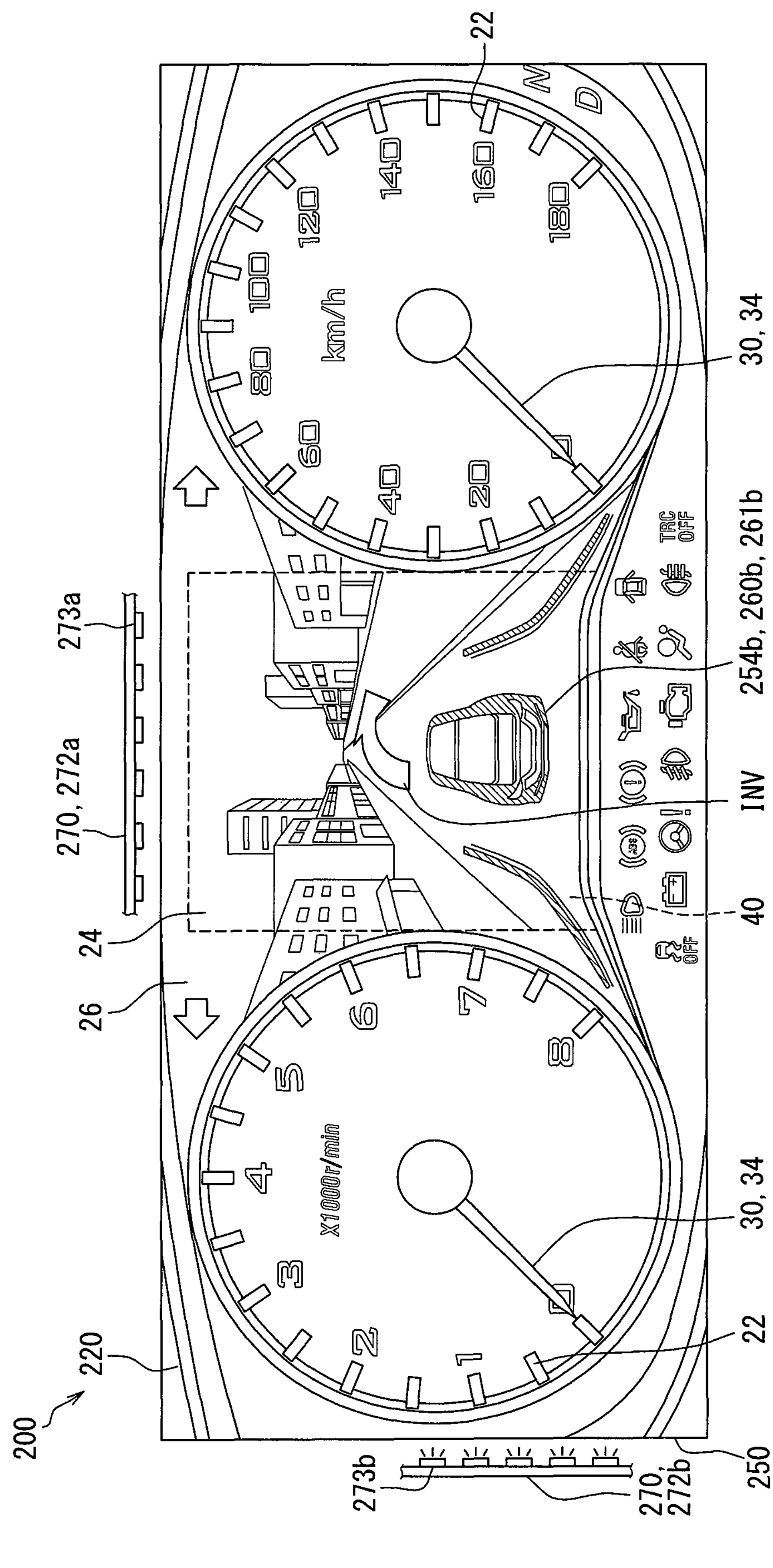
FIG. 14 is a front view showing the display device according to the second embodiment, and shows another example of display.
Figure 15:
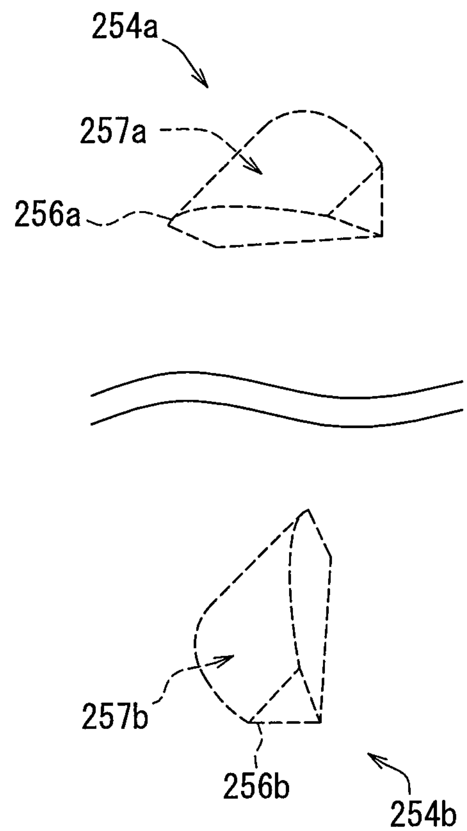
FIG. 15 is a partially enlarged view illustrating an orientation of a reflection surface of each reflective portion according to the second embodiment.

As shown in FIGS. 13 to 15, a second embodiment is a modification of the first embodiment. The second embodiment will be described focusing on matters different from the first embodiment.

In the second embodiment, as shown in FIGS. 13 and 14, characters and scales representing an engine speed are disposed in a left region of a dial plate 220, and characters and scales representing a speed of a vehicle are disposed in a right region, as an indicator portion 222. Accordingly, a total of two pointers 30 are provided, one corresponding to a left region of the dial plate 220 and one corresponding to a right region.

As in the first embodiment, an image display panel 40 faces a back side of the dial plate 220 and is disposed corresponding to a central region of the dial plate 220. The central region of the dial plate 220 is set as a transmissive region 24 so that a display light of the image of the image display panel 40 is transmitted through the central region.

A light transmissive display plate 250 according to the second embodiment has two reflective portions 254*a* and 254*b* so as to configure different patterns 260*a* and 260*b*. The reflective portion 254*a* is provided in a portion of the light transmissive display plate 250 which faces an upper region of the image display panel 40. The reflective portion 254*b* is provided in a portion of the light transmissive display plate 250 which faces a lower region of the image display panel 40.

A display plate light source 270 according to the second embodiment has two light emitting portions 272*a* and 272*b*. The light emitting portion 272*a* corresponds to the reflective portion 254*a*. In the light emitting portion 272*a*, each light emitting device 273*a* faces a side surface of the outer edge portion 252 on an upper side of the outer edge portion 252 of the light transmissive display plate 250. Each of the light emitting devices 273*a* emits a light source light toward the side surface, so that the light source light proceeds from the upper side toward the lower side inside the light transmissive display plate 250.

A reflection surface 257*a* of each reflective element 256*a* in the reflective portion 254*a* faces upward in the same direction as each other. In other words, the light emitting portion 272*a* is disposed at a position facing the reflection surface 257*a* of the corresponding reflective portion 254*a* in the outer edge portion 252. When the light source light reaches the reflective portion 254*a* from the light emitting portion 272*a*, the light source light is reflected to the viewing side by the reflection surface 257*a* of each reflective element 256*a* facing the light emitting portion 272*a*. Therefore, when the light emitting portion 272*a* is turned on, the pattern 260*a* is displayed in light by the reflective elements 256*a* arrayed in the reflective portion 254*a*.

The light emitting portion 272*b* corresponds to the reflective portion 254*b*. In the light emitting portion 272*b*, each light emitting device 273*b* faces a side surface of the outer edge portion 252 on a left side of the outer edge portion 252 of the light transmissive display plate 250. Each of the light emitting devices emits the light source light toward the side surface, so that the light source light proceeds from the left side toward the right side inside the light transmissive display plate 250.

Reflection surfaces 257*b* of respective reflective elements 256*b* in the reflective portion 254*b* face toward the left side which is in the same direction as each other. In other words, the light emitting portion 272*b* is disposed at a position facing the reflection surface 257*b* of the corresponding reflective portion 254*b* in the outer edge portion 252. Thus, the reflection surface 257*a* of the reflective portion 254*a* and the reflection surface 257*b* of the reflective portion 254*b* are oriented in directions different from each other by 90 degrees as shown in FIG. 15.

When the light source light reaches the reflective portion 254*b* from the light emitting portion 272*b*, the light source light is reflected to the viewing side by the reflection surface 257*b* of each reflective element 256*b* facing the light emitting portion 272*b*. Therefore, when the light emitting portion 272*b* is turned on, a pattern 260*b* is displayed in light by the reflective elements 256*b* arrayed in the reflective portion 254*b*.

In such an arrangement of the light emitting portions 272*a* and 272*b* and the reflective portions 254*a* and 254*b*, light from the light emitting portion 272*a* can also reach the reflective portion 254*b*, but the reflection surface 257*b* of the reflective portion 254*b* faces in a direction different from that of the reflection surface 257*a* of the reflective portion 254*a*, and does not face the light emitting portion 272*a*. Therefore, even if the light emitting portion 272*a* is turned on, the pattern 260*b* is prevented from being displayed by the reflective portion 254*b* in light.

In this example, the pattern 260*a* configured by the reflective portion 254*a* includes a contour pattern 261*a* in which an exterior contour of a display object is expressed. In particular, the display object according to the present embodiment is a vehicle, and the exterior contour of the vehicle is represented by the contour pattern 261*a*.

The pattern 260*b* configured by the reflective portion 254*b* represents a vehicle, but the pattern 260*b* represents a vehicle overhead view pattern 261*b* in which the vehicle is viewed from behind and above.

FIG. 13 shows a state in which the light emitting portion 272*a* is turned on and the light emitting portion 272*b* is turned off. In this state, the contour pattern 261*a* is displayed, but the vehicle overhead view pattern 261*b* is not displayed. In response to the above state, the image display panel 40 displays an internal image IIS in which an internal state of the display object is expressed, so as to be superimposed on the contour pattern 261*a*. In particular, according to the present embodiment, since the display object is a vehicle, the internal image IIS represents the internal state of the vehicle. For example, the internal image IIS displays an engine and a storage battery at a position corresponding to the contour pattern 261*a*, and displays what control is currently performed on a hybrid system of the vehicle by moving images in which an energy flows between the engine, an electric motor, and the storage battery.

FIG. 14 shows a state in which the light emitting portion 272*a* is turned off and the light emitting portion 272*b* is turned on. In this state, the contour pattern 261*a* is not displayed, but the vehicle overhead view pattern 261*b* is displayed. In response to the above state, the image display panel 40 displays a navigation image INV in which surrounding roads and towns are represented. The navigation image INV displays, for example, an arrow that turns to the right, thereby enabling the occupant to navigate to the destination.

According to the second embodiment described above, the reflection surfaces 257*a* and 257*b* are oriented in the same direction in the same reflective portion 254*a* or 254*b*, and are oriented in different directions between the different reflective portions 254*a* and 254*b*. The light emitting portions 272*a* and 272*b* emit the light toward the reflection surfaces 257*a* and 257*b* facing each other in correspondence to the reflective portions 254*a* and 254*b*, respectively. With the above configuration, the light emitting portions 272*a* and 272*b* are turned on or off individually, the multiple different patterns 260*a* and 260*b* can be displayed on the same light transmissive display plate 250.

Further, according to the second embodiment, the image display panel 40 displays, as an image, the internal image IIS in which the internal state of the display object is expressed, so as to be superimposed on the contour pattern 261*a* in which an exterior contour of the display object is expressed. According to the superimposed display described above, since the contour pattern 261*a* is displayed as if the contour pattern 261*a* protrudes to the viewing side, the occupant of the vehicle can accurately recognize the display object by the exterior contour. Since the internal state is separately displayed on the back side, the occupant of the vehicle can accurately recognize the internal state while avoiding a confusion with the exterior contour. In this manner, a display with high visibility can be realized by leveraging the stereoscopic effect.

Third Embodiment

Figure 16:
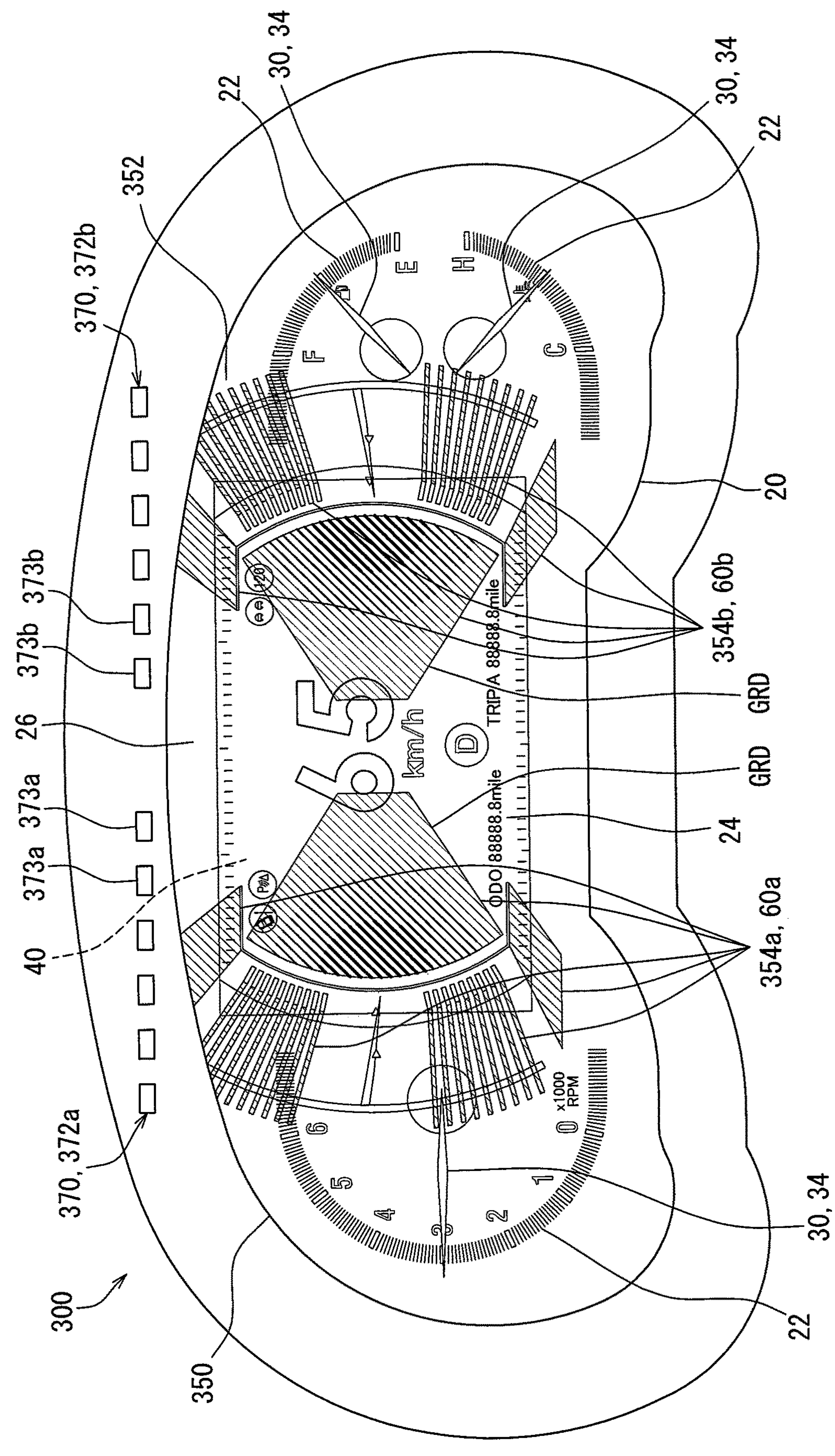
FIG. 16 is a front view showing a display device for a vehicle according to a third embodiment.
Figure 17:
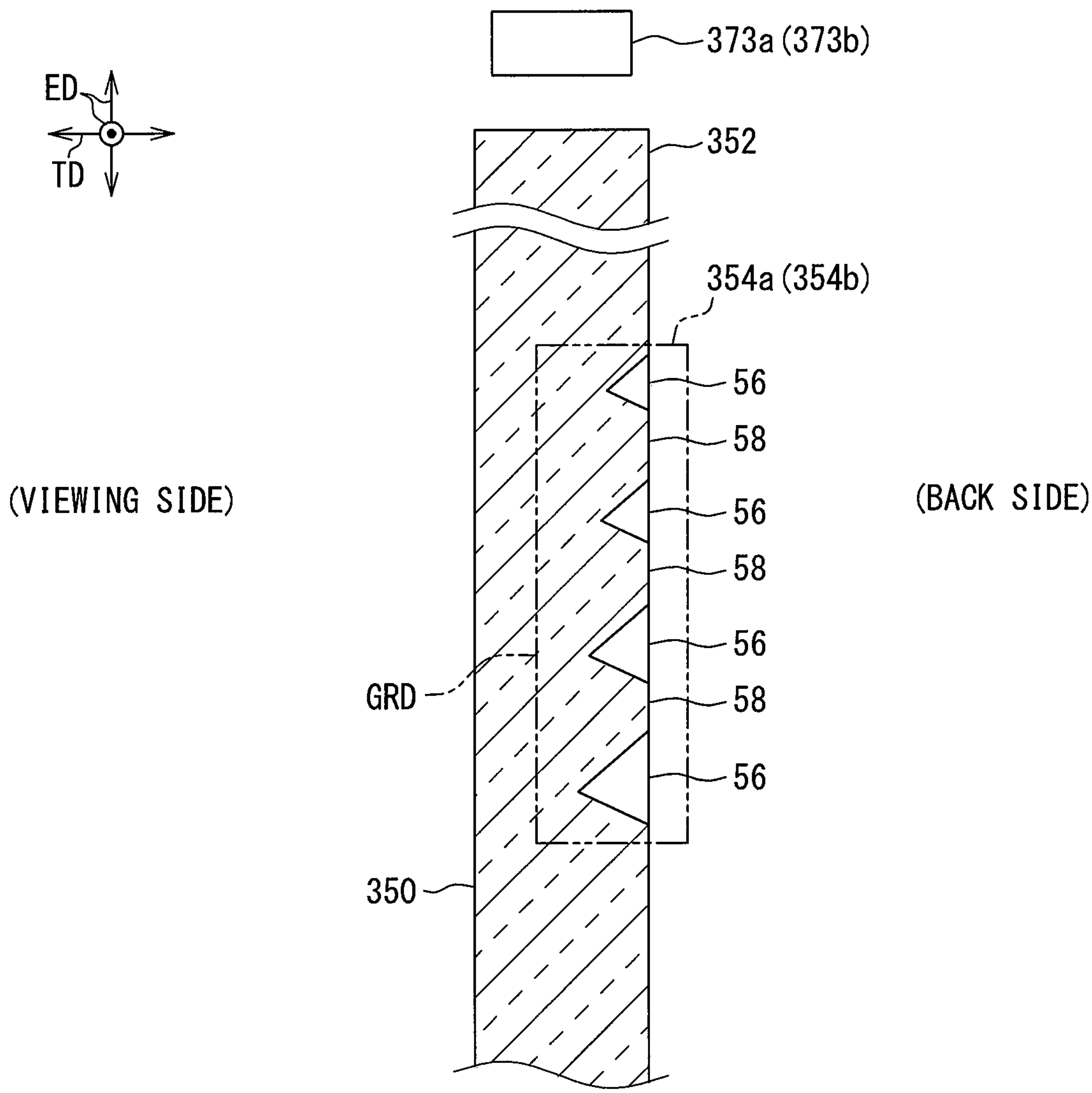
FIG. 17 is a schematic cross-sectional view of a light transmissive display plate illustrating a reflective element in a gradation region according to the third embodiment.

As shown in FIGS. 16 and 17, a third embodiment is a modification of the first embodiment. The third embodiment will be described focusing on configurations different from the first embodiment.

As shown in FIG. 16, a display plate light source 370 according to the third embodiment has two light emitting portions 372*a* and 372*b* which are separated from each other, similarly to the first embodiment. However, according to the third embodiment, in each of the light emitting portions 372*a* and 372*b*, each of light emitting devices 373*a* and 373*b* faces a side surface of an outer edge portion 352 on an upper side of an outer edge portion 352 of a light transmissive display plate 350. Each of the light emitting devices 373*a* and 373*b* emits a light source light toward the side surface, so that the light source light proceeds from the upper side to the lower side inside the light transmissive display plate 50.

Two reflective portions 354*a* and 354*b* are disposed corresponding to the left and right light emitting portions 372*a* and 372*b*, respectively. Each of the reflective portions 354*a* and 354*b* has a gradation region GRD. As shown schematically in FIG. 17, in the gradation region GRD, at least one of a recess dimension of reflective elements 56 and a density of the reflective elements 56 gradually changes depending on the position. Since the amount by which the light source light from the light emitting portions 372*a* and 372*b* is reflected to the viewing side differs depending on the location, a display luminance of the patterns 60*a* and 60*b* by the respective reflective elements 56 changes in a gradation manner in the gradation region GRD. In FIG. 16, gradation is schematically represented by changing a thickness of hatching.

According to the third embodiment described above, since the reflective portions 354*a* and 354*b* have the gradation region GRD in which the display luminance of the patterns 60*a* and 60*b* is changed into a gradation manner by gradually changing the shape or density of the reflective elements 56, the stereoscopic effect can be emphasized.

Fourth Embodiment

As shown in FIGS. 18 to 22, a fourth embodiment is a modification of the first embodiment. The fourth embodiment will be described focusing on configurations different from the first embodiment.

Figure 20:
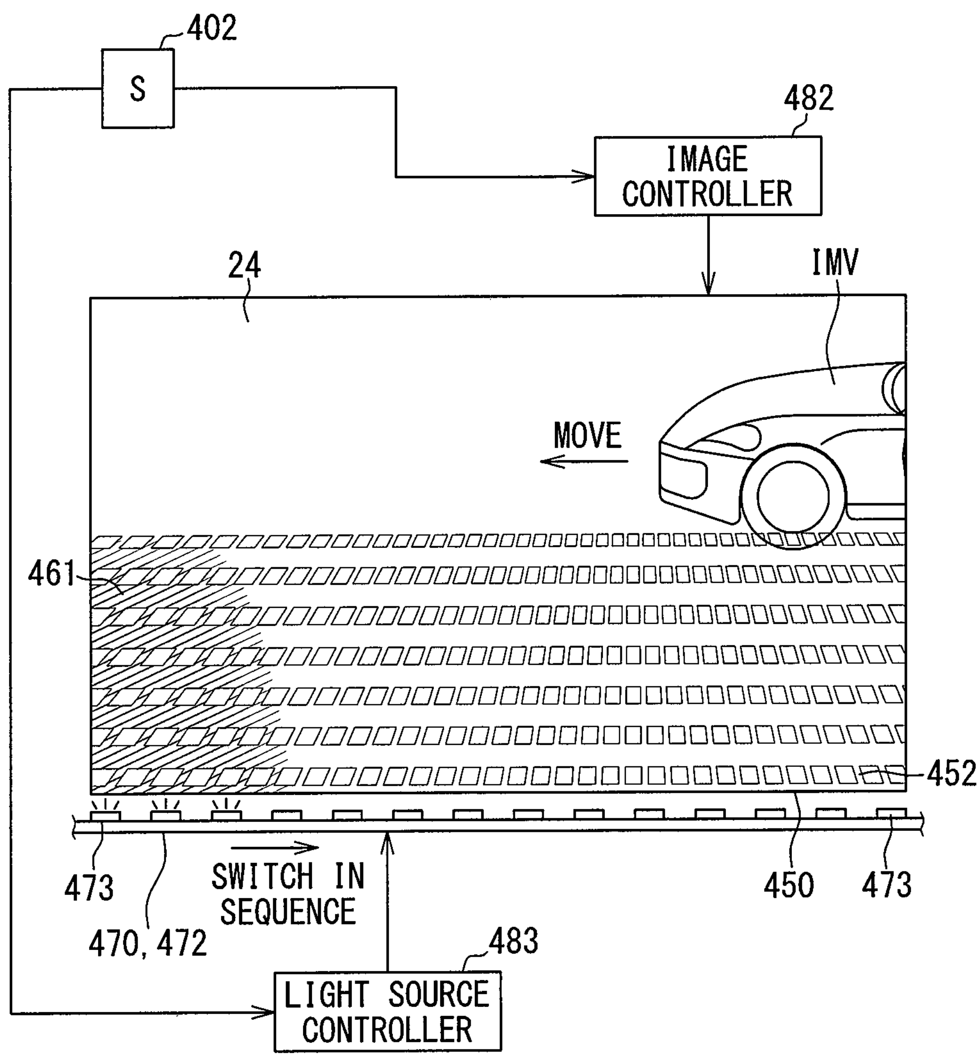
Figure 21:
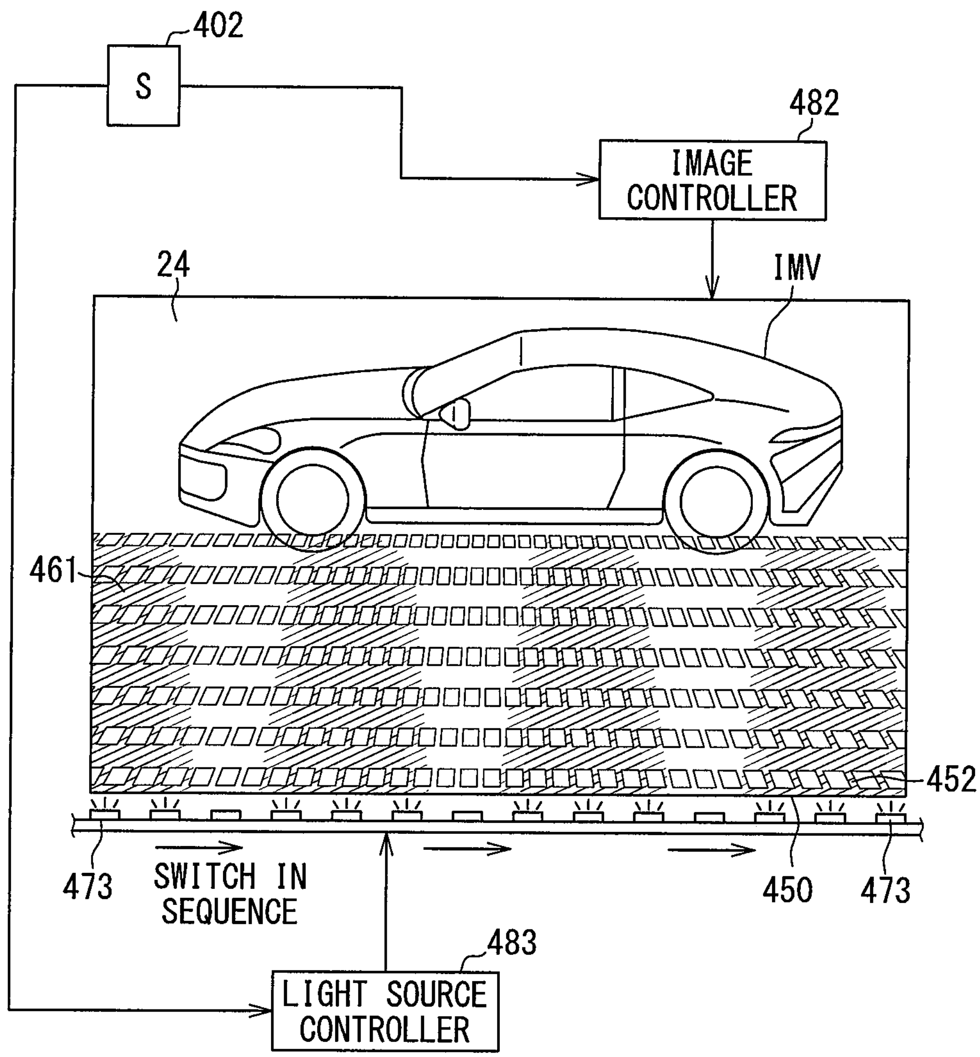
FIG. 21 is a diagram illustrating the control of the light emitting devices according to the fourth embodiment, and shows a case in which a moving object image is stopped at a center.

As particularly shown in FIGS. 20 and 21, a display plate light source 470 according to the fourth embodiment has one light emitting portion 472. In the light emitting portion 472, each light emitting device 473 faces a side surface of an outer edge portion 452 of a light transmissive display plate 450 at a lower side of the outer edge portion 452.

On the other hand, the light source controller 483 according to the fourth embodiment individually switches on and off each light emitting device 473 of the light emitting portion 472, individually.

A reflective portion 454 according to the fourth embodiment is provided to include a portion of the light transmissive display plate 450, which faces the image display panel 40. In particular, the reflective portion 454 according to the present embodiment is provided to include a portion of the image display panel 40, which faces the lower side. More specifically, the reflective portion 454 is provided at a position of the dial plate 20 facing the lower side.

In the fourth embodiment, a pattern 460 configured by the reflective elements 56 of the reflective portion 454 is a ground pattern 461 representing the ground. More specifically, the ground pattern 461 has multiple horizontal lines extending in parallel to the left and right and vertical lines extending in the vertical direction and becoming narrower in an upward direction with respect to each other. The horizontal lines and the vertical lines configure the ground pattern 461 in a lattice form, thereby expressing a sense of perspective of the ground.

With respect to the ground pattern 461, the light emitting devices 473 are aligned along the outer edge portion 452, so that a light is emitted toward a portion of the ground pattern 461 which is deviated from each other in a direction along which the light emitting devices 473 are aligned. As a result, only a part of the ground pattern 461 corresponding to the light emitting devices 473 to be lighted can be displayed.

The image display panel 40 according to the fourth embodiment can display a moving object image IMV representing a moving object. In particular, in the present embodiment, since a vehicle is employed as the moving object, the moving object image IMV is a vehicle image in which the vehicle is represented.

Figure 22:
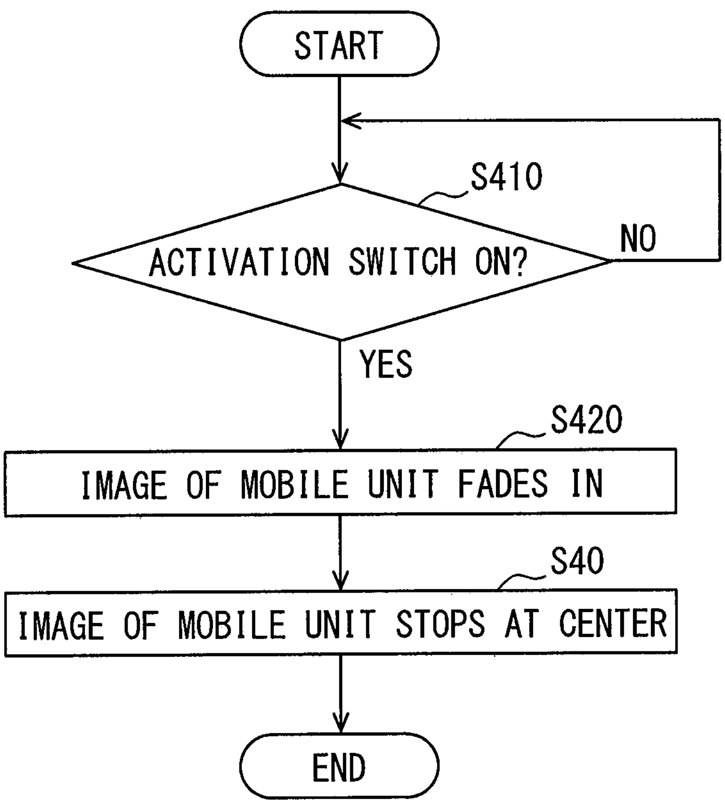
FIG. 22 is a flowchart of the display device according to the fourth embodiment.

A process to be executed by the vehicle display device 400 according to the fourth embodiment (mainly, an image controller 482 and a light source controller 483) will be described with reference to a flowchart of FIG. 22. At the start of the flowchart of FIG. 22, it is assumed that an image of the image display panel 40 is in a non-display state, and a start switch 402 of the vehicle is in an off-state. The start switch 402 is somewhat different depending on the vehicle, but corresponds to, for example, an ignition switch for starting an engine or a power switch of an electric vehicle.

First, in Step S410, it is determined whether or not the start switch 402 of the vehicle has been changed from the off-state to an on-state. When an affirmative determination is made in Step S410, the process proceeds to Step S420. When a negative determination is made in Step S410, the determination in Step S410 is performed again after a predetermined time or in response to a predetermined trigger.

Figure 18:
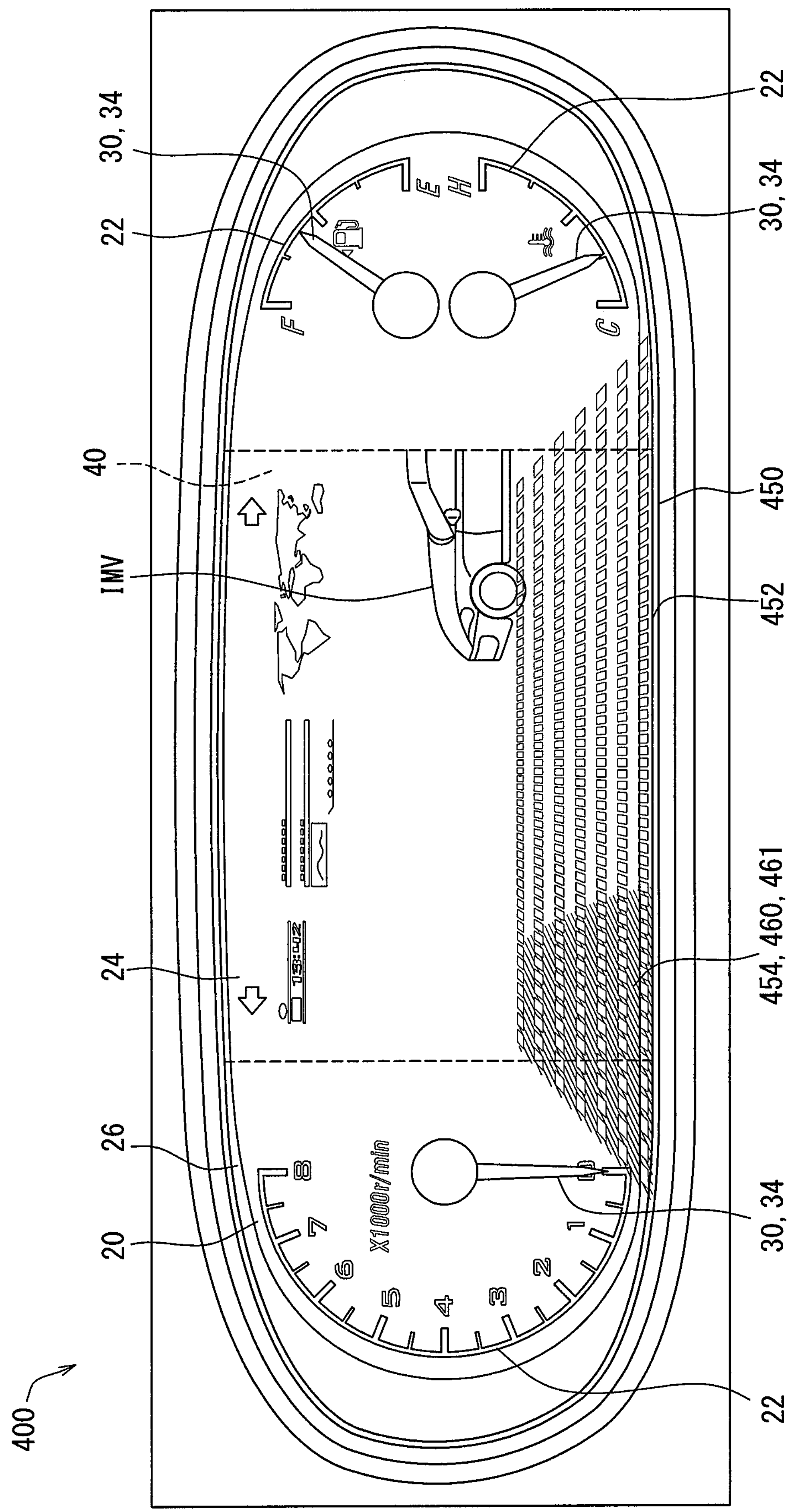
FIG. 18 is a front view showing a display device for a vehicle according to a fourth embodiment, and shows one example of display.

In Step S420, as particularly shown in FIGS. 18 and 20, the image controller 482 fades in the moving object image IMV from a right side to a center of the display surface 40*a*. In conjunction with the fade-in, the light source controller 483 sequentially switches the light emitting devices 473 to be lighted from the light emitting device 473 on the left side to the light emitting device 473 adjacent to the right side. In other words, the light emitting device 473 to be lighted shifts in a direction opposite to a moving direction of the moving object image. With the above operation, an effect as if the vehicle as the mobile object is traveling can be performed. After the process of Step S420, the process proceeds to Step S430.

Figure 19:
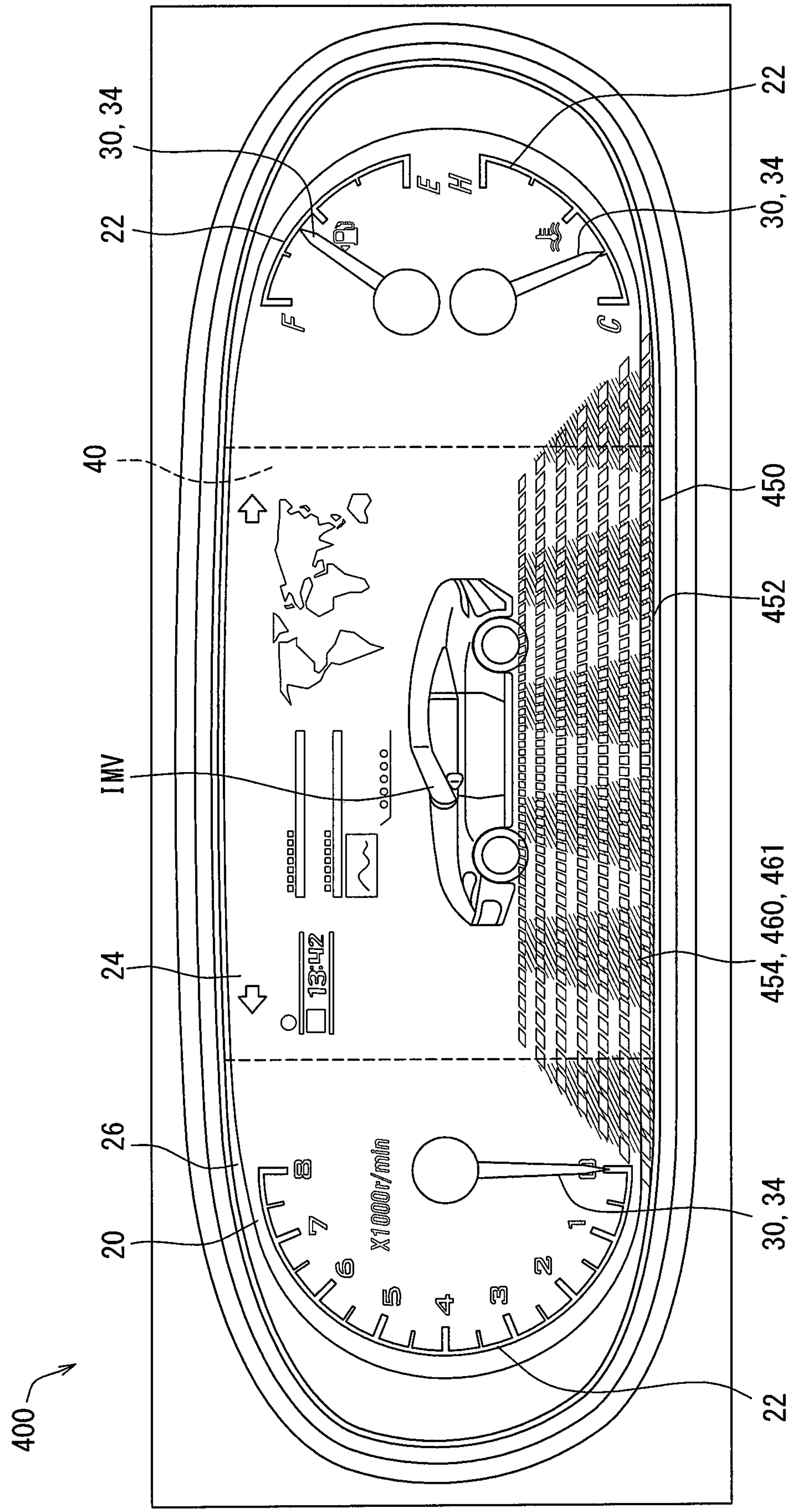
FIG. 19 is a front view showing the display device according to the fourth embodiment, and shows another example of display.

In Step S430, particularly as shown in FIGS. 19 and 21, when the moving object image IMV moves to the center of the display surface 40*a*, the image controller 482 causes the moving object image to be displayed while being stopped at the center. Similarly to Step S420, the light source controller 483 sequentially switches the light emitting device 473 to be lighted from the light emitting device 473 on the left side to the light emitting device 473 adjacent to the right side. For example, the light source controller 483 shifts the light emitting devices 473 which are sequentially lighted so that three light emitting devices 473 which are consecutively disposed are turned on between the turned-off light emitting devices 473. In this manner, even if the moving object image IMV is stopped without moving, the effect as if the vehicle as the moving object is traveling can be performed. A series of processing is completed in Step S430.

According to the fourth embodiment described above, among the multiple light emitting devices 473 that emit a light toward a part shifted from each other, the light emitting devices 473 to be lighted are switched. With the switching described above, the pattern 460 is partially displayed, and the motion can be given to the pattern 460, and the stereoscopic effect can be emphasized.

According to the fourth embodiment, the light emitting devices 473 to be lighted are sequentially switched to the adjacent light emitting devices in accordance with the moving object image IMV displayed by the image display panel 40. With the above processing, a part of the ground pattern 461 to be displayed appears to be moved, so that the moving object image IMV can appear as if the moving object image IMV is moving. Therefore, in cooperation between the ground pattern 461 by the reflective portion 454 and the moving object image IMV by the image display panel 40, a stereoscopic effect and a sense of unity can be created.

Fifth Embodiment

Figure 23:
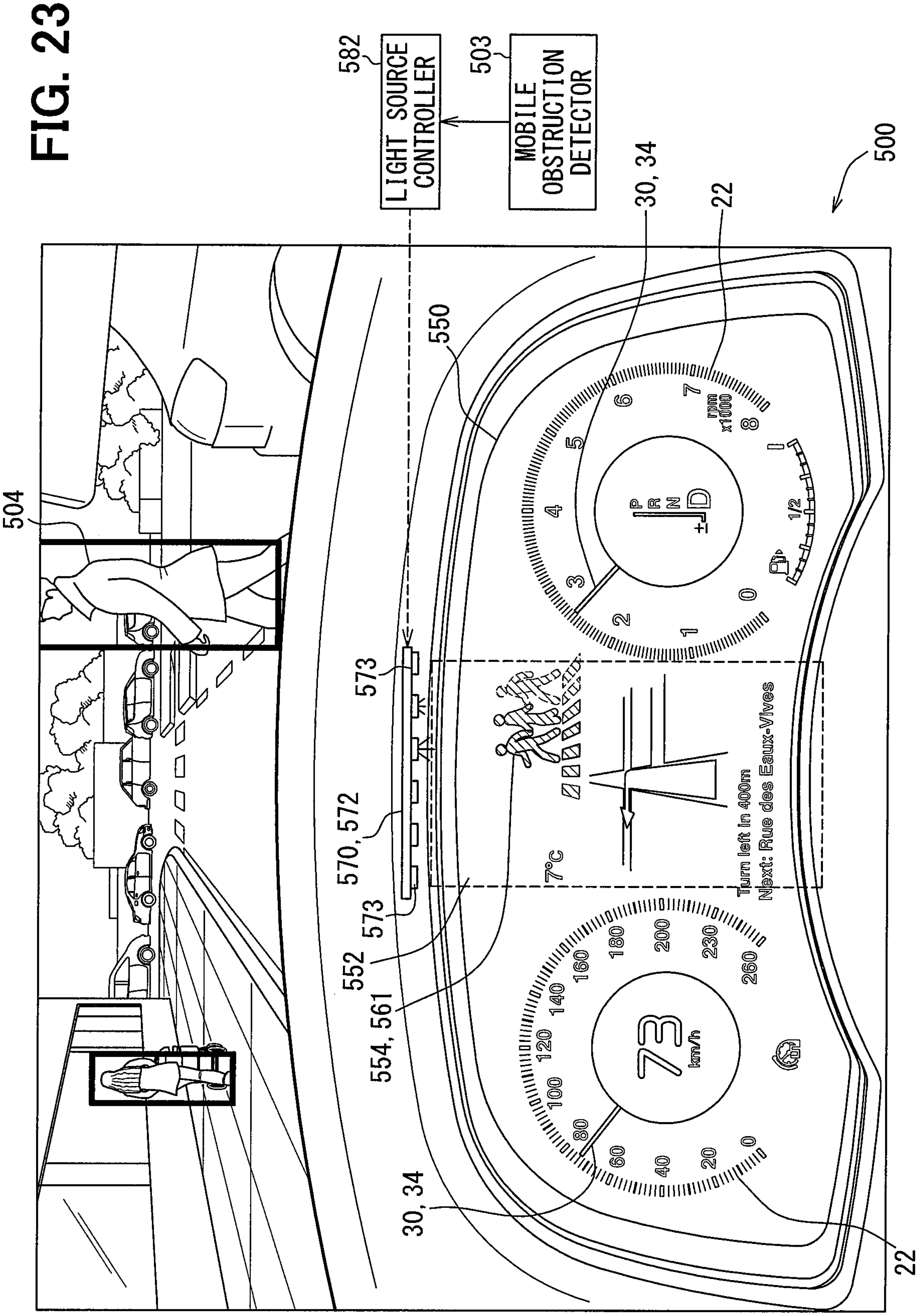
FIG. 23 is a front view of a display device for a vehicle according to a fifth embodiment, and shows a state in which the display device is mounted on the vehicle.
Figure 24:
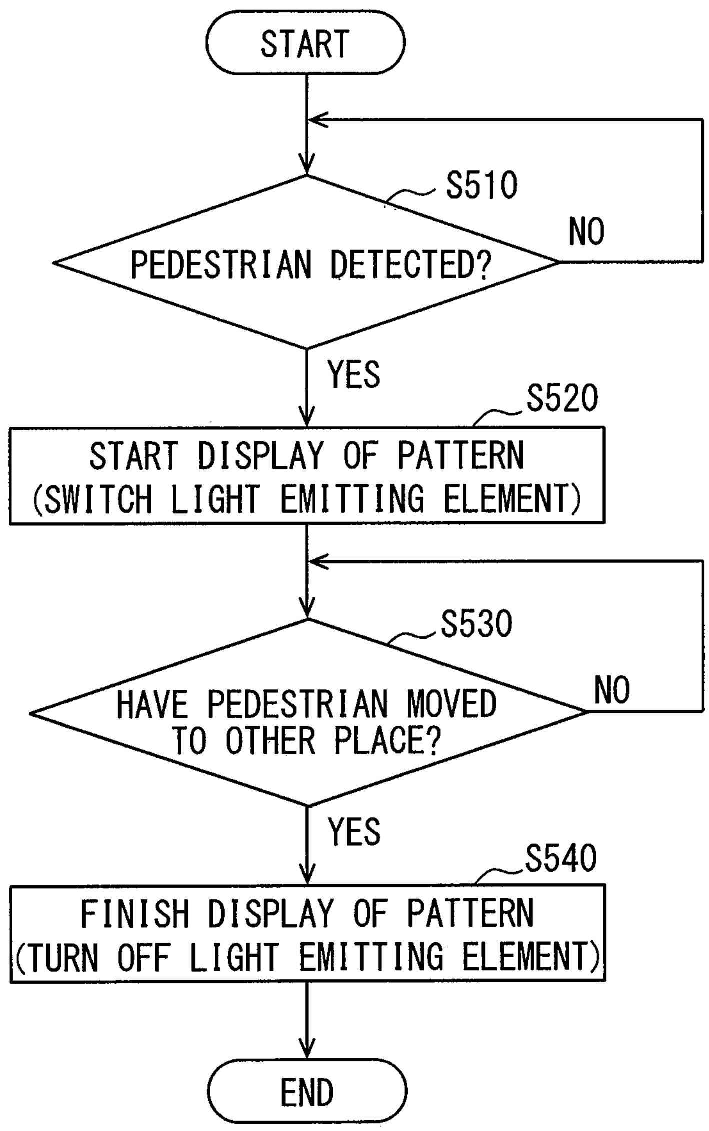
FIG. 24 is a flowchart of the display device according to the fifth embodiment.

As shown in FIGS. 23 and 24, a fifth embodiment is a modification of the first embodiment. The fifth embodiment will be described focusing on configurations different from the first embodiment.

A vehicle on which the vehicle display device 500 of the fifth embodiment is mounted includes a moving obstacle detection unit 503 for detecting a moving obstacle. The moving obstacle detection unit 503 includes at least one periphery monitoring sensor such as a millimeter wave radar, a sonar, or a LIDER (Light Detection and Ranging/Laser Imaging Detection and Ranging), and can detect the moving obstacle such as a pedestrian around the vehicle.

A display plate light source 570 according to the fifth embodiment has one light emitting portion 572. In the light emitting portion 572, light emitting devices 573 are aligned on one upper side of an outer edge portion 552 of a light transmissive display plate 550, and face a side surface of the outer edge portion 552.

On the other hand, a light source controller 582 according to the fifth embodiment individually switches on and off each light emitting device 573 of the light emitting portion 572. The light source controller 582 according to the fifth embodiment can communicate with the moving obstacle detection unit 503 through, for example, an ECU of the vehicle.

In the fifth embodiment, a pattern 60 configured by reflective elements 56 of a reflective portion 554 is a moving obstacle motion pattern 561 expressed by arraying multiple moving obstacles along a direction in which the light emitting devices 573 are aligned More specifically, the moving obstacle motion pattern 561 according to the present embodiment is a pattern represented by lining up states in which a pedestrian as the moving obstacle crosses a crosswalk for each motion.

As compared with the moving obstacle motion pattern 561, the light emitting devices 573 are disposed along the outer edge portion 552, so that a light is emitted toward a portion of the pattern 561 which is shifted from each other in the direction in which the light emitting devices 573 are disposed. As a result, only one motion of the moving obstacle motion pattern 561 corresponding to the light emitting device 573 to be lighted can be displayed.

A process to be executed by the vehicle display device 500 (mainly, light source controller 582) according to the fifth embodiment will be described with reference to a flowchart of FIG. 24.

First, in Step S510, the light source controller 582 determines whether or not the pedestrian 504 moving to the left and right in a front outside of the vehicle is detected based on an input signal from the moving obstacle detection unit 503. When an affirmative determination is made in Step S510, the process proceeds to Step S520. When a negative determination is made in Step S510, the determination in Step S510 is performed again after a predetermined time or in response to a predetermined trigger.

In Step S520, the light source controller 582 sequentially switches the light emitting device 573 to be lighted to the adjacent light emitting device 573 in accordance with the moving direction of the pedestrian 504. In this manner, in the moving obstacle motion pattern 561, the motion of the pedestrian to be displayed is sequentially switched, and the effect that the pedestrian walks like a paragraphed cartoon can be performed.

In this example, the light source controller 582 may switch the luminance of each light emitting device 573 so as to gradually change, instead of instantaneously switching between ON and OFF. As a result, the motion adjacent to the motion having the highest display luminance is expressed as an afterimage, and the appearance is improved.

When the pedestrian 504 stops in the middle of the crosswalk, the light source controller 582 may pause the switching of the light emitting device 573 to be lighted in conjunction with the stop. After the process of Step S520, the process proceeds to Step S530.

In Step S530, the light source controller 582 determines whether or not the pedestrian 504 that has been detected has moved from the front outside of the vehicle to another location. When an affirmative determination is made in Step S530, the process proceeds to Step S540. When a negative determination is made in Step S530, the display of the moving obstacle motion pattern 561 is continued, and the determination in Step S510 is performed again after a predetermined time or in accordance with a predetermined trigger.

In Step S540, the light source controller 582 turns off all of the light emitting devices 583, and ends the display of the moving obstacle motion pattern 561. A series of processing is completed in Step S540.

According to the fifth embodiment described above, among the multiple light emitting devices 573 that emit a light toward a part shifted from each other, the light emitting devices 573 to be lighted are switched. With the switching described above, the pattern 561 is partially displayed, and the motion can be given to the pattern 561, and the stereoscopic effect can be emphasized.

According to the fifth embodiment, when the moving obstacle detection unit 503 detects the pedestrian 504 as the moving obstacle, the light emitting device 573 to be lighted is sequentially switched to the adjacent light emitting device 573 in accordance with the pedestrian 504. In this manner, the representations of the pedestrian 504 represented by the moving obstacle motion pattern 561 are sequentially displayed, and the presence of the pedestrian 504 can be accurately displayed for the occupant of the vehicle.

As Modification 1 involved in the first to third embodiments, the image display panel 40 is not limited to a liquid crystal panel, and a panel using an organic EL display may be adopted.

In Modification 2, a region of the dial plate 20 facing the image display panel 40 may be a semi-transmissive region having a semi-light transmission property as long as the region is set to have a semi-light transmissive property so as to transmit an image of the image display panel.

In Modification 3, the reflection surface 57*a* may be formed in a planar shape.

In Modification 4, the image controller 82 and the light source controller 83 may share a processor or the like.

Figure 25:
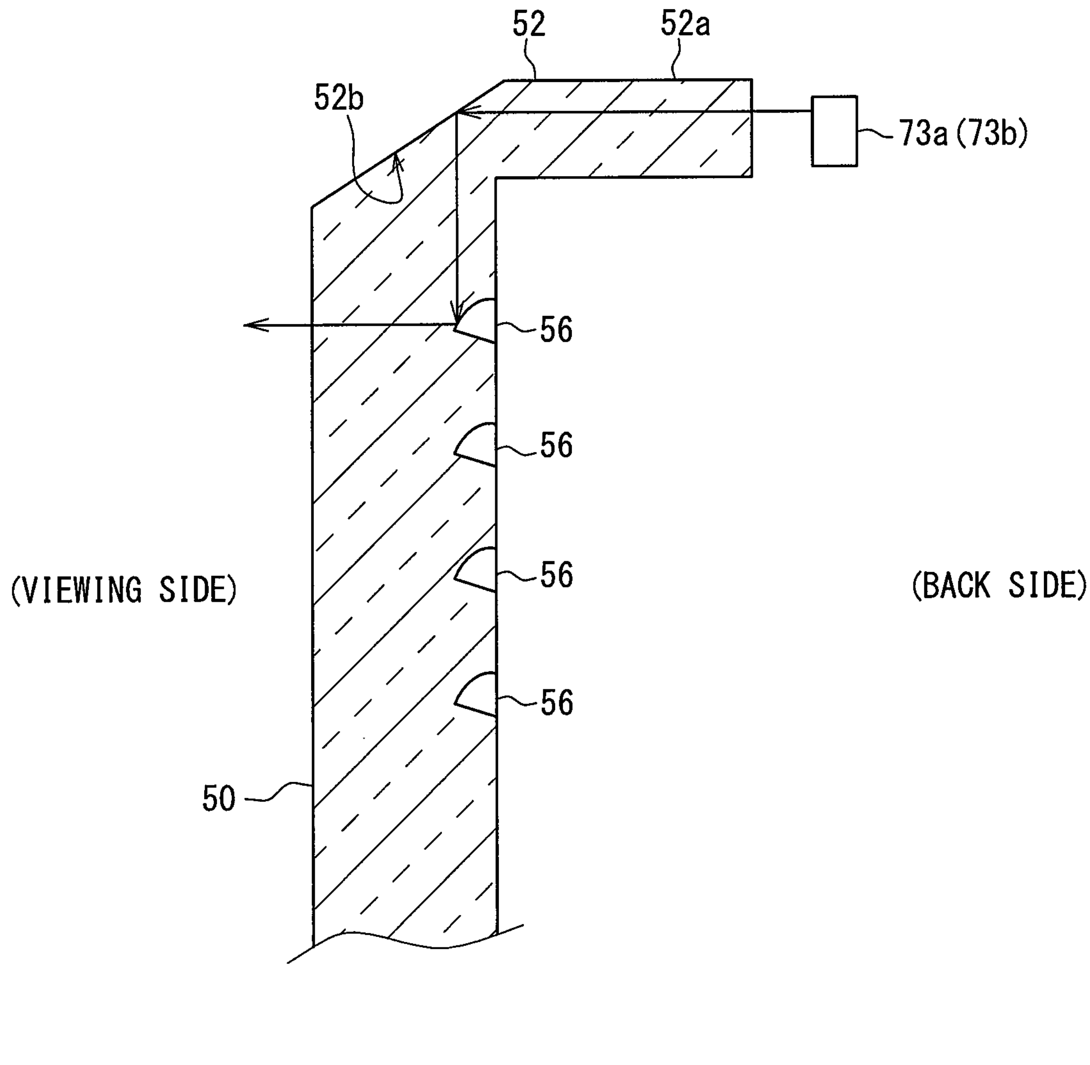
FIG. 25 is a diagram corresponding to FIG. 4 in Modification 5.

As Modification 5, as shown in FIG. 25, the light transmissive display plate 50 may have a planar outer edge reflection surface 52*b* provided on the outer edge portion 52 so as to be inclined toward the back side toward the outside, and an outer edge light guide portion 52*a* extending from the outer edge reflection surface 52*b* to the back side. In an example of FIG. 25, multiple light emitting devices 73*a* and 73*b* of the light source 70 are arrayed so as to face a tip end surface of the outer edge light guide portion 52*a* on the back side. Light source lights emitted from positions different from each other by the multiple light emitting devices 73*a* and 73*b* are guided to the outer edge reflection surface 52*b* by the outer edge light guide portion 52*a*, and further reflected to the inside of the light transmissive display plate 50 by the outer edge reflection surface 52*b*. In this manner, the light source lights of the light emitting devices 73*a* and 73*b*, which enter the inside of the light transmissive display plate 50 through the outer edge portion 52, illuminate illumination ranges which are partially shifted from each other in the extending direction ED.

In Modification 6, the light source controllers 483, 582, and the like are not limited to those using a program, but may be realized by a simpler circuit.

Sixth Embodiment

Figure 26:
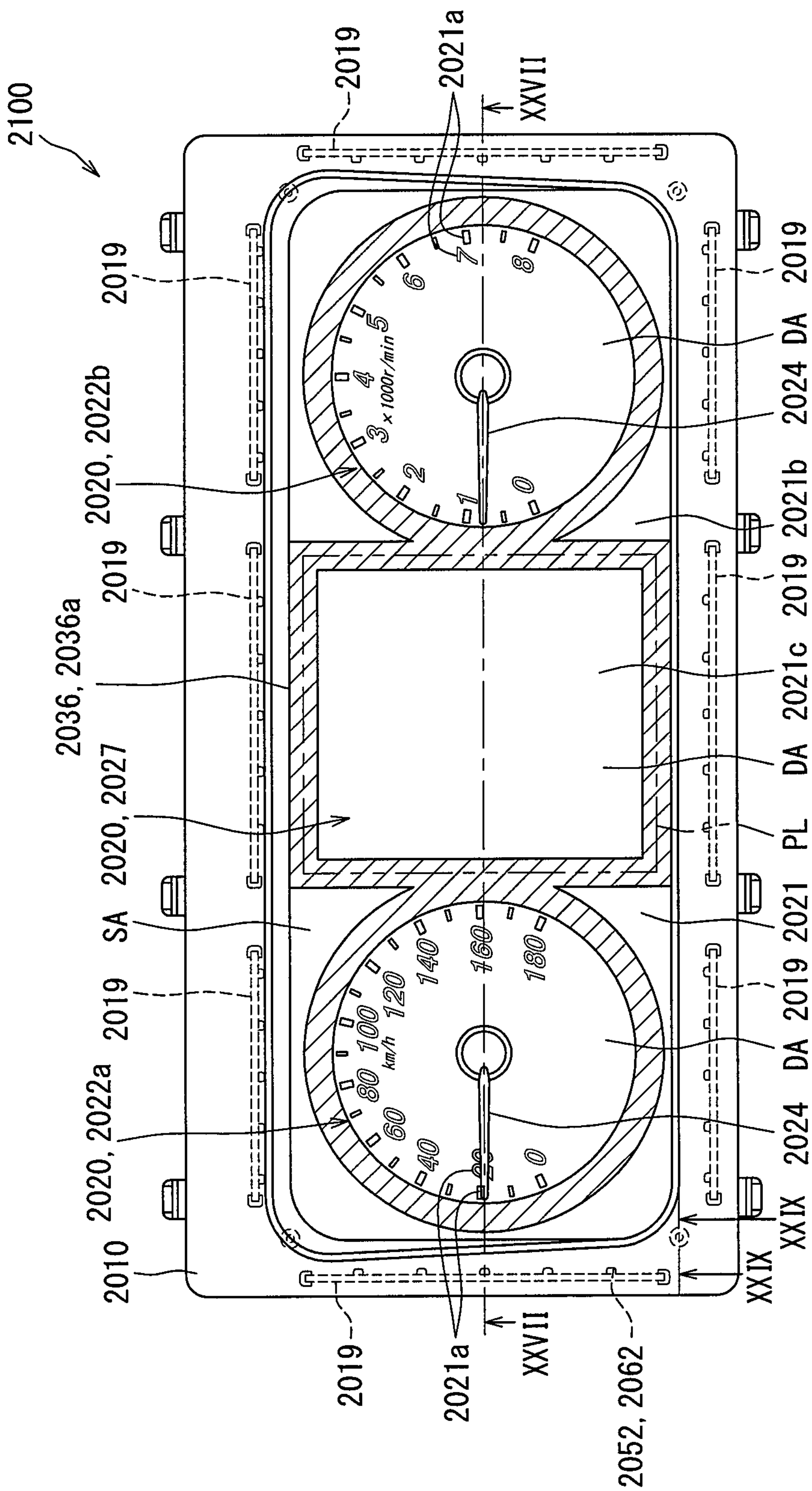
FIG. 26 is a front view of a display device for a vehicle according to a sixth embodiment.

A vehicle display device 2100 according to a sixth embodiment is mounted on a vehicle and installed on an instrument panel facing a seat on which an occupant who visually recognizes the device 2100 is seated. As shown in FIG. 26, the vehicle display device 2100 can display a state of the vehicle toward a viewing side where the occupant is positioned.

Figure 27:
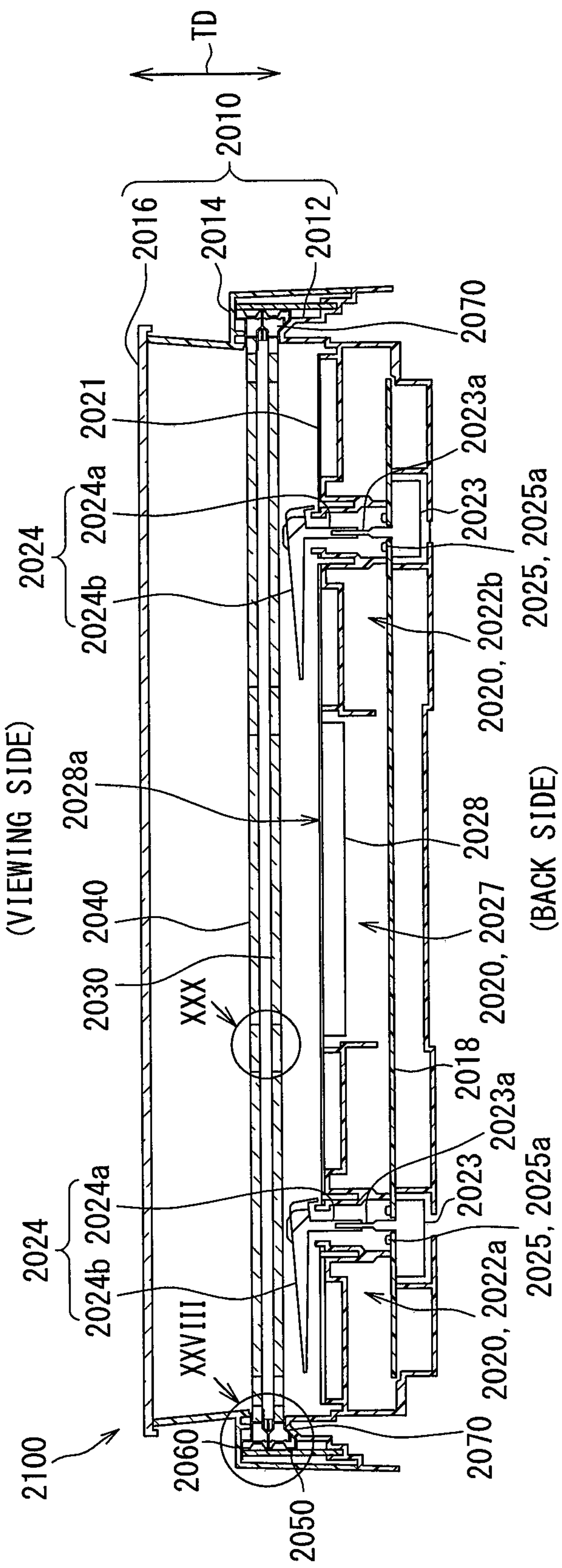
FIG. 27 is a cross-sectional view taken along a line XXVII-XXVII of FIG. 26.

As shown in FIG. 27, the vehicle display device 2100 described above includes a case portion 2010, a display unit 2020, multiple light guide plates 2030 and 2040, multiple light guide plate light source units 2050 and 2060, and multiple outer edge members 2070. In the present embodiment, two light guide plates 2030 and 2040 and two light guide plate light source units 2050 and 2060 are provided.

The case portion 2010 includes a rear case 2012, a window plate 2014, and a light transmissive plate 2016. The rear case 2012 is made of, for example, a synthetic resin having a light shielding property, and covers the display unit 2020 from the back side. The window plate 2014 is made of, for example, a synthetic resin having a light shielding property, and is formed in a cylindrical shape having opening portions on the viewing side and the back side along the outer peripheral contour of the display unit 2020. The light transmissive plate 2016 is made of a semi-light transmissive resin such as colored acrylic resin, for example, in a plate-shape that closes the viewing-side opening portion of the window plate 2014. As a result, the light guide plates 2030 and 2040 are covered with the light transmissive plate 2016 from the viewing side. The transmittance of the light transmissive plate 2016 according to the present embodiment is set to about 30% by the smoke-like coloring, but may be set to an arbitrary value of 30% or more.

The display unit 2020 displays a state of the vehicle with the use of a display plate 2021. The display plate 2021 is also generally called a dial plate, and is disposed between the rear case 2012 and the light guide plates 2030 and 2040. The display plate 2021 is formed in a flat plate-like shape by partially applying semi-light transmissive or light shielding printing on a surface of a base material made of, for example, a light transmissive synthetic resin on the viewing side. The printing may be replaced with coating.

The display unit 2020 includes multiple mechanical display units 2022*a* and 2022*b* and an image display unit 2027. In particular, according to the present embodiment, the image display unit 2027 is disposed to be sandwiched between the two mechanical display units 2022*a* and 2022*b* on the left and right sides.

In this example, since the two mechanical display units 2022*a* and 2022*b* have the same configuration as each other, the left mechanical display unit 2022*a* will be described as a representative. The mechanical display unit 2022*a* includes a stepping motor 2023, a pointer 2024, and a pointer light source unit 2025. The stepping motor 2023 is held by a main circuit board 2018 disposed between the rear case 2012 and the display plate 2021, that is, on the back side of the display plate 2021.

The pointer 2024 integrally includes a coupling portion 2024*a* and an indicating portion 2024*b*. The coupling portion 2024*a* is disposed through a through hole provided in the display plate 2021, and is coupled to a rotation shaft 2023*a* of the stepping motor 2023. The indicating portion 2024*b* is disposed between the display plate 2021 and the light guide plates 2030 and 2040, that is, on the viewing side of the display plate 2021, and has a needle shape. The pointer 2024 rotates in accordance with an output of the stepping motor 2023, and a state of the vehicle is displayed by pointing an indicator 2021*a* disposed in a ring shape on the display plate 2021. In the present embodiment, the indicator 2021*a* is configured by scales and numerals.

The pointer light source unit 2025 includes multiple light emitting devices 2025*a* disposed on the main circuit board 2018. In particular, in the present embodiment, the light emitting device 2025*a* is a light emitting diode, and emits a light when connected to a power supply through a control circuit. The pointer 2024 emits a light by illuminating the pointer 2024 with a light of the pointer light source unit 2025.

In the present embodiment, the left mechanical display unit 2022*a* displays a vehicle speed as the state of the vehicle. The mechanical display unit 2022*b* on the right side displays an engine speed as the state of the vehicle. The image display unit 2027 includes a liquid crystal display device 2028 disposed on the back surface side of the display plate 2021 and in close proximity to the display plate 2021. The liquid crystal display device 2028 of the present embodiment is a liquid crystal panel using thin film transistors (Thin Film Transistor and TFTs) and employs an active matrix type liquid crystal display panel formed of a plurality of liquid crystal pixels arranged two-dimensionally. The liquid crystal display device 2028 has a rectangular display surface 2028*a* for displaying an image on the viewing side.

Further, in a portion of the display plate 2021 overlapping with the display surface 2028*a*, as particularly shown in FIG. 26, a display plate light transmissive portion 2021*c* having a transmissive property is surrounded by a display plate light shielding portion 2021*b* having a light shielding property by printing, and is disposed in a size slightly smaller than the display surface 2028*a*. A light of an image displayed on the display surface 2028*a* in this manner passes through the display plate light transmissive portion 2021*c*.

With the mechanical display units 2022*a* and 2022*b* and the image display unit 2027, the display plate 2021 of the display unit 2020 has a display region DA for displaying on the viewing side. On the other hand, at a boundary portion between the mechanical display units 2022*a* and 2022*b* and the image display unit 2027, and at an outer peripheral portions of the mechanical display units 2022*a* and 2022*b* and the image display unit 2027, a peripheral region SA that surrounds the display region DA and does not display on the viewing side is provided.

As shown in FIG. 27, each of the light guide plates 2030 and 2040 is formed in a flat plate-like shape and made of, for example, a synthetic resin having a light transmissive property. Each of the light guide plates 2030 and 2040 is disposed on the viewing side of the display unit 2020. The light guide plates 2030 and 2040 are disposed to overlap with each other and extend substantially in parallel with each other by being disposed to match each other in a plate thickness direction TD. The plate thickness of each of the light guide plates 2030 and 2040 is set substantially equal to each other, and a gap of about one plate thickness is provided between the light guide plate 2030 and the light guide plate 2040.

The plate thickness direction TD of the present embodiment substantially coincides with a normal direction of the surface having the largest area of each of the light guide plates 2030 and 2040.

The light source units 2050 and 2060 for the light guide plates respectively correspond to the light guide plates 2030 and 2040, and are paired with the respective light guide plates 2030 and 2040. The light guide plate light source units 2050 and 2060 have multiple light emitting devices 2052 and 2062, respectively. In particular, in the present embodiment, the light emitting devices 2052 and 2062 are light emitting diodes, and emit a light source light by being connected to a power supply through a control circuit. The light emitting devices 2052 and 2062 belonging to the respective light source units 2050 and 2060 are provided so as to be able to be switched on and off. The light emitting devices 2062 belonging to the light source unit 2060 paired with the light guide plate 2040 on the viewing side and the light emitting devices 2052 belonging to the light source unit 2050 paired with the light guide plate 2030 on the back side emit the light in different colors. As a result, the light source units 2050 and 2060 emit the light source light of different colors from each other. As the color of the light source light, a color indicating safety, a color indicating comfortable driving, a color indicating danger attention, and the like can be adopted. For example, the light source unit 2050 emits a blue light source light, and the light source unit 2060 emits a red light source light, but other colors may be employed. The light source units 2050 and 2060 cause the light source light to enter the inside of the light guide plates 2030 and 2040 through outer edge portions 2032 and 2042 of the respective light guide plates 2030 and 2040, respectively.

The placement of the light emitting devices 2052 and 2062 of the respective light source units 2050 and 2060 will be described in more detail. In the present embodiment, multiple light source circuit boards 2019 are disposed on the outer periphery than the light guide plates 2030 and 2040 so as to surround the entire periphery. The light emitting devices 2052 and 2062 are disposed on the light source circuit boards 2019 so as to surround the outer edge portions 2032 and 2042 of the light guide plates 2030 and 2040 corresponding to the light source units 2050 and 2060, respectively.

Figure 28:
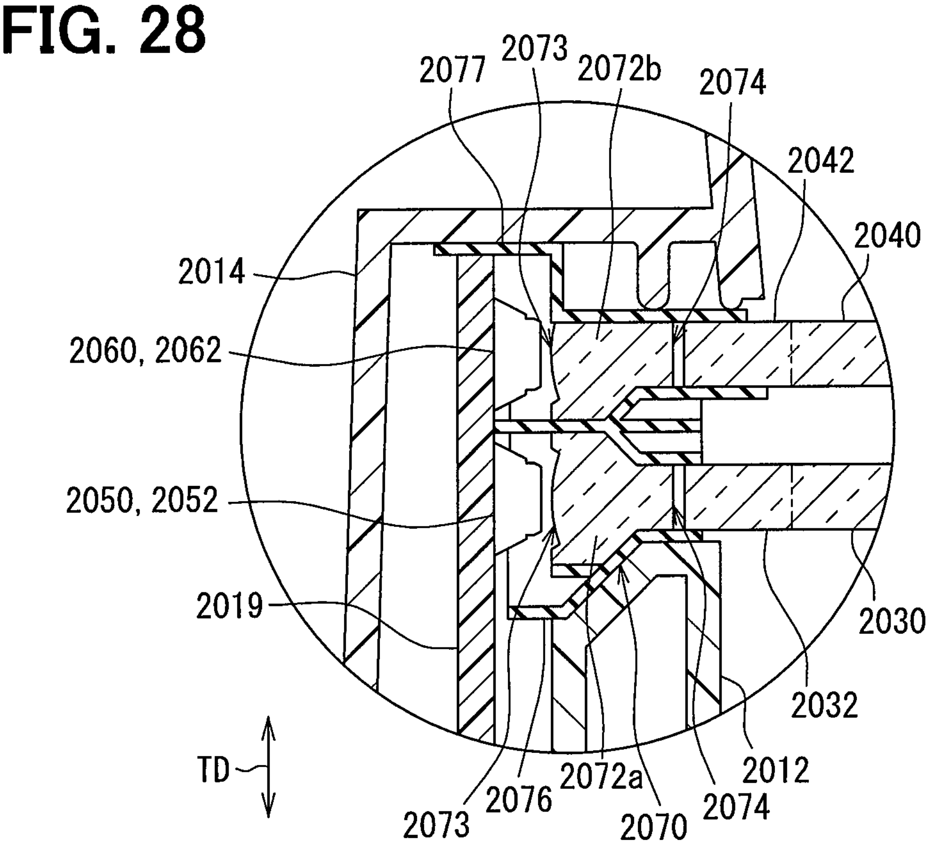
FIG. 28 is an enlarged view of a portion)(XVIII of FIG. 27.

In this example, as shown in FIG. 28, the light emitting devices 2052 and 2062 belonging to the different light source units 2050 and 2060, respectively, are disposed so as to overlap with each other in the plate thickness direction TD. In other words, the light emitting device 2052 belonging to the light source unit 2050 and the light emitting device 2062 belonging to the light source unit 2060 overlap with each other in a direction perpendicular to the display plate 2021 of the display unit 2020.

The outer edge members 2070 are disposed between the outer edge portions 2032 and 2042 of the plate-like light guide plates 2030 and 2040 and the light emitting devices 2052 and 2062. Each outer edge member 2070 integrally includes multiple outer edge light guide portions 2072*a* and 2072*b* and a light source light compartment portion 2076 by two-color molding. The two outer edge light guide portions 2072*a* and 2072*b* are provided in the same number as the light guide plates 2030 and 2040. The outer edge light guide portions 2072*a* and 2072*b* are disposed between the light guide plate 2030 and the light source unit 2050 and between the light guide plate 2040 and the light source unit 2060, respectively. Each of the outer edge light guide portions 2072*a* and 2072*b* is made of, for example, a synthetic resin having a light transmissive property so as to be able to guide the light source light. Each of the outer edge light guide portions 2072*a* and 2072*b* has a light source facing surface 2073 formed in a smooth convex shape so as to face the light emitting devices 2052 and 2062 of the respective light source units 2050 and 2060. Each of the outer edge light guide portions 2072*a* and 2072*b* has a plate facing surface 2074 formed in a smooth planar shape so as to face the outer edge portions 2032 and 2042 of the respective light guide plates 2030 and 2040. A size of each plate facing surface 2074 is adjusted to a plate thickness of the light guide plates 2030 and 2040, and a size of each light source facing surface 2073 is set to be larger than the size of each plate facing surface 2074. The outer edge light guide portions 2072*a* and

2072*b* cause the light source light of the respective light source unit 2050 and 2060 to enter the light source facing surface 2073, and emits the light from the plate facing surface 2074.

A light source light compartment portion 2076 is disposed between the outer edge light guide portion 2072*a* and the outer edge light guide portion 2072*b*.

The light source light compartment portion 2076 is formed of, for example, an elastomer having a light shielding property, and shields the light source light. The light source light compartment portion 2076 has multiple cylindrical holes surrounding portions of the outer edge light guide portions 2072*a* and 2072*b* excluding the facing surfaces 2073 and 2074, respectively, corresponding to the outer edge light guide portions 2072*a* and 2072*b*. The light source light compartment portion 2076 extends to the light source units 2050 and 2060 side of the light source facing surfaces 2073 and to the light guide plates 2030 and 2040 side of the plate facing surfaces 2074. Further, an enclosing portion 2077 provided on the light source units 2050 and 2060 side of the light source light compartment portion 2076 encloses the light source circuit boards 2019.

Since the light source light compartment portion 2076 optically partitions each pair, for example, even if the light source light is emitted from the light source unit 2050, the light source light is prevented from being incident on the light guide plate 2040 belonging to a different pair. Similarly, even if the light source light is emitted from, for example, the light source unit 2060, the light source light is prevented from being incident on the light guide plate 2030 belonging to a different pair.

Figure 29:
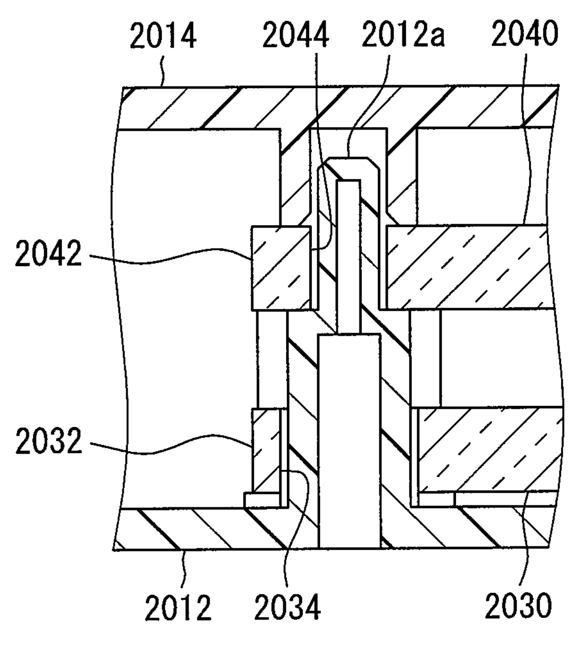
FIG. 29 is an enlarged cross-sectional view taken along a line XXIX-XXIX of FIG. 26.
Figure 30:
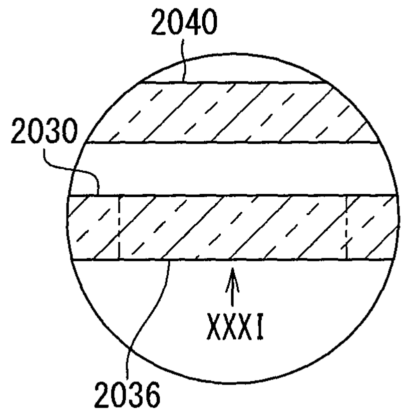
FIG. 30 is an enlarged view of a portion XXX of FIG. 27.
Figure 31:
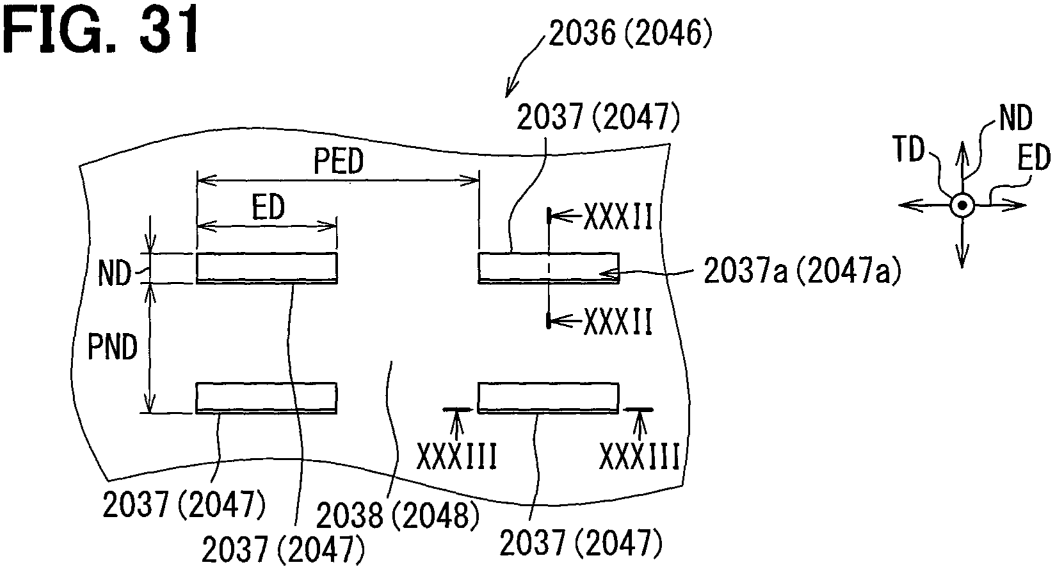
FIG. 31 is an enlarged view of a light guide plate as viewed in a direction of XXXI in FIG. 30.
Figure 32:
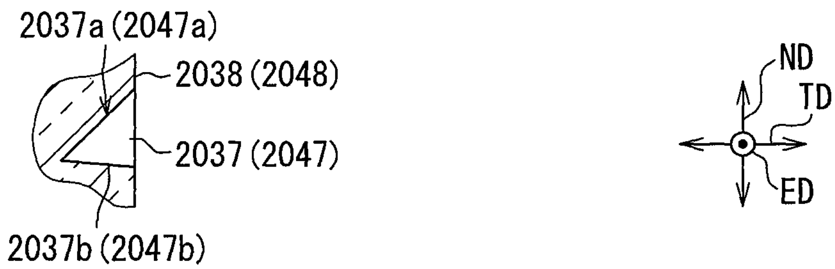
FIG. 32 is a cross-sectional view taken along a line XXXII-XXXII of FIG. 31.
Figure 33:
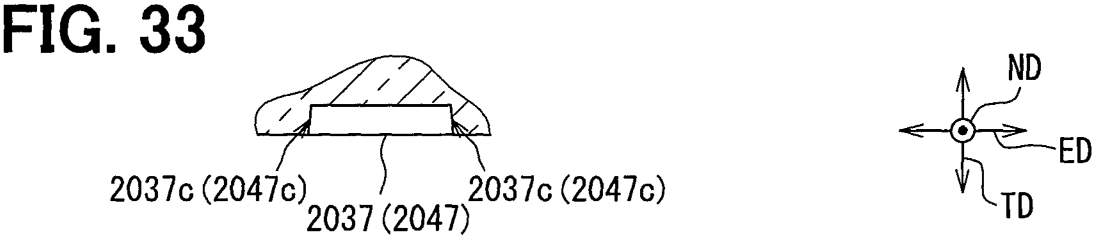
FIG. 33 is a cross-sectional view taken along a line XXXIII-XXXIII of FIG. 31.

The outer edge member 2070 described above is held between the rear case 2012 and the window plate 2014. Further, the outer edge member 2070 holds the light guide plates 2030 and 2040 by sandwiching the outer edge portions 2032 and 2042 between the light guide plates 2030 and 2040 side end portions of the light source light compartment portion 2076. Further, as shown in FIG. 29, through holes 2034 and 2044 penetrating in the plate thickness direction TD are provided at four corners of the outer edge portions 2032 and 2042 of the respective light guide plates 2030 and 2040, and a projecting pin 2012*a* projecting from the rear case 2012 toward the viewing side penetrates through the through holes 2034 and 2044, so that the light guide plates 2030 and 2040 are positioned. In this example, a diameter of the through hole 2044 of the light guide plate 2040 is set to be smaller than a diameter of the through hole 2034 of the light guide plate 2030, and a diameter of the projecting pin 2012*a* at a portion penetrating through the through hole 2044, is set to be smaller than that at a position penetrating through the through hole 2034. For that reason, the light guide plates 2030 and 2040 can be easily assembled to the rear case 2012. In addition, the flexibility of the elastomer of the light source light compartment portion 2076 reduces abnormal sounds such as collision sounds between the light guide plates 2030 and 2040 and the case portion 2010, which may be generated in response to vibration of the vehicle.

As shown in FIGS. 30 to 33, each of the light guide plates 2030 and 2040 has reflective portion 2036 and 2046, respectively. The reflective portions 2036 and 2046 reflect the light source light from the respective light source units 2050 and 2060 toward the viewing side.

To describe the light guide plate 2030 on the back side in detail, the reflective portion 2036 has multiple protrusion and recess portions 2037 protruding from the back side of the light guide plate 2030 to the inside of the light guide plate 2030. A projection dimension of each of the protrusion and recess portions 2037 is 15 μm. Each of the protrusion and recess portions 2037 has an inclined reflection surface 2037*a* facing the light source unit 2050 and an inclined wall surface 2037*b* disposed back-to-back with the inclined reflection surface 2037*a*. The inclined reflection surface 2037*a* is formed in a planar shape capable of reflecting the light source light guided inside the light guide plate 2030 to the viewing side by forming an angle of 45° with respect to the plate thickness direction TD of the light guide plate 2030. The inclined wall surface 2037*b* forms an angle of 5° or less with respect to the plate thickness direction TD of the light guide plate 2030, and is formed in a planar shape. The extension dimension of the inclined reflection surface 2037*a* and the inclined wall surface 2037*b* in the extending direction ED is 75 μm.

Inclined side surfaces 2037*c* are provided between the side end portion of the inclined reflection surface 2037*a* and the side end portion of the inclined wall surface 2037*b*. Each of the inclined side surfaces 2037*c* provided on both sides forms an angle of 5 degrees or less with respect to the plate thickness direction TD of the light guide plate 2030, and is formed in a planar shape.

The multiple protrusion and recess portions 2037 are arrayed in two-dimensional directions ED and ND at predetermined alignment pitches PED and PND, one by one, and are separated from each other through a flat portion 2038 of the light guide plate 2030. Specifically, the alignment pitch PED in the direction ED is 150 μm, and the alignment pitch PND in the direction ND orthogonal to the direction ED is 75 μm.

The protrusion and recess portions 2047, the inclined reflection surface 2047*a*, the inclined wall surface 2047*b*, and the inclined side surface 2047*c* of the light guide plate 2040 on the viewing side also have the same configuration as that of the light guide plate 2030. In other words, the multiple protrusion and recess portions 2047 are also disposed in the two-dimensional directions ED and ND at predetermined alignment pitches PED and NED, one by one, and separated from each other through a flat portion 2048 of the light guide plate 2040. The detailed shapes of the protrusion and recess portions 2047 are indicated by parentheses in common with those of FIGS. 31 to 33.

Figure 34:
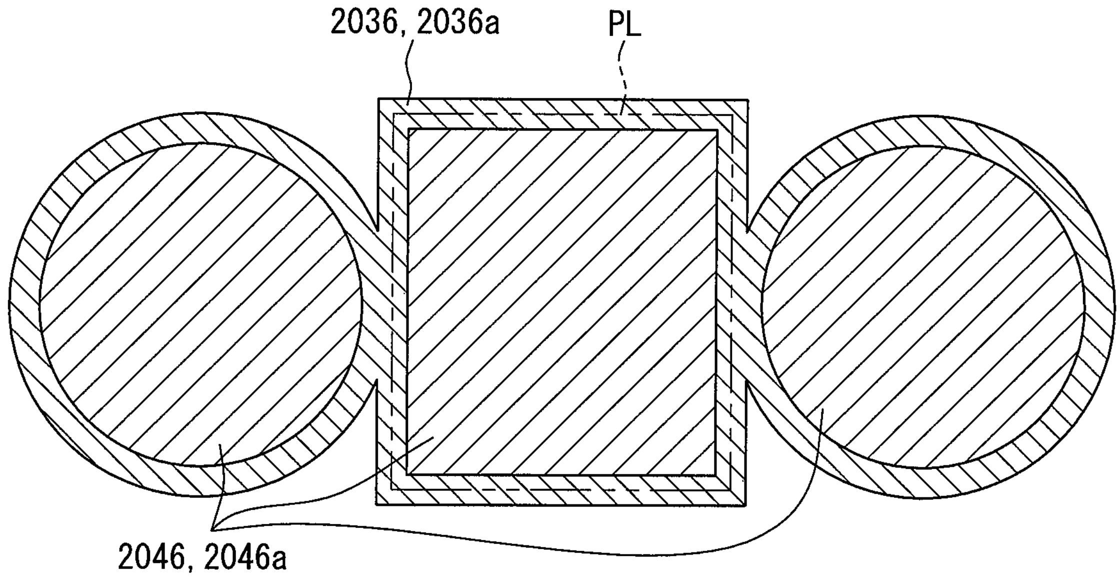
FIG. 34 is a diagram illustrating a positional relationship between reflective portions of the respective light guide plates.
Figure 35:
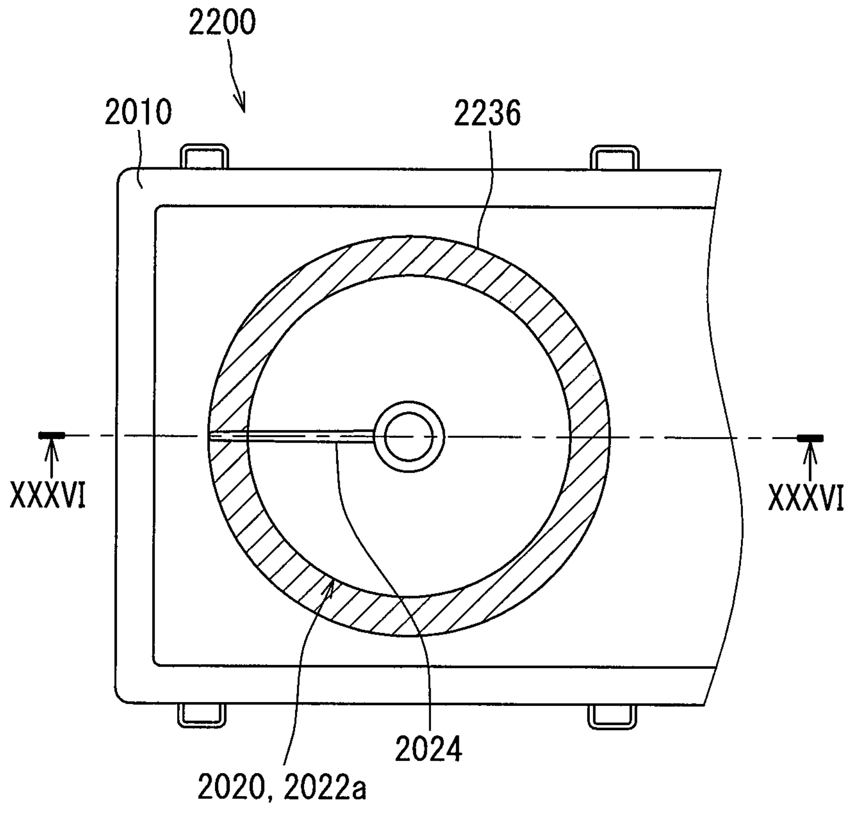
FIG. 35 is a partial front view of a display device for a vehicle in Modification 1.

In each of the light guide plates 2030 and 2040, a pattern is formed as shown in FIGS. 26 and 34 by the placement of the multiple protrusion and recess portions 2037 and 2047. The patterns are different from each other in the light guide plates 2030 and 2040. In FIG. 26, a region where the protrusion and recess portions 2037 of the reflective portion 2036 by the light guide plate 2030 is disposed is hatched with hatching lines. Actually, when only the light source unit 2050 of the light source units 2050 and 2060 is lighted, the reflective portion 2046 of the light guide plate 2040 is hardly visually recognized as shown in FIG. 26. Even when only the light source unit 2060 is turned on, the reflective portion 2036 is hardly visible. FIG. 34 also shows the placement of the protrusion and recess portions 2047 of the reflective portion 2046 by the light guide plate 2040.

Therefore, in each of the light guide plates 2030 and 2040, the reflective portions 2036 and 2046 are disposed in regions at least partially deviated from each other. Specifically, in the light guide plate 2030 on the back side, the reflective portion 2036 is a peripheral reflective portion 2036*a* provided in a region corresponding to the peripheral region SA. In the light guide plate 2040 on the viewing side, the reflective portion 2046 is provided in a region corresponding to the display region DA, and serves as a display superimposing reflective portion 2046*a* for superimposing the light source light reflected on the viewing side on the display of the display unit 2020. In the present embodiment, the region corresponding to the peripheral region SA is a region on the light guide plate 2030 overlapping with the peripheral region SA in the vertical direction of the display plate 2021 or the plate thickness direction TD of the light guide plates 2030 and 2040. Similarly, the region corresponding to the display region DA is a region on the light guide plate 2040 overlapping with the display region DA in the vertical direction of the display plate 2021 or the plate thickness direction TD of the light guide plates 2030 and 2040.

In more detail, the peripheral reflective portion 2036*a* is disposed in a ring shape so as to border the entire periphery of the mechanical display unit 2022*a*. The peripheral reflective portion 2036*a* is disposed in a ring shape so as to border the entire periphery of the mechanical display unit 2022*b*. The peripheral reflective portion 2036*a* is disposed in a rectangular annular shape so as to border the entire periphery of the image display unit 2027. In the region corresponding to the vicinity of the mechanical display unit 2022*a* or 2022*b* and the image display unit 2027, the edges of the peripheral reflective portion 2036*a* are connected to each other.

The display superimposing reflective portion 2046*a* is disposed over the entire region of the region surrounded by the peripheral reflective portion 2036*a*. In other words, the display superimposing reflective portion 2046*a* are discretely disposed in three places in the display regions DA of the mechanical display units 2022*a* and 2022*b* and the image display unit 2027. In FIG. 34, a fine inclined hatching corresponds to the placement of the reflective portion 2036 (that is, the peripheral reflective portion 2036*a*), and a coarse inclined hatching corresponds to the placement of the reflective portion 2046 (that is, the display superimposing reflective portion 2046*a*).

According to the present embodiment, the light guide plates 2030 and 2040 provided with the respective reflective portions 2036 and 2046 for reflecting the light source light from the light source units 2050 and 2060 toward the viewing side are disposed to overlap with each other. The multiple light source units 2050 and 2060 that individually correspond to the respective light guide plates 2030 and 2040 are configured to cause light source lights of different colors to enter the inside through the outer edge portions 2032 and 2042 of the respective light guide plates 2030 and 2040. Since the light source units 2050 and 2060 are provided so as to be switchable between ON and OFF, changes or combinations of colors or patterns are realized by reflection of the reflective portions 2036 and 2046, thereby improving appearance.

In accordance with the present embodiment, the reflective portions 2036 and 2046 are disposed in a region at least partially deviated from each other. With the above configuration, since the reflection position can be changed by switching on and off the light source units 2050 and 2060, the appearance is improved.

Further, according to the present embodiment, the light emitting devices 2052 and 2062 belonging to the different light source units 2050 and 2060 are disposed so as to overlap with each other in the plate thickness direction TD. For example, when the light source unit 2050 or 2060 to be lighted is switched to another light source unit 2060 or 2050, a luminance balance on the light guide plates 2030 and 2040 changes before and after switching, making it difficult to visually recognize the change, thereby reducing discomfort and improving visibility.

Further, according to the present embodiment, the protrusion and recess portions 2037 and 2047 protruding from the back side of the light guide plates 2030 and 2040 to the inside of the light guide plates 2030 and 2040 form a pattern. The protrusion and recess portions 2037 and 2047 allow the reflective portions 2036 and 2046 to easily reflect the light source light to the viewing side.

Further, according to the present embodiment, since the patterns are different from each other in each of the light guide plates 2030 and 2040, different patterns can be visually recognized by switching the light source units 2050 and 2060 to be lighted, and the appearance is improved.

According to the present embodiment, in one light guide plate 2030, the peripheral reflective portion 2036*a* is provided in a region corresponding to the peripheral region SA of the display unit 2020, and in another light guide plate 2040, the display superimposing reflective portion 2046*a* is provided in a region corresponding to the display region DA, and the light source light reflected on the viewing side is superimposed on the display of the display unit 2020. The peripheral reflective portion 2036*a* and the display superimposing reflective portion 2046*a* are designed in accordance with the region arrangement of the display unit 2020, to thereby enhance the appearance.

Figure 36:
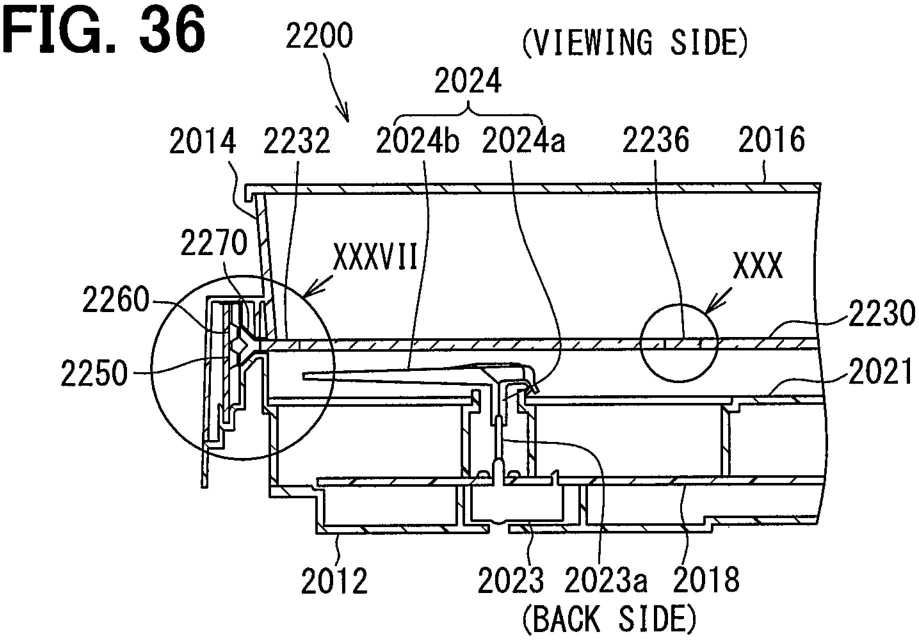
FIG. 36 is a cross-sectional view taken along a line XXXVI-XXXVI of FIG. 35.

In Modification 1 of the present embodiment, multiple light source units may correspond to one light guide plate. Specifically, in examples of FIGS. 35 to 40, the vehicle display device 2200 has one light guide plate 2230 as shown in FIG. 36. The light guide plate 2230 is formed similarly to the present embodiment.

Figure 37:
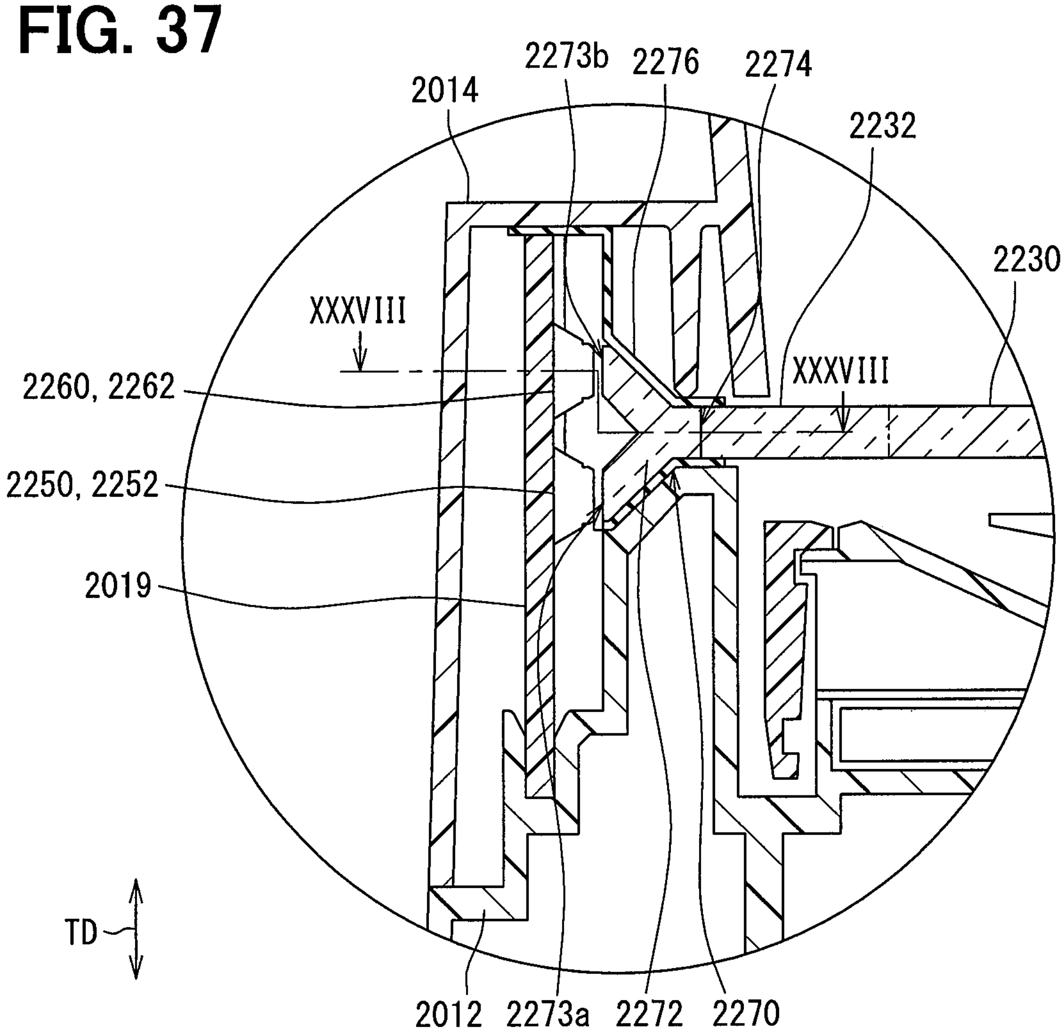
FIG. 37 is an enlarged view of a portion XXXVII of FIG. 36.
Figure 38:
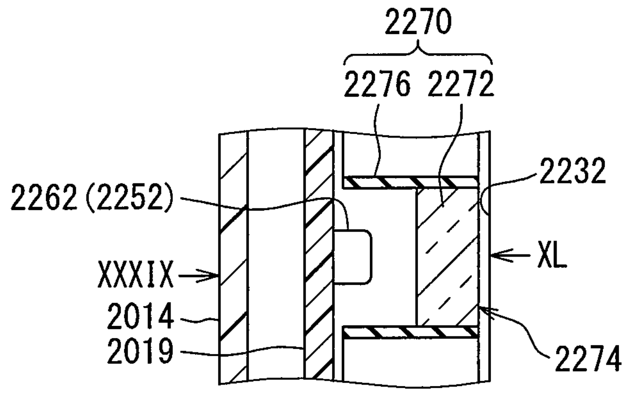
FIG. 38 is a cross-sectional view taken along a line XXXVIII-XXXVIII of FIG. 37.
Figure 39:
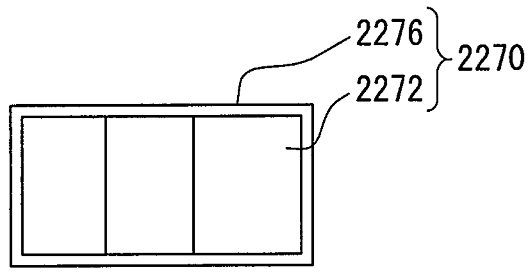
FIG. 39 is a diagram of an outer edge member of FIG. 38 as viewed in a direction of XXXIX.
Figure 40:
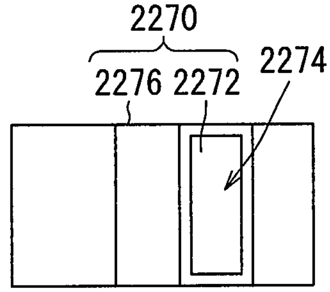
FIG. 40 is a diagram of the outer edge member of FIG. 38 as viewed in a direction of XL.

In this example, as shown in FIG. 37, two light guide plate light source units 2250 and 2260 are provided for one light guide plate 2230. As in the first embodiment, each of the light source units 2250 and 2260 includes multiple light emitting devices 2252 and 2262, and each of the light emitting devices 2252 belonging to the light source unit 2250 and each of the light emitting devices 2262 belonging to the light source unit 2260 emits light in different colors. The light emitting devices 2252 and 2262 belonging to the different light source units 2250 and 2260 are disposed so as to overlap with each other in the plate thickness direction TD. Since the light emitting devices 2252 and 2262 are disposed in two rows for each of the light source units 2250 and 2260 in this manner, the alignment pitch of the light emitting devices 2252 or 2262 belonging to the same light source unit 2250 or 2260 can be set to be narrower than that in the case where the light emitting devices 2252 and 2262 are alternately disposed in one row. The alignment pitch of the light emitting devices 2252 or 2262 is narrowed, thereby being capable of reducing a luminance unevenness of the light source light reflected by the reflective portion 2236.

As shown in FIGS. 37 to 40, each of the outer edge members 2270 is disposed between the outer edge portion 2232 of the plate-like light guide plate 2230 and each of the light emitting devices 2252 and 2262. Each outer edge member 2270 integrally has an outer edge light guide portion 2272 and a light shielding portion 2276 by two-color molding. The outer edge light guide portion 2272 is made of, for example, a light transmissive synthetic resin so as to be able to guide the light source light. The outer edge light guide portion 2272 has a plate facing surface 2274 facing one light guide plate 2230, and two light source facing surfaces 2273*a* and 2273*b* respectively facing two light emitting devices 2252 and 2262 overlapping with each other in the plate thickness direction TD, and has a Y-shaped cross section in which branches connecting the respective facing surfaces 2273*a* and 2273*b* are provided. Each of the light source facing surfaces 2273*a* and 2273*b* and the plate facing surface 2274 is formed in a smooth planar shape.

The outer edge light guide portion 2272 causes the light source lights of the light source units 2250 and 2260 to enter the light source facing surfaces 2273*a* and 2273*b* and emit the light from the plate facing surface 2274.

The light shielding portion 2276 is made of, for example, an elastomer having a light shielding property, and has a cylindrical shape surrounding a portion of the outer edge light guide portion 2272 excluding the facing surfaces 2273*a*, 2273*b*, and 2274. As a result, when the light source light emitted by the light emitting devices 2252 and 2262 is guided by the outer edge light guide portion 2272, the light source light is less likely to leak to the outside of the light shielding portion 2276. The light shielding portion 2276 extends toward the light guide plate 2230 side of the plate facing surface 2274.

The outer edge member 2270 is held between the rear case 2012 and the window plate 2014. Further, the outer edge member 2270 holds the light guide plate 2230 by sandwiching the light guide plate 2230 between the light guide plate 2230 side end portions of the light shielding portion 2276.

The vehicle display device 2200 can switch the light source units 2250 and 2260 to be lighted so as to turn on one of the two light source units 2250 and 2260. As a result, different colors (for example, red or blue) corresponding to the light source units 2250 and 2260 can be used to switch the colors visually recognized by the reflective portion 2236. The two light source units 2250 and 2260 may be provided so as to be capable of being turned on at the same time.

In Modification 2, three or more light guide plates 2030 and 2040 may be provided.

In Modification 3, the reflective portions 2036 and 2046 of the light guide plates 2030 and 2040 may be disposed in regions where the entire regions overlap with each other. Therefore, the patterns formed by the protrusion and recess portions 2037 and 2047 may be the same in the respective light guide plates 2030 and 2040.

As Modification 4, any of various patterns can be adopted as the patterns formed by the protrusion and recess portions 2037 and 2047.

In Modification 5, the inclined reflection surfaces 2037*a* and 2047*a* in the protrusion and recess portions 2037 and 2047 may be formed in a curved shape.

In Modification 6, the light emitting devices 2052 and 2062 belonging to the different light source units 2050 and 2060 may not overlap with each other in the plate thickness direction TD, and may be disposed in a zigzag pattern, for example.

In this example, in JP 2016-121890 A, which is a prior art example of the vehicle display device according to a sixth embodiment, only one light guide plate is provided. Then, only the same pattern corresponding to the reflective portion can be always displayed. Therefore, the appearance of the device is not sufficient.

On the other hand, for the purpose of providing a display device for a vehicle having an excellent appearance, according to a sixth embodiment, (1) a display device for a vehicle includes:

a display unit (2020) which displays a state of a vehicle;

a plurality of light guide plates (2030, 2040) that are formed in a plate-shape having a light transmissive property, and disposed to overlap with each other on a viewing side of the display unit; and a plurality of light source units (2050, 2060) that are provided to individually correspond to the respective light guide plates and are provided so as to be switchable to be turned on and off, and cause the light source light to enter the inside through outer edge portions (2032, 2042) of the respective light guide plates, in which the respective light source units emit the light source lights of different colors, and each of the light guide plates has a reflective portion (2036, 2046) which reflects the light source light from the corresponding light source unit to the viewing side.

The features of the vehicle display device according to the sixth embodiment are described above, but features of a lower hierarchy are listed as follows. In order to show a relationship with the above-mentioned features, "the above" is added to each configuration in the description.

(2) In each of the light guide plates, the respective reflective portions are disposed in regions in which at least parts of the reflective portions are shifted from each other.

(3) Each of the light source units includes multiple light emitting devices (2052, 2062) that emit the light source light, each of the light guide plates is disposed so as to align in a plate thickness direction (TD), and the light emitting devices belonging to different light source units are disposed so as to overlap with each other in the plate thickness direction.

(4) In each of the light guide plates, the reflective portion includes protrusion and recess portions (2037, 2047) protruding from a back side of the light guide plate to an inside of the light guide plate to form a pattern.

(5) The patterns are different from each other in each of the light guide plates.

(6) The display unit includes a display region (DA) for displaying on the viewing side and a peripheral region (SA) surrounding the display region, the reflective portion (2036) in at least one of the light guide plates (2030) of the multiple light guide plates is a peripheral reflective portion (2036*a*) provided in a region corresponding to the peripheral region, and the reflective portion (2046) in at least one of the light guide plates (2040) different from the light guide plate provided with the peripheral reflective portion in the multiple light guide plates is a display superimposing reflective portion (2046*a*) that is provided in a region corresponding to the display region for superimposing the light source light reflected on the viewing side on the display of the display unit.

According to the above configuration, the light guide plates provided with the reflective portion for reflecting the light source light from the light source unit toward the viewing side are disposed to overlap with each other. The multiple light source units individually corresponding to the respective light guide plates make the light source lights of different colors incident to the inside through the outer edge portions of the respective light guide plates. Such the light source unit is provided so as to be switchable between ON and OFF, whereby a change or combination of colors or patterns is realized by reflection of each reflective portion, and the appearance is improved.

Seventh Embodiment

Figure 41:
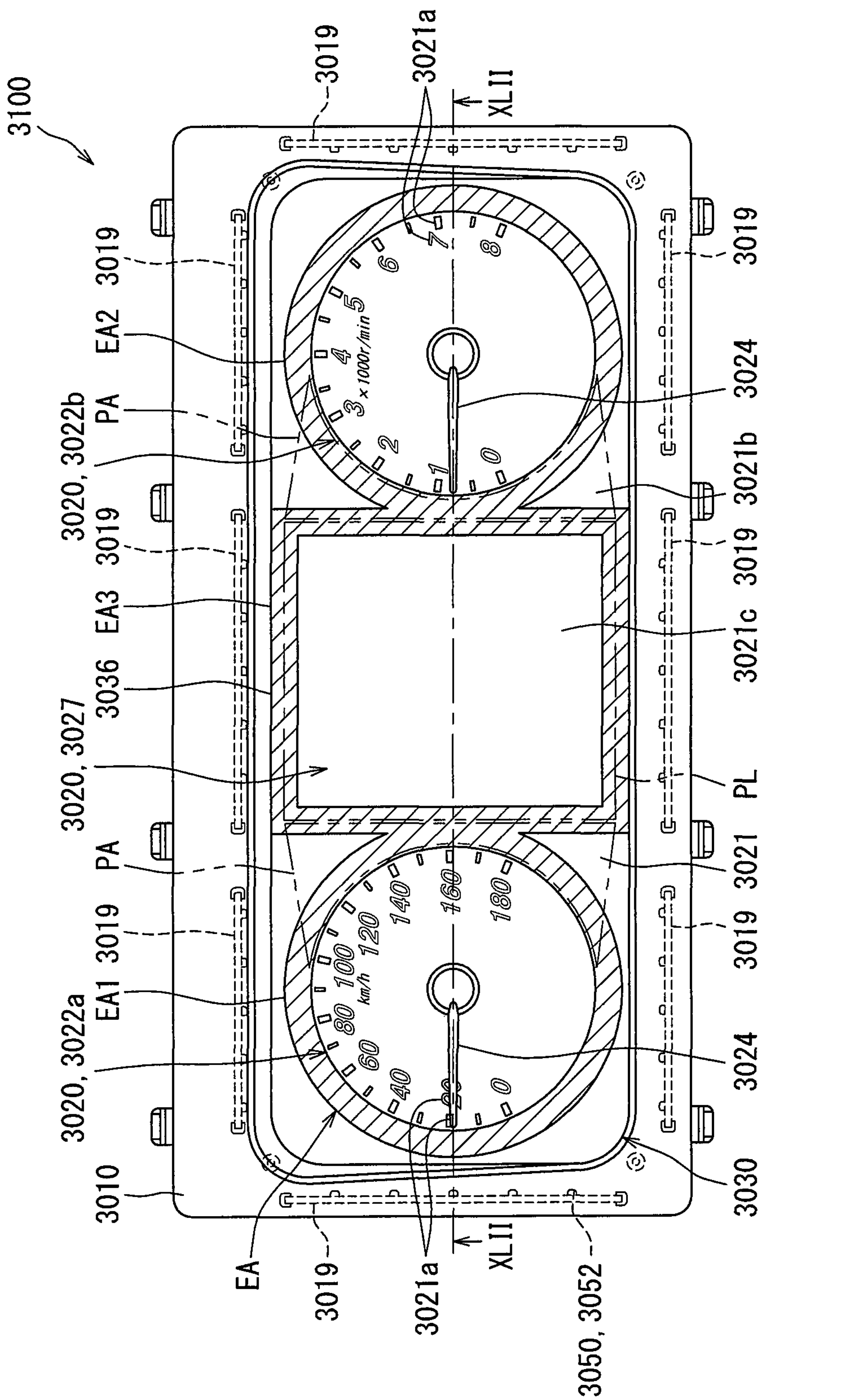
FIG. 41 is a front view of a display device for a vehicle according to a seventh embodiment.

A vehicle display device 3100 according to a seventh embodiment is mounted on a vehicle and installed on an instrument panel facing a seat on which an occupant who visually recognizes the device 3100 is seated. As shown in FIG. 41, the vehicle display device 3100 can display a state of the vehicle toward a viewing side where the occupant is positioned.

Figure 42:
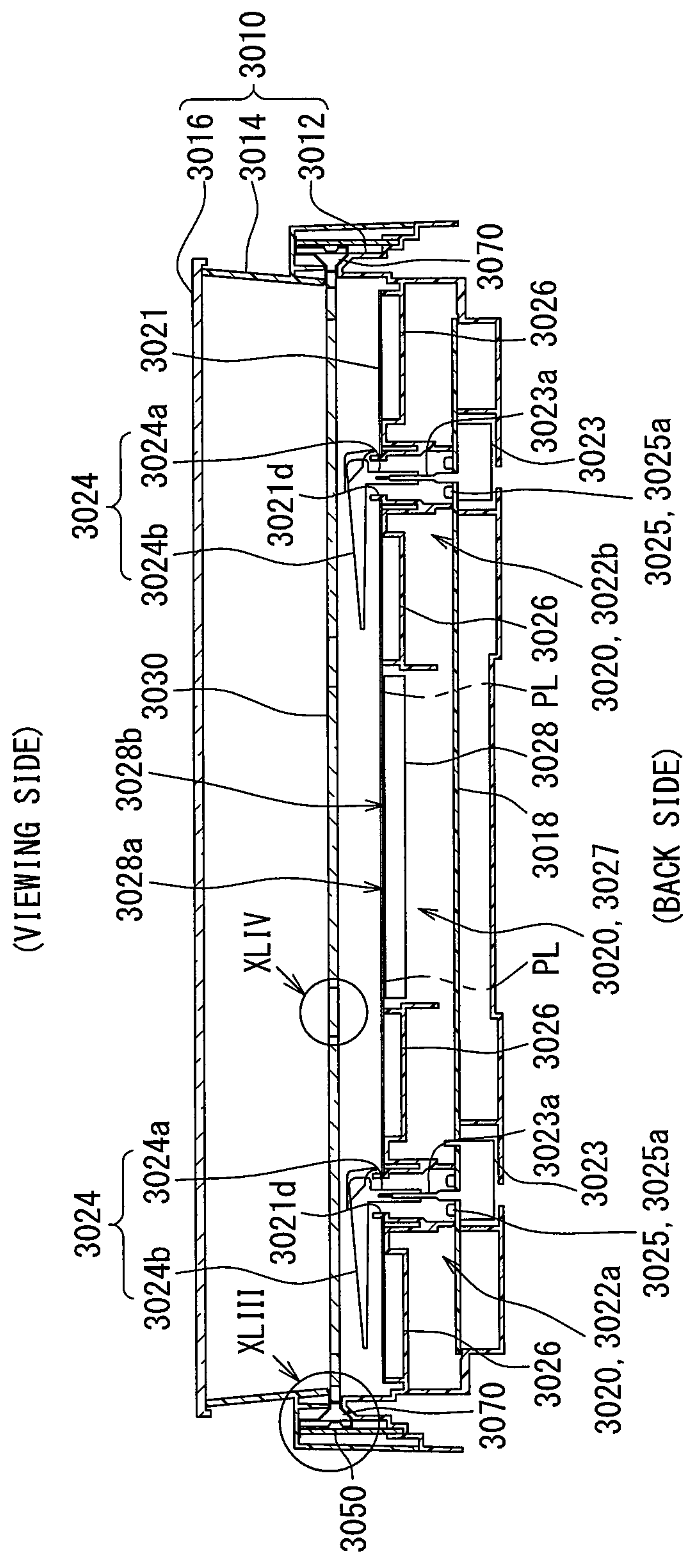
FIG. 42 is a cross-sectional view taken along a line XLII-XLII of FIG. 41.

As shown in FIG. 42, the vehicle display device 3100 described above includes a case portion 3010, a display main body portion 3020, a light emitting plate 3030, a light emitting plate light source unit 3050, and multiple outer edge members 3070.

The case portion 3010 includes a rear case 3012, a window plate 3014, and a light transmissive plate 3016. The rear case 3012 is formed of, for example, a synthetic resin having a light-shielding property, and covers the display main body portion 3020 from the rear side. The window plate 3014 is made of, for example, a synthetic resin having a light shielding property, and is formed in a cylindrical shape having opening portions on the viewing side and the back side along the outer peripheral contour of the display main body portion 3020. The light transmissive plate 3016 is made of a semi-light transmissive resin such as colored acrylic resin, for example, in a plate-shape that closes the viewing-side opening portion of the window plate 3014. As a result, the light emitting plate 3030 is covered with the light transmissive plate 3016 from the viewing side. The transmittance of the light transmissive plate 3016 according to the present embodiment is set to about 30% by the smoke-like coloring, but may be set to an arbitrary value of 30% or more.

The display main body portion 3020 displays a state of the vehicle with the use of the display plate 3021. The display plate 3021 is also generally called a dial plate, and is disposed between the rear case 3012 and the light emitting plate 3030. The display plate 3021 is formed in a flat plate-like shape by partially applying semi-light transmissive or light shielding printing on a surface of a base material made of, for example, a light transmissive synthetic resin. The printing may be replaced with coating.

The display main body portion 3020 includes multiple mechanical display units 3022*a* and 3022*b* and an image display unit 3027. In particular, according to the present embodiment, the image display unit 3027 is disposed to be sandwiched between the two mechanical display units 3022*a* and 3022*b* on the left and right sides.

In this example, the two mechanical display units 3022*a* and 3022*b* have the same configuration as each other. Each of the mechanical display units 3022*a* and 3022*b* displays a state of the vehicle with the use of a pointer 3024. Each of the mechanical display units 3022*a* and 3022*b* includes a stepping motor 3023, a pointer 3024, a pointer light source unit 3025, an indicator 3021*a*, and an indicator illumination unit 3026. The stepping motor 3023 is held by a main circuit board 3018 disposed between the rear case 3012 and the display plate 3021, that is, on the back side of the display plate 3021.

The pointer 3024 integrally includes a coupling portion 3024*a* and an indicating portion 3024*b*. The coupling portion 3024*a* is disposed through a through hole 3021*d* provided in the display plate 3021, and is coupled to a rotation shaft 3023*a* of the stepping motor 3023. The indicating portion 3024*b* is disposed between the display plate 3021 and the light emitting plate 3030, that is, on the viewing side of the display plate 3021, and has a needle shape. The pointer 3024 rotates in accordance with the output of the stepping motor 3023.

The pointer light source unit 3025 has multiple light emitting devices 3025*a* disposed on the main circuit board 3018 on the back side of the through hole 3021*d*. In particular, in the present embodiment, the light emitting device 3025*a* is a light emitting diode, and emits a light when connected to a power supply through a control circuit. The light from the pointer light source unit 3025 illuminates the pointer 3024 from the back side, so that the pointer 3024 emits a light.

The indicator 3021*a* is disposed on the display plate 3021, and is disposed in a partial ring shape centered on the through hole 3021*d*. In particular, the indicator 3021*a* includes scales and numerals. The scales are disposed at regular intervals. The numerals are provided corresponding to a part of the scales and disposed on an inner peripheral side of the corresponding scale. Those scales and numerals are surrounded by light shielding printing and formed into a contour by semi-light transmissive printing.

The indicator illumination unit 3026 has multiple light emitting devices disposed on the outer peripheral side of the pointer light source unit 3025 and on the back side of the indicator 3021*a*. The indicator illumination portion 3026 illuminates the indicator 3021*a* from the back side by the light emitting devices, whereby the indicator 3021*a* emits a light.

When the indicator 3021*a* is indicated by the pointer 3024, the mechanical display units 3022*a* and 3022*b* respectively display the state of the vehicle with the use of the pointer 3024. In the present embodiment, the left mechanical display unit 3022*a* displays a vehicle speed as the state of the vehicle. The mechanical display unit 3022*b* on the right side displays an engine speed as the state of the vehicle.

Therefore, in each of the mechanical display units 3022*a* and 3022*b*, a toric region on the inner peripheral side from the annular indicator 3021*a* substantially configures a visible region of each of the mechanical display units 3022*a* and 3022*b*.

The image display unit 3027 is disposed adjacent to the mechanical display unit 3022*a* and adjacent to the mechanical display unit 3022*b*, and displays an image. The image display unit 3027 includes a liquid crystal display device 3028 disposed closer to the display plate 3021 on the back side of the display plate 3021. The liquid crystal display device 3028 of the present embodiment employs an active matrix liquid crystal panel formed of multiple liquid crystal pixels disposed in two dimensions, which is a liquid crystal display panel using thin film transistors (Thin Film Transistor and TFTs). The liquid crystal display device 3028 has a rectangular liquid crystal display surface 3028*a* for displaying an image on the viewing side.

Further, in a portion of the display plate 3021 which overlaps with the liquid crystal display surface 3028*a*, a display plate light transmissive portion 3021*c* having a transmissive property by not being printed is disposed with a size slightly smaller than that of the liquid crystal display surface 3028*a*. The periphery of the display plate light transmissive portion 3021*c* is surrounded by a rectangular display frame 3021*b* having a light shielding property by printing. Therefore, the light of an image displayed on the liquid crystal display surface 3028*a* is transmitted through only a portion overlapping with the display plate light transmissive portion 3021*c*, which is provided inside a boundary line PL between the display plate light transmissive portion 3021*c* and the display frame 3021*b* toward the viewing side, so that the light of the image can be visually recognized. In other words, a portion of the liquid crystal display surface 3028*a* which overlaps with the display plate light transmissive portion 3021*c* is optically exposed as a display exposed surface 3028*b*, thereby displaying an image toward the viewing side. In the present embodiment, the display exposed surface 3028*b* surrounded by the display frame 3021*b* substantially configures a visible area of the image display unit 3027.

As shown in FIG. 42, the light emitting plate 3030 is formed in a flat plate-like shape and made of, for example, a synthetic resin having a light transmissive property. The light emitting plate 3030 is disposed on the viewing side of the mechanical display units 3022*a* and 3022*b* and the image display unit 3027, and is provided substantially in parallel to the display plate 3021. The light emitting plate 3030 has a light emitting region EA formed so as to be able to emit the light toward the viewing side.

The light emitting plate light source unit 3050 includes multiple light emitting devices 3052 that emit a light source light. In particular, in the present embodiment, the light emitting devices 3052 are light emitting diodes, and emits the light when connected to a power supply through a control circuit. Each of the light emitting devices 3052 is provided so as to be switchable between ON and OFF. The light emitting devices 3052 emit the light in the same color. The light source unit 3050 causes the light source light to enter the light emitting plate 3030 through an outer edge portion 3032 of the light emitting plate 3030 by the light emitting devices 3052. According to the present embodiment, multiple light source substrates 3019 are disposed on the outer periphery than the light emitting plate 3030 so as to surround the entire periphery. Each of the light emitting devices 3052 is disposed on the light source substrate 3019 so as to surround the outer edge portion 3032 of the light emitting plate 3030.

Figure 43:
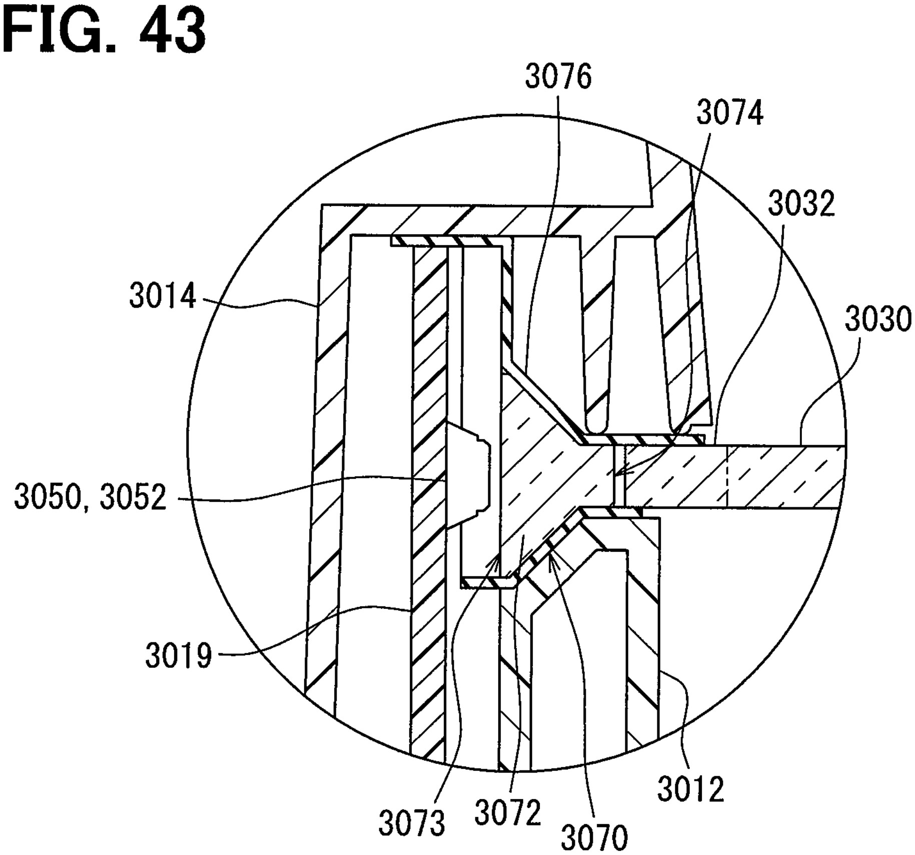
FIG. 43 is an enlarged view of a portion XLIII of FIG. 42.
Figure 44:
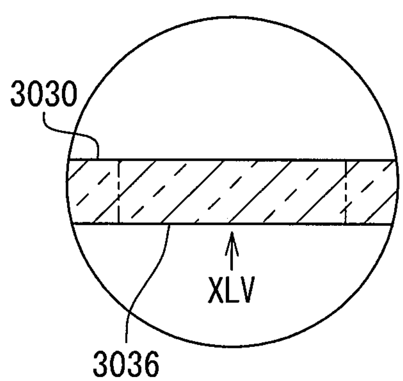
FIG. 44 is an enlarged view of a portion XLIV of FIG. 42.
Figure 45:
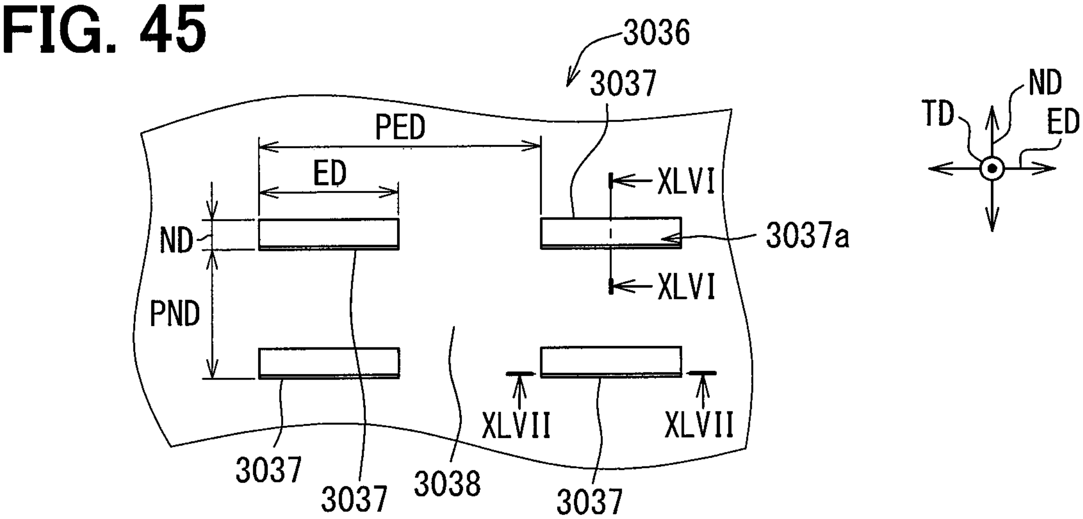
FIG. 45 is a diagram of light emitting plates as viewed in a direction of XLV in FIG. 44.
Figure 46:
FIG. 46 is a cross-sectional view taken along a line XLVI-XLVI of FIG. 45.
Figure 47:
FIG. 47 is a cross-sectional view taken along a line XLVII-XLVII of FIG. 45.

Each of the outer edge members 3070 is disposed between the outer edge portion 3032 of the flat plate-like shaped light emitting plate 3030 and each of the light emitting devices 3052. Each of the outer edge members 3070 integrally includes an outer edge light guide portion 3072 and a light shielding portion 3076 by two-color molding. The outer edge light guide portion 3072 is made of, for example, a synthetic resin having a light transmissive property so as to be able to guide the light source light. As shown in FIG. 43, the outer edge light guide portion 3072 has a plate facing surface 3074 facing the outer edge portion 3032 of the light emitting plate 3030, and a light source facing surface 3073 facing the light emitting device 3052. Each of the light source facing surface 3073 and the plate facing surface 3074 is formed in a smooth planar shape.

The light shielding portion 3076 is made of, for example, an elastomer having a light shielding property, and has a cylindrical shape surrounding a portion of the outer edge light guide portion 3072 except for the facing surfaces 3073 and 3074. As a result, when the light source light emitted by the light emitting devices 3052 is guided by the outer edge light guide portion 3072, the light source light is less likely to leak to the outside of the light shielding portion 3076. The light shielding portion 3076 extends toward the light emitting plate 3030 side of the plate facing surface 3074.

The outer edge member 3070 is held between the rear case 3012 and the window plate 3014. Further, an light emitting plate side end portion of the light shielding portion 3076 sandwiches the light emitting plate 3030, whereby the outer edge member 3070 holds the light emitting plate 3030. Because of the flexibility of the elastomer of the light shielding portion 3076, abnormal noises such as collision noises between the light emitting plate 3030 and the case portion 3010, which may occur in response to vibration of the vehicle, are reduced.

The light emitting plate 3030 has a reflective portion 3036 in the light emitting region EA. The reflective portion 3036 is provided with a concave inclined surface 3037*a* that is concaved from the back surface of the light emitting plate 3030 to the inside. The light emitting plate 3030 emits the light by reflecting the light source light guided from the light source unit 3050 toward the viewing side by the inclined surface 3037*a* of the reflective portion 3036.

More specifically, as shown in FIGS. 44 to 47, the reflective portion 3036 includes multiple reflective elements 3037 protruding from the back side of the light emitting plate 3030 to the inside of the light emitting plate 3030. A projection dimension of each reflective element 3037 is 15 μm. One inclined surface 3037*a* is provided for each of the reflective elements 3037. The inclined surface 3037*a* is formed in a planar shape capable of reflecting the light source light guided inside the light emitting plate 3030 to the viewing side by forming an angle of 45° with respect to the plate thickness direction TD of the light emitting plate 3030.

The plate thickness direction TD of the present embodiment substantially coincides with a normal direction of the surface of the largest area of the light emitting plate 3030.

Each of the reflective elements 3037 is provided with an inclined wall surface 3037*b* provided back-to-back with the inclined surface 3037*a*. The inclined wall surface 3037*b* forms an angle of 5° or less with respect to the plate thickness direction TD of the light emitting plate 3030, and is formed in a planar shape. In each reflective element 3037, the dimension in the direction in which the inclined surface 3037*a* and the inclined wall surface 3037*b* extend is 75 μm. Inclined side surfaces 3037*c* are provided between the side end portion of the inclined surface 3037*a* and the side end portion of the inclined wall surface 3037*b*. Each of the inclined side surfaces 3037*c* provided on both sides forms an angle of 5 degrees or less with respect to the plate thickness direction TD of the light emitting plate 3030, and is formed in a planar shape.

The multiple reflective elements 3037 are disposed in a two-dimensional direction at predetermined alignment pitches PED and PND, one by one, separated from each other through a flat portion 3038 of the light emitting plate 3030. Specifically, the alignment pitch PED in the direction ED is 150 μm, and the alignment pitch PND in the direction ND orthogonal to the direction ED is 75 μm.

The multiple reflective elements 3037 according to the present embodiment are disposed in the light emitting region EA at a predetermined and constant density by such pitch setting, thereby forming the reflective portion 3036.

Figure 48:
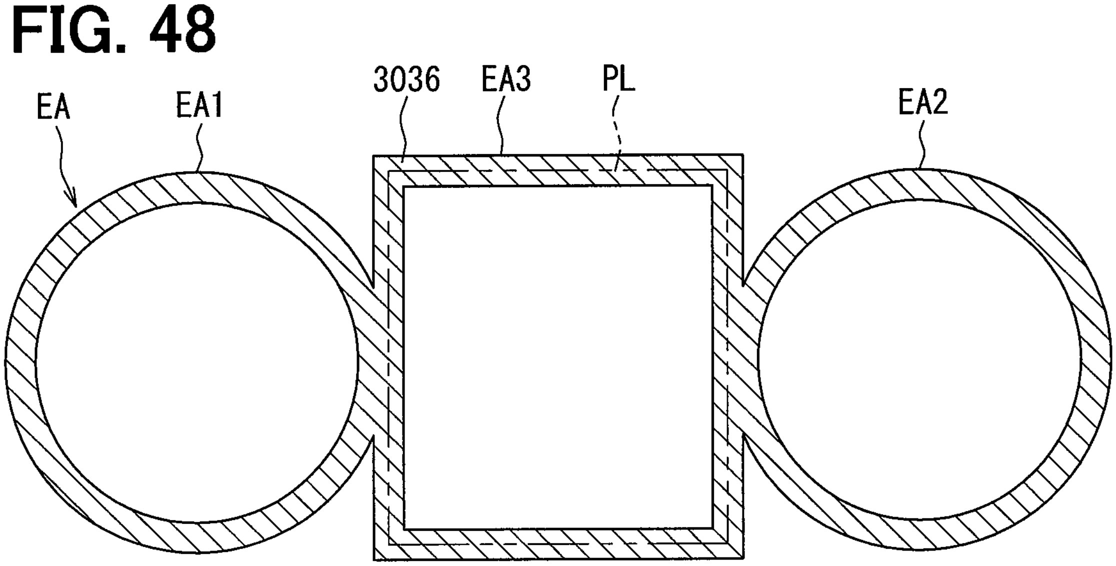
FIG. 48 is a diagram illustrating a pattern formed by a light emitting region of a light emitting plate.

As shown in FIG. 48, in the light emitting plate 3030, the multiple reflective elements 3037 are provided in the light emitting region EA as the reflective portions 3036, thereby forming a pattern. In the light emitting plate 3030, the light emitting region EA is provided with the inclusion of a region corresponding to the boundary portion PA between the visible region of the mechanical display unit 3022*a* and the visible region of the image display unit 3027. Further, the light emitting region EA is provided with the inclusion of a region corresponding to the boundary portion PA between the visible region of the mechanical display unit 3022*b* and the visible region of the image display unit 3027. In this example, the region corresponding to the boundary portion PA is a region on the light emitting plate 3030 that overlaps with the boundary portion PA in a vertical direction of the display plate 3021 or a plate thickness direction TD of the light emitting plate 3030.

More specifically, the light emitting region EA according to the present embodiment is provided corresponding to the visible region of the mechanical display unit 3022*a*, the visible region of the mechanical display unit 3022*b*, and the visible region of the image display unit 3027. A portion EA1 of the light emitting region EA corresponding to the mechanical display unit 3022*a* is provided in a ring shape so as to border the entire periphery of the visible region of the mechanical display unit 3022*a*. A portion EA2 of the light emitting region EA corresponding to the mechanical display unit 3022*b* is provided in a ring shape so as to border the entire periphery of the visible region of the mechanical display unit 3022*b*.

A portion EA3 of the light emitting region EA corresponding to the image display unit 3027 is provided in a rectangular annular shape so as to border over the entire periphery of the visible region of the image display unit 3027. In this example, the portion EA3 is provided across the entire circumference of a boundary line PL.

In a region corresponding to a portion where the mechanical display unit 3022*a* and the image display unit 3027 are close to each other in the boundary portion PA between the visible region of the mechanical display units 3022*a* and 3022*b* and the visible region of the image display unit 3027, the light emitting region EA is provided in the entire region, and the respective portions EA1 and EA3 or EA2 and EA3 of the light emitting region EA are connected to each other.

Such a light emitting region EA emits the light and is visually recognized brightly when the light source unit 3050 is turned on, but is hardly visually recognized from the viewing side due to the setting of the size and density of the reflective element 3037 when the light source unit 3050 is turned off. In FIGS. 41 and 48, a range of the light emitting region EA is hatched with oblique lines.

According to the seventh embodiment, the light emitting region EA is provided so as to include the region overlapping with the boundary portion PA between the visible region of the mechanical display units 3022*a* and 3022*b* and the visible region of the image display unit 3027. Since the light emitting region EA is formed so as to be able to emit the light toward the viewing side, the boundary portion PA can be prevented from being viewed darkly.

More specifically, the light emitting region EA is formed in a light emitting plate 3030 disposed on the viewing side of the mechanical display units 3022*a* and 3022*b* and the image display unit 3027. Therefore, the light emitting region EA is prevented from mechanically interfering with the structure of the mechanical display units 3022*a* and 3022*b* and the structure of the image display unit 3027. Further, the above configuration makes it possible to avoid that the display of the mechanical display units 3022*a* and 3022*b* and the image display unit 3027 is blocked from being visually recognized by the light transmissive property of the light emitting plate 3030. As described above, there can be provided the vehicle display device 3100 having an excellent appearance.

According to the seventh embodiment, the light emitting plate 3030 has a reflective portion 3036 that reflects the guided light source light to the viewing side by providing the light emitting plate 3030 with a concave inclined surface 3037*a* in the light emitting region EA. In such a configuration in which light emission in the light emitting region EA is realized by reflection on the inclined surface 3037*a*, when the light source unit 3050 is turned off, the inclined surface 3037*a* is less likely to be visually recognized and the existence of the light emitting region EA can be difficult to be recognized, so that the appearance is improved.

According to the seventh embodiment, the image display unit 3027 includes a display exposure surface 3028*b* that configures a visible region of the image display unit 3027 and displays an image toward the viewing side by being optically exposed, and a display frame 3021*b* that surrounds the display exposed surface 3028*b* and has a light shielding property, and the light emitting region EA is provided across a boundary line PL between the display exposed surface 3028*b* and the display frame 3021*b* over the entire circumference. With such region setting of the light emitting region EA, the outer peripheral contour in the visible region of the image display unit 3027 can be less likely to be recognized by a viewer. Therefore, the image display unit 3027 can be recognized to be larger than an actual size, and the appearance is improved.

Eighth Embodiment

As shown in FIGS. 49 to 53, an eighth embodiment is a modification of the seventh embodiment. The eighth embodiment will be described focusing on configurations different from the seventh embodiment.

Figure 49:
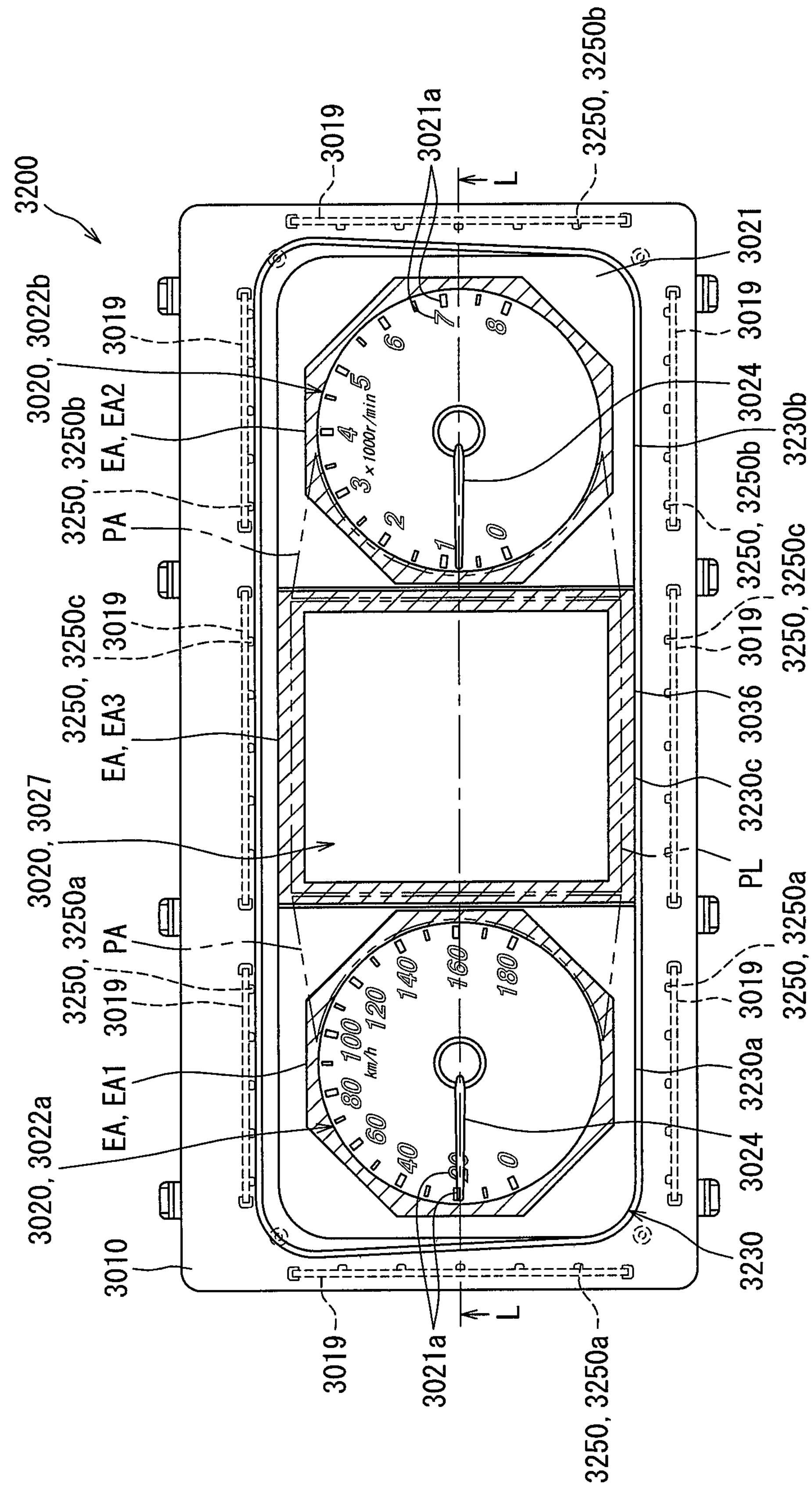
FIG. 49 is a front view of a display device for a vehicle according to an eighth embodiment.

In a vehicle display device 3200 according to the eighth embodiment, as shown in FIG. 49, a light emitting plate 3230 is formed in a single flat plate-like shape by multiple divided portions 3230*a*, 3230*b*, and 3230*c*. In the present embodiment, a total of three portions 3230*a*, 3230*b*, and 3230*c* are provided corresponding to a total number of the mechanical display units 3022*a* and 3022*b* and the image display unit 27. The portion 3230*a* includes all regions of the light emitting plate 3230 corresponding to a visible region of a mechanical display unit 22*a*. The portion 3230*b* includes all regions of the light emitting plate 3230 corresponding to a visible region of a mechanical display unit 22*b*. The portion 3230*c* includes all regions of the light emitting plate 3230 corresponding to the visible region of the image display unit 3027.

Figure 50:
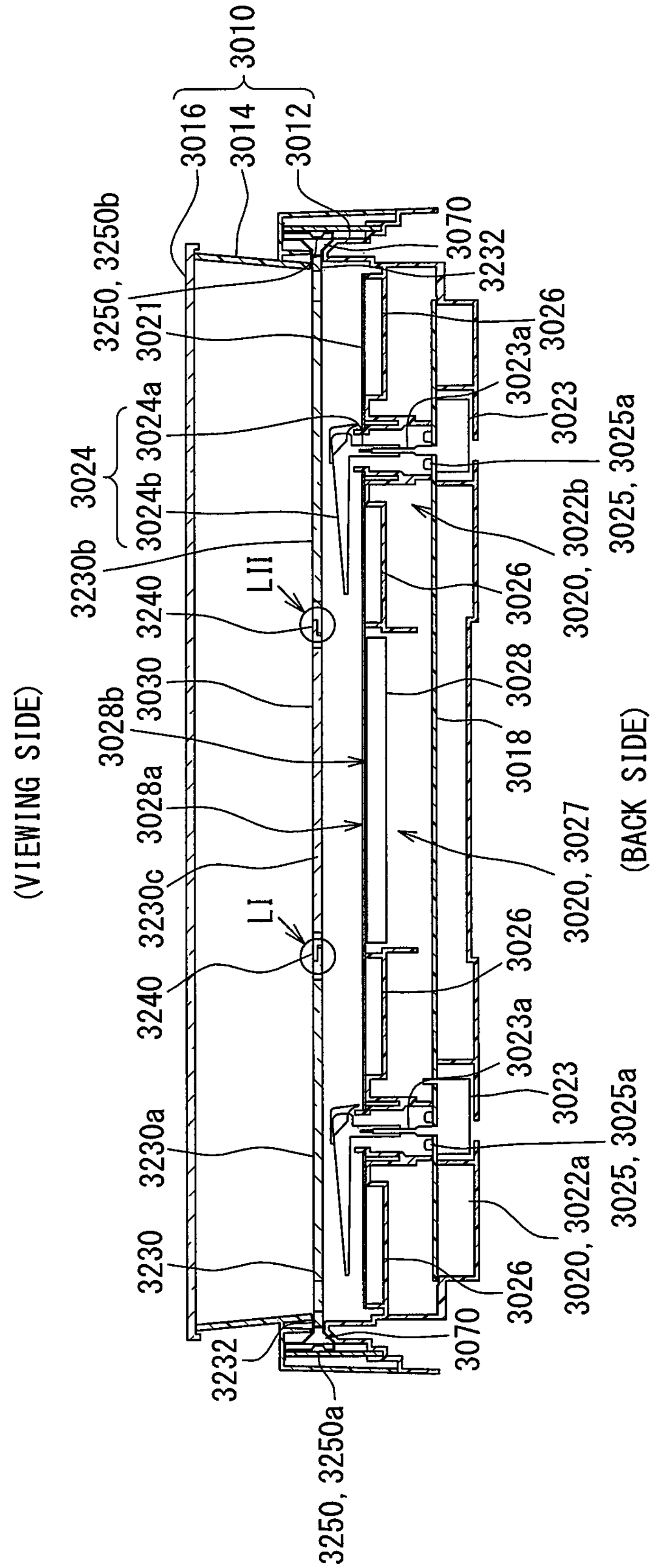
FIG. 50 is a cross-sectional view taken along a line L-L of FIG. 49.
Figure 51:
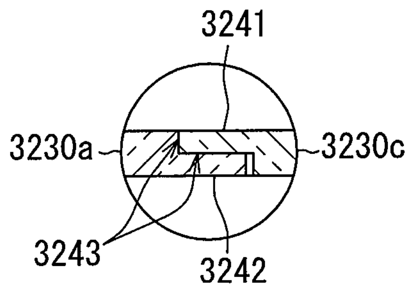
FIG. 51 is an enlarged view of a portion LI of FIG. 50.
Figure 52:
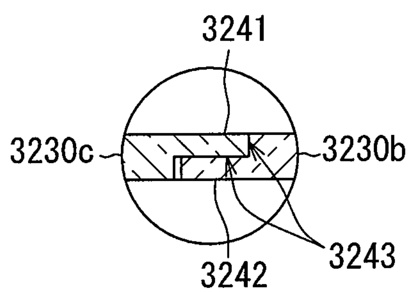
FIG. 52 is an enlarged view of a portion LII of FIG. 51.

As shown in FIGS. 50 to 52, the multiple portions 3230*a*, 3230*b*, and 3230*c* are bonded to each other at joint portions 3240. Specifically, the joint portions 3240 are provided between the portion 3230*a* and the portion 3230*c*, and between the portion 3230*b* and the portion 3230*c*. In each of the joint portions 3240, a joint structure is formed in which a protrusion 3241 projecting from a portion 3230*c* corresponding to the image display unit 27 along the viewing side surface of the light emitting plate 3230 and a protrusion 3242 projecting from the portion 3230*a* and 3230*b* corresponding to the mechanical display units 3022*a* and 3022*b* along the back side surface of the light emitting plate 3230 are combined together. The portion 3230*c* and the portion 3230*a* or 3230*b* are bonded together by applying an ultra-short pulse laser light in a state in which a joint interface 3243 is subjected to a photooxidation treatment with ultraviolet rays and pressurized in advance. The join portion 3240 by such a bonding method is in a controllable state of the light source light transmission between the adjacent portions 3230*a* and 3230*c*, and the adjacent portions 3230*b* and 3230*c*, while making it difficult for the occupant to visually recognize the joint interface 3243 from the viewing side.

Figure 53:
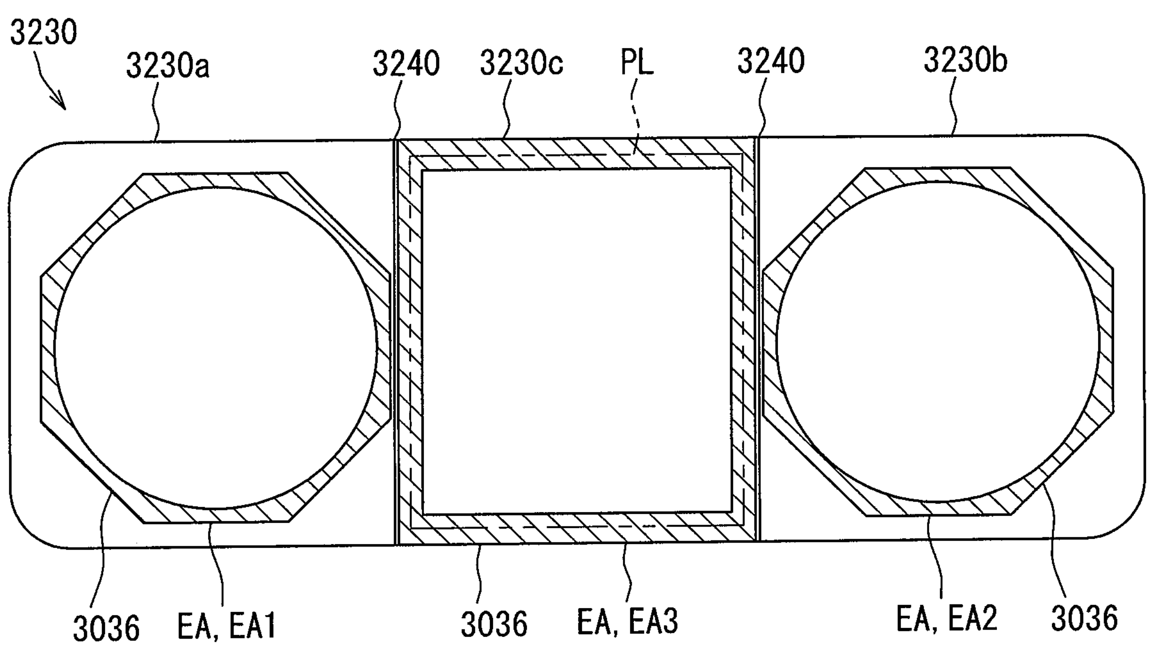
FIG. 53 is a front view of a light emitting plate according to the eighth embodiment.

As shown in FIGS. 49 and 53, as in the seventh embodiment, in the light emitting plate 3230, the light emitting region EA is provided with the inclusion of a region corresponding to the boundary portion PA between the visible region of the mechanical display units 3022*a* and 3022*b* and the visible region of the image display unit 3027. However, the light emitting region EA of the eighth embodiment is provided in each of the portions 3230*a*, 3230*b*, and 3230*c* separated from each other across the joint portions 3240. More specifically, in the light emitting region EA, the portion EA1 corresponding to the mechanical display units 3022*a* and 3022*b* is provided in a ring shape at the portion 3230*a* so as to border the entire periphery of the visible region of the mechanical display unit 3022*a*, but the outer peripheral contour of the portion EA 1 has an octagonal shape. The portion of the light emitting region EA corresponding to the mechanical display unit 3022*b* is provided in a ring shape at the portion 3230*b* so as to border the entire periphery of the visible region of the mechanical display unit 3022*b*, but the outer peripheral contour of the portion EA2 has an octagonal shape.

The portion EA3 of the light emitting region EA corresponding to the image display unit 3027 is provided in a rectangular annular shape at the portion 3230*c* so as to border over the entire periphery of the visible region of the image display unit 3027. In this example, each of the joint portions 3240 is provided in a straight line extending along a side adjacent to the portions EA1 and EA3 corresponding to the mechanical display units 22*a* and 22*b* of the portion EA3. In contrast to the light emitting plate 3230 described above, in the light source unit 3250 according to the eighth embodiment, light emitting devices 3252*a*, 3252*b*, and 3252*c* are disposed on the light source substrate 3019 so as to surround the entire outer edge portion 3232 of the light emitting plate 3230 corresponding to the respective portions 3230*a*, 3230*b*, and 3230*c*. However, the light emitting devices 3252*a* and 3252*b* corresponding to the portions 3230*a* and 3230*b* and the light emitting device 3252*c* corresponding to the portion 3230*c* emit the light in different colors, so that the light source unit 3250 causes the light source lights of the colors different from each other to be incident between the adjacent portions 3230*a* and 3230*c*, 3230*b*, and 3230*c*.

Therefore, the light emitting region EA can emit the light in a different color for each of the portions 3230*a*, 3230*b*, and 3230*c*. Since each of the portions 3230*a*, 3230*b*, and 3230*c* is divided corresponding to each of the display units 3022*a*, 3022*b*, and 3027, each portion can cause the light emitting region EA to emit the light in a color corresponding to each of the display units 3022*a*, 3022*b*, and 3027. For example, the portions 3230*a* and 3230*b* may emit the light in blue and the portion 3230*c* may emit the light in red. The portion 3230*c* may emit the light in red when displaying a warning without emitting the light normally.

According to the eighth embodiment, the light emitting plate 3230 is formed in a single plate-shape such that, in a state in which the multiple portions 3230*a*, 3230*b*, and 3230*c* are joined to each other at the joint portions 3240, the joint portions 3240 regulate the transmission of the light source light between the adjacent portions 3230*a* and 3230*c* or 3230*b* and 3230*c*. Then, the light source unit 3250 causes the light source lights of different colors to be incident between the adjacent portions 3230*a* and 3230*c* or 3230*b* and 3230*c*. In this case, the light emission of different colors can be realized for each of the portions 3230*a*, 3230*b*, and 3230*c* by one light emitting plate 3230, so that the appearance is improved.

Ninth Embodiment

As shown in FIGS. 54 to 57, a ninth embodiment is a modification of the seventh embodiment. The ninth embodiment will be described focusing on configurations different from the seventh embodiment.

Figure 55:
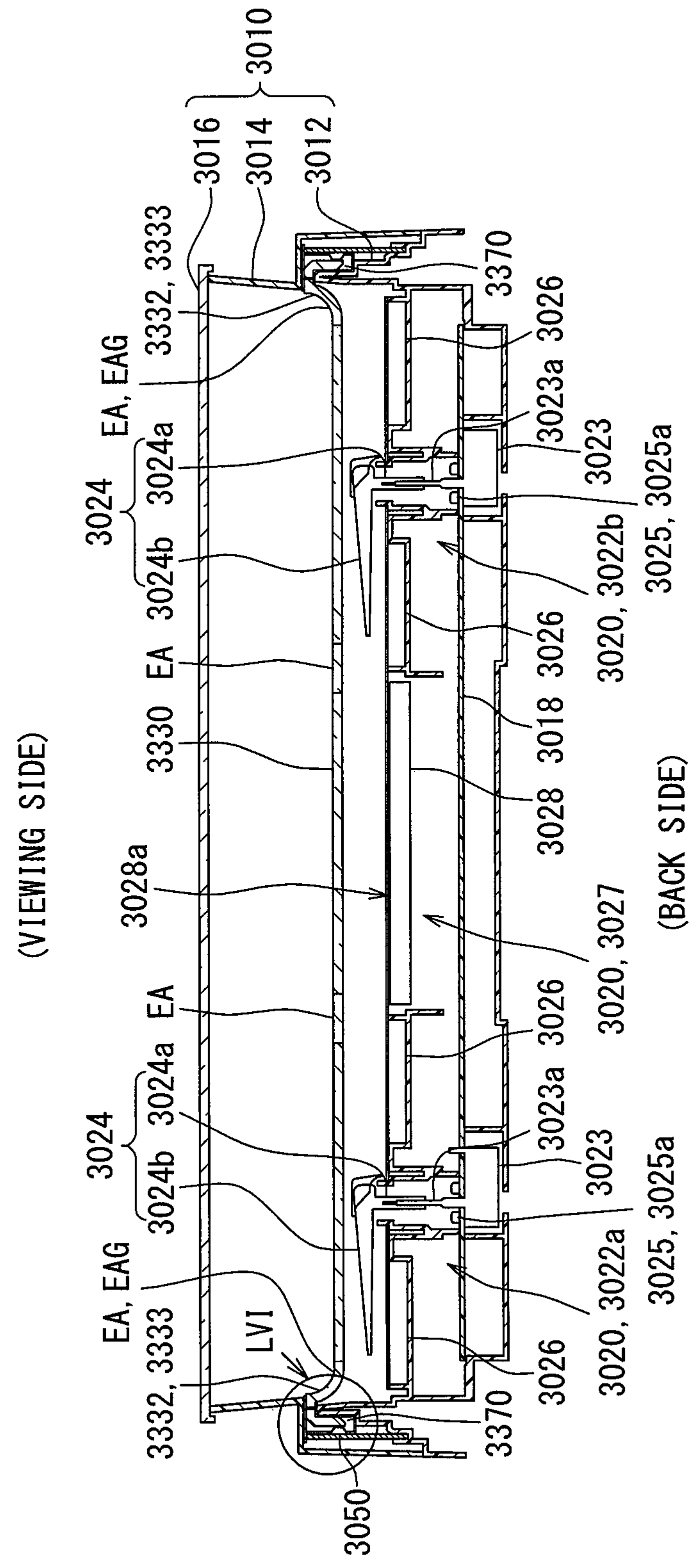
FIG. 55 is a cross-sectional view taken along a line LV-LV of FIG. 54.

In a vehicle display device 3300 according to the ninth embodiment, as shown in FIG. 55, a light emitting plate 3330 has a flat plate-like shape inside while an outer edge portion 3332 has a curved shape. More specifically, an outer edge portion 3332 of the light emitting plate 3330 according to the ninth embodiment has a bent light guide portion 3333 over the entire circumference.

Figure 56:
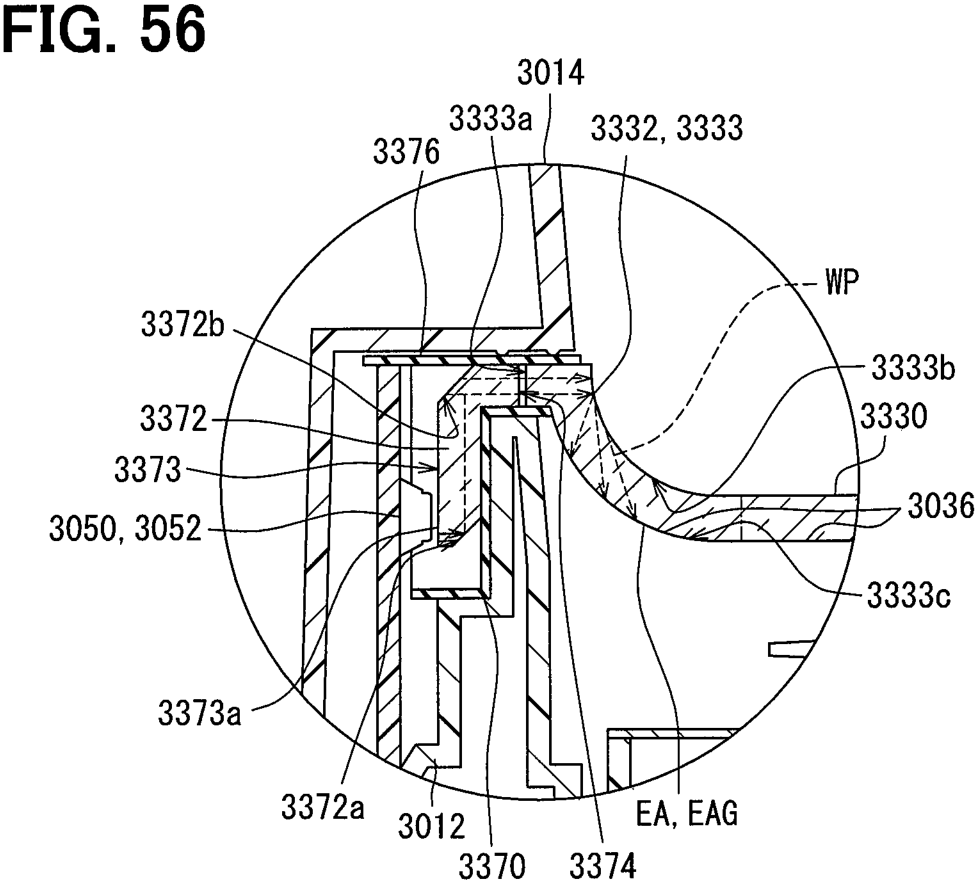
FIG. 56 is an enlarged view of a portion LVI of FIG. 55.

As shown in FIG. 56, the bent light guide portion 3333 provides a bent path WP which is bent, and guides a light source light toward a light emitting region EA through the bent path WP. The bent light guide portion 3333 is formed to be curved toward a viewing side from the inside toward the light source unit 50 side, and an outer edge facing surface 3333*a* facing an outer edge member 3370 is provided at a portion bent by about 90 degrees with respect to a planar inside.

Figure 54:
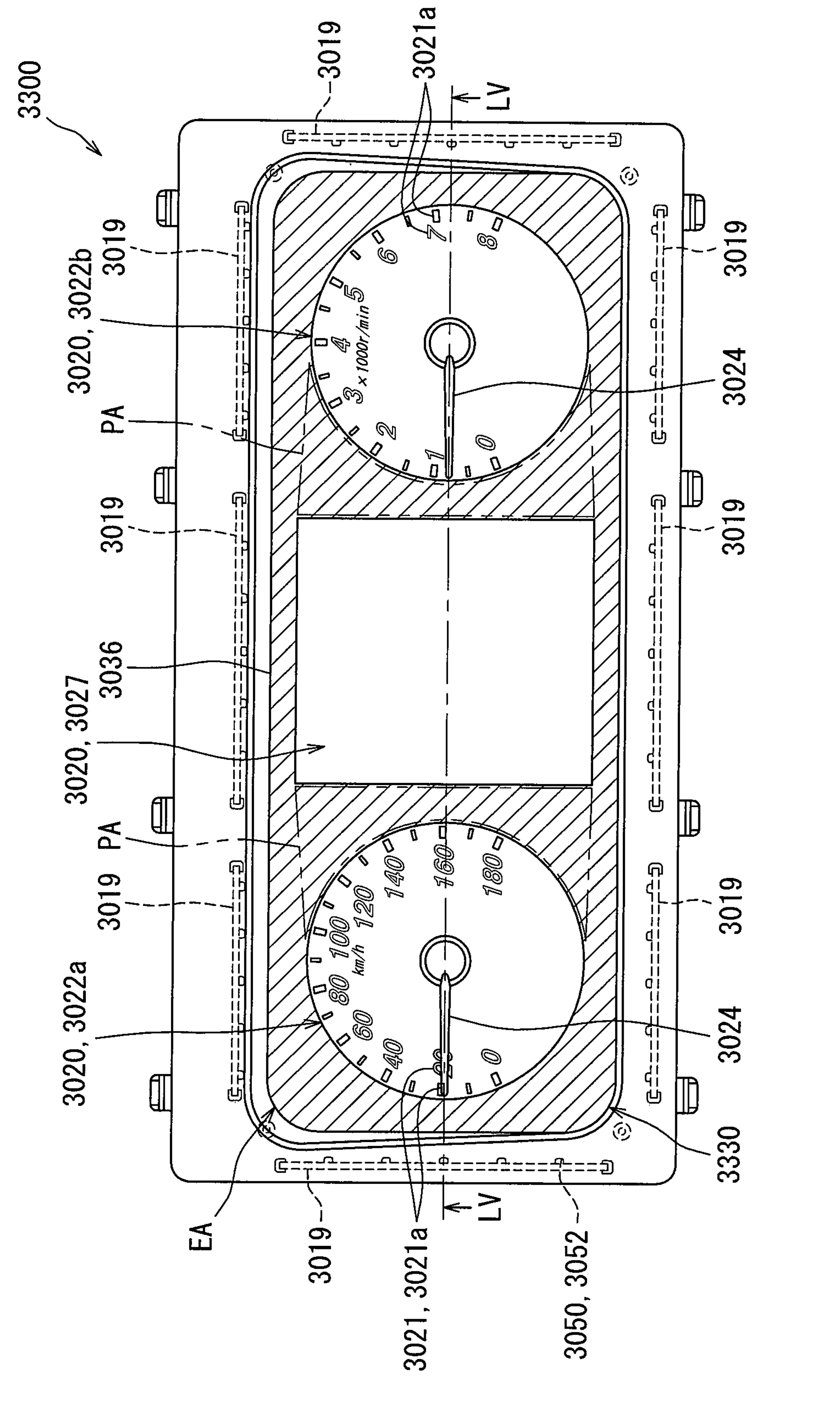
FIG. 54 is a front view of a display device for a vehicle according to a ninth embodiment.
Figure 57:
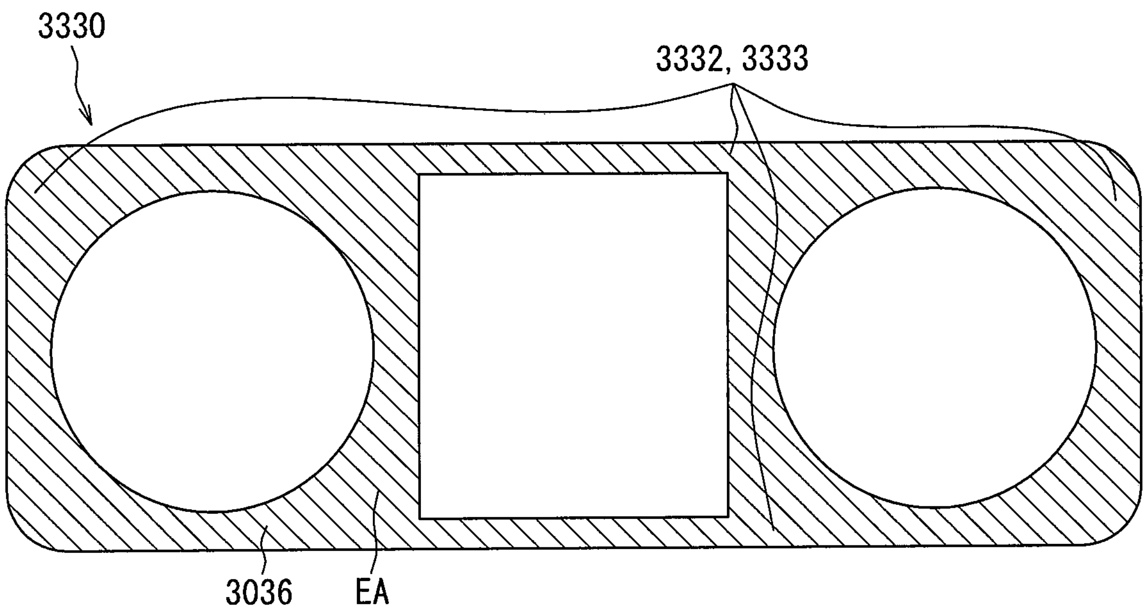
FIG. 57 is a front view of a light emitting plate according to the ninth embodiment.

As shown in FIGS. 54 and 57, a light emitting region EA according to the ninth embodiment is set in substantially the entire region of the light emitting plate 3330 except for regions corresponding to visible regions of the mechanical display units 22*a* and 22*b* and a region corresponding to a visible region of an image display unit 27, and is also set in the bent light guide portion 3333. In this example, the light emitting region EA of the ninth embodiment has a density change region EAG in which a density of reflective elements 3037 changes in a gradation manner in a reflective portion 3036 that realizes the light emitting region EA. Specifically, the density of the reflective elements 3037 is set to be lower than that of the bent light guide portion 3333 in the light emitting region EA in the planar interior, and the light emitting region EA in the bent light guide 3333 is the density change region EAG. Specifically, in the bent light guide portion 3333, the density of the reflective elements 3037 increases from the inside toward a light source unit 3050.

As shown in FIG. 56, the outer edge member 3370 according to the ninth embodiment has an outer edge light guide portion 3372 and a light shielding portion 3376 integrally by two-color molding, similarly to the seventh embodiment, but the outer edge light guide portion 3372 of the ninth embodiment is bent into an L-shaped cross section. An L-shaped side surface of the outer edge light guide portion 3372 is a light source facing surface 3373, and the light emitting devices 3052 of the light source unit 3050 face an end portion 3373*a* on the back side of the light source facing surface 3373. Reflective surfaces 3372*a* and 3372*b* are respectively provided at an incident portion and a bent portion of the light source light in the outer edge light guide portion 3372, and the light source light is sequentially reflected by the reflection surfaces 3372*a* and 3372*b* and guided to a plate facing surface 3374 positioned on the viewing side of the inside of the light source unit 3050 and the light emitting plate 3330. The light source light is emitted from the outer edge light guide portion 3372 through the plate facing surface 3374, and enters the bent light guide portion 3333 of the light emitting plate 3330 through the outer edge facing surface 3333*a*.

When the light source light passes through the bent path WP, the surface 3333*b* of the bent light guide portion 3333 on the viewing side is smoothly formed. Therefore, while the light source light in the bent path WP is reflected by a surface 3333*b* on the viewing side, a part of the bent light guide portion 3333 which reaches a surface 3333*c* on the back side is reflected by the reflective elements 3037 to the viewing side, and the other part that is not reflected by the reflective elements 3037 is guided to the internal light emitting region EA.

According to the ninth embodiment, the light emitting region EA has the density change region EAG in which the density of the reflective elements 3037 changes in a gradation manner. In the density change region EAG, the emission luminance changes in a gradation manner in accordance with the density of the reflective elements 3037, so that the viewer can feel a stereoscopic effect and the appearance is improved.

According to the ninth embodiment, the outer edge portion 3332 has the bent light guide portion 3333 that forms the bent path WP and guides the light source light toward the light emitting region EA through the bent path WP. Since the light source light is guided through the bent path WP, a distance to the light emitting region EA can be increased, and the luminance of the light source light is made uniform before reaching the light emitting region EA, so that luminance unevenness is suppressed and appearance is improved.

Further, according to the ninth embodiment, an entire dead space including the boundary portion PA between the visible area of the mechanical display units 3022*a* and 3022*b* and the visible area of the image display unit 3027 emits the light, and the overall brightness improves the appearance.

As Modification 1 of the seventh to ninth embodiments, the number of mechanical display units 22*a* and 22*b* may be one or three or more. Similarly, the number of the image display units 27 may be two or more.

As Modification 2, the light emitting region EA may be provided with the inclusion of a region corresponding to the boundary portion PA between the visible region of at least one of the mechanical display units 3022*a* and 3022*b* and the visible region of the image display unit 3027 (in the case of the multiple image display units 3027, the visible region of at least one of the image display units 3027). More specifically, the light emitting region EA may not be provided so as to border the display units 3022*a*, 3022*b*, and 3027 over the entire circumference, and may be provided only in a region corresponding to a portion where the adjacent display units 3022*a* and 3027, 3022*b*, and 3027 are closest to each other, for example.

In Modification 3, the inclined surface 3037*a* of the reflective portion 3036 may be formed in a curved surface shape.

As Modification 4, in the vehicle display device 3100, multiple light emitting plates 3030 may be disposed to overlap with each other on the viewing side of the mechanical display units 3022*a* and 3022*b* and the image display unit 3027. The patterns of the multiple light emitting plates 3030 may be different from each other, and different patterns may be visually recognized by switching on or off the light source unit 3050 corresponding to each light emitting plate 3030.

In Modification 5, the light emitting plate 3030 is not limited to one that emits the light by reflecting the light source light from the light source unit 3050 to the viewing side by the reflective portion 3036. For example, a configuration in which light emitting devices are buried in the light emitting plate 3030 and the light emitting devices emit the light may be employed.

In this case, in JP 2016-13813 A, which is a prior art example of the vehicle display device based on the seventh to ninth embodiments, in the vehicle display device, there is a need to place a structure for the mechanical display unit around the visible area of the mechanical display unit, and there is also a need to place a structure for the image display unit around the visible area of the image display unit. For example, such a structure may result in a non-display area between the visible area of the mechanical display unit and the visible area of the image display unit (that is, the boundary portion) which cannot be displayed. Such a non-display range generally tends to be dark, and the appearance of the vehicle display device is poor due to the presence of the non-display area at the boundary portion.

On the other hand, for the purpose of providing a vehicle display device having an excellent appearance, in the seventh to ninth embodiments, (1) a display device for displaying a state of a vehicle includes:

a mechanical display unit (3022*a*, 3022*b*) for displaying the state with the use of a pointer (3024);

an image display unit (3027) for displaying an image, and a light emitting plate (3030, 3230, 3330) that is disposed on a viewing side of the mechanical display unit and the image display unit and formed in a plate-shape having a light transmissive property, in which the light emitting plate has a light emitting region (EA) formed so as to emit a light toward the viewing side, and the light emitting region includes a region corresponding to a boundary portion (PA) between a visible region of the mechanical display unit and a visible region of the image display unit.

The features of the vehicle display device according to the seventh to ninth embodiments are described above, but the features of the lower hierarchy are listed as follows. In order to show a relationship with the above-mentioned features, "the above" is added to each configuration in the description.

(2) The display device further includes a light source unit (3050, 3250) for causing the light source light guided to the light emitting region to enter the light emitting plate through an outer edge portion (3032, 3232, 3332) of the light emitting plate, in which the light emitting plate has a reflective portion (3036) for reflecting the guided light source light toward the viewing side by providing a concave inclined surface (3037*a*) on the light emitting plate in the light emitting region.

(3) The reflective portion in the light emitting region is formed by arraying multiple reflective elements (3037) having the inclined surface at a predetermined density, and the light emitting region has a density change region (EAG) in which the predetermined density changes in a gradation manner.

(4) The outer edge portion forms a bent path (WP) and has a bent light guide portion (3333) for guiding the light source light through the bent path toward the light emitting region.

(5) The light emitting plate is formed in a single plate-shape in which multiple portions (3230*a*, 3230*b*, 3230*c*) are joined to each other at joint portions (3240), and the joint portions regulate transmission of the light source light between the adjacent portions, and the light source unit allows the light source light of different colors to be incident between the adjacent portions.

(6) The image display unit includes:

a display exposed surface (3028*b*) that configures a visible region of the image display unit, and displays the image toward the viewing side by optically exposing the image, and a display frame (3021*b*) that surrounds the display exposure surface and having a light shielding property, and the light emitting region is provided across a boundary line (PL) between the display exposure surface and the display frame over the entire circumference.

(7) The light emitting region is provided in the entire region of the light emitting plate other than the region corresponding to the visible region of the mechanical display unit and the visible region of the image display unit.

According to the above configuration, the light emitting region is provided with the inclusion of a region overlapping with a boundary portion between the visible region of the mechanical display unit and the visible region of the image display unit. Since the light emitting region is formed so as to emit the light toward the viewing side, the boundary portion can be inhibited from being viewed darkly.

More specifically, the light emitting region is formed in a light emitting plate disposed on the viewing side of the mechanical display unit and the image display unit. Therefore, the light emitting region is avoided from mechanically interfering with the structure of the mechanical display unit and the structure of the image display unit. Further, the visibility of the display of the mechanical display unit and the image display unit can be avoided from being blocked by the light transmissive property of the light emitting plate. As described above, a vehicle display device having an excellent appearance can be provided.

Tenth Embodiment

Figure 58:
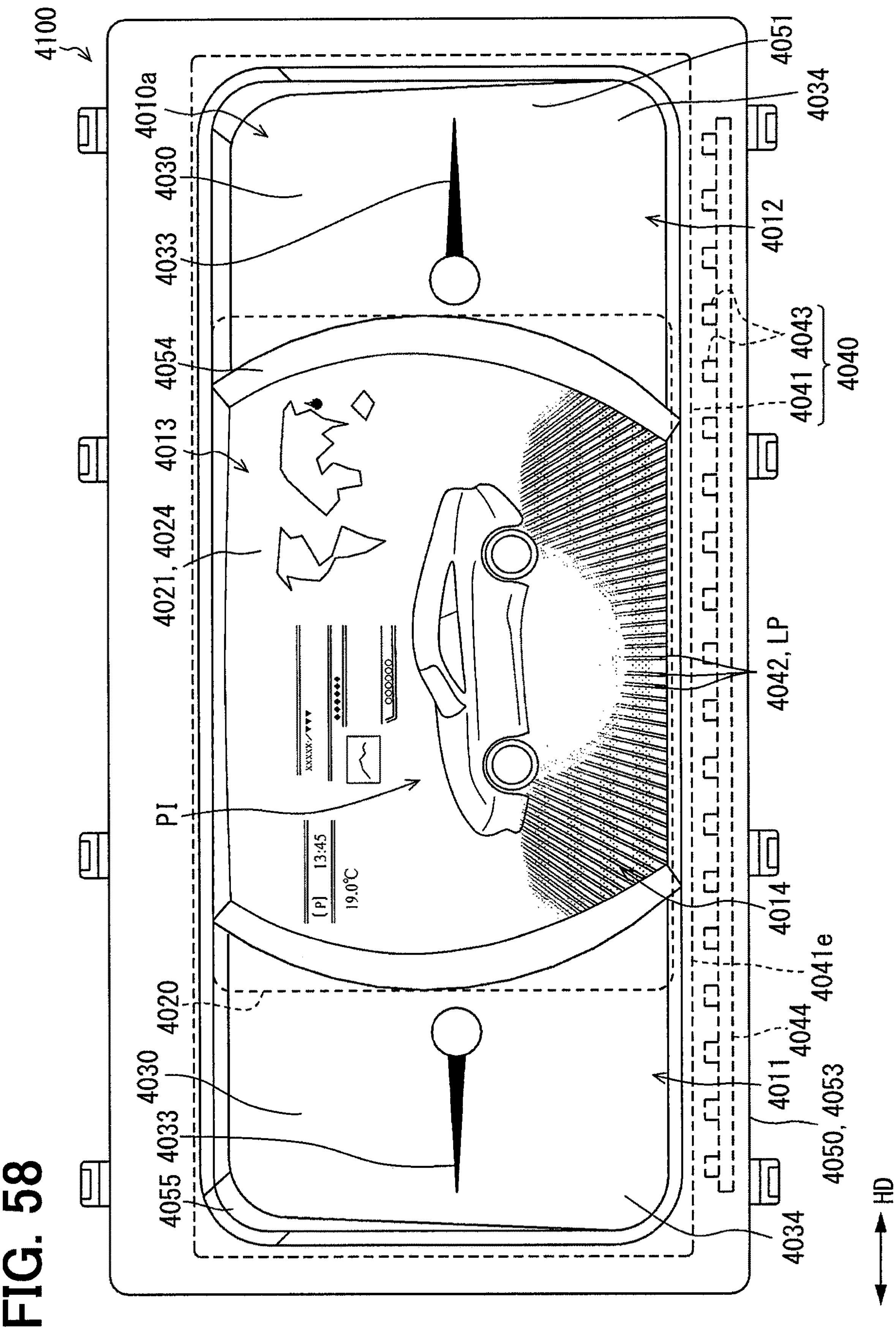
FIG. 58 is a front view showing each display unit of a display device according to a tenth embodiment.

A display device 4100 according to a tenth embodiment shown in FIG. 58 is mounted on a vehicle and functions as a combination meter for the vehicle. The display device 4100 is attached to an instrument panel or the like in a posture in which a display region 4010*a* on a front side shown in FIG. 58 faces a driver's seat. The display device 4100 displays various information about the vehicle in the display region 4010*a*.

In the display region 4010*a*, a pointer display unit such as a speedometer display unit 4011 and a tachometer display unit 4012, a multi-display unit 4013, a light emission design display unit 4014, and the like are provided. The speedometer display unit 4011 and the tachometer display unit 4012 display information by respective rotating pointers 4033. The multi-display unit 4013 is located at the center of the display region 4010*a* and displays information mainly by various images PI drawn on a display screen 4021 of a liquid crystal display device 4020. The light emission design display unit 4014 displays a light emission design LP superimposed on an image PI of the display screen 4021 of the multi-display unit 4013.

Figure 59:
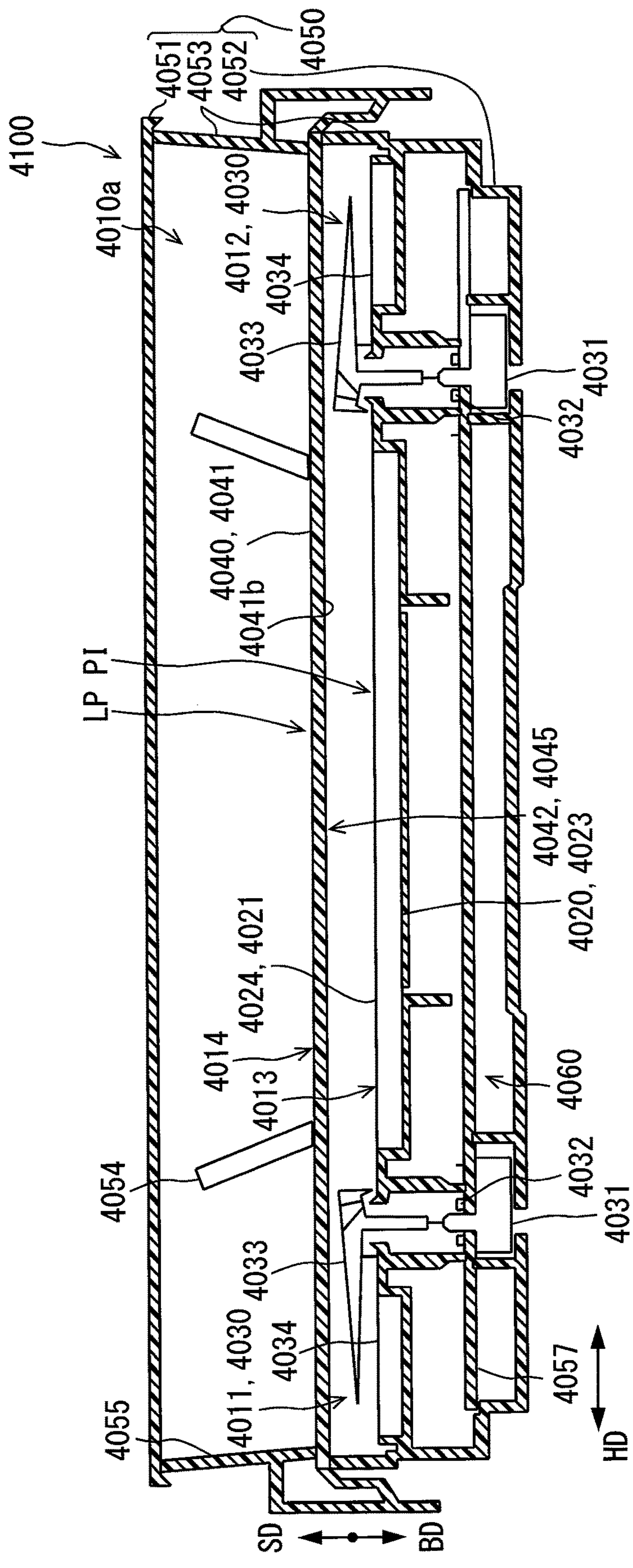
FIG. 59 is a cross-sectional view showing a mechanical configuration of the display device.

As shown in FIGS. 58 and 59, the display device 4100 includes the liquid crystal display device 4020, two pointer display devices 4030, a transmissive display device 4040, a housing 4050, a circuit board 4057, and the like.

The liquid crystal display device 4020 is a large TFT (Thin Film Transistor) liquid crystal display held in the center of the housing 4050. The liquid crystal display device 4020 is formed in a rectangular flat plate-like shape as a whole by overlapping a backlight 4023, an image display panel 4024, and the like with each other. In the following description, a display direction SD is defined by a direction along a virtual axis line substantially orthogonal to the display screen 4021 in which the display screen 4021 of the liquid crystal display device 4020 is oriented. A direction opposite to the display direction SD is referred to as a back direction BD. Further, a direction along a width direction of the vehicle in a longitudinal direction of the display screen 4021 is defined as a horizontal direction HD.

The backlight 4023 is configured to include a liquid crystal light source 4025 (refer to FIG. 60) and a diffusion plate. The backlight 4023 diffuses the light emitted from the liquid crystal light source 4025 with the diffusion plate and causes the light to enter the back side of the image display panel 4024. The backlight 4023 transmits and illuminates the image display panel 4024. The image display panel 4024 forms the display screen 4021. In the display screen 4021, a large number of pixels are arrayed in a two-dimensional manner. The image display panel 4024 controls a transmittance of light of sub-pixels such as red, green, and blue provided in each pixel, thereby displaying various images PI in color on the display screen 4021.

The two pointer display devices 4030 are disposed on both sides of the liquid crystal display device 4020 in the horizontal direction HD. Each of the pointer display devices 4030 includes a pointer drive motor 4031, a pointer display light source 4032, the pointers 4033, a dial plate 4034, and the like. The pointer drive motor 4031 and the pointer display light source 4032 are electrically connected to a display control circuit 4060 (refer also to FIG. 60) which will be described later. The pointer drive motor 4031 rotates the pointers 4033 based on a control signal output from the display control circuit 4060. Based on the control signal output from the display control circuit 4060, the pointer display light source 4032 emits a design such as scales, numerals, characters, and icons formed on the dial plate 4034, and a light for causing the pointers 4033 to emit a light.

The transmissive display device 4040 includes an acrylic light guide plate 4041, multiple light transmissive display light sources 4043, and the like. The transmissive display device 4040 displays the light emission design LP stereoscopically combined with the image PI of the display screen 4021 on the light emission design display unit 4014 provided on the acrylic light guide plate 4041 by the illumination light emitted from each of the light transmissive display light sources 4043.

Figure 61:
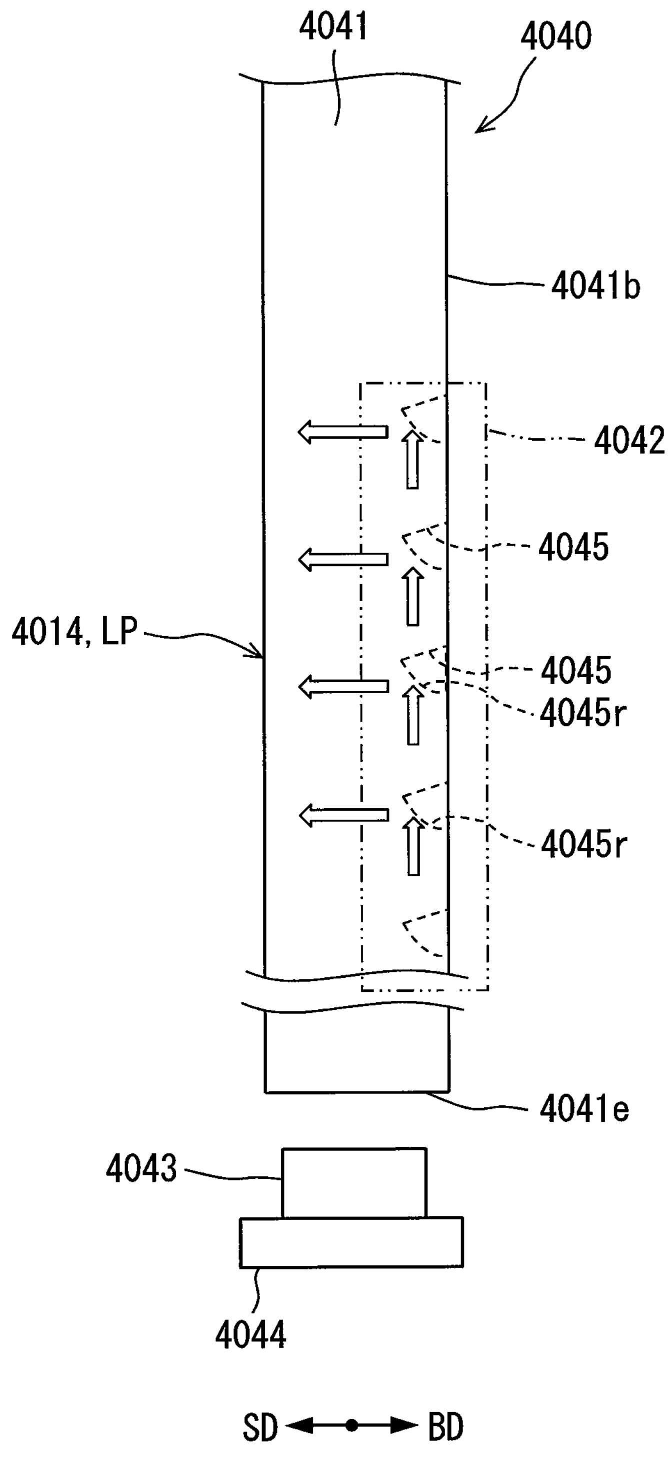
FIG. 61 is a diagram illustrating a shape, a placement, a function, and the like of recess portions provided in a range where an acrylic light guide plate is formed, and is a schematic diagram showing fine recess portions in an exaggerated manner.
Figure 62:
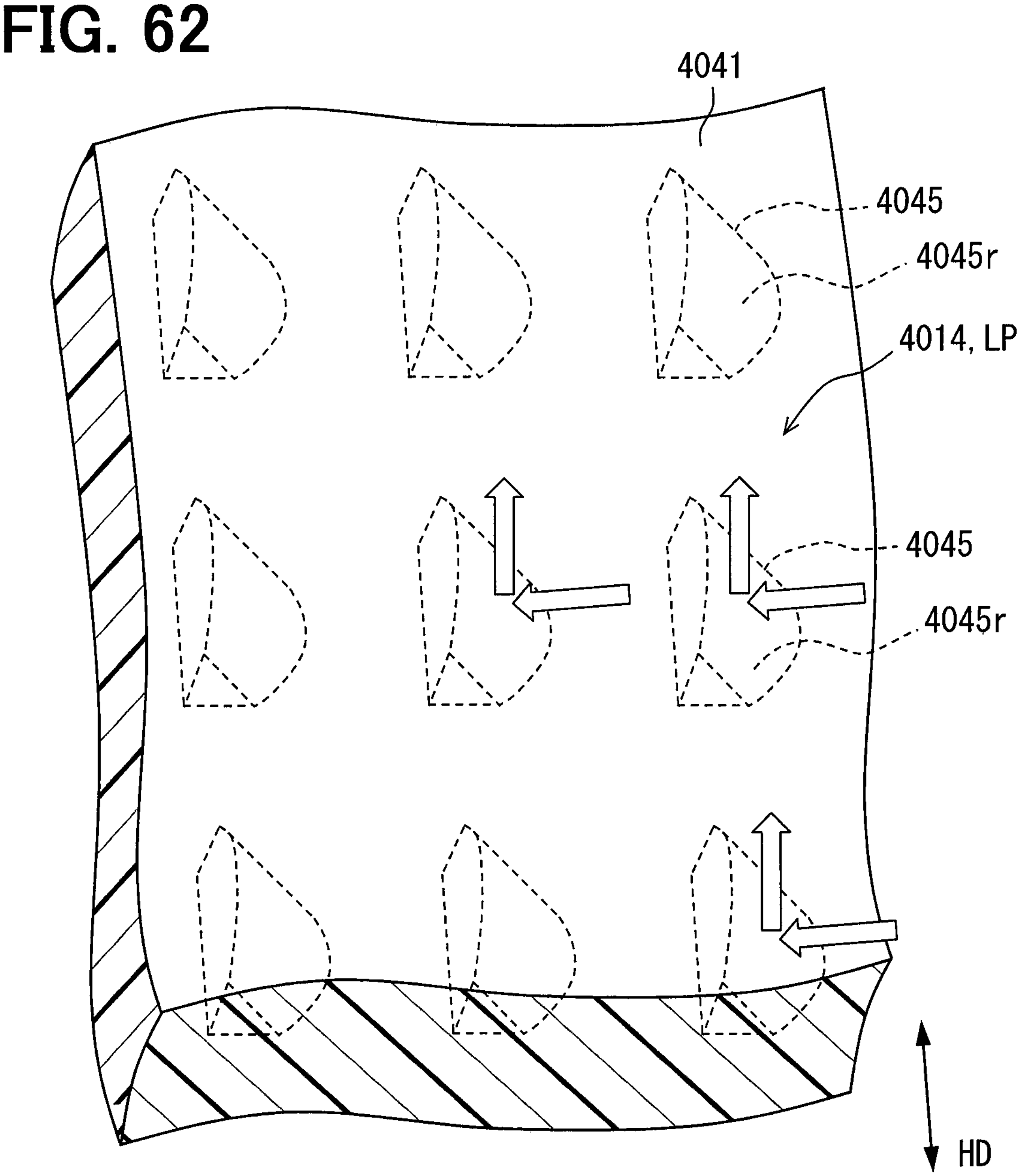
FIG. 62 is an enlarged view of a part of the acrylic light guide plate, and is a schematic view showing the shape and the placement of the recess portions.

The acrylic light guide plate 4041 is formed in a rectangular flat plate-like shape and made of a colorless and transparent resin material such as acrylic resin. The acrylic light guide plate 4041 has high light transmittance in the plate thickness direction. The acrylic light guide plate 4041 is positioned in the display direction SD of the display screen 4021. The longitudinal direction of the acrylic light guide plate 4041 is along the horizontal direction HD of the display device 4100. The acrylic light guide plate 4041 is held by the housing 4050 at a position separated from the display screen 4021 by about 10 to 15 mm in the display direction SD in a posture in which a planar direction of the acrylic light guide plate 4041 is aligned with the display screen 4021. The acrylic light guide plate 4041 entirely covers the display screen 4021 of the multi-display unit 4013 and the pointers 4033 of the respective pointer display units. The acrylic light guide plate 4041 is provided with an incident end surface 4041*e* and multiple forming areas 4042 as shown in FIGS. 61 and 62.

The incident end surface 4041*e* is formed on a downwardly facing lower end surface of four end surfaces of the acrylic light guide plate 4041 in a posture mounted on the vehicle. The incident end surface 4041*e* has a shape extending in a belt shape along the horizontal direction HD, and is formed in a planar shape. The incident end surface 4041*e* faces a light source substrate 4044 on which the multiple light transmissive display light sources 4043 are mounted. The incident end surface 4041*e* causes the light emitted from the multiple light transmissive display light sources 4043 to enter the interior of the acrylic light guide plate 4041.

Figure 67:
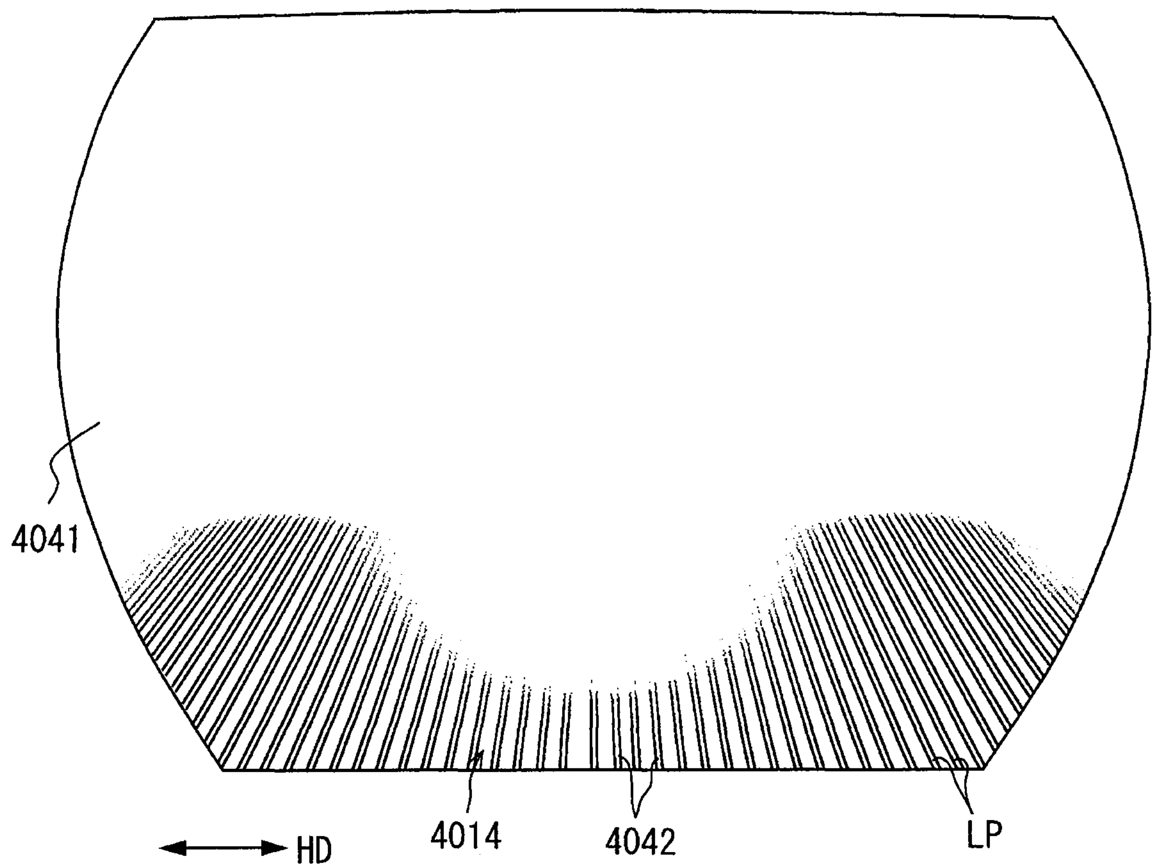
FIG. 67 is a diagram showing a display object displayed on an acrylic light guide plate among the display elements displayed in the opening display shown in FIG. 65.

The forming area 4042 is formed on a back surface 4041*b* of both surfaces of the acrylic light guide plate 4041, which faces the back surface direction BD. Each forming area 4042 is defined in a shape extending linearly from an incident end surface 4041*e* on which the light of a light transmissive display light source 4043 is incident toward the center of the acrylic light guide plate 4041. In other words, among the multiple forming areas 4042, the forming area 4042 positioned in the middle of the incident end surface 4041*e* extends in a direction substantially orthogonal to the incident end surface 4041*e*. On the other hand, as the forming area 4042 is farther from the center of the incident end surface 4041*e*, the forming area extends in a posture inclined toward the center side with respect to the incident end surface 4041*e* (refer to FIG. 67). The respective forming areas 4042 are formed to be spaced apart from each other in the horizontal direction HD, which is the extension direction of the incident end surface 4041*e*. A distance between the two adjacent forming areas 4042 is, for example, about several mm, and is disposed to be narrower than a distance between the two adjacent light transmissive display light sources 4043.

The back surface 4041*b* of the acrylic light guide plate 4041 belonging to each forming area 4042 is provided with a large number of minute recess portions 4045. Each recess portion 4045 is recessed from the back surface 4041*b* of the acrylic light guide plate 4041 in a concave shape by micro-machining. The multiple recess portions 4045 are two-dimensionally disposed at a predetermined and constant density in each forming area 4042 with a space between the recess portions 4045 in each of a longitudinal direction and a short direction of the acrylic light guide plate 4041. More specifically, a distance between the adjacent recess portions 4045 is set in a range of 100 to 200 μm in the longitudinal direction (horizontal direction HD) of the acrylic light guide plate 4041, and is set in a range of 60 to 120 μm in the short direction of the acrylic light guide plate 4041. As an example, an alignment pitch of the recess portions 4045 according to the tenth embodiment is set to 150 μm in the longitudinal direction and to 75 μm in the short direction.

The recess portion 4045 is a V-shaped groove extending along the longitudinal direction of the acrylic light guide plate 4041. The individual recess portions 4045 are of a size that is difficult for a driver seated in the driver's seat to visually recognize, or of a machined shape that is not worried by the driver. As an example, a length of one recess portion 4045 is set to about 75 μm. A depth dimension of the recess portion 4045 with reference to the back surface 4041*b* is set to about 5 to 20 μm. One of the two inclined surfaces configuring the recess portion 4045, which is closer to the incident end surface 4041*e*, is a facing inclined surface 4045*r* having a posture which faces the incident end surface 4041*e*. The facing inclined surface 4045*r* has a curved shape protruding toward the inside of the acrylic light guide plate 4041, and is formed in a partial cylindrical surface shape having a radius of curvature of about 100 μm.

When the light transmissive display light source 4043 is in an off-state, a large number of recess portions 4045 provided in each forming area 4042 are substantially invisible to the driver. On the other hand, when the light transmissive display light source 4043 is in a lighting state, each forming area 4042 reflects the light incident on the acrylic light guide plate 4041 from the incident end surface 4041*e* toward the display direction SD by each of the facing inclined surfaces 4045*r* of the multiple recess portions 4045. As a result, the light emission design LP having the same shape as the respective forming areas 4042 is superimposed on the image PI of the display screen 4021 (refer to FIG. 58) and displayed on the light emission design display unit 4014 provided on the acrylic light guide plate 4041. According to the array of the recess portions 4045 having a predetermined density, the individual forming areas 4042 can emit the light without unevenness. The multiple forming areas 4042 form an illumination display that reminds the driver of the image of the ground as a whole as will be described below (refer to FIG. 67).

The light transmissive display light source 4043 is a light emitting device such as a light emitting diode capable of emitting a multi-color light. The light transmissive display light source 4043 is a light source that illuminates the acrylic light guide plate 4041 with an edge light. The light transmissive display light source 4043 emits the light in response to input of a pulsed drive signal. The light transmissive display light source 4043 causes the light to enter the acrylic light guide plate 4041 from the incident end surface 4041*e*. Each of the light transmissive display light sources 4043 is mounted on a mounting surface of the light source substrate 4044 so as to be spaced apart from each other. The light transmissive display light sources 4043 are disposed at equal intervals along the incident end surface 4041*e* of the acrylic light guide plate 4041. A distance between the two adjacent light transmissive display light sources 4043 is set to, for example, about 10 to 15 mm, and is wider than a distance between the two adjacent forming areas 4042 (refer to FIG. 58).

The housing 4050 shown in FIGS. 58 and 59 forms the appearance of the display device 4100 and houses each of the configurations of the display device 4100 to protect those configurations from dust and dirt in the atmosphere. The housing 4050 includes a smoke panel 4051, a lower cover 4052, and a body panel 4053 or the like to which those components are assembled.

The smoke panel 4051 is made of a transparent resin material colored in a dark color such as a smoke tone. For example, a light transmittance of the smoke panel 4051 is set to about 30%. The smoke panel 4051 is positioned in the display direction SD of the liquid crystal display device 4020 and the transmissive display device 4040, and is attached to the main body panel 4053 from the front side. The smoke panel 4051 with a low transmittance set makes the fine recess portions 4045 (refer to FIG. 61) provided in the acrylic light guide plate 4041 more invisible to the driver.

The lower cover 4052 is made of, for example, a black resin material having a light shielding property. The lower cover 4052 is positioned in the rear direction BD of the circuit board 4057, and is attached to the main body panel 4053 from the back side.

The main body panel 4053 is made of a resin material or the like having a light shielding property. The main body panel 4053 holds the liquid crystal display device 4020, the transmissive display device 4040, the circuit board 4057, and the like. The main body panel 4053 is formed with facing portions 4054, a plate window 4055, and the like. The facing portions 4054 are located on both sides of the display screen 4021 in the horizontal direction HD, and separates the speedometer display unit 4011, the tachometer display unit 4012, and the multi-display unit 4013 from each other on the display. The plate window 4055 defines an outer edge of the display region 4010*a*.

The circuit board 4057 is disposed in the back direction BD of the liquid crystal display device 4020. The circuit board 4057 is held by a housing 4050. The circuit board 4057 is provided with a power supply circuit 4069, a meter drive driver 4071, a meter illumination driver 4072, a plate illumination driver 4073, a liquid crystal image driver 4074, a liquid crystal illumination driver 4075, a display control circuit 4060, and the like shown in FIG. 60. Hereinafter, details of those components will be described with reference to FIGS. 60 and 58.

The power supply circuit 4069 is a DC-DC converter of a linear type or a switching type. The power supply circuit 4069 is connected to a battery power supply mounted on the vehicle. The power supply circuit 4069 converts a DC voltage supplied from a battery power supply (+B) into an output voltage of, for example, about 5 volts, and stably supplies the output voltage to the display control circuit 4060 and each of the drivers 4071 to 4075.

The meter drive driver 4071 outputs a control signal based on a command from the display control circuit 4060 to each of the pointer drive motors 4031. The meter drive driver 4071 controls a pointed position of each pointer 4033 by driving each pointer drive motor 4031. The meter illumination driver 4072 outputs a control signal based on a command from the display control circuit 4060 to the pointer display light source 4032. The meter illumination driver 4072 controls the light emission of the pointer display light source 4032 to luminescently display each design of the dial plate 4034 and the pointers 4033.

The plate illumination driver 4073 outputs a pulse signal based on a command from the display control circuit 4060 to the light transmissive display light source 4043. The plate illumination driver 4073 individually controls the pulse signal applied to each of the light transmissive display light sources 4043, thereby changing a light emission mode of the light emission design LP displayed to emit the light in accordance with the image PI of the display screen 4021.

The liquid crystal image driver 4074 outputs an image signal based on a command from the display control circuit 4060 to the image display panel 4024. The liquid crystal illumination driver 4075 outputs a luminance signal based on a command from the display control circuit 4060 to the liquid crystal light source 4025. The liquid crystal image driver 4074 and the liquid crystal illumination driver 4075 control a display mode of the image PI displayed on the display screen 4021.

The display control circuit 4060 is an electronic circuit that controls display of the display region 4010*a*. The display control circuit 4060 is communicably connected to a communication bus of an in-vehicle network 4110 mounted on the vehicle. The display control circuit 4060 mainly includes a microcontroller including at least one processor, one RAM, one storage unit 4067, and the like. The storage unit 4067 stores a display control program necessary for information display, and a large number of image data for drawing various images PI. The display control circuit 4060 configures functional blocks such as an information acquisition unit 4061, a pointer display circuit unit 4062, an image control circuit unit 4063, a light emission control circuit unit 4064, and so on by executing the display control program stored in the storage unit 4067 by the processor.

The information acquisition unit 4061 acquires various state information indicating a state of the vehicle from the in-vehicle network 4110 or the like. The state information includes activation information indicating activation of the vehicle. Specifically, the activation information is an in-vehicle initial mode signal such as a traveling speed, an engine rotation speed, a remaining fuel level, and various temperatures. In addition, the state information includes abnormality information indicating an abnormality of a specific portion of the vehicle. The information acquisition unit 4061 continuously acquires the state information while the vehicle is activated.

The pointer display circuit unit 4062 cooperates with the meter drive driver 4071 and the meter illumination driver 4072 to realize the pointer display by the pointer display device 4030. The pointer display circuit unit 4062 controls rotation angles of the pointers 4033 by supplying a command corresponding to each information of the traveling speed and the engine rotation speed acquired by the information acquisition unit 4061 to the meter drive driver 4071.

The image control circuit unit 4063 controls the display of the image PI by the liquid crystal display device 4020 in cooperation with the liquid crystal image driver 4074 and the liquid crystal illumination driver 4075. The light emission control circuit unit 4064 individually controls light emission of the multiple light transmissive display light sources 4043 in cooperation with the plate illumination driver 4073. The light emission control circuit unit 4064 causes the light emission design display unit 4014 to display the light emission design LP expressing a flow operation due to a change in brightness and darkness by shifting a rising timing of the pulse signals for driving the respective light transmissive display light sources 4043 from each other (refer to FIG. 69). The image control circuit unit 4063 and the light emission control circuit unit 4064 display a stereoscopic display design in the display region 4010*a* by coordinating a change in the mode of the image PI and the light emission design LP.

The light emission control circuit unit 4064 includes a PWM controller 4065 and a duty controller 4066. The PWM controller 4065 and the duty controller 4066 adjust the emission luminance of each of the light transmissive display light sources 4043 by increasing or decreasing an effective value of a current applied to each of the light transmissive display light sources 4043 by the control of the pulse signal. The light emission control circuit unit 4064 changes a light emission mode of the light emission design LP by switching of the respective controls by the PWM controller 4065 and the duty controller 4066 or by a combination of the respective controls. A pulse signal is applied from the plate illumination driver 4073 to each light transmissive display light source 4043 based on a switching command generated by at least one of the PWM controller 4065 and the duty controller 4066.

Figure 63:
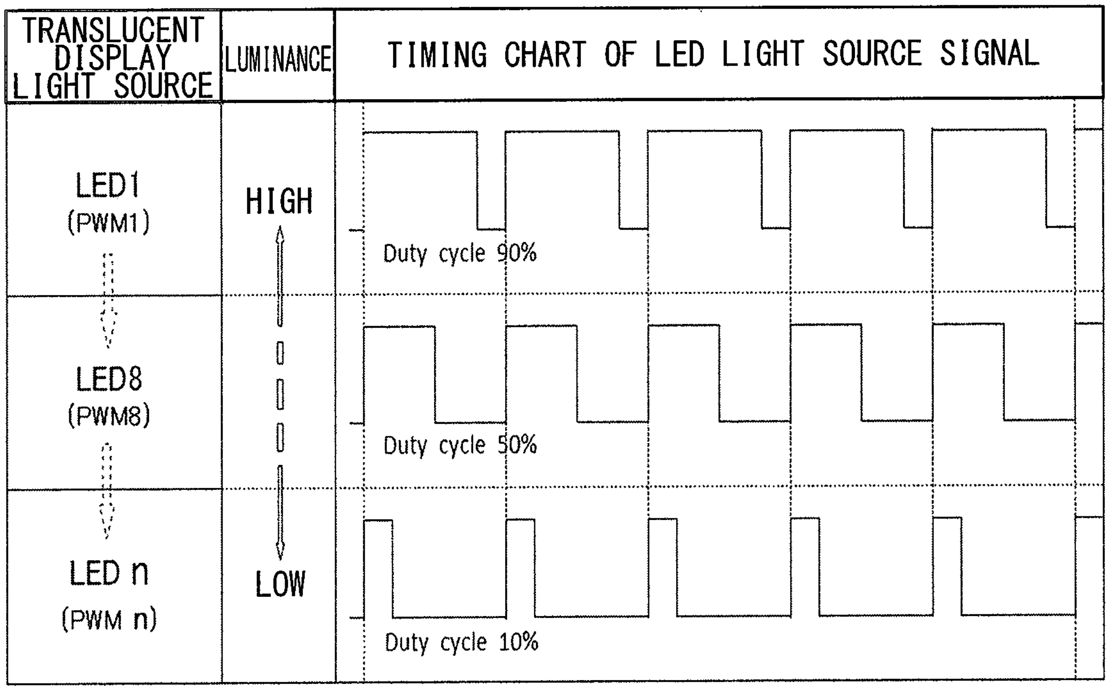
FIG. 63 is a time chart showing details of pulse signals in the case where lighting of individual light transmissive display light sources is individually controlled according to a pulse width modulation control of a PWM controller.

The PWM controller 4065 changes a time ratio between an on-state and an off-state of the current in the pulse signal of a predetermined cycle, and controls the luminance of each of the light transmissive display light sources 4043. In such a pulse width modulation control, as the pulse width of turning on the current increases and the time ratio of turning on the current per unit cycle increases, the light emission luminance of the light transmissive display light source 4043 increases (refer to FIG. 63).

Figure 64:
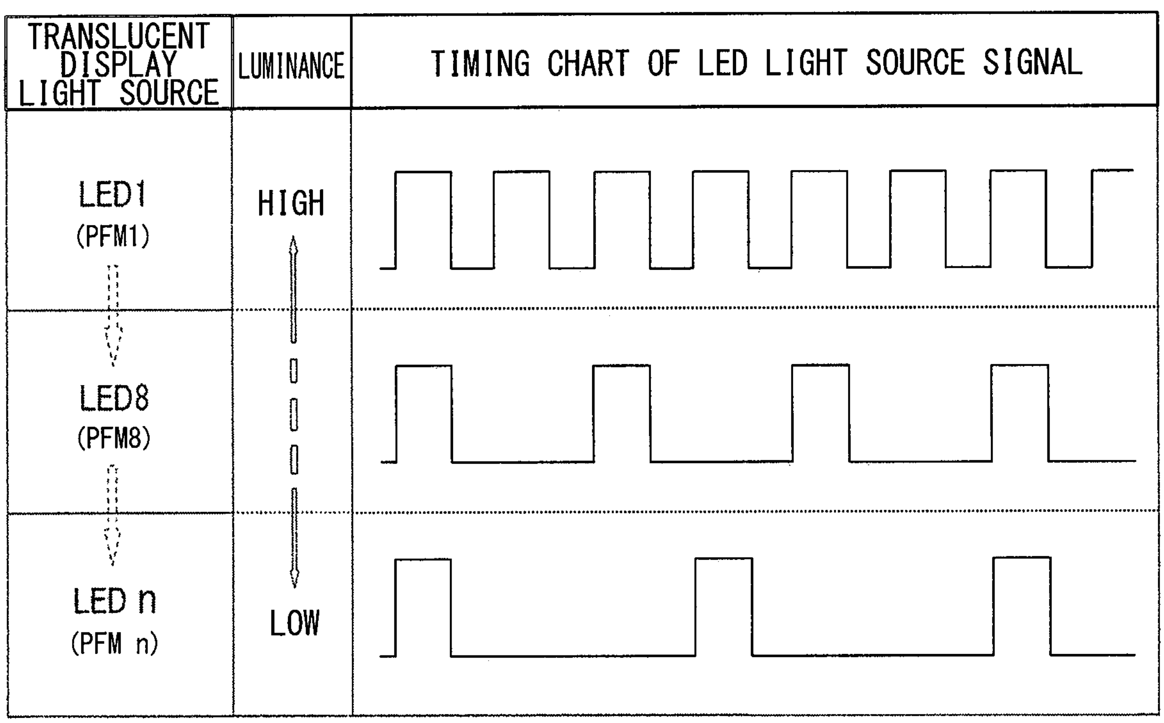
FIG. 64 is a time chart showing details of a pulse signal in the case where lighting of individual light transmissive display light sources is individually controlled according to a pulse frequency modulation control of a duty controller.

The duty controller 4066 controls the luminance of each of the light transmissive display light sources 4043 by changing a length of the off-time while setting the on-time during which the current is turned on to a constant time. In such a pulse frequency modulation control, as the off-time of the current is shortened and the frequency of the pulse signal is modulated higher, the light emission luminance of the light transmissive display light source 4043 is increased (refer to FIG. 64).

Figure 65:
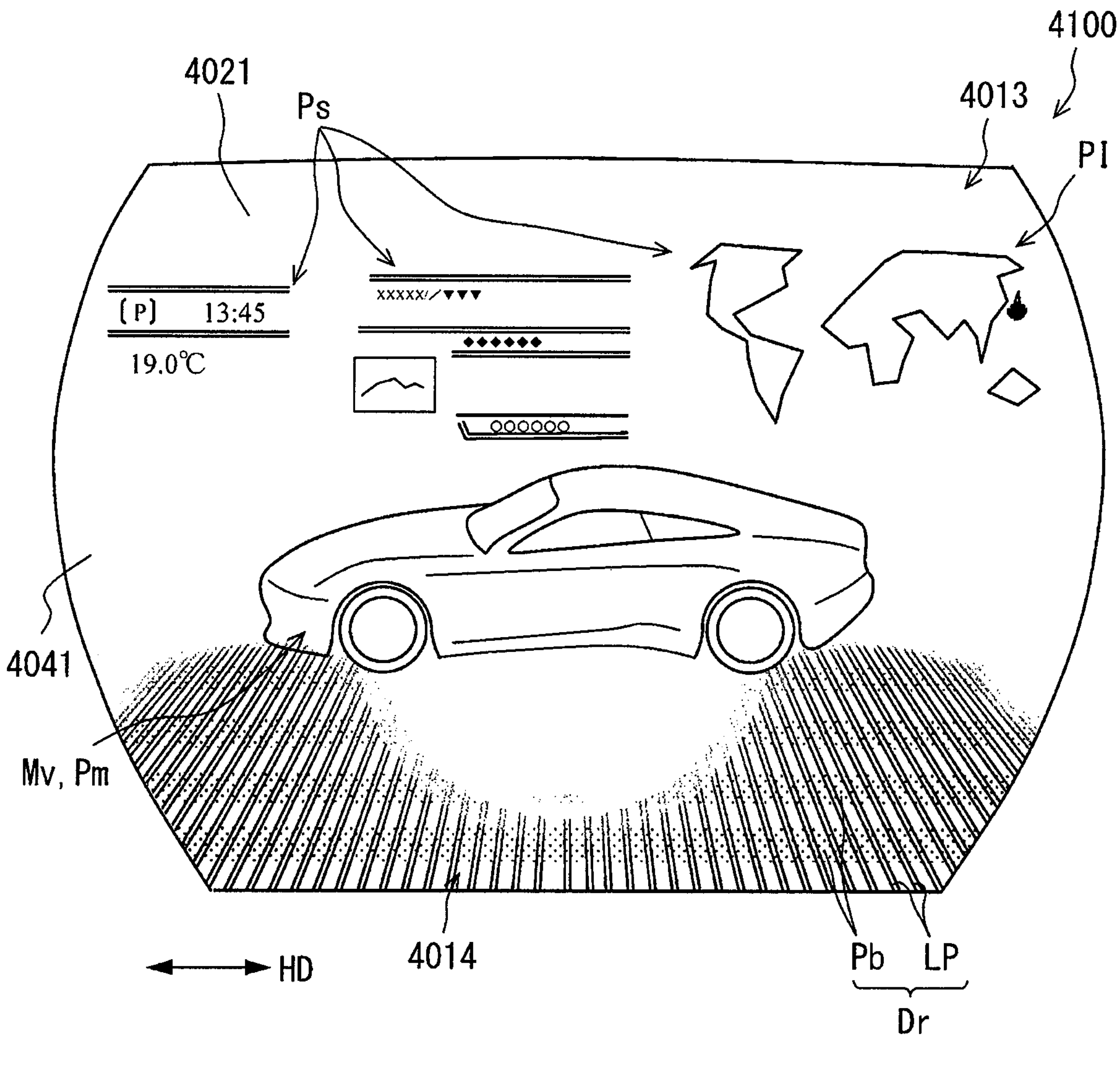
FIG. 65 is a diagram showing display elements displayed in an opening display.
Figure 66:
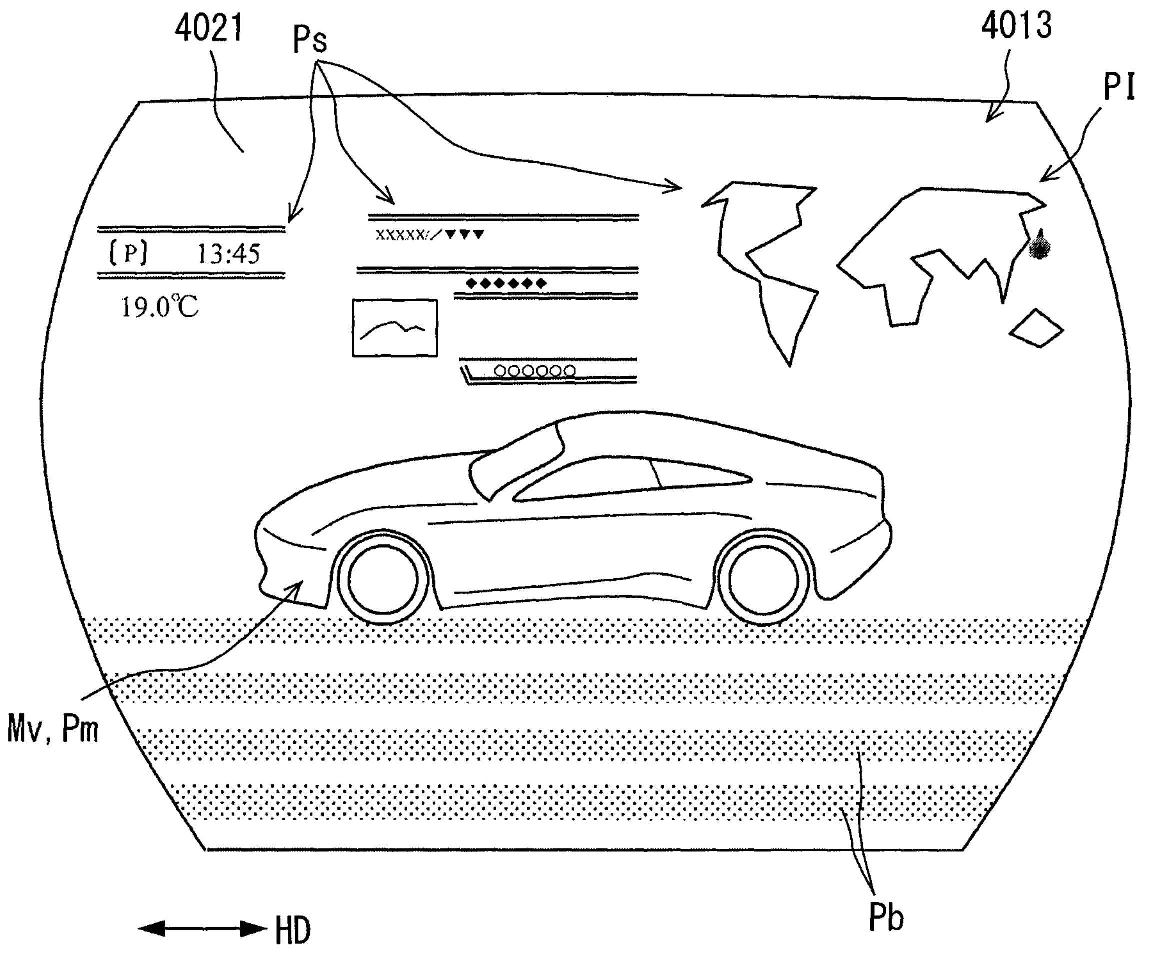
FIG. 66 is a diagram showing display elements displayed on a display screen among the display elements displayed in the opening display shown in FIG. 65.

Next, the details of the opening display displayed on the display device 4100 described so far will be described below. The opening display is one of effect displays obtained by superimposing the light emission design LP on the image PI. In the opening display, each display element shown in FIG. 65 is displayed by superimposing the image PI of the display screen 4021 shown in FIG. 66 and the light emission design LP of the light emission design display unit 4014 on each other shown in FIG. 67. Hereinafter, details of the image PI and the light emission design LP displayed in the opening display will be described with reference to FIGS. 58 and 60 with reference to FIGS. 65 to 67.

In the opening display, status image portions Ps, a vehicle model Mv, a road surface design Dr, and the like are displayed. The status image portions Ps are image portions that notifies the state information of the vehicle by combining a message by characters, a predetermined icon, and the like together. The status image portion Ps is displayed in a range not overlapping with the light emission design LP in the display screen 4021, specifically, in a region above the center of the display screen 4021 in the vertical direction.

The vehicle model Mv is drawn in a form based on the appearance shape of the vehicle on which the display device 4100 is mounted. The vehicle model Mv is one of a moving image portions Pm moving on the display screen 4021 in the opening display. The vehicle model Mv is displayed at the center of the display screen 4021 in the vertical direction. A front-rear direction of the vehicle model Mv is along the horizontal direction HD. As will be described later, the vehicle model Mv moves on the display screen 4021 along the horizontal direction HD. An upper edge portion of the light emission design LP is superimposed on a lower edge portion of the vehicle model Mv.

The road surface design Dr is stereoscopically displayed by superimposing the light emission design LP of the acrylic light guide plate 4041 and the background image portion Pb on the display screen 4021 on each other. The light emission design LP is displayed in multiple vertical stripes extending in the vertical direction according to the shape of each forming area 4042 described above. Since the light incident on the incident end surface 4041*e* (refer to FIG. 61) is weakened by attenuation and reflection as the light goes upward, the light emission design LP becomes a gradation-like light emission mode in which luminance decreases as the light goes upward.

The background image portion Pb is a region lower than the center of the display screen 4021 in the vertical direction, and is displayed in a range overlapping with the light emission design LP. The background image portion Pb is a horizontal stripe-shaped image portion formed by combining multiple strip-shaped designs extending along the horizontal direction HD together. The vertical stripe-shaped light emission design LP is superimposed on the horizontal stripe-shaped background image portion Pb, so that the road surface design Dr becomes a lattice-shaped display mode that recalls the ground on which the vehicle model Mv is placed.

Figure 60:
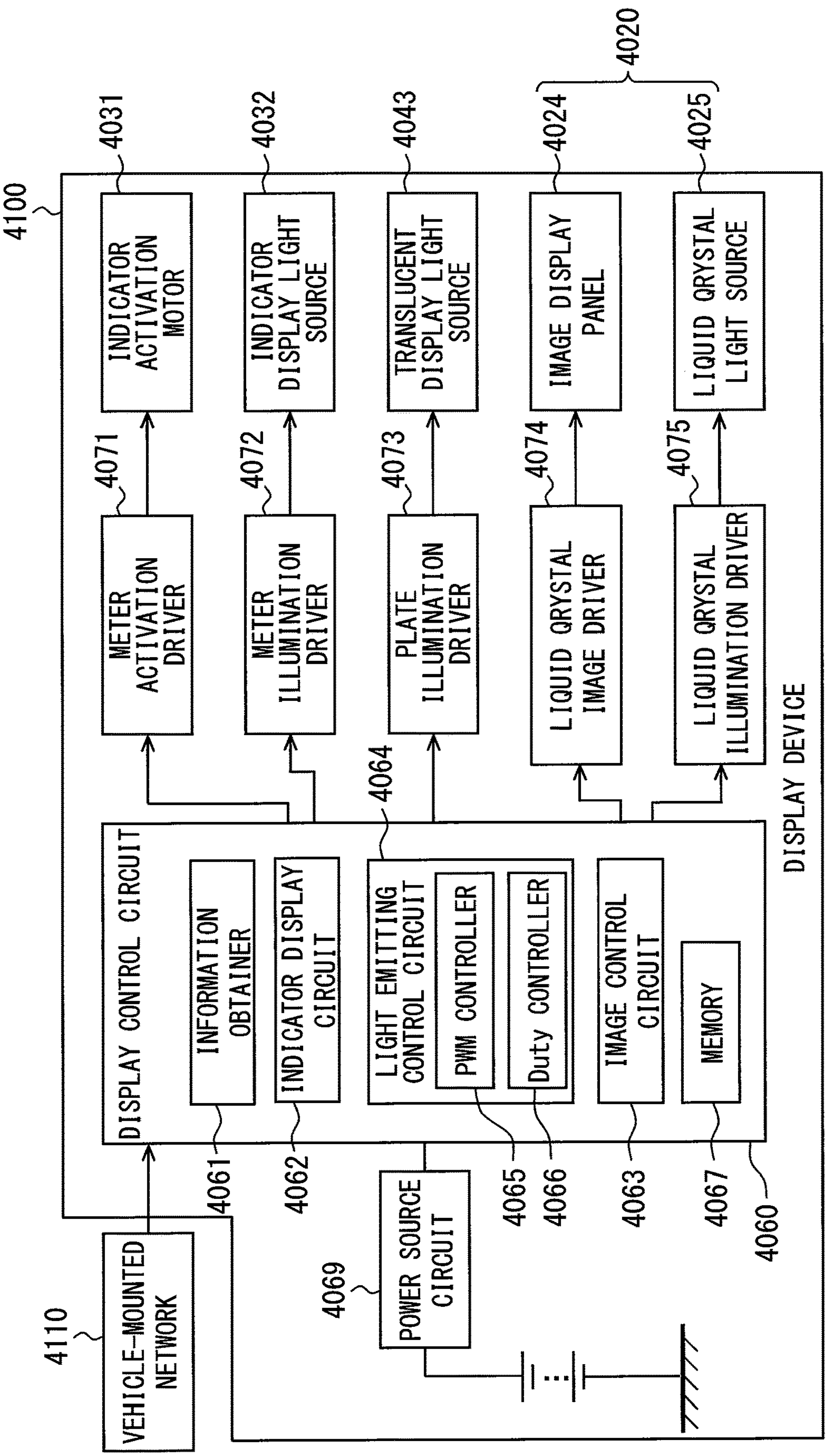
FIG. 60 is a block diagram showing an electrical configuration of the display device.

Next, details of the display mode which dynamically changes in the opening display will be described in order with reference to FIGS. 58 and 60 based on FIGS. 68 to 70.

Figure 68:
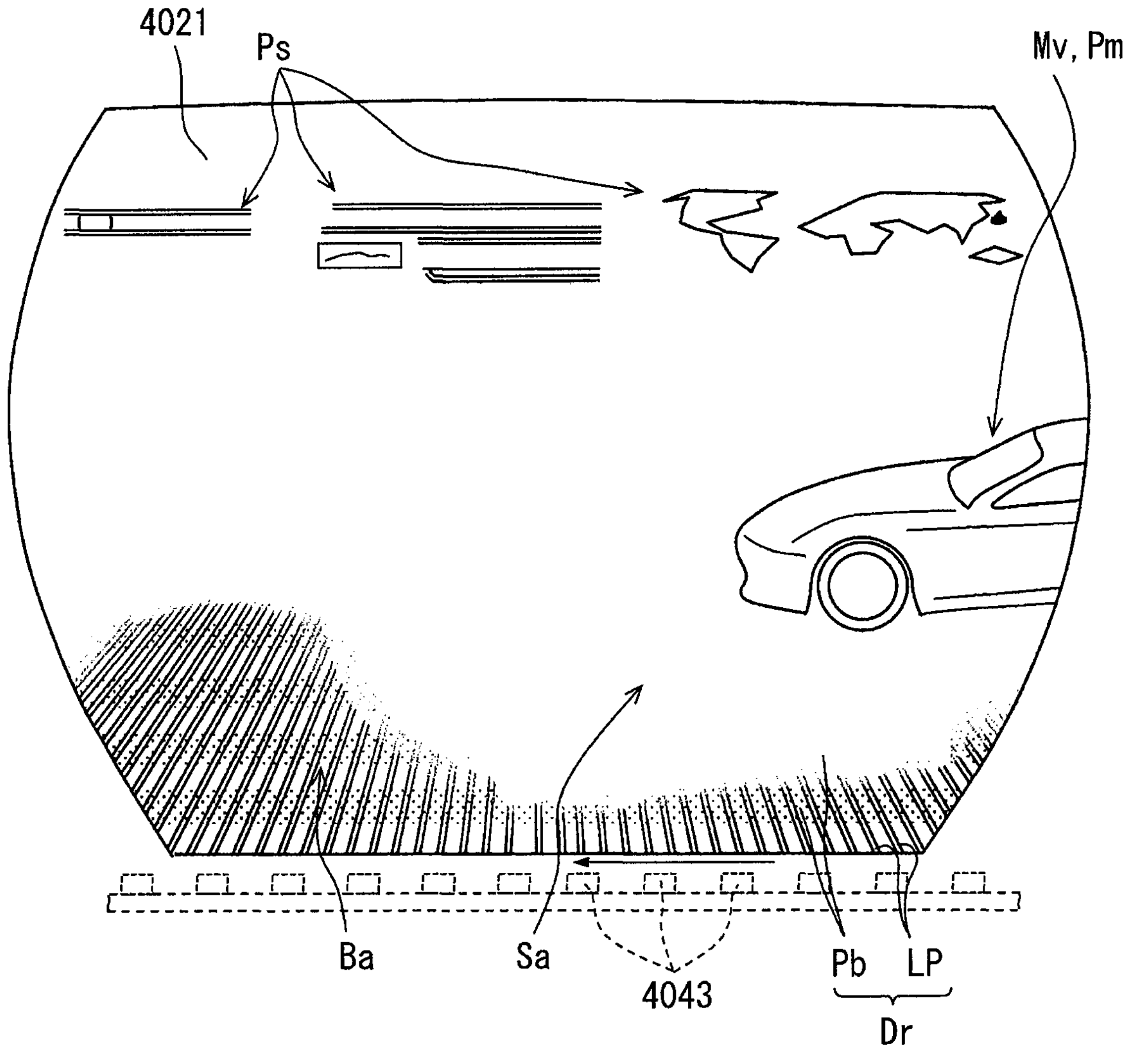
FIG. 68 is a diagram showing a mode immediately after the opening display is started.

As shown in FIG. 68, when the vehicle is started, display of the status image portions Ps on the display screen 4021 is started, and the vehicle model Mv as the moving image portion Pm is slid in from a right edge of the display screen 4021 into the display screen 4021. The vehicle model Mv starts moving leftward from the right edge of the display screen 4021 toward the center. In accordance with the movement of the vehicle model Mv, the light emission mode of the light emission design LP changes.

Specifically, the light emission design LP includes a bright region Ba and a dark region Sa having different luminescence luminance from each other. The bright region Ba is a region having a display luminance higher than that of the dark region Sa. The shape and position of the bright region Ba and the dark region Sa are changed in accordance with the movement of the vehicle model Mv by the cooperative control of the control circuit units 4063 and 4064 that synchronizes a change in the light emission mode of the light emission design LP with a change in the display mode of the background image unit Pb.

In an initial stage of the opening display, the bright region Ba and the dark region Sa move in the same direction as the vehicle model Mv in accordance with the movement of the vehicle model Mv. Specifically, each of the control circuit units 4063 and 4064 performs an effect such that the dark region Sa displayed in front of the vehicle model Mv moves leftward together with the vehicle model Mv. For such an effect, the light emission control circuit unit 4064 and the plate illumination driver 4073 perform a control for changing the light emission state of the light transmissive display light source 4043 in order from right to left (refer to an arrow in FIG. 68). As described above, the movement of the vehicle model Mv is emphasized.

Figure 69:
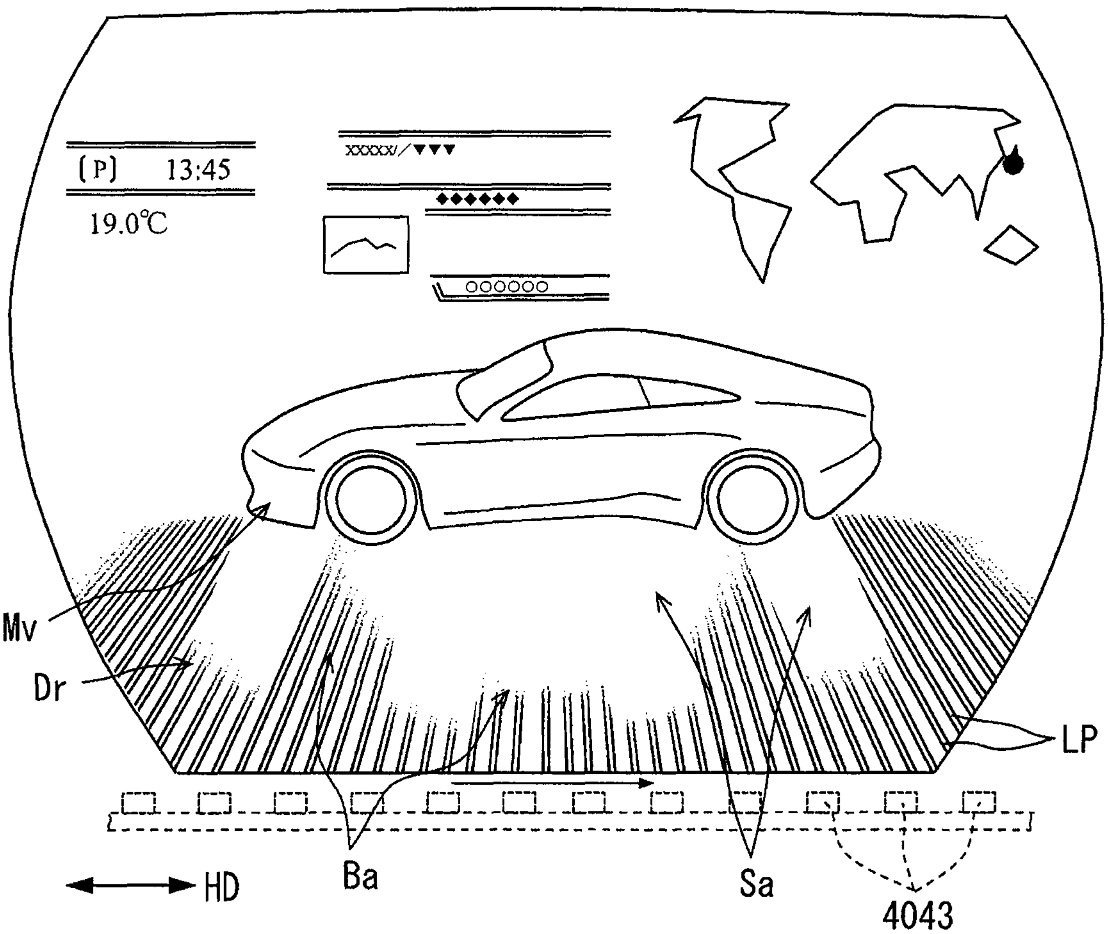
FIG. 69 is a diagram showing an intermediate mode of the opening display.

As shown in FIG. 69, when the vehicle model Mv moves to the center of the multi-display unit 4013, the bright regions Ba and the dark regions Sa are alternately displayed in the horizontal direction HD, and the movement in the right direction is started. At this time, the light emission design LP expresses an operation (refer to an arrow in FIG. 69) that flows from the front to the rear of the vehicle model Mv by alternately lighting and changing the brightness of the adjacent light transmissive display light sources 4043 (refer to FIGS. 63 and 64). In accordance with such a change in the mode of the light emission design LP, the background image portion Pb is also changed to a video mode flowing backward. The light emission design LP and the background image portion Pb allow the road surface design Dr to appear as if the vehicle model Mv is traveling.

Figure 70:
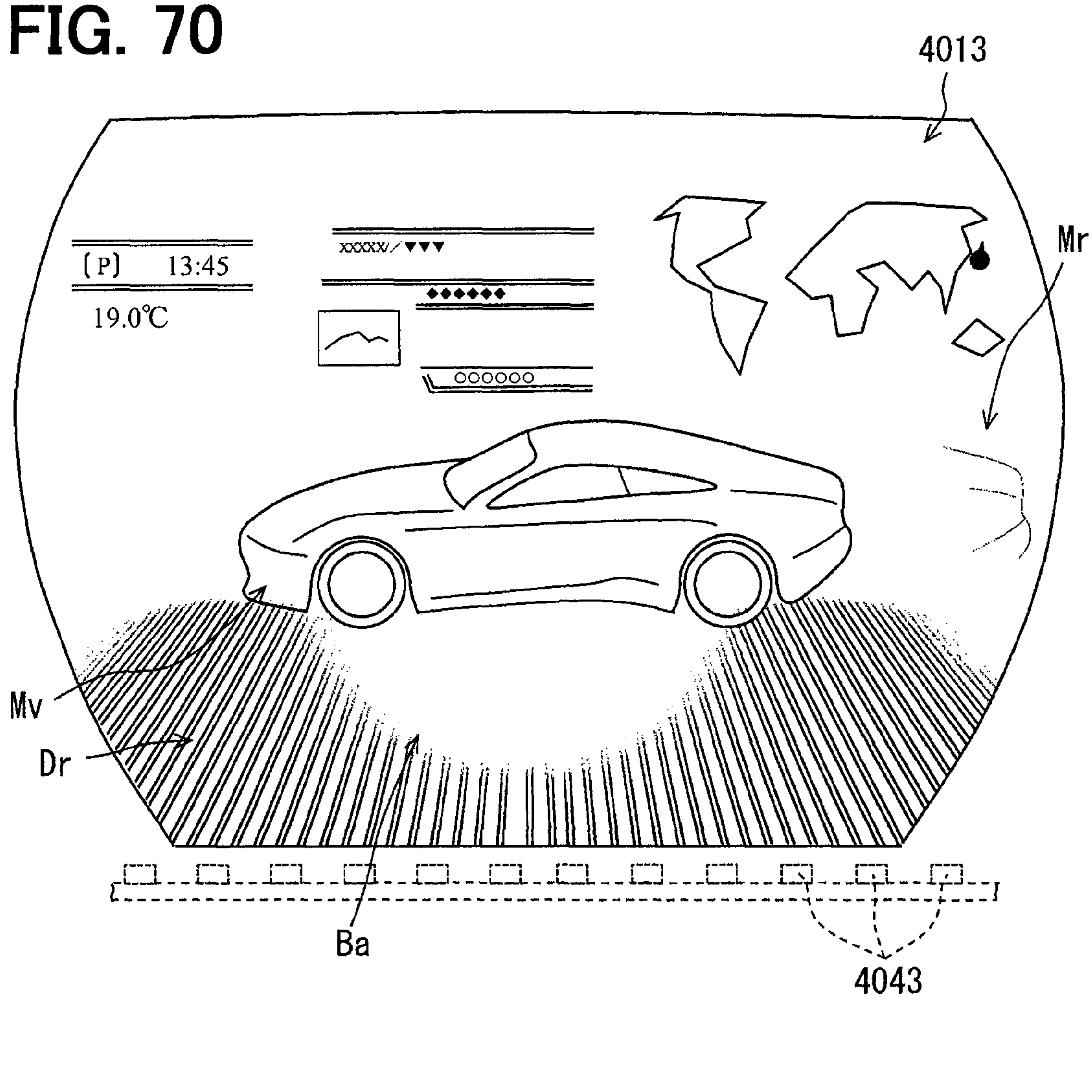
FIG. 70 is a diagram showing a final mode of the opening display.

In a final screen of the opening display shown in FIG. 70, the vehicle model Mv is displayed in such a display mode that the vehicle stops at the center of the multi-display unit 4013. An afterimage image portion Mr may be displayed on the right side behind the vehicle model Mv. At this stage, since all of the light transmissive display light sources 4043 are turned on with uniform brightness, the dark region Sa (refer to FIG. 69) disappears, and all of the light emission design LP becomes only the bright region Ba. With the above operation, the opening display is completed.

Figure 71:
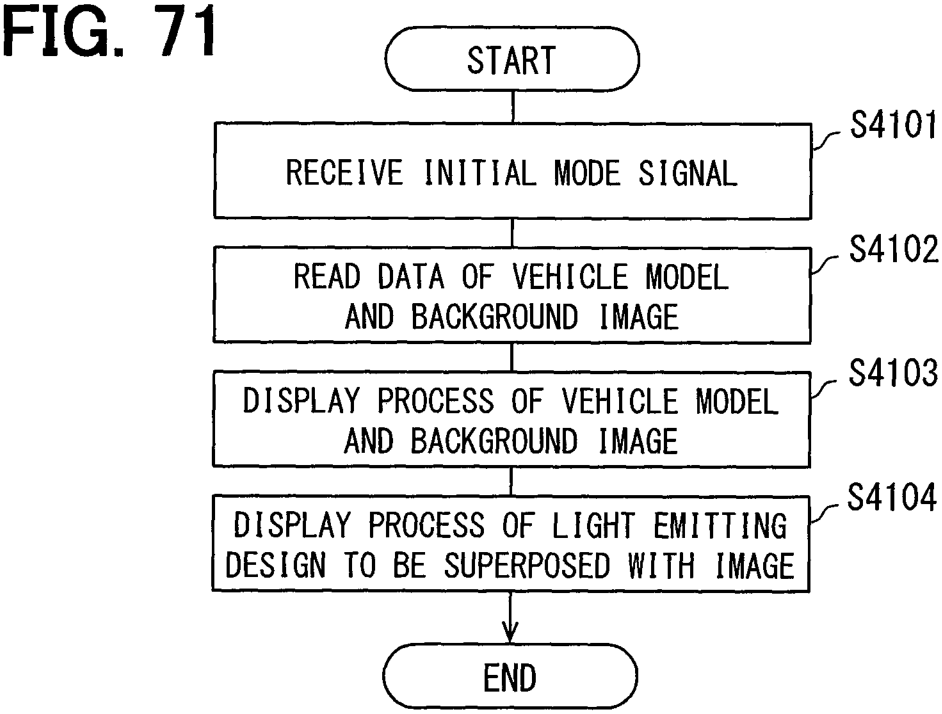
FIG. 71 is a flowchart showing details of a display control process for displaying the opening display.

Details of a display control process for performing the opening display described above will be described with reference to FIG. 71. The display control process is started by the display control circuit 4060 based on the start of the power supply from the power supply circuit 4069.

In Step S4101, an in-vehicle initial mode signal is received as activation information indicating activation of the vehicle, and the process proceeds to Step S4102. In Step S4101, acquisition of various state information in the vehicle is started. In Step S4102, image data of the vehicle model Mv, the background image portion Pb, the status image portion Ps, and the like is read, and the process proceeds to Step S4103. In Step S4103, based on the image data read in Step S4102, the display process for displaying the vehicle model Mv, the background image portion Pb, the status image portion Ps, and the like on the display screen 4021 is started, and the process proceeds to Step S4104. In Step S4104, the display process of the light emission design LP superimposed and combined with the image PI on the display screen 4021 is started, and the display process is finished. When the opening display by the above processing is completed, the display of the display region 4010*a* is switched to the display at the time of normal driving.

In this example, a case in which the abnormality information indicating the abnormality of a specific portion of the vehicle is acquired in S 4101 of the above-described display control processing will be described. When the abnormality information is acquired in S4101, the display device 4100 switches the display from the opening display to the warning display shown in FIG. 72. In the warning display, the driver is notified of the specific portion where the abnormality is detected with the use of the vehicle model Mv.

Figure 72:
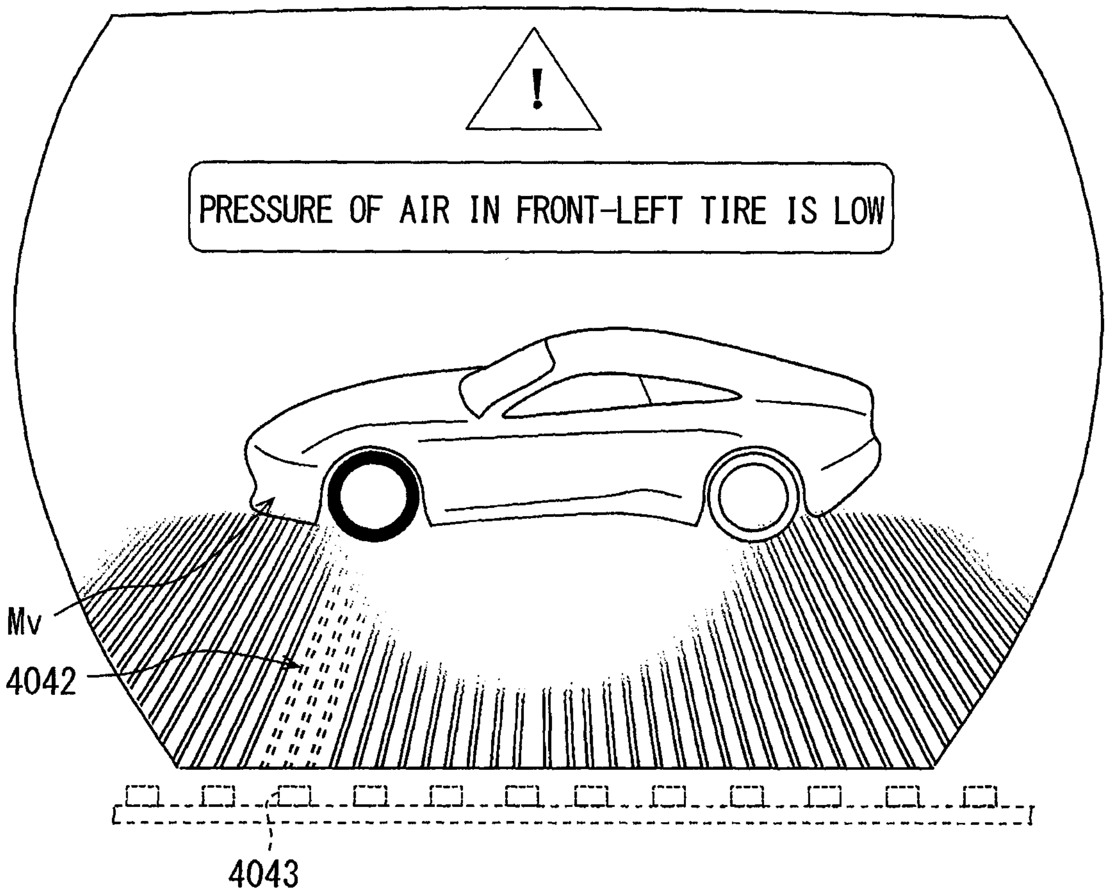
FIG. 72 is a diagram showing an example of a warning display.

More specifically, in the warning display, a position corresponding to the specific portion in the vehicle model Mv is indicated by a part of the forming area 4042. The light emission control circuit unit 4064 (refer to FIG. 60) controls the light emission of a specific light transmissive display light source 4043 to emit the light in a manner different from the other forming areas 4042 in the forming area 4042 of a part of the multiple forming areas 4042. For example, a part of the forming region 4042 is displayed in a flashing color (for example, red) different from that of the other forming regions. As an example, when a decrease in an air pressure of a left front wheel is detected, as shown in FIG. 72, the forming area 4042 connected to the left front wheel of the vehicle model Mv is displayed in a blinking manner in a warning color (refer to a broken line in FIG. 72). In the warning display, it is possible to notify a decrease in a remaining fuel level and a remaining battery charge, a failure of each part, and the like can be notified.

In the tenth embodiment, the moving image portion Pm of the vehicle model Mv or the like displayed on the display screen 4021 and the light emission design LP displayed on the acrylic light guide plate 4041 are positioned so as to be shifted from each other in the display direction SD. Therefore, the effect display such as the opening display in which the moving image portion Pm and the light emission design LP are superimposed on each other can be a display having a stereoscopic effect. In addition, in the opening display, as the moving image portion Pm moves the display screen 4021, the light emission design LP superimposed on the moving image portion Pm also changes the light emission mode. As described above, the moving image portion Pm and the light emission design LP are dynamically changed at positions shifted from each other, so that the display device 4100 can perform an effect display with the stereoscopic effect.

In addition, in the opening display according to the tenth embodiment, the bright region Ba and the dark region Sa of the road surface design Dr including the light emission design LP move in accordance with the movement of the vehicle model Mv. In particular, in the opening display of the tenth embodiment, the dark region Sa also moves in the same direction as the moving direction of the vehicle model Mv. The movement of the dark region Sa further emphasizes the movement of the vehicle model Mv. As a result, the effect as if the vehicle model Mv is traveling is further enhanced.

In the tenth embodiment, the background image portion Pb displayed in a range overlapping with the light emission design LP in the display screen 4021 changes the display mode in accordance with the change in the light emission mode of the light emission design LP. As a result, the stereoscopic effect of the road surface design Dr obtained by superimposing the light emission design LP on the background image portion Pb is further emphasized by the dynamic change of the background image portion Pb and the light emission design LP in cooperation with each other.

Further, the background image portion Pb according to the tenth embodiment is a horizontal stripe-shaped image portion which is superimposed on the vertical stripe-shaped light emission design LP to form a lattice-shaped road surface design Dr. According to such a grid-like display, the road surface design Dr has a display mode in which the driver can easily recall the road surface on which the vehicle model Mv is placed.

In addition, each forming area 4042 according to the tenth embodiment has a shape extending linearly from the incident end surface 4041*e* toward the center of the acrylic light guide plate 4041. For that reason, the light incident from the incident end surface 4041*e* becomes gradually weaker as the light moves away from the incident end surface 4041*e*, and the light emission design LP has a gradation-like light emission mode in which luminance decreases as the light moves upward. According to the above configuration, the light emission design LP is a display with a sense of depth, and the stereoscopic effect of the display of the display device 4100 can be further emphasized.

Further, in the tenth embodiment, a distance between the two forming areas 4042 is set to be narrower than a distance between the two light transmissive display light sources 4043. As described above, the distances of the forming areas 4042 that exhibit a linear shape are set to be dense, so that the light emission design LP becomes a display mode in which the driver can easily recognize the light emission design LP as a plane having a depth, and can contribute to a creation of the stereoscopic effect of the opening display.

In addition, according to the tenth embodiment, when the state information indicating the abnormality of the specific portion is acquired by the information acquisition unit 4061, a warning display is presented. Like the warning display, if a part of the forming area 4042 is caused to emit the light in a manner different from that of the other forming areas 4042 to indicate an abnormal portion of the vehicle model Mv, the display device 4100 can easily notify the driver of the abnormal portion of the vehicle.

In the tenth embodiment, the road surface design Dr corresponds to a “display design”, the liquid crystal display device 4020 corresponds to an “image display device”, the acrylic light guide plate 4041 corresponds to a “display plate”, the incident end surface 4041*e* corresponds to an “end surface”, and the light transmissive display light source 4043 corresponds to a “light source unit”. The image control circuit unit 4063 and the liquid crystal image driver 4074 correspond to an “image controller”, and the light emission control circuit unit 4064 and the plate illumination driver 4073 correspond to a “light source controller”.

Eleventh Embodiment

Figure 73:
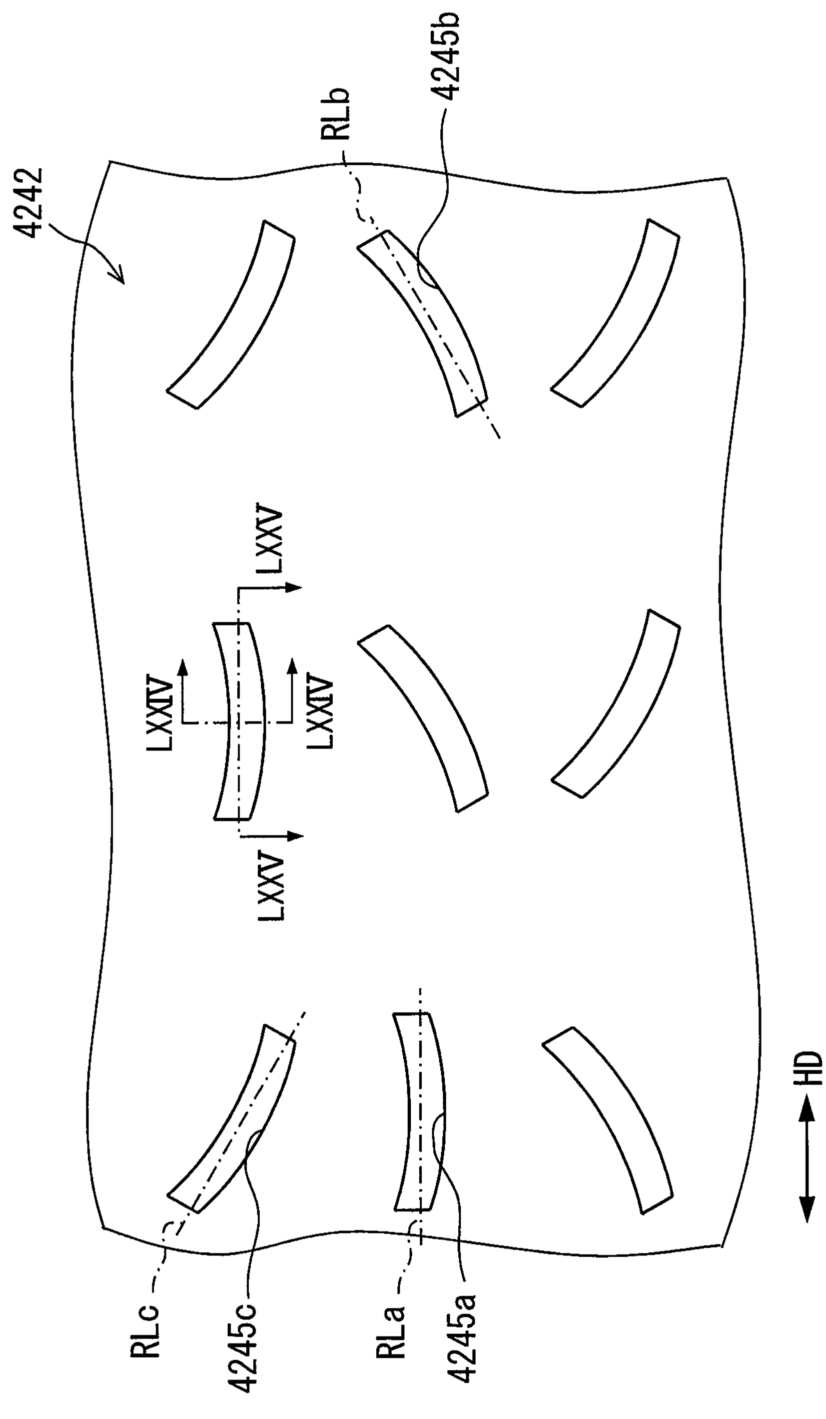
FIG. 73 is a diagram showing a placement of recess portions according to an eleventh embodiment.
Figure 74:
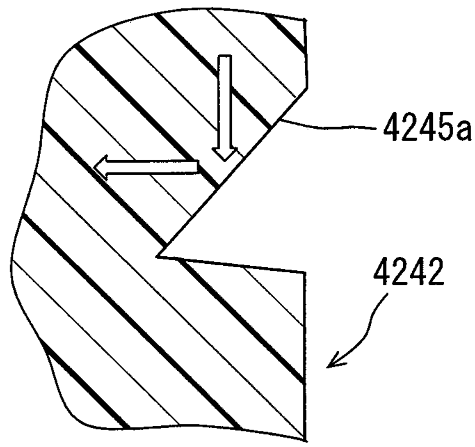
FIG. 74 is a lateral cross-sectional view of the recess portion taken along a line LXXIV-LXXIV of FIG. 73.
Figure 75:
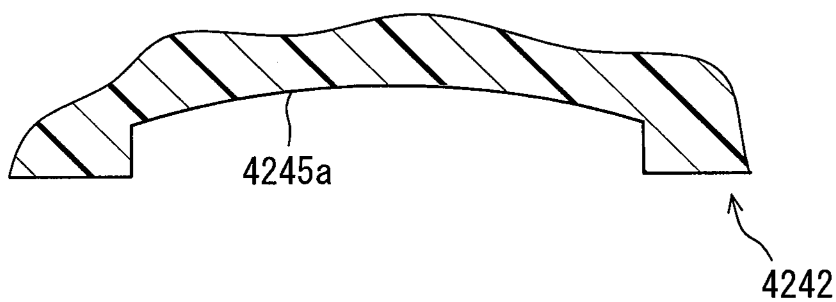
FIG. 75 is a vertical cross-sectional view of the recess portion taken along a line LXXV-LXXV of FIG. 73.

An eleventh embodiment shown in FIGS. 73 to 76 is a modification of the tenth embodiment. As shown in FIGS. 73 to 75, in the eleventh embodiment, multiple types of recess portions 4245*a* to 4245*c* having different extension directions are mixed in a forming area 4242. The recess portions 4245*a* to 4245*c* are disposed in a random order in the forming area 4242. The shapes of the recess portions 4245*a* to 4245*c* are substantially the same as each other. In addition, the alignment pitch of the recess portions 4245*a* to 4245*c* is set to the same value as that of the tenth embodiment.

A virtual reference line RLa defining a direction of the recess portion 4245*a* is along a horizontal direction HD. A virtual reference line RLb defining the direction of the recess portion 4245*b* is set at an angle of +30 degrees with respect to the reference line RLa. The virtual reference line RLc defining the direction of the recess portion 4245*c* is set at an angle of −30 degrees with respect to the reference line RLa. The random arrangement of the recess portions 4245*a* to 4245*c* can be designed by distributing three kinds of orientations based on a pseudo random number generated by a computer or the like, for example. The recess portions may be oriented in two or four or more types.

Figure 76:
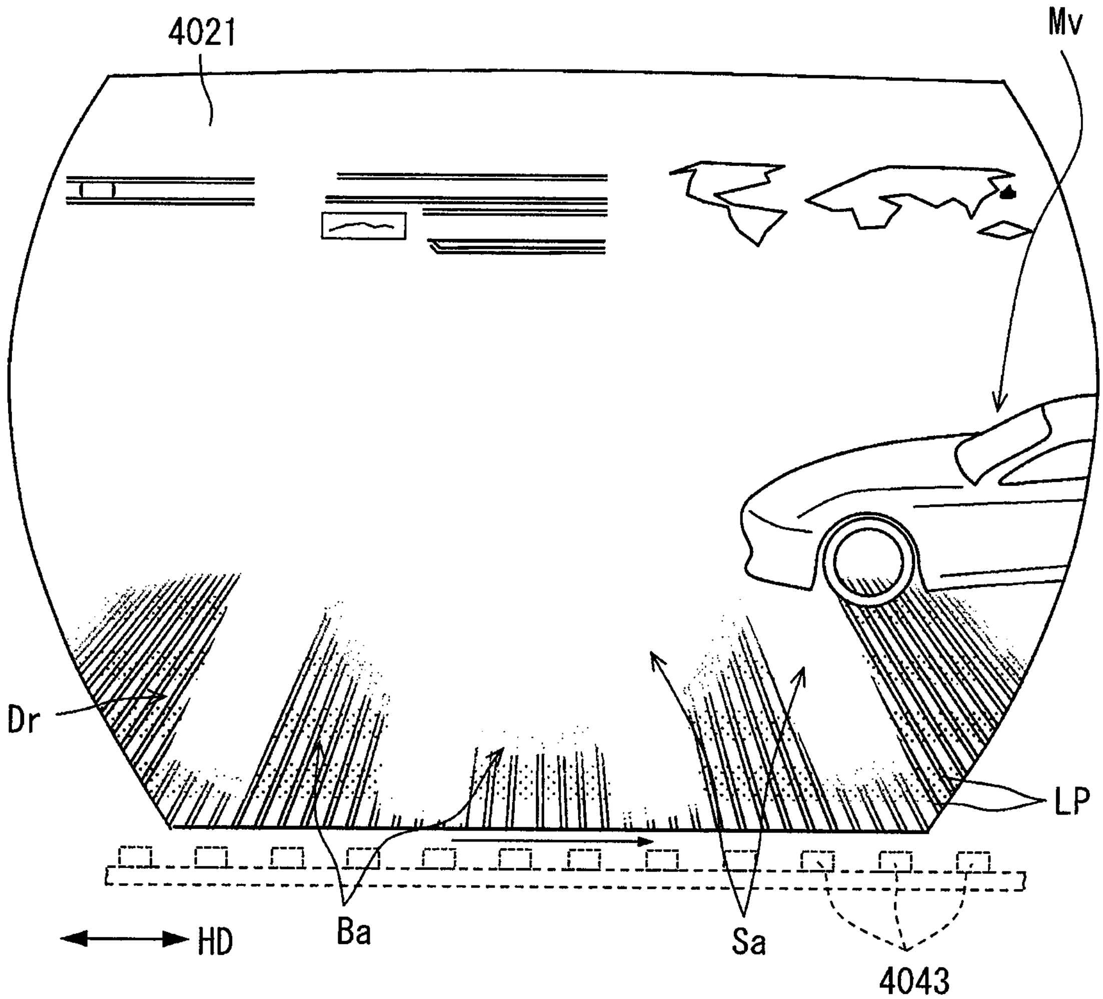
FIG. 76 is a diagram showing a mode immediately after the opening display is started.

In an opening display according to the eleventh embodiment shown in FIG. 76, a lighting control for moving a light transmissive display light source 4043 in a lighting state rightward is performed from a timing at which a vehicle model Mv slides into a display screen 4021 immediately after the vehicle is started. As described above, the display positions of a bright region Ba and a dark region Sa are moved in the direction opposite to the moving direction of the vehicle model Mv. As a result, the bright region Ba and the dark region Sa express an image of a road surface flowing rearward of the vehicle model Mv by moving rightward.

Also in the eleventh embodiment described so far, the same effects as those in the tenth embodiment are achieved, and the stereoscopic effect display is realized by a dynamic change of each of the vehicle model Mv and the light emission design LP. In addition, according to the eleventh embodiment, with the display of the road surface design Dr such that the bright region Ba and the dark region Sa flow toward the vehicle model Mv, the opening display can produce a driving feeling such that the vehicle model Mv is traveling.

In the above embodiment, an example in which the display positions of the bright region and the dark region are changed as a change in the light emission mode of the light emission design has been described. However, the change in the light emission mode of the light emission design is not limited to the change in the luminance (light/dark) as described above, and may be a change of the hue, shade, or the like of the light emitting color. More specifically, the movement of the moving image portion such as the vehicle model may be emphasized with the use of a positional change in the region having different light emission colors, a positional change in the region having different shades, or the like. Also, a direction of movement represented by the light emission design is not limited to the direction of movement of the moving image portion and the opposite direction. For example, the light emission design may display a radial motion about the moving image portion, or may display a motion in a vertical direction or the like irrelevant to the moving direction of the moving image portion. Further, the moving image portion is not limited to the vehicle model.

In the above embodiment, a vertical striped light emission design that is combined with the background image portion to form a lattice shape is displayed on the light emission design display unit. However, the form of the light emission design, that is, the shape, arrangement, number, and the like of the forming area can be appropriately changed. In addition, the light transmissive display light source may be provided on both sides of an acrylic light guide plate in the horizontal direction HD, on an upper side of the acrylic light guide plate, or the like. According to such an array of the light transmissive display light source, the light emission design display unit can display a light emission design of high luminance at an arbitrary position.

The liquid crystal display device of the above embodiment has a horizontally long rectangular shape. However, the shape of the display screen can be appropriately changed. For example, the liquid crystal display device may have a configuration using a different type of display panel not having a rectangular shape. Further, the display screen may have a curved shape. In addition, as an image display device for displaying an image, a configuration different from that of a liquid crystal display, such as an organic EL (electroluminescence) display, may be adopted. Further, the liquid crystal display device may not be defined in the center of the display region. Further, the whole display region is formed by a liquid crystal display device, and the pointer display device may be omitted.

In the above embodiment, the opening display is exemplified as the effect display in which the moving image portion and the light emission design are combined together, but the effect display is not limited to the opening display. In addition, the configuration corresponding to the display control circuit according to the above embodiment may be realized by different software and hardware, or a combination of the software and the hardware. As a storage unit of the display control circuit, various non-transitory tangible storage medium storage media such as a flash memory or a hard disk drive can be adopted.

In the above embodiment, an example in which the characteristic portion of the present disclosure is applied to the display device mounted on the vehicle has been described, but the display device to which the characteristic portion of the present disclosure can be applied is not limited to the above-described display device which functions as a combination meter. For example, the characteristic portion of the present disclosure can be applied to a display device different from a combination meter such as a navigation apparatus mounted on the vehicle. Further, the characteristic portion of the present disclosure is also applicable to a display device serving as an instrument mounted on a mobile object different from the vehicle, for example, an aircraft, a ship, or the like, and a display device serving also as a control panel of an industrial machine and a household appliance.

JP 2015-71369 A, which is a prior art example of a vehicle display device according to the tenth and eleventh embodiments, discloses a vehicle display device for displaying a lattice-shaped effect image having a sense of perspective on a display screen of a liquid crystal display device. The vehicle display device displays a grid-like effect image as an animation moving from the back of the display screen to the front, thereby sensually expressing the traveling state of the vehicle.

The effect image disclosed in JP 2015-71369 A has a lattice shape having a sense of perspective, but is actually only a planar image displayed on a display screen. This makes it difficult to give a sufficient stereoscopic effect to the viewer even if the form of the effect image or the like is changed as animation in the form of a lattice.

On the other hand, according to the tenth and eleventh embodiments, in order to provide a display device capable of performing a stereoscopic effect display, (1) the display device includes:

an image display device (4020) for displaying an image (P1) on a display screen (4021);

a transmissive display device (4040) that includes a transmissive display plate (4041) disposed in a display direction (SD) facing the display screen, and multiple light source units (4043) for causing a light to enter the display plate from an end surface (4041*e*) of the display plate, and causes multiple fine recess portions (4045, 4245*a*, 4245*b*, 4245*c*) provided on the display plate to reflect the light from the light source units in the display direction, to display a light emission design (LP) superimposed on an image of the display screen on the display plate; and a display control circuit (4060) that includes an image controller (4063, 4074) for controlling the display of the image display unit, and a light source controller (4064, 4073) for individually controlling the light emission of a plurality of light source units, and changes a light emission mode of a light emission design superimposed on at least a part of a moving image portion (Pm) according to the movement of the moving image portion while moving the moving image portion displayed on the display screen.

The features of the vehicle display device according to the tenth and eleventh embodiments are described above, but the features of the lower hierarchy are listed as follows. In order to show a relationship with the above-mentioned features, "the above" is added to each configuration in the description.

(2) The light emission design includes a bright region (Ba) and a dark region (Sa) having different luminescence luminance from each other, and the light source controller moves the display position of at least one of the bright region and the dark region in accordance with the movement of the moving image portion.

(3) The light source controller moves the display position of at least one of the bright region and the dark region in the same direction as the moving direction of the moving image portion.

(4) The light source controller moves the display position of at least one of the bright region and the dark region in a direction opposite to the moving direction of the moving image portion.

(5) The image controller further displays a background image portion (Pb) in a range overlapping with the light emission design in the display screen, and changes a display mode of the background image portion in accordance with a change in a light emission mode of the light emission design.

(6) The display plate is provided with multiple forming areas (4042 and 4242) in which a large number of the minute recess portions are disposed, and each of the forming areas has a shape extending linearly from the end surface on which the light of the light source unit is incident toward the center of the display plate.

(7) The image controller displays a background image portion (Pb) in a range overlapping with the light emission design in the display screen, and changes a display mode of the background image portion in accordance with a change in a light emission mode of the light emission design, and the background image portion is a horizontal stripe-shaped image portion superimposed on the light emission design to form a lattice-shaped display design (Dr).

(8) The multiple light source units are provided to be spaced apart from each other in the extension direction of the end surface, the multiple forming areas are provided to be spaced apart from each other along the extension direction, and a distance between two adjacent forming areas is provided to be narrower than a distance between two adjacent light source units.

(9) The display device is mounted on a vehicle, the moving image portion includes a vehicle model (Mv) in a form based on an appearance shape of the vehicle, and the light emission design is a luminescent form recalling a ground surface on which the vehicle model is placed.

(10) The display device further includes an information acquisition unit (4061) for acquiring state information indicating a state of the vehicle, and the light emission design causes a part of the vehicle model indicating a position corresponding to the specific location to emit a light in a manner different from the other parts when the information acquisition unit acquires the state information indicating an abnormality of the specific location of the vehicle.

In such a mode, the moving image portion displayed on the display screen and the light emission design displayed on the display plate are positioned to be deviated from each other in the display direction in which the display screen faces. Therefore, the display in which the moving image portion and the light emission design are superimposed on each other (hereinafter referred to as "effect display") can be a stereoscopic display. In addition, in the effect display, as the moving image portion moves on the display screen, the light emission design superimposed on the moving image portion also changes the light emission mode. In this manner, the superimposed moving image portion and light emission design are dynamically changed at positions deviated from each other, with the result that the display device can perform the effect display with the stereoscopic effect.

Twelfth Embodiment

Figure 77:
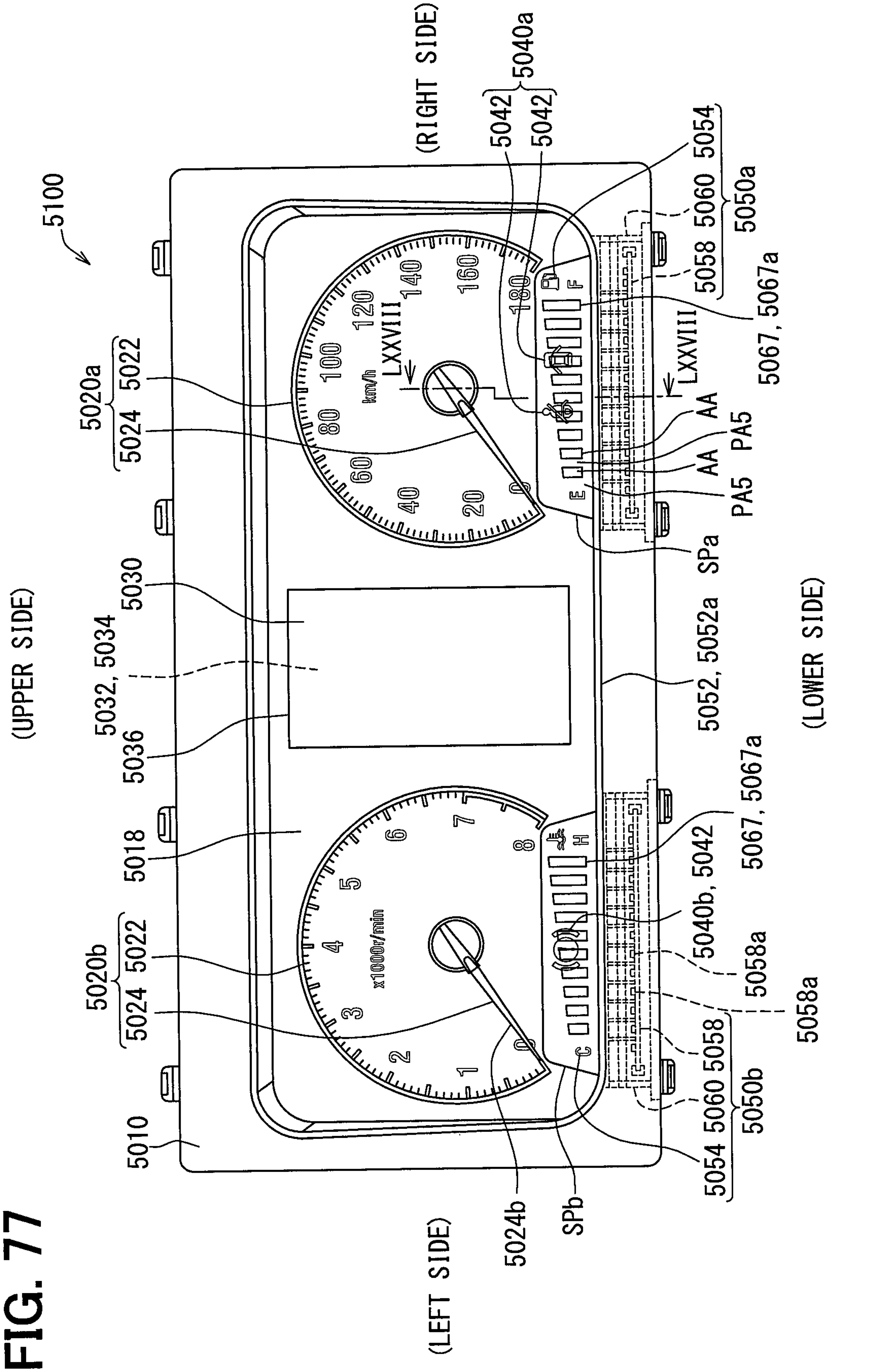
FIG. 77 is a front view of a display device for a vehicle according to a twelfth embodiment.

As shown in FIG. 77, a vehicle display device 5100 according to a twelfth embodiment is mounted on a vehicle and installed on an instrument panel facing a seat on which an occupant who visually recognizes the device 5100 is seated. The vehicle display device 5100 can display a state of the vehicle toward the viewing side where the occupant is to be positioned.

Figure 78:
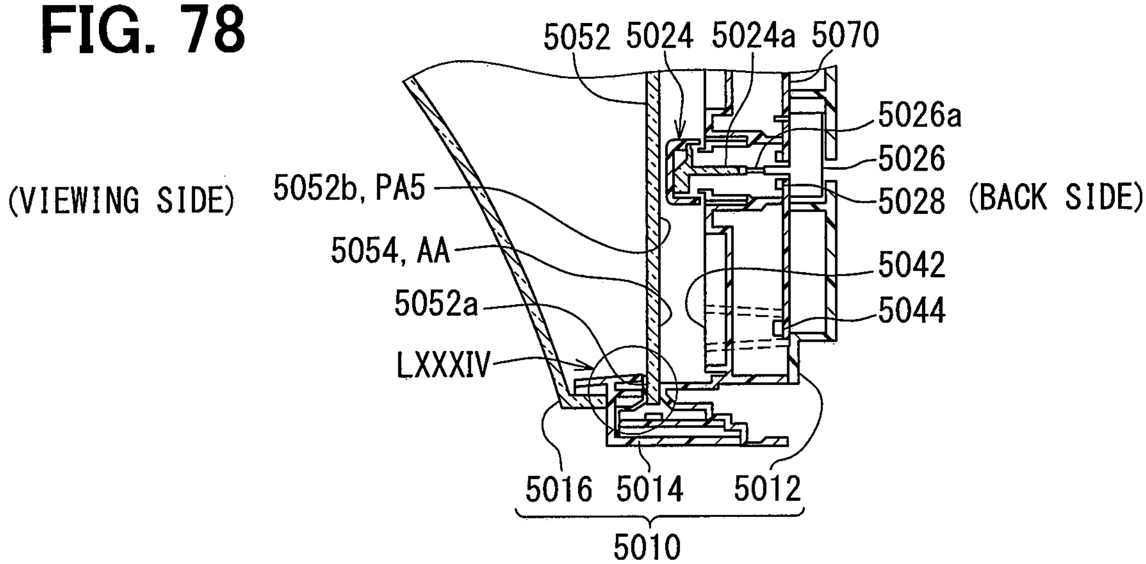
FIG. 78 is a cross-sectional view taken along a line LXXVIII-LXXVIII of FIG. 77.
Figure 79:
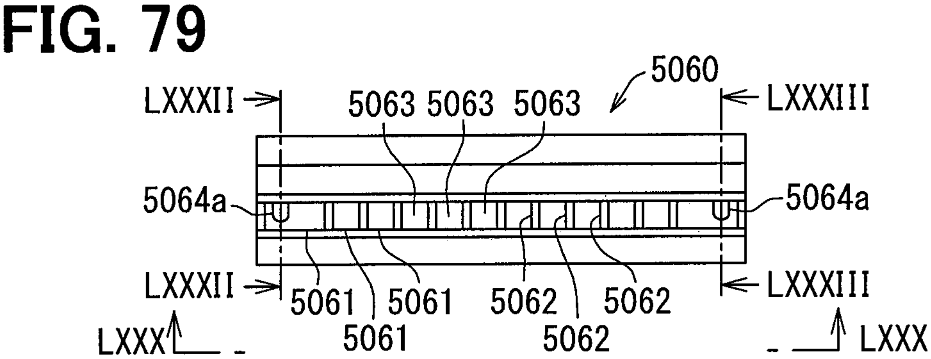
FIG. 79 is a diagram of a light shielding compartment portion as viewed from a light transmissive plate side according to the twelfth embodiment.
Figure 80:
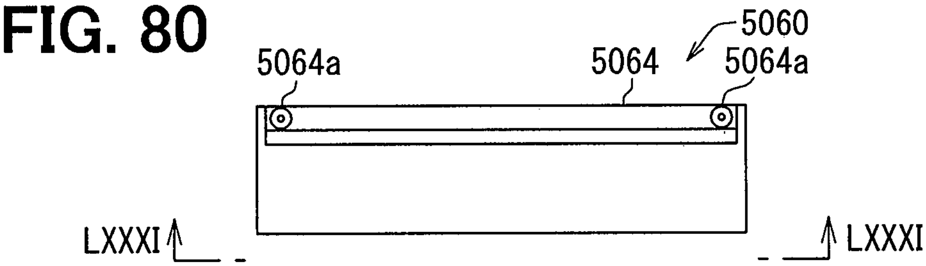
FIG. 80 is a view taken along a line LXXX-LXXX of FIG. 79.
Figure 81:
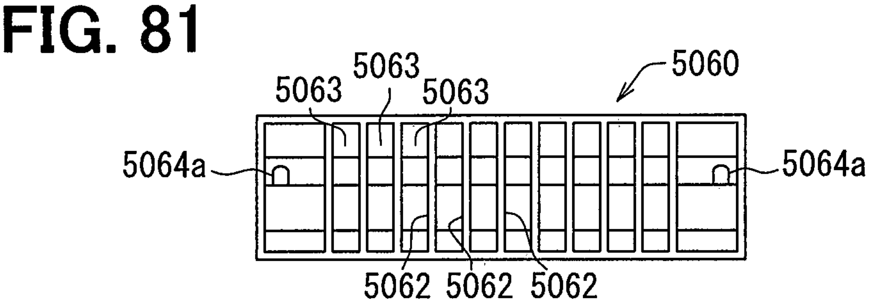
FIG. 81 is a view taken along a line LXXXI-LXXXI of FIG. 80.
Figure 82:
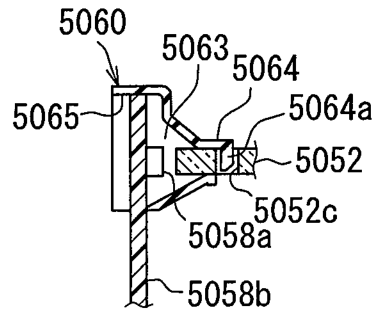
FIG. 82 is a cross-sectional view showing a positional relationship among the light shielding compartment portion, the light transmissive plate, and the light source unit in a cross-section taken along a line LXXXII-LXXXII of FIG. 79.
Figure 83:
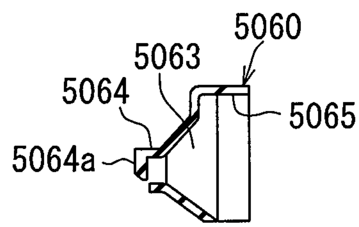
FIG. 83 is a cross-sectional view taken along a line LXXXIII-LXXXIII of FIG. 79.
Figure 84:
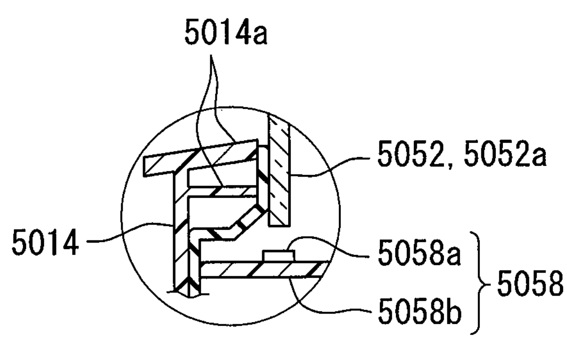
FIG. 84 is a partially enlarged cross-sectional view of a portion LXXXIV of FIG. 78.

As shown in FIG. 78, the vehicle display device 5100 described above includes a case portion 5010, pointer display units 5020*a* and 5020*b*, a liquid crystal display unit 5030, warning display units 5040*a* and 5040*b*, light transmissive display units 5050*a* and 5050*b*, and a main circuit board 5070. The case portion 5010 includes a rear case 5012, a frame case 5014, and a smoke plate 5016. The rear case 5012 is made of, for example, a synthetic resin having a light shielding property, and covers the display units 5020*a*, 5020*b*, 5030, 5040*a*, and 5040*b* and the main circuit board 5070 from the back side. The frame case 5014 is made of, for example, a synthetic resin having a light shielding property, and is formed in a cylindrical shape having an opening portion on a viewing side along an outer peripheral contour of the device 5100 and on the back side on the side opposite to the viewing side. The smoke plate 5016 is made of a semi-light transmissive resin such as colored acrylic resin, for example, in a curved plate-shape that closes an entire surface of the viewing-side opening portion of the frame case 5014. As a result, the display units 5020*a*, 5020*b*, 5030, 5040*a*, 5040*b*, 5050*a*, and 5050*b* are visually recognized by the occupant through the smoke plate 5016. The transmittance of the smoke plate 5016 according to the present embodiment is set to about 30% by the smoke-like coloring, but may be set to an arbitrary value of 30% or more.

The pointer display units 5020*a* and 5020*b* display the states of the vehicle when pointers 5024 indicates respective indicators 5022. The indicators 5022 are provided on a display plate 5018. The display plate 5018 is also commonly referred to as a dial plate. The display plate 5018 is formed in a flat plate-like shape by partially applying semi-light transmissive or light shielding printing on a surface of a base material made of, for example, a light transmissive synthetic resin on the viewing side. The printing may be replaced with coating.

In particular, in the present embodiment, pointer display units 5020*a* and 5020*b* are provided in a left region and a right region of the display plate 5018, respectively. In this example, since the two pointer display units 5020$a$ and 5020$b$ have the same configuration as each other, the right hand pointer display unit 5020$a$ will be described as a representative. The indicator 5022 of the pointer display unit 5020$a$ is formed by printing on the display plate 5018 to array scales and characters corresponding to the scales in a ring shape.

The pointer 5024 integrally includes a coupling portion 5024$a$ and an indicating portion 5024$b$. The coupling portion 5024$a$ is disposed through a through hole provided in the display plate 5018, and is coupled to a rotation shaft 5026$a$ of a pointer drive motor 5026 (for example, a stepping motor) held by the main circuit board 5070 on the back side of the display plate 5018. The indicating portion 5024$b$ is disposed on the viewing side of the display plate 5018, and has a needle shape extending along the display plate 5018. The pointer 5024 rotates in response to the output of the pointer drive motor 5026.

In the present embodiment, the pointer 5024 corresponding to a region on the right side displays a speed of the vehicle as the state of the vehicle. The pointer 5024 corresponding to the left region indicates an engine speed of the vehicle as the state of the vehicle.

The liquid crystal display unit 5030 is provided in the center region of the display plate 5018 in a position sandwiched between the two pointer display units 5020$a$ and 5020$b$. The liquid crystal display unit 5030 can display an image by transmitting the display light from the liquid crystal panel 5032 disposed on the back side of the display plate 5018 to the viewing side through the transmissive region 5036 formed by not providing printing on the display plate 5018.

The liquid crystal panel 5032 according to the present embodiment is a liquid crystal panel using thin film transistors (TFTs), and is an active matrix type liquid crystal panel formed of multiple liquid crystal pixels disposed in two dimensions. The liquid crystal panel 5032 has a rectangular display surface formed on the viewing side. The liquid crystal panel 5032 is illuminated from the back side by the backlight 5034, and an image is displayed.

The warning display units 5040$a$ and 5040$b$ are provided along the outer edge portion of the display plate, in particular, at two positions below the respective pointer display units 5020$a$ and 5020$b$ in the present embodiment. The warning display units 5040$a$ and 5040$b$ are formed to be capable of displaying warnings. Specifically, the warning display units 5040$a$ and 5040$b$ include multiple warning lights 5042 indicating various warnings. Each warning light 5042 is formed as a mark printed on the display plate 5018.

The warning display units 5040$a$ and 5040$b$ have multiple light emitting devices 5044 individually corresponding to the warning lights 5042 in a state of being held by the main circuit board 5070. The light emitting devices 5044 individually corresponding to the warning lights emit the light, and the warning display units 5040$a$ and 5040$b$ emit the light by illuminating the marks of the warning lights 5042 from the back side. Each light emitting device 5044 employs a light emitting diode, and each light emitting device 5044 emits the light by being connected to a power supply.

The warning light 5042 includes a warning mark indicating that the occupant is not wearing a seat belt, a warning mark indicating that the vehicle is in a half door state, a warning mark indicating that an abnormality has occurred in the brake, and the like.

The warning display of the warning display units 5040$a$ and 5040$b$ is in a non-display state in a normal state, and is displayed when an abnormality occurs or the like. The display color of the warning of the warning display units 5040$a$ and 5040$b$ is set to red, but may be set to another display color such as amber.

The light transmissive display units 5050$a$ and 5050$b$ perform display with the use of a light transmissive plate 5052 which is disposed on the viewing side of the display plate 5018 on which the warning display units 5040$a$ and 5040$b$ are displayed. The light transmissive plate 5052 is made of, for example, a synthetic resin having a transmissive property, and has a flat plate-like shape disposed substantially in parallel with the display plate 5018. The light transmissive plate 5052 is adapted to transmit a warning indication by the warning display units 5040$a$ and 5040$b$ visually by the occupant due to the translucency of the light transmissive plate 5052.

In particular, according to the present embodiment, the light transmissive display units 5050$a$ and 5050$b$ are respectively provided corresponding to two regions of the light transmissive plate 5052 that face the warning display units 5040$a$ and 5040$b$, that is, two regions SPa and SPb that overlap with the warning display by the warning display units 5040$a$ and 5040$b$. Since the right light transmissive display unit 5050$a$ and the left light transmissive display unit 5050$b$ share one light transmissive plate 5052 and have the same configuration as each other, the right light transmissive display unit 5050$a$ will be described below as a representative. Specifically, the light transmissive display unit 5050$a$ includes a light source unit 5058, a light shielding compartment portion 5060, and a reflective portion 5054.

The light source unit 5058 is formed by arraying multiple light emitting devices 5058$a$ on a light source circuit board 5058$b$. Each light emitting device 5058$a$ employs a light emitting diode, and each light emitting device 5058$a$ emits a light by being connected to a power supply. In particular, in the present embodiment, each of the light emitting devices 5058$a$ is a multicolor light emitting diode, but the light emitting devices 5058$a$ in the lighting state are configured to control a light emission with substantially the same color and substantially the same luminance as each other.

The light source unit 5058 is disposed so as to face an outer edge portion 5052$a$ of the light transmissive plate 5052. The light emitted from each light emitting device 5058$a$ enters the inside of the light transmissive plate 5052 through the outer edge portion 5052$a$, as a result of which the light source unit 5058 can supply the light to the inside of the light transmissive plate 5052.

As shown in FIGS. 77, 79 to 84, the light shielding compartment portion 5060 is formed to have elasticity by being made of, for example, an elastomer having a light shielding property, and has a hollow cylindrical shape enclosing each light emitting device 5058$a$ of the light source unit 5058. Multiple rectangular opening portions 5061 are disposed on the light transmissive plate 5052 side of the light shielding compartment portion 5060 so as to come in contact with the outer edge portion 5052$a$ of the light transmissive plate 5052 and individually correspond to the respective light emitting devices 5058$a$. The opposite side of the light transmissive plate 5052 in the light shielding compartment portion 5060 is opened for disposing the light-source circuit board 5058$b$, but a contact wall 5065 that comes into contact with the outer edge portion of the light source circuit board 5058$b$ with little gap is provided, to thereby prevent a light leakage of each light emitting device 5058$a$.

The light shielding compartment portion 5060 has a partition wall 5062 provided along a surface of the light source circuit board 5058*b* from each opening portion 5061, and a rectangular cylindrical space 5063 corresponding to each light emitting device 5058*a* is provided by the partition wall 5062. One light emitting device 5058*a* is disposed in each cylindrical space 5063, and an end portion of the partition wall 5062 comes in contact with a surface of the light source circuit board 5058*b*, thereby preventing the light of each light emitting device 5058*a* from leaking into the other cylindrical space 5063. In this manner, the light shielding compartment portion 5060 partitions each light emitting device 5058*a* by the partition wall 5062 disposed between the light emitting devices 5058 disposed adjacent to each other in the light source unit 5058. Each of the light emitting devices 5058*a* supplies the light to an illumination range of the light transmissive plate 5052 which is deviated from each other in the extension direction of the outer edge portion 5052*a*.

A cover portion 5064 is formed on the light transmissive plate 5052 side of the light shielding compartment portion 5060 to partially cover the surface of the light transmissive plate 5052 in the vicinity of the outer edge portion 5052*a*. A pin 5064*a* protruding from the cover portion 5064 toward the inside of the light transmissive plate 5052 is formed in the cover portion 5064 along the plate thickness direction of the light transmissive plate 5052. A fitting hole 5052*c* corresponding to the pin 5064*a* is provided in one of the light transmissive plates 5052, and the pin 5064*a* is fitted into the fitting hole 5052*c*. Further, the cover portion 5064 is in pressure contact with a protrusion portion 5014*a* protruding from the viewing side to the back side in the frame case 5014, and is sandwiched between the frame case 5014 and the light transmissive plate 5052. Thus, the light shielding compartment portion 5060 is stably held, and the light of the light source unit 5058 is reliably provided inside the light transmissive plate 5052 while being prevented from leaking.

Figure 85:
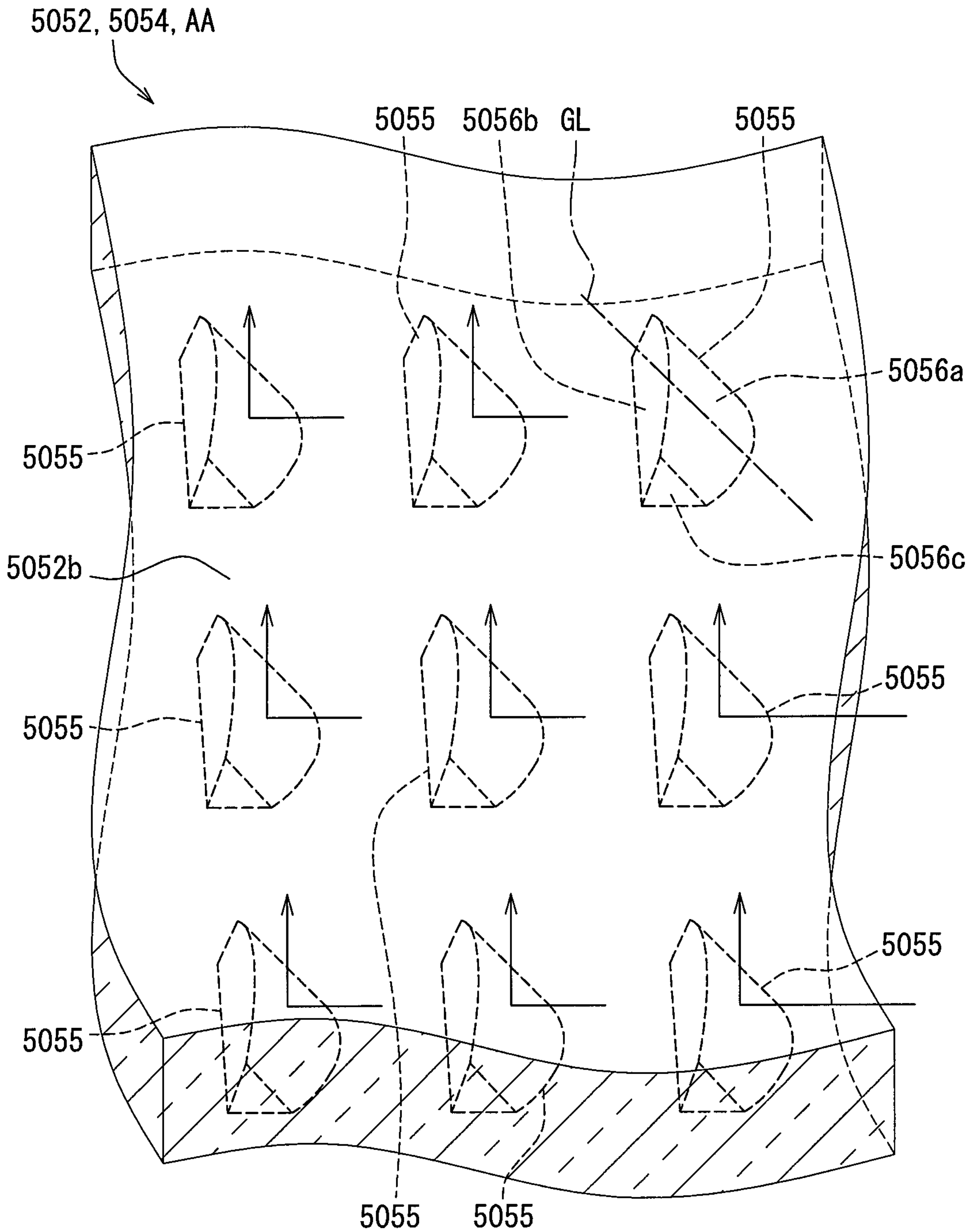
FIG. 85 is an enlarged view showing a region in which reflective portions are arrayed in a partially enlarged manner according to the twelfth embodiment.

As shown in FIG. 77, the reflective portion 5054 is formed on the light transmissive plate 5052, and reflects light from the light source unit 5058 to the viewing side, thereby lighting and displaying a display content. More specifically, as shown in FIG. 85, the reflective portion 5054 is formed by two-dimensionally arraying the multiple reflective elements 5055 set to a fine size. Each of the reflective elements 5055 is formed in a concave hole shape recessed from the back side of the light transmissive plate 5052 to the inside of the light transmissive plate 5052. Each of the reflective elements 5055 has a reflection surface 5056*a*, a back surface 5056*b*, and two side surfaces 5056*c*.

The reflection surface 5056*a* is disposed facing the outer edge portion 5052*a* side of the reflective elements 5055 on which the light from the light source unit 5058 is incident, and reflects the light from the light source unit 5058 to the viewing side. The reflection surface 5056*a* is formed in a curved surface shape concaved inside the light transmissive plate 5052, and has a curvature at least in a direction in which the illumination range of each light emitting device 5058*a* is deviated. In particular, according to the present embodiment, the reflection surface 5056*a* is formed in a cylindrical surface shape, and a generating line GL of the reflection surface 5056*a* are disposed so as to be inclined with respect to the plate thickness direction of the light transmissive plate 5052 so as to move away from the light source unit 5058 from the back side toward the viewing side. The back surface 5056*b* is provided to face the opposite side to the reflection surface 5056*a*, and thus has a planar shape disposed back-to-back with the reflection surface. The two side surfaces are disposed between the side end portion of the reflection surface and the side end portion of the back surface, and have a planar shape.

In the reflective portion 5054, the reflective elements 5055 are disposed one by one, being separated from each other, through flat portions 5052*b* formed flat along the direction along which the light transmissive plate 5052 is disposed. In an array region AA in which the reflective elements 5055 are arrayed, the light is reflected to the viewing side, and thus the entire region AA is displayed as light. On the other hand, in a flat region PA5 configured by only the flat portion 5052*b* without disposing the reflective element 5055, since the light from the light source unit 5058 is not substantially reflected to the viewing side, nothing is displayed. The placement of the array region AA and the flat region PA5 enables the reflective portion 5054 to display a pattern. In FIG. 85, solid arrows schematically indicate directions in which the light from the light source unit 5058 is reflected.

Specifically, as shown in FIG. 77, the pattern of the present embodiment can display a scale pattern 5067 including multiple scales 5067*a* arrayed along the outer edge portion 5052*a* of the light transmissive plate 5052. The scales 5067*a* individually correspond to the respective light emitting device 5058*a* of the light source unit 5058. In detail, each scale 5067*a* is disposed on an extension line of each opening portion 5061 of the light shielding compartment portion 5060 from each light emitting device 5058*a*, and the scales 5067*a* per se also extend in a direction along the extension line. The extension dimension of each scale 5067*a* gradually increases as one of the outer edge portions 5052*a* of the light transmissive plate 5052 is advanced.

In the present embodiment, the right light transmissive display unit 5050*a* lights up and displays the remaining fuel level of the vehicle in a normal state as a display content different from that of the warning display unit 5040*a* in the region SPa. The left light transmissive display unit 5050*b* is configured to display a water temperature of an engine coolant water of the vehicle in a normal state as a display content different from that of the warning display unit 5040*b* in the region SPb. The display color of the display content of each of the light transmissive display units 5050*a* and 5050*b* is set to white, but may be set to another color as long as the color is a display color different from the warning display of the warning display units 5040*a* and 5040*b* to be superimposed.

Figure 86:
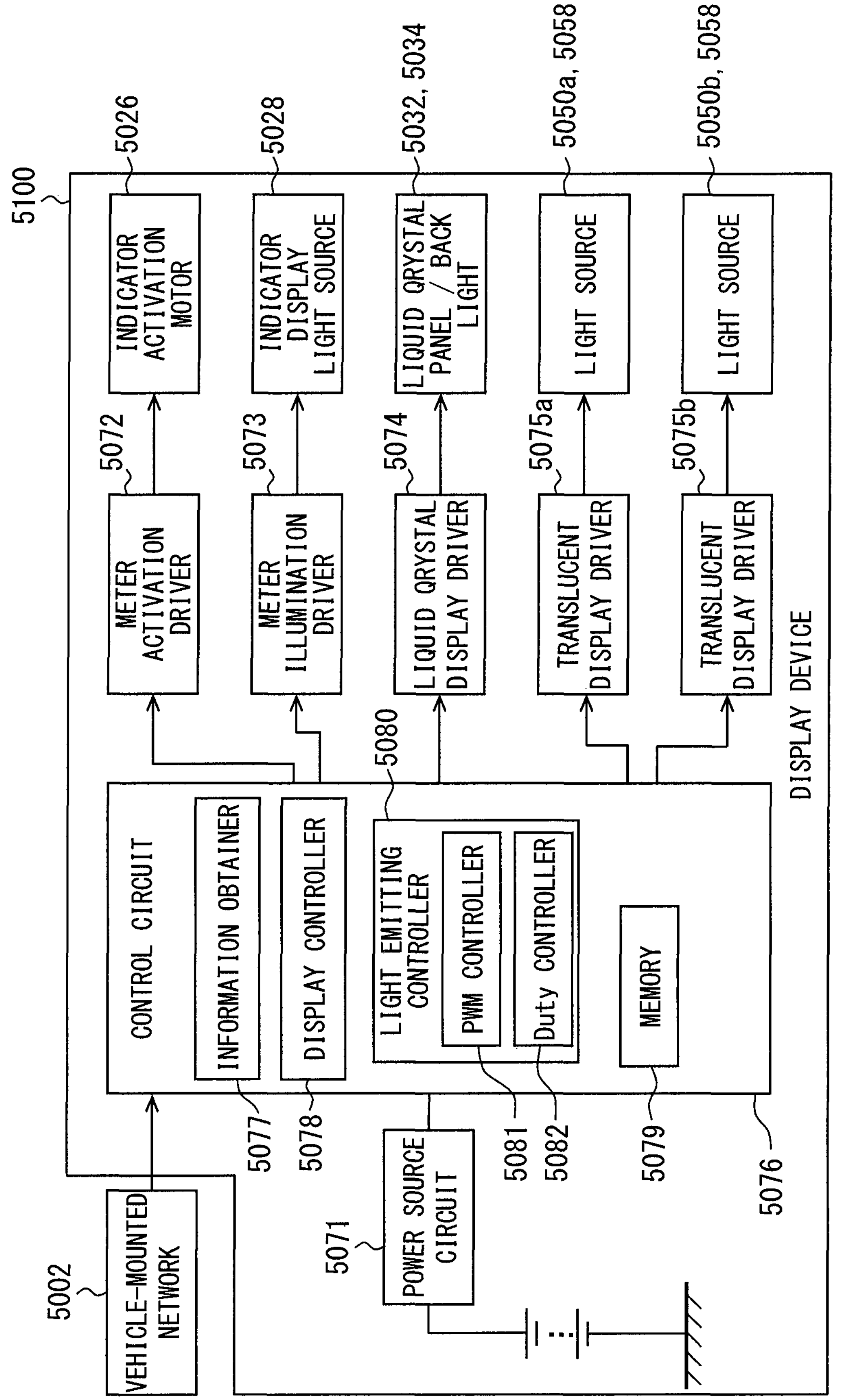
FIG. 86 is a block diagram illustrating a circuit and the like of a display device for a vehicle according to the twelfth embodiment.

When all of the light emitting devices 5058*a* of the light source units 5058 of the light transmissive display units 5050*a* and 5050*b* are turned off, no light is provided to the reflection surface 5056*a* of the reflective elements 5055, and since the reflective elements 5055 are formed in a minute size and through the flat portion 5052*b*, the scale pattern 5067 is hardly visible to the occupant. As shown in FIG. 78, the main circuit board 5070 is disposed on the back side of the display plate 5018 and the liquid crystal panel 5032, and is held by the rear case 5012. The main circuit board 5070 is provided with a power supply circuit 5071, a meter drive driver 5072, a meter illumination driver 5073, a liquid crystal display driver 5074, transmissive display drivers 5075*a* and 5075*b*, a control circuit 5076, and the like shown in FIG. 86.

The power supply circuit 5071 is a DC-DC converter of a linear type or a switching type. The power supply circuit 5071 is connected to a battery power supply mounted on the vehicle. The power supply circuit 5071 converts a DC power supplied from a battery power supply (+B) into an output voltage of, for example, about 5 volts, and stably supplies an output voltage to the control circuit 5076 and the drivers 5072, 5073, 5074, 5075*a*, and 5075*b*.

The meter drive driver 5072 outputs a control signal based on a command from the control circuit 5076 to each of the pointer drive motors 5026. The meter drive driver 5072 controls the pointed position of each pointer 5024 by driving each pointer drive motor 5026.

The meter illumination driver 5073 outputs a control signal based on a command from the control circuit 5076 to the pointer display light source 5028. In this manner, the meter illumination driver 5073 controls the light emission of the pointer display light source 5028 to display each indicator 5022 and each pointer 5024 on the display plate 5018.

The meter illumination driver 5073 outputs a control signal based on a command from the control circuit 5076 to the light emitting device 5044 which displays the warning display units 5040*a* and 5040*b*. In this manner, the meter illumination driver 5073 controls the display mode of the warning display units 5040*a* and 5040*b*.

The liquid crystal display driver 5074 outputs a control signal based on a command from the control circuit 5076 to the liquid crystal panel 5032 and the backlight 5034. In this manner, the liquid crystal display driver 5074 controls the display mode of the image displayed on the display surface.

The transmissive display drivers 5075*a* and 5075*b* are provided one by one for each of the left and right light transmissive display units 5050*a* and 5050*b*. Each of the transmissive display drivers 5075*a* and 5075*b* outputs a control signal based on a command from the control circuit 5076 to the light source unit 5058 of the corresponding light transmissive display unit 5050*a* or 5050*b*. In this manner, each of the transmissive display drivers 5075*a* and 5075*b* controls the display mode of the corresponding light transmissive display units 5050*a* or 5050*b*. The control circuit 5076 is an electronic circuit that controls the display of device 5100. The control circuit 5076 is communicably connected to a communication path of an in-vehicle network 2 mounted on the vehicle. The control circuit 5076 mainly includes a microcontroller having at least one processor, one storage unit 5079, and the like. The storage unit 5079 stores a display control program necessary for display, image data for drawing various images, and the like. The control circuit 5076 configures functional blocks such as the information acquisition unit 5077, the display controller 5078, and the light emission controller 5080 by executing the display control program stored in the storage unit 5079 by the processor.

The information acquisition unit 5077 acquires various information indicating the state of the vehicle from the in-vehicle network 2 or the like. As the information to be acquired, abnormality information indicating abnormality of a specific portion of the vehicle, and so on are adopted in addition to a speed of the vehicle, an engine speed, a remaining fuel level, a water temperature of an engine coolant water, and so on. The information acquisition unit 5077 continuously acquires information while the vehicle is activated.

The display controller 5078 controls the display of the device 5100 in cooperation with the drivers 5072, 5073, 5074, 5075*a*, and 5075*b* based on the information from the information acquisition unit 5077. The display controller 5078 controls, for example, display of each of the light transmissive display units 5050*a* and 5050*b*. Specifically, the display controller 5078 individually controls turning on and off of each light emitting device 5058*a* in the light source unit 5058 of the right light transmissive display unit 5050*a* based on the information of the remaining fuel level of the vehicle acquired by the information acquisition unit 5077.

In other words, when the remaining fuel level is full, that is, when a fuel tank of the vehicle is refueled to an upper limit, the display controller 5078 turns on all the light emitting devices 5058*a* corresponding to the respective scales 5067*a* of the scale pattern 5067. As a result, all of the scales 5067*a* are lighted and indicated, and that the remaining fuel level is full is indicated. On the other hand, when the remaining fuel level is a predetermined amount smaller than the full amount, the display controller 5078 turns on a part of the light emitting devices 5058*a* corresponding to each scale 5067*a* of the scale pattern 5067 and a part of the light emitting devices 5058*a* corresponding to a part of the left scale 5067*a* having a small extension dimension, and turns off the light emitting devices 5058*a* of the other part. As a result, only the scale 5067*a* corresponding to a part of the light emitting devices 5058*a* is lighted and indicated, and that the remaining fuel level is a predetermined amount is indicated.

Similarly, the display controller 5078 individually controls turning on and off of each light emitting device 5058*a* in the light source unit 5058 of the left light transmissive display unit 5050*b* based on the water temperature information of the engine coolant water of the vehicle acquired by the information acquisition unit 5077.

The display controller 5078 also controls the display of warnings of the warning display units 5040*a* and 5040*b*, for example. Specifically, the display controller 5078 individually controls turning on and off of the light emitting devices 5044 in the warning display units 5040*a* and 5040*b* based on the abnormality information acquired by the information acquisition unit 5077. In other words, when the abnormality information indicating the abnormality of a specific place of the vehicle is acquired, the display controller 5078 turns on the light emitting device 5044 for displaying the warning lamp 5042 corresponding to the abnormality information among the light emitting devices 5044. When no abnormality information is acquired, the display controller 5078 turns off all the light emitting devices 5044 for displaying the warning lamp 5042.

In addition, the display controller 5078 adjusts a display mode between the warning display unit 5040*a* and the light transmissive display unit 5050*a*, and between the warning display unit 5040*b* and the light transmissive display unit 5050*b*. When displaying at least one of warning displays of the warning display unit 5040*a*, the display controller 5078 temporarily turns off the display content of the light transmissive display unit 5050*a* superimposed on the warning display unit 5040*a*. In other words, when the warning lamp 5042 disposed on the right warning display unit 5040*a* is displayed, the display of the remaining fuel level in the right light transmissive display unit 5050*a* is temporarily turned off. Similarly, when displaying at least one of warning displays of the warning display unit 5040*b* on the right side, the display controller 5078 temporarily turns off the display content of the light transmissive display unit 5050*b* superimposed on the warning display unit 5040*b*. That is, when the warning lamp 5042 disposed in the warning display unit 5040*b* is displayed, the display of the water temperature in the left light transmissive display unit 5050*b* is temporarily turned off.

More specifically, the display controller 5078 causes the display content of the light transmissive display unit 5050*a* to blink while the warning of the warning display unit 5040*a* is displayed. In other words, while the warning lamp 5042 disposed in the warning display unit 5040*a* is displayed, the display of the remaining fuel level in the light transmissive display unit 5050*a* is flashed by repeating the temporary turn-off and the temporary turn-on.

Similarly, the display controller 5078 blinks the display content of the light transmissive display unit 5050*b* while the warning of the warning display unit 5040*b* is displayed. That is, while the warning lamp 5042 disposed in the warning display unit 5040*b* is displayed, the display of the water temperature of the light transmissive display unit 5050*b* is flashed by repeating the temporary turn-off and the temporary turn-on.

In addition, the display controller 5078 controls display of the pointer display units 5020*a* and 5020*b*, image display of the liquid crystal display unit 5030, and the like.

The light emission controller 5080 includes a PWM controller 5081 and a duty controller 5082. The PWM controller 5081 and the duty controller 5082 cooperate with the light emission controller 5078 to increase or decrease an effective value of the current applied to each light emitting device 5058*a* by the control of a pulse signal to adjust a light emission luminance of each light emitting device 5058*a*. The light emission controller 5080 changes the display mode of the light transmissive display units 5050*a* and 5050*b* by switching the respective controls of the PWM controller 5081 and the duty controller 5082 or by a combination of the respective controls. Pulse signals are applied from the transmissive display drivers 5075*a* and 5075*b* to the light emitting devices 5058*a* of the light transmissive display units 5050*a* and 5050*b* based on switching commands generated by at least one of the PWM controller 5081 and the duty controller 5082.

The PWM controller 5081 changes a time ratio between the on-state and the off-state of the current in the pulse signal of a predetermined cycle, and controls the luminance of each light emitting device 5058*a*. In such a pulse width modulation control, the pulse width with the current on is widened, and the luminance of the light emitting device 5058*a* increases as the time ratio that is turned on per unit cycle increases.

The duty controller 5082 controls the luminance of each light emitting device 5058*a* by changing a length of the off-time while setting a time during which the current is turned on to a fixed time. In such pulse width modulation control, the off-time of the current becomes shorter, and the higher the frequency of the pulse signal is modulated, the higher the luminance of the light emitting device 5058*a* becomes.

Figure 87:
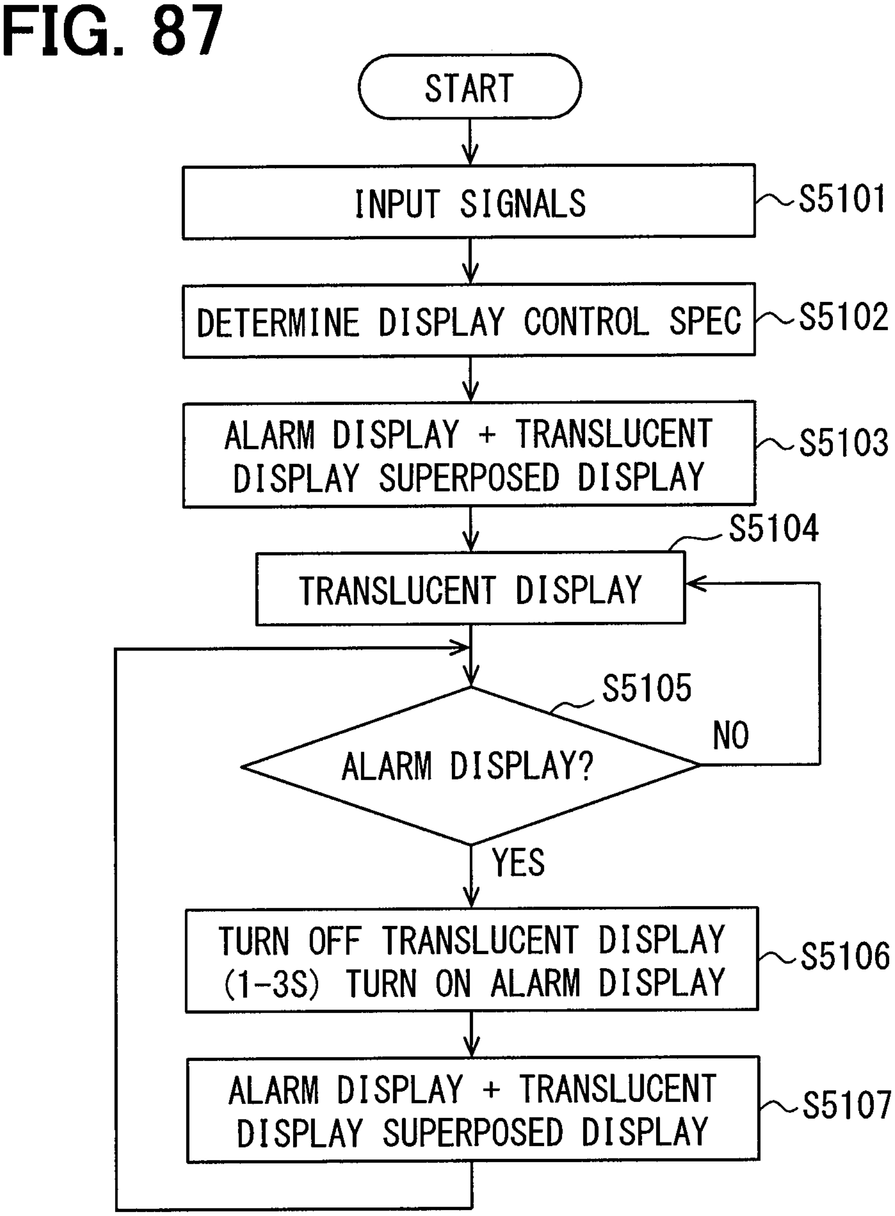
FIG. 87 is a flowchart of the display device according to the twelfth embodiment.

Processes executed by the vehicle display device 5100 (mainly, the display controller 5078) according to the present embodiment, in particular, processes involved in the warning display units 5040*a* and 5040*b* and the light transmissive display units 5050*a* and 5050*b* will be described with reference to a flowchart of FIG. 87. The flowchart starts when an engine switch of the vehicle is turned on, and ends when the engine switch of the vehicle is turned off.

First, in Step S5101, the above-described various control signals are input to the control circuit 5076. After the processing in Step S5101, the process proceeds to Step S5102.

In Step S5102, the display controller 5078 determines a display control specification. After the processing in Step S5102, the process proceeds to Step S5103.

In Step S5103, the display controller 5078 instantaneously displays the light transmissive display units 5050*a* and 5050*b* and the warning display units 5040*a* and 5040*b* in a superimposed manner. After the processing in Step S5103, the process proceeds to Step S5104.

Figure 88:
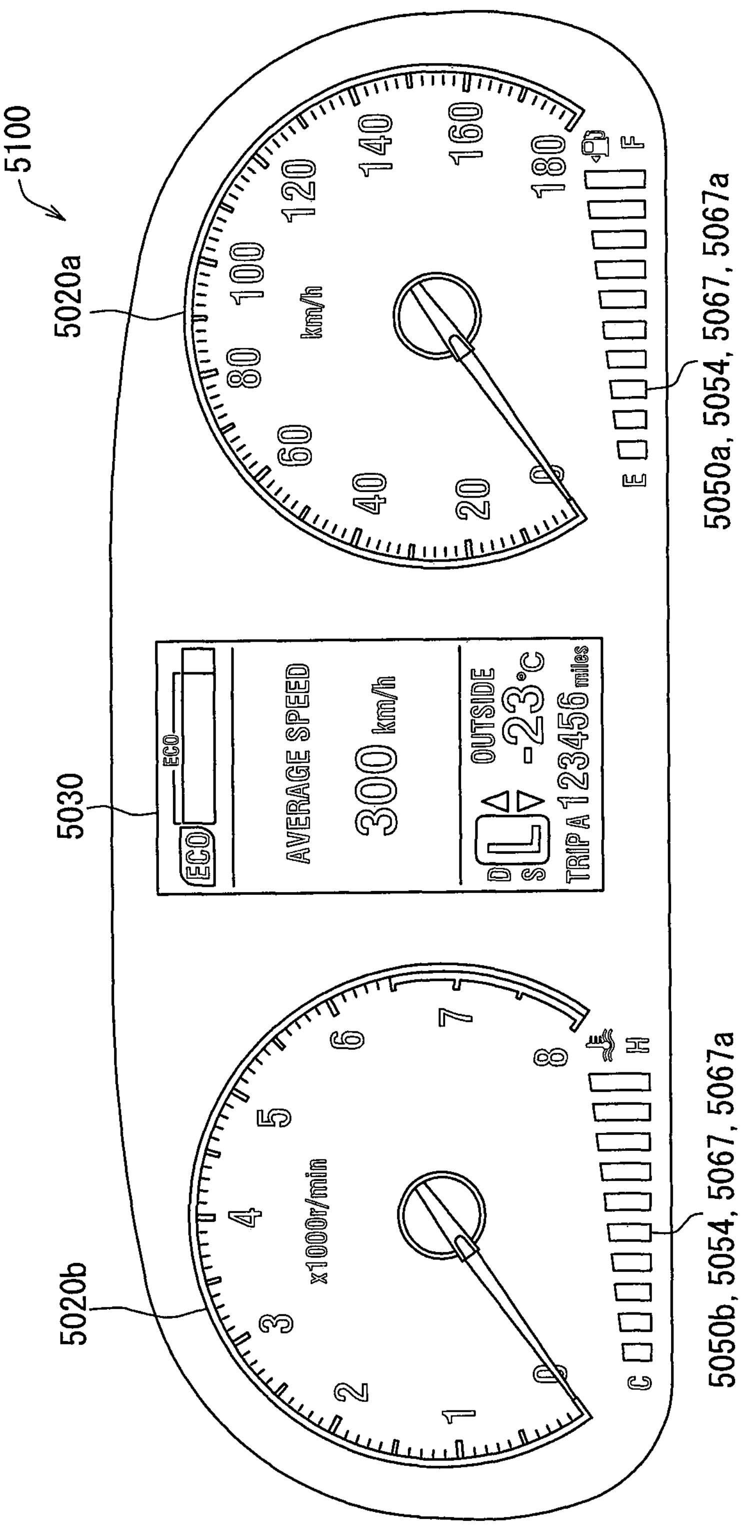
FIG. 88 is a diagram showing an example of display according to the twelfth embodiment, and showing a case in which a light transmissive display unit is in a display state and a warning display unit is in a non-display state.

In Step S5104, the display controller 5078 starts and continues to display the state of the vehicle of each of the light transmissive display units 5050*a* and 5050*b* based on the display control specification determined in Step S5102 (refer to FIG. 88). After the processing in Step S5104, the process proceeds to Step S5105.

In Step S5105, when the abnormality information indicating the abnormality of the specific portion of the vehicle is not input, the display controller 5078 determines whether or not the warning lamp 5042 to be lighted and displayed exists in each of the warning lamps 5042 of the warning display units 5040*a* and 5040*b*. If a negative determination is made in Step S5105, the process returns to Step S5104. If an affirmative determination is made in Step S5105, the process proceeds to Step S5106.

Figure 89:
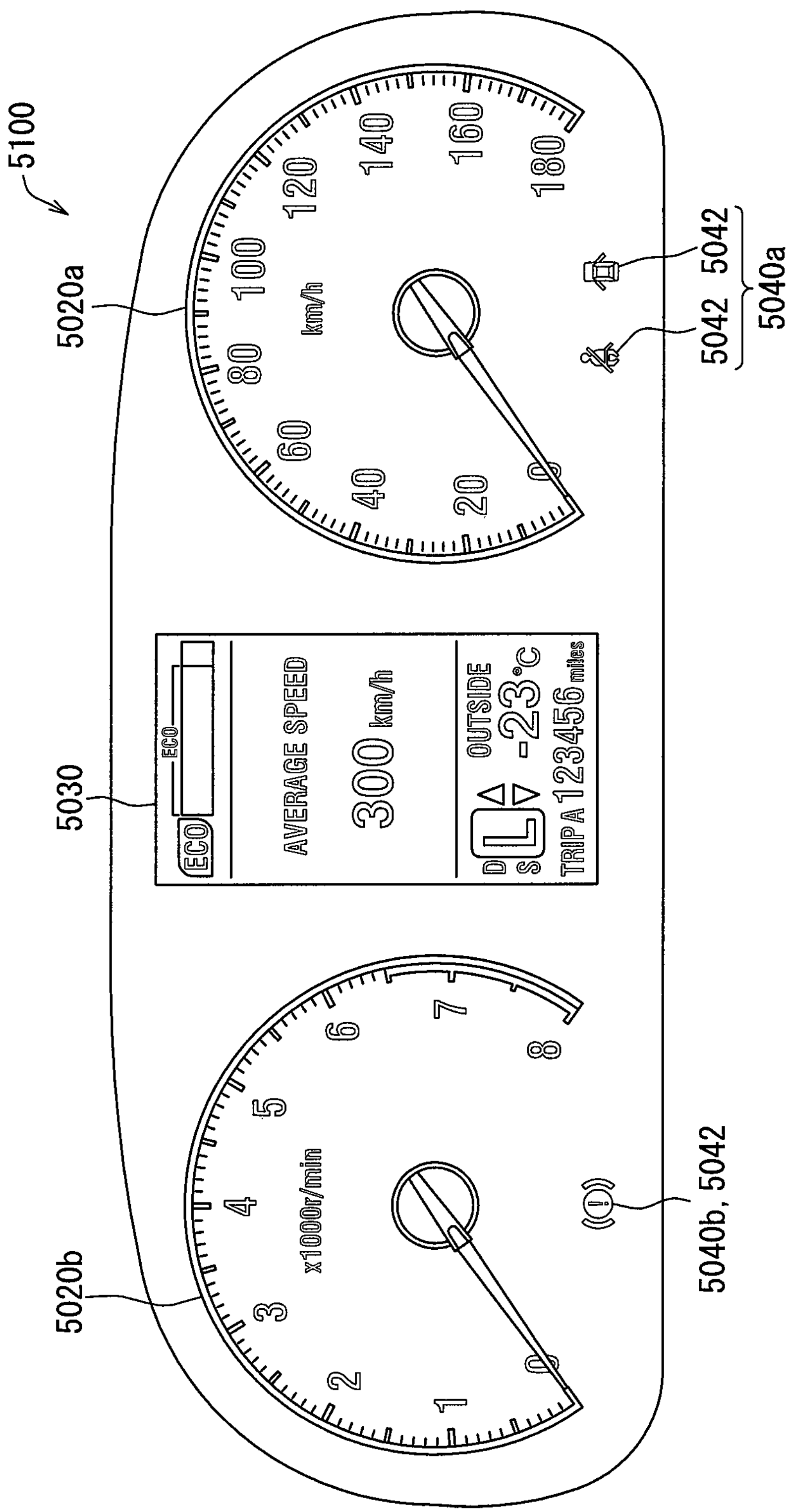
FIG. 89 is a diagram showing an example of display in the twelfth embodiment, and showing a case in which the light transmissive display unit is in the non-display state and the warning display unit is in the display state.

In Step S5106, the display controller 5078 turns on the warning light 5042 to be turned on and starts displaying the warning. At the same time, in the light transmissive display units 5050*a* and 5050*b*, the light transmissive display unit 5050*a* or 5050*b* corresponding to the warning display unit 5040*a* or 5040*b* to which the lighted warning lamp 5042 belongs is temporarily turned off. When warning lights 5042 for lighting and displaying exist in both of the warning display units 5040*a* and 5040*b*, both of the light transmissive display units 5050*a* and 5050*b* are temporarily turned off (refer to FIG. 89). Temporary turning-off of the light transmissive display units 5050*a* and 5050*b* is continued for a predetermined time of about 1 to 3 seconds, and thereafter, the process proceeds to Step S5107.

Figure 90:
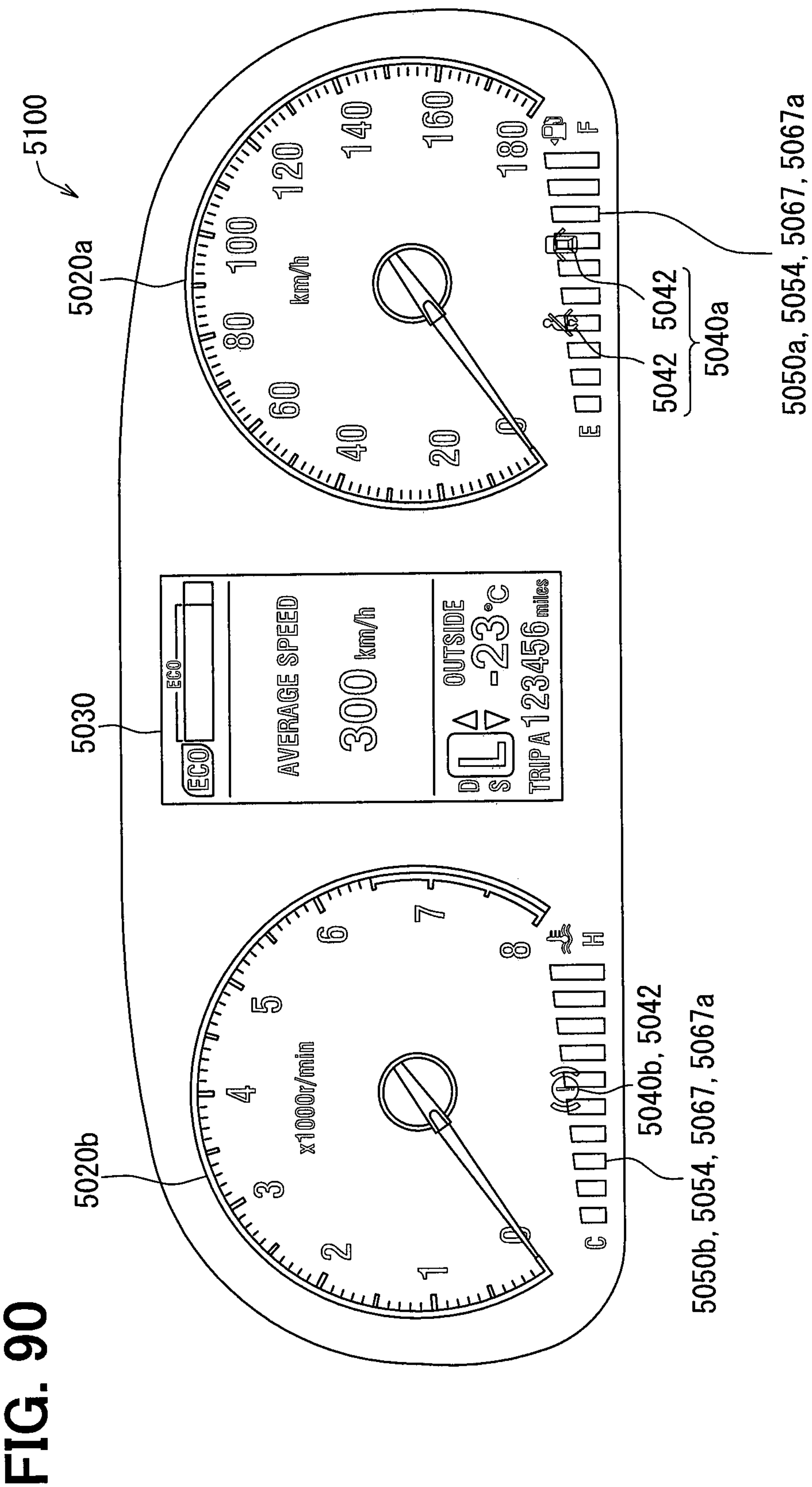
FIG. 90 is a diagram showing an example of display according to the twelfth embodiment, and showing a case in which the light transmissive display unit and the warning display unit are displayed in a superimposed manner.

In Step S5107, the display controller 5078 causes the light transmissive display unit 5050*a* or 5050*b*, which has been temporarily turned off, to be displayed on the warning light 5042, which has started lighting in Step S5106, while continuing the display of the warning, and displays the warning display unit 5040*a* or 5040*b* and the light transmissive display unit 5050*a* or 5050*b* corresponding to the warning display unit in a superimposed manner (refer to FIG. 90). After the processing in Step S5107, the process proceeds to Step S5105 again.

In other words, with repetition of the processing from Step S5105 to Step S5107, while the warning of the warning lamp 5042 of the warning display unit 5040*a* or 5040*b* is displayed, the display content of the corresponding light transmissive display unit 5050*a* or 5050*b* is visually recognized as if the display is flashing.

Then, when the abnormality information indicating the abnormality of the specific place of the vehicle is not input, that is, when the abnormality is resolved and the display of the warning becomes unnecessary, a negative determination is made in Step S5105, and thus the processing of Step S5104 and Step S5105 is repeated. Therefore, only the display contents of the light transmissive display units 5050*a* and 5050*b* are continuously displayed, and the warnings of the warning display units 5040*a* and 5040*b* are in a non-display state.

In each of the drawings, multiple elements such as the scales 5067*a* are only partially denoted by reference symbols.

According to the present embodiment, the light transmissive display units 5050*a* and 5050*b* light and display the display contents different from those of the warning display units 5040*a* and 5040*b* in the regions SPa and SPb superimposed on the display of the warning on the light transmissive plate 5052. In this example, since the light transmissive plate 5052 through which the display of the warning is transmitted is disposed on the viewing side of the warning display units 5040*a* and 5040*b*, the warning is displayed deeper than the display contents of the light transmissive display units 5050*a* and 5050*b*, and a stereoscopic effect can be produced. The display contents of the light transmissive display units 5050*a* and 5050*b* which are lighted and displayed in the normal state are temporarily turned off when warnings are displayed by the warning display units 5040*a* and 5040*b*. Since the display content of the light transmissive display units 5050*a* and 5050*b* disappears, not only the display of the warning becomes easy to visually recognize, but also the display of the warning becomes conspicuous due to the change of the display due to the turning-off of the light, the display becomes easy to attract the attention of the viewer. As described above, with an improvement in the stereoscopic effect and display of the warning with excellent visibility, the vehicle display device 5100 can be provided in which the viewer can easily recognize the warning.

Further, according to the present embodiment, while warnings of the warning display units 5040*a* and 5040*b* are displayed, the display contents of the light transmissive display units 5050*a* and 5050*b* blink. This makes it easier to pay attention to the display of the warning due to the blinking, and also makes it possible to avoid a situation in which the display contents of the light transmissive display units 5050*a* and 5050*b* cannot be recognized at all.

Further, according to the present embodiment, since the display colors of the display units 5040*a*, 5040*b* and 5050*a*, 5050*b* are different from each other, it is easy to distinguish between the two displays, and the visibility is enhanced. Further, according to the present embodiment, the lighting display of the display content in the light transmissive display units 5050*a* and 5050*b* is realized by the reflective portion 5054 which reflects the light from the light source unit 5058 which provides the light inside the light transmissive plate 5052 to the viewing side. In the lighting display of such display contents, the three-dimensional effect with the display of the warning is further enhanced by a novel appearance. Since the display content of the novel appearance is turned off when the warning is displayed by the warning display units 5040*a* and 5040*b* while attracting the attention of the viewer, the visual attractiveness of the warning display is further enhanced.

According to the present embodiment, a part or all of the scales 5067*a* of the scale pattern 5067 is lighted and displayed as the display content of the light transmissive display units 5050*a* and 5050*b*, thereby displaying the state of the vehicle. The display space can be saved by displaying the state of the vehicle different from the warning in the regions SPa and SPb superimposed on the display of the warning by the warning display units 5040*a* and 5040*b*.

In addition, according to the present embodiment, the light transmissive display units 5050*a* and 5050*b* include a light shielding compartment portion 5060 having a light shielding property for partitioning each light emitting device 5058*a* between the light emitting devices 5058*a* disposed adjacent to each other. In this manner, since the light emitted from the light emitting devices 5058*a* disposed adjacent to each other is prevented from mixing with each other, independent light emission of the scales 5067*a* corresponding to each light emitting device 5058*a* individually can be easily realized.

As Modification 1 of the twelfth embodiment, the light transmissive display units 5050*a* and 5050*b* may display a display content other than the scale pattern 5067. For example, a mark indicating the state of the vehicle, a pattern for decoration, or the like may be adopted as the display content.

As Modification 2, the light transmissive display units 5050*a* and 5050*b* may not display the display content by the reflective portion 5054 which reflects the light from the light source unit 5058. For example, an organic EL display may be employed as the light transmissive plate 5052, and the display content may be displayed by an organic EL display.

In Modification 3, the warning display units 5040*a* and 5040*b* may not display the warning by lighting the warning lamp 5042 printed on the display plate 5018. For example, the warning display units 5040*a* and 5040*b* may display a warning by an image of a liquid crystal panel or an organic EL display.

As Modification 4, the display controller 5078 may continue to turn off the display contents of the light transmissive display units 5050*a* and 5050*b* while the warnings of the warning display units 5040*a* and 5040*b* are displayed.

Here, the device disclosed in JP 2008-122214 A, which is a prior art example of the vehicle display device according to the twelfth embodiment, has a display panel and a display plate. The display panel is formed to be able to display warnings such as various warning messages or warning lights. The display plate is disposed on the viewing side of the display panel, and transmits the warning display in the window portion.

In addition, the display plate forms a hairline pattern in a region other than the window portion. The display panel displays a pattern continuous with the hairline pattern as a background.

In the device described above, both the warning display and the display content such as the hairline pattern are displayed by the same display panel, so that both the displays are visually recognized in a planar manner and the stereoscopic effect is poor. Further, since both of the displays are displayed simultaneously, the warning display is hardly conspicuous and the visibility is not excellent. This makes it difficult for the viewer to recognize the warning.

On the other hand, according to the twelfth embodiment, in order to provide a vehicle display device in which the warning is easily recognized by the viewer by improving the stereoscopic effect and displaying the warning with excellent visibility, (1) the display device for a vehicle includes:

a warning display unit (5040*a*, 5040*b*) that formed to be capable of displaying the warning;

a light transmissive display unit (5050*a*, 5050*b*) that includes a light transmissive plate (5052) disposed on a viewing side of the warning display unit and transmitting the warning display, and lights and displays the display content different from the warning display unit in the region (SPa, SPb) overlapped with the warning display unit at normal times; and a display controller (5078) for controlling the display of the warning display unit and the light transmissive display unit, in which the display controller temporarily extinguishes the warning display content of the warning display unit when displaying the warning of the warning display unit.

The features of the vehicle display device according to the twelfth embodiment are described above, but the features of the lower hierarchy are listed as follows. In order to show a relationship with the above-mentioned features, "the above" is added to each configuration in the description.

(2) The display controller blinks the display content of the light transmissive display unit while the warning of the warning display unit is displayed.

(3) The display color of the display content of the light transmissive display unit is different from the display color of the warning of the warning display unit.

(4) The light transmissive display unit includes:

a light source unit (5058) for supplying the light to the inside of the light transmissive plate; and a reflective portion (5054) formed on the light transmissive plate for reflecting the light from the light source unit to the viewing side, thereby lighting and displaying the display content.

(5) The reflective portion includes a scale pattern (5067) including multiple scales (5067*a*) arrayed along the outer edge portion of the light transmissive plate as the display content, the light source unit includes multiple light emitting devices (5058*a*) individually corresponding to the respective scales, and the display controller individually controls turning on and turning off of each of the light emitting devices, thereby lighting and displaying a part or all of the scales of the scale pattern to display the state of the vehicle.

(6) The light transmissive display unit includes a light shielding compartment portion (5060) for partitioning each of the light emitting devices between the light emitting devices disposed adjacent to each other.

According to the above configuration, the light transmissive display unit lights up and displays a display content different from that of the warning display unit in a region overlapping with the warning display on the light transmissive plate. In this example, since the light transmissive plate through which the display of the warning is transmitted is disposed on the viewing side of the warning display unit, the display of the warning is displayed deeper than the display content of the light transmissive display unit, and a stereoscopic effect can be produced. The display content of the light transmissive display unit which is lighted and displayed in the normal state is temporarily turned off when the warning is displayed on the warning display unit. The disappearance of the display content of the light transmissive display unit not only makes the display of the warning easier to visually recognize, but also makes the display of the warning conspicuous due to the change of the display due to the turning-off of the light, which makes it easier to attract the attention of the viewer. As described above, with an improvement in the stereoscopic effect and display of the warning with excellent visibility, the vehicle display device can be provided in which the viewer can easily recognize the warning.

Thirteenth Embodiment

Figure 91:
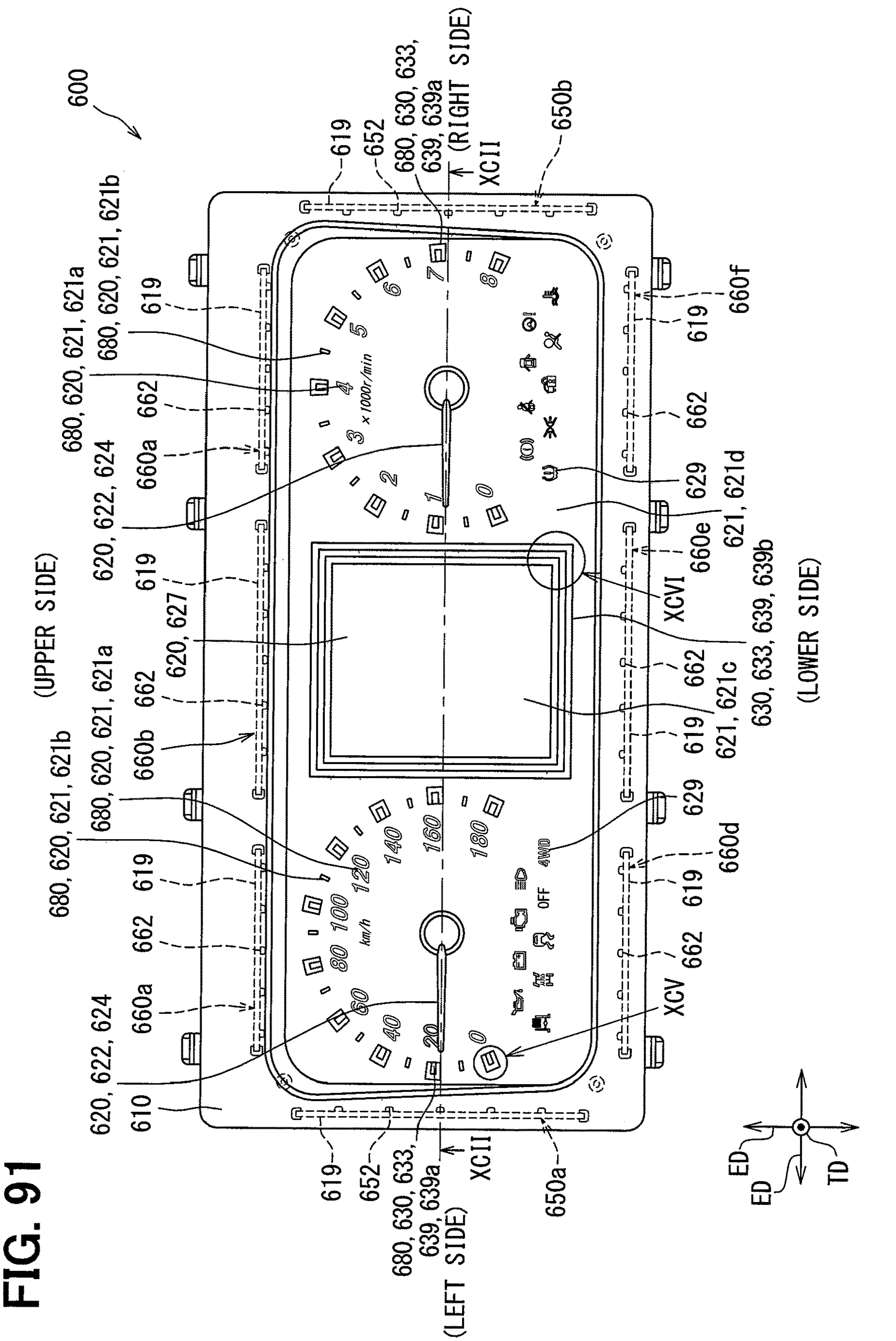
FIG. 91 is a front view of a display device for a vehicle according to a thirteenth embodiment.

As shown in FIG. 91, a vehicle display device 600 according to a thirteenth embodiment is mounted on a vehicle, and is installed on an instrument panel facing a seat on which an occupant who visually recognizes the device 600 is seated. The vehicle display device 600 is capable of displaying vehicle information toward a viewing side where the occupant is to be positioned.

In the present embodiment, a vertical direction is defined with reference to the vehicle on a horizontal plane. The left and right are defined with reference to the case where the occupant seated in the seat looks at the device 600 from the front.

Figure 92:
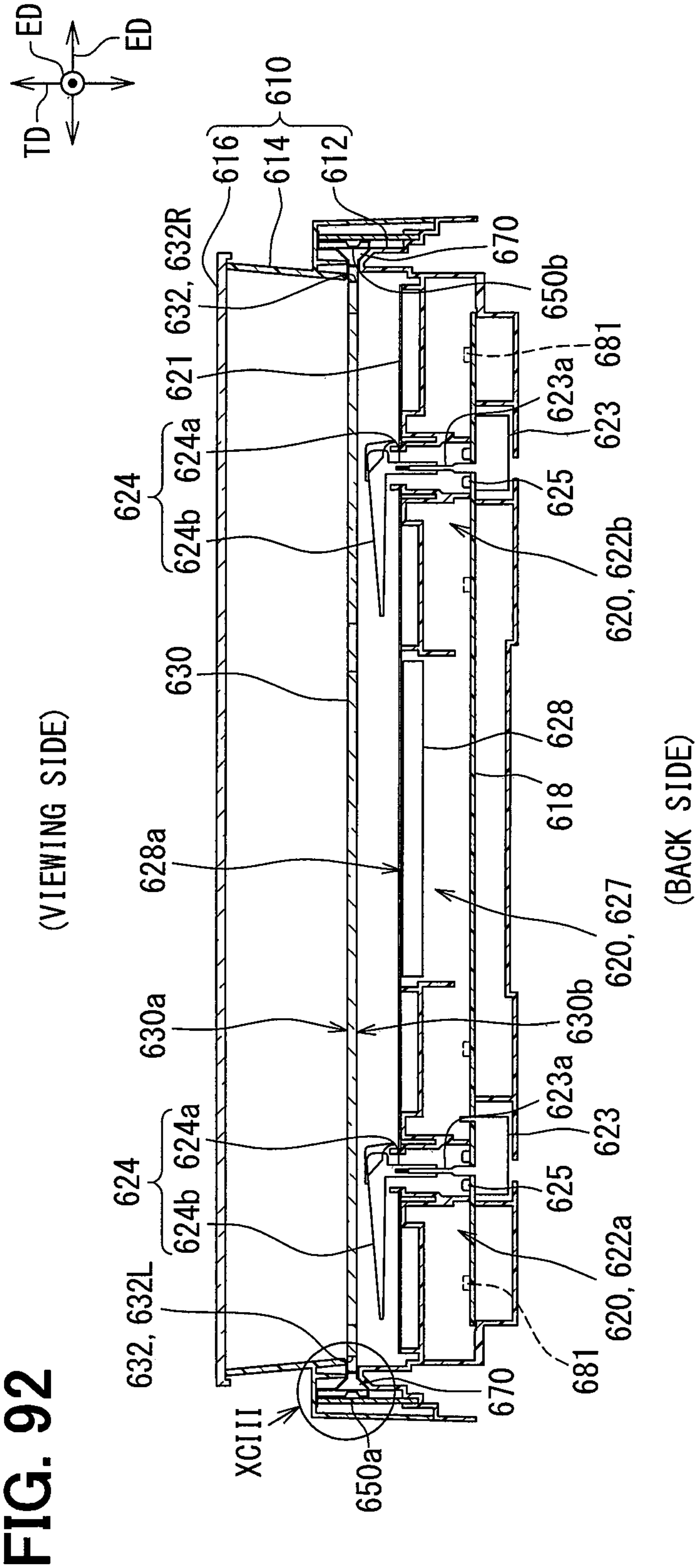
FIG. 92 is a cross-sectional view taken along a line XCII-XCII of FIG. 91.

As shown in FIG. 92, the vehicle display device 600 described above includes a case portion 610, a display main body portion 620, a light guide plate 630, multiple first light source units 650*a* and 650*b*, and multiple second light source units 660*a*, 660*b*, 660*c*, 660*d*, 660*e*, and 660*f*.

The case portion 610 includes a rear case 612, a window plate 614, and a light transmissive plate 616. The rear case 612 is made of, for example, a synthetic resin having a light shielding property, and covers the display main body portion 620 from a back side. The window plate 614 is made of, for example, a synthetic resin having a light shielding property, and is formed in a cylindrical shape having an opening portion on the viewing side and the back side opposite to the viewing side along an outer peripheral contour of the display main body portion 620. The light transmissive plate 616 is made of a semi-light transmissive resin such as colored acrylic resin, for example, in a plate-shape that closes a viewing-side opening portion of the window plate 614. As a result, the light guide plate 630 is covered with the light transmissive plate 616 from the viewing side. The transmittance of the light transmissive plate 616 according to the present embodiment is set to about 30% by the smoke-like coloring, but may be set to an arbitrary value of 30% or more.

The display main body portion 620 displays information on the vehicle with the use of the display plate 621. The display plate 621 is also generally called a dial plate, and is disposed between the rear case 612 and the light guide plate 630. The display plate 621 is formed in a flat plate-like shape by partially applying semi-light transmissive or light shielding printing on a surface of a base material made of, for example, a light transmissive synthetic resin on the viewing side. The printing may be replaced with coating.

The display main body portion 620 includes an image display unit 627, an indicator lamp portion 629, and a pointer display unit 622.

The image display unit 627 is disposed in a central region of the display plate 621. The image display unit 627 includes a liquid crystal display device 628 disposed on the back side of the display plate 621 and in close proximity to the display plate 621. The liquid crystal display device 628 according to the present embodiment employs an active matrix liquid crystal display panel formed of multiple liquid crystal pixels disposed in two dimensions, which is a liquid crystal panel using thin film transistors (Thin Film Transistor and TFTs). The liquid crystal display device 628 has a rectangular display surface 628*a* for displaying an image on the viewing side.

Further, in a region overlapping with the display surface 628*a* in the display plate 621, a light transmissive region 621*c* having a translucency due to the absence of printing is formed in a rectangular shape by being surrounded by a light shielding region 621*d* having a light shielding property by printing. The light transmissive region 621*c* is formed to have a size slightly smaller than the display surface 628*a*. The light of an image thus displayed on the display surface 628*a* passes through the display plate 621.

The indicator lamp portion 629 is disposed in a lower region of the display plate 621. The indicator lamp portion 629 includes multiple indicator lamps such as an indicator lamp indicating a direction of a headlamp and an indicator lamp indicating various warnings. Each of the indicator lamps displays information of the vehicle by illuminating a mark printed on the display plate 621 with a light emitting devices disposed on the back side of the display plate 621.

The multiple pointer display units 622 according to the present embodiment are provided by being disposed in the left region and the right region of the display plate 621. With the above placement, the image display unit 627 is disposed to be sandwiched between the two pointer display units 622 on the left and right sides.

In this example, since the two pointer display units 622 have the same configuration as each other, the left hand pointer display unit 622 will be described as a representative. The pointer display unit 622 includes a stepping motor 623 and a pointer 624. The stepping motor 623 is held by a main circuit board 618 disposed between the rear case 612 and the display plate 621, that is, on the back side of the display board 621.

The pointer 624 integrally includes a coupling portion 624*a* and an indicating portion 624*b*. The coupling portion 624*a* is disposed through a through hole provided in the display plate 621, and is coupled to a rotation shaft 623*a* of the stepping motor 623. The indicating portion 624*b* is disposed between the display plate 621 and the light guide plate 630, that is, on the viewing side of the display plate 621 and on the back side of the light guide plate 630, and has a needle shape. The pointer 624 rotates in accordance with the output of the stepping motor 623, and the information of the vehicle is displayed by indicating an indicator portion 680.

The pointer 624 emits a light by being illuminated by light emitting devices 625 disposed on the back side of the display plate 621.

The indicator portion 680 of the present embodiment is configured by characters 621*a* and secondary scales 621*b* disposed in a partial ring shape on the display plate 621, and scale patterns 639*a* disposed in a partial ring shape on the light guide plate 630 as a pattern 639. The characters 621*a* and the secondary scales 621*b* of the indicator portion 680 are surrounded by light shielding printing on the display plate 621, and are formed as a contour by semi-light transmissive printing. The light emitting devices 681 mounted on the main circuit board 618 illuminate the characters 621*a* and the secondary scales 621*b* from the back side, so that the characters 621*a* and the secondary scales 621*b* are displayed to emit a light.

In the present embodiment, the indicator portion 680 is divided into the characters 621*a* and the secondary scales 621*b* on the back side of the pointer 624 and the scale pattern 639*a* on the viewing side of the pointer 624, so that the occupant of the vehicle feels a stereoscopic effect.

In the present embodiment, the pointer 624 corresponding to the left region displays a speed of the vehicle as information on the vehicle. The pointer 624 corresponding to the region on the right side displays an engine speed of the vehicle as information on the vehicle.

The light guide plate 630 is made of, for example, a light transmissive synthetic resin, has a flat plate-like shape, and extends in each direction perpendicular to the plate thickness direction TD. The light guide plate 630 is disposed on the viewing side of the display main body portion 620 and substantially parallel to the display plate 621. The light guide plate 630 has a substantially rectangular shape having a viewing side plate surface 630*a* facing the viewing side and a back side plate surface 630*b* facing the back side. In the present embodiment, a plate thickness direction TD of the light guide plate 630 substantially coincides with a normal direction of the viewing side plate surface 630*a* and the back side plate surface 630*b*.

The first light source units 650*a* and 650*b* are provided at a total of two positions corresponding to a left outer edge portion 632L on the left side and a right outer edge portion 632R on the right side of the outer edge portion 632 of the light guide plate 630. The first light source unit 650*a* facing the left outer edge portion 632L has multiple light emitting devices 652 aligned with each other above the light source substrate 619 provided along the left outer edge portion 632L. The first light source unit 650*b* facing the right outer edge portion 632R has multiple light emitting devices 652 aligned with each other above the light source substrate 619 provided along the right outer edge portion 632R.

In each of the first light source units 650*a* and 650*b*, light emitting diodes are employed in each light emitting device 652, and each light emitting device 652 emits the light when connected to a power supply. In particular, in the present embodiment, each of the light emitting devices 652 is a multicolor light emitting diode, but each of the light emitting devices 652 in the same first light source unit 650*a* or 650*b* is controlled to emit the light in substantially the same color and substantially the same luminance.

Figure 94:
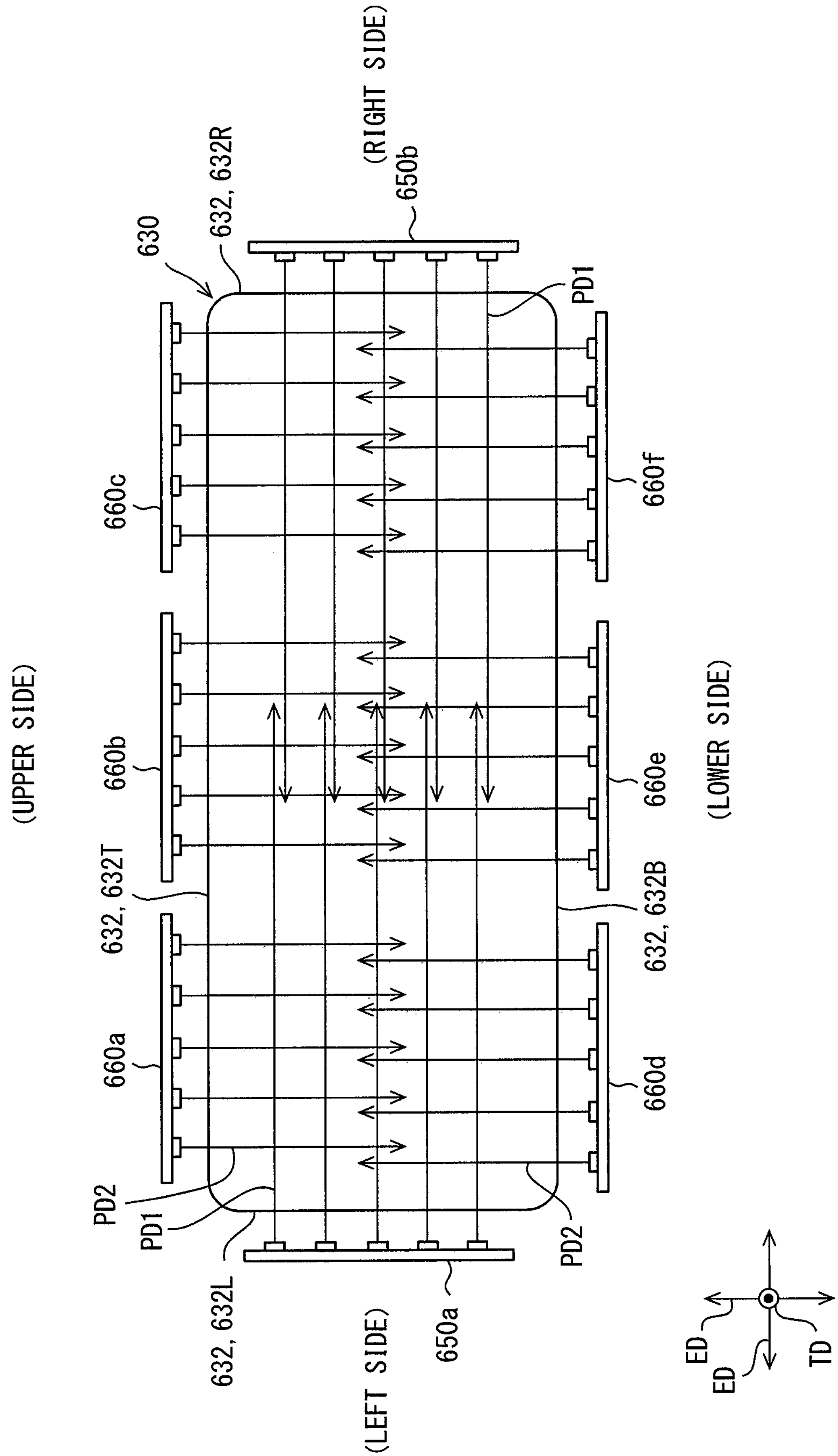
FIG. 94 is a front view of a light guide plate illustrating a relationship between a first light source light and a second light source light.

The second light source units 660*a* to 660*f* are provided at a total of six places, that is, three places of the outer edge portions 632 of the light guide plate 630 corresponding to an upper outer edge portion 632T and three places of the outer edge portions 632 corresponding to a lower outer edge portion 632B (refer also to FIG. 94). The three second light source units 660*a* to 660*c* facing the upper outer edge portion 632T are aligned with each other in a horizontal direction. The second light source unit 660*a* on the left side has multiple light emitting devices 662 aligned with each other on a light source substrate 619 provided along a left side of the upper outer edge portion 632T. The second light source unit 660*b* at the center has multiple light emitting devices 662 aligned with each other on the light source substrate 619 provided along a center portion of the upper outer edge portion 632T. The right second light source unit 660*c* has multiple light emitting devices 662 on the light source substrate 619 arrayed along the right side of the upper outer edge portion 632T.

The second light source units 660*d* to 660*f* at three points facing the lower outer edge portion 632B are aligned with each other in the horizontal direction. The second light source unit 660*d* on the left side has multiple light emitting devices 662 aligned with each other on the light source substrate 619 provided along a left side of the lower outer edge portion 632B. The second light source unit 660*e* at the center has multiple light emitting devices 662 aligned with each other on the light source substrate 619 provided along a center portion of the lower outer edge portion 6326. The second light source unit 660*f* at the right has multiple light emitting devices aligned with each other on the light source substrate 619 provided along a right side of the lower outer edge portion 6326.

In each of the second light source units 660*a* to 660*f*, light emitting diodes are employed in each light emitting device 662, and each light emitting device 662 emits the light when connected to a power supply. In particular, in the present embodiment, each of the light emitting devices 662 is a multicolor light emitting diode, but each of the light emitting devices 662 in the same second light source unit 660*a* to 660*f* is controlled to emit the light in substantially the same color and substantially the same luminance.

Thus, the light emitting devices 652 and 662 of the respective light source units 650*a* to 650*c* and 660*a* to 660*f* surround the outer edge portion 632 of the light guide plate 630 over the entire circumference.

Figure 93:
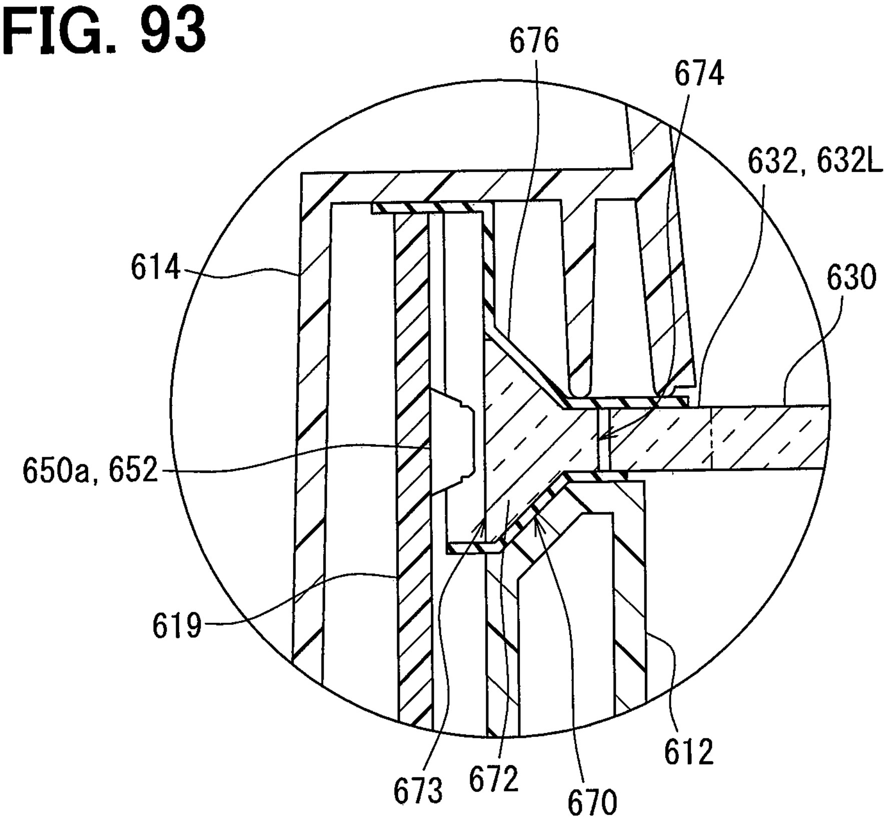
FIG. 93 is an enlarged view of a portion XCIII of FIG. 92.

In this example, an outer edge member 670 as shown in FIG. 93 is provided between the light emitting devices 652 and 662 of the respective light source unit 650*a* to 650*c*, 660*a* to 660*f* and the outer edge portion 632 of the light guide plate 630. The outer edge member 670 integrally includes an outer edge light guide portion 672 and a light shielding portion 676 by two-color molding. The outer edge light guide portion 672 is made of, for example, a light transmissive synthetic resin so as to guide the first light source light or the second light source light. The outer edge light guide portion 672 has a plate facing surface 674 facing the outer edge portion 632 of the light guide plate 630, and a light source facing surface 673 facing the light emitting devices 652 or 662. Each of the light source facing surface 673 and the plate facing surface 674 is formed in a smooth planar shape.

The light shielding portion 676 is made of, for example, an elastomer having a light shielding property, and has a cylindrical shape surrounding a portion of the outer edge light guide portion 672 except for the facing surfaces 673 and 674. As a result, when the light source light emitted by the light emitting devices 652 or 662 is guided by the outer edge light guide portion 672, the light source light is less likely to leak to the outside of the light shielding portion 676. The light shielding portion 676 extends toward the light guide plate 630 side of the plate facing surface 674.

The outer edge member 670 is held between the rear case 612 and the window plate 614. Further, the outer edge member 670 holds the light guide plate 630 by sandwiching the light guide plate 630 between the light guide plate side end portions of the light shielding portion 676. Because of the flexibility of the elastomer of the light shielding portion 676, abnormal noises such as collision noises between the light guide plate 630 and the case portion 610, which may occur in response to vibration of the vehicle, are reduced.

As shown in FIG. 94, a first light source light and a second light source light emitted from light emitting devices 652 and 662 of the respective light source units 650*a* to 650*c* and 660*a* to 660*f* through the outer edge portion 632 is supplied to the inside of the light guide plate 630. Inside the light guide plate 630, the first light source light and the second light source light from the light source units 650*a* to 650*c* and 660*a* to 660*f* proceed in the direction in which the light guide plate 630 extends (hereinafter, referred to as an extension direction ED). In this example, the light source light traveling in the extension direction ED of the light guide plate 630 may be a light traveling linearly along the extension direction ED inside the light guide plate 630, or may be a light traveling in the extension direction ED of the light guide plate 630 as a result of traveling in a zigzag manner while being reflected by the plate surfaces 630*a* and 630*b* on both sides inside the light guide plate 630.

Specifically, the first light source light from the first light source unit 650*a* travels from the left side to the right side inside the light guide plate 630. The first light source light from the first light source unit 650*b* travels from the right side to the left side inside the light guide plate 630. Each second light source light from the second light source units 660*a* to 660*c* travels from an upper side to a lower side within the light guide plate 630. Each second light source light from the second light source units 660*d* to 660*f* travels from the lower side to the upper side within the light guide plate 630. In other words, the first light source light proceeds in the extension direction ED so as to intersect with the second light source light inside the light guide plate 630. In other words, the second light source light travels in the extension direction ED so as to intersect with the first light source light inside the light guide plate 630. In the present embodiment, a traveling direction PD1 of the first light source light having a maximum intensity and a traveling direction PD2 of the second light source light having a maximum intensity are substantially orthogonal to each other.

As shown in FIG. 91, the light guide plate 630 has a reflective display unit 633 at an intersection of the first light source light and the second light source light. The reflective display unit 633 can display a pattern 639 on the viewing side by providing a display region DA in the shape of a pattern 639.

Figure 95:
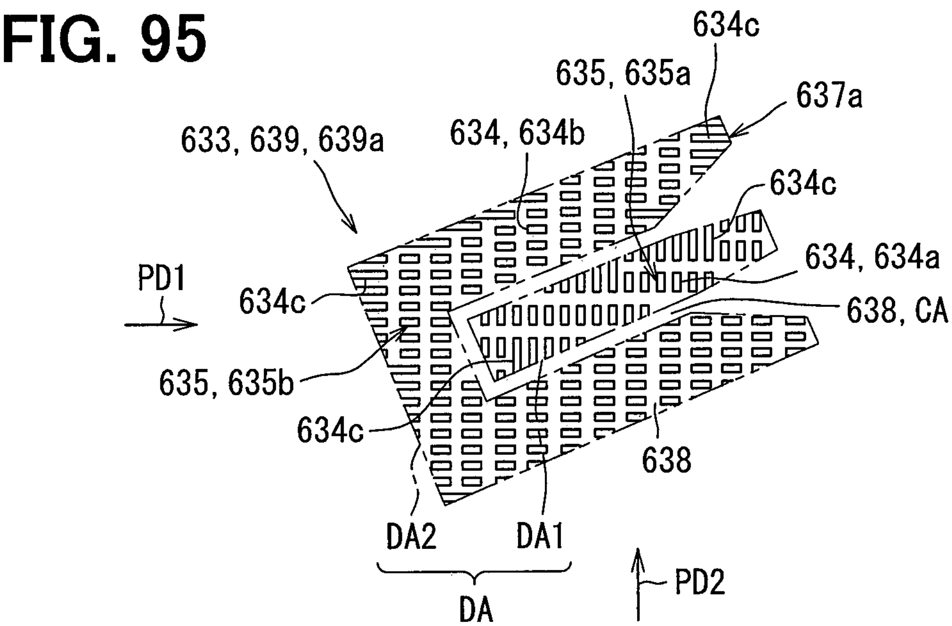
FIG. 95 is an enlarged view of a portion XCV of FIG. 91.
Figure 96:
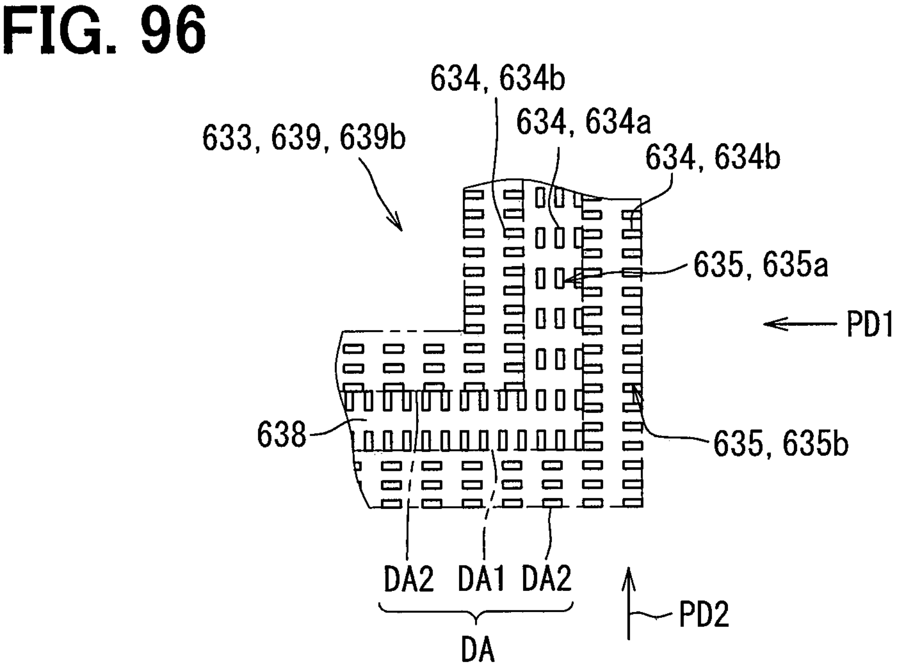
FIG. 96 is an enlarged view of a portion XCVI of FIG. 91.
Figure 97:
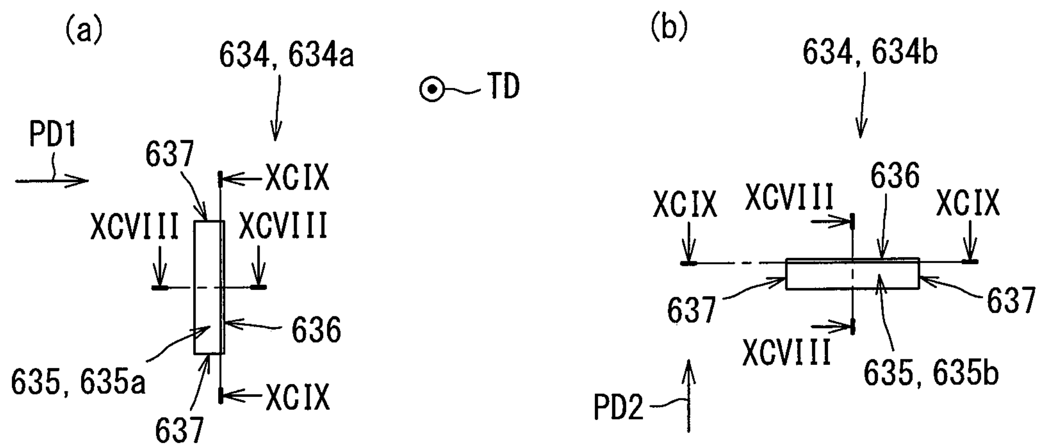
FIG. 97 is an enlarged view illustrating a reflective element having a scale pattern of FIG. 95, in which (a) shows an example of a first reflective element, and (b) shows an example of a second reflective element.
Figure 98:
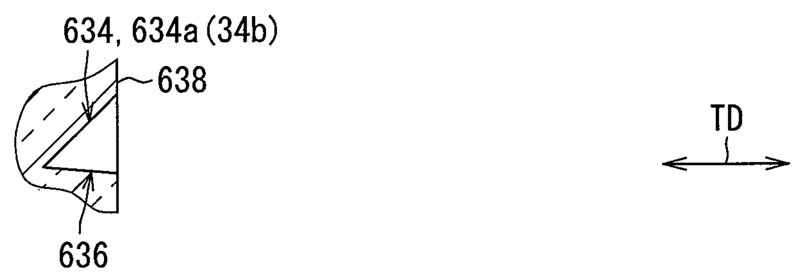
FIG. 98 is a cross-sectional view taken along a line XCVIII-XCVIII of FIG. 97.
Figure 99:
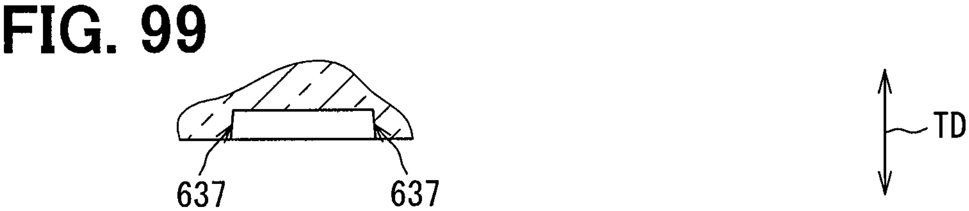
FIG. 99 is a cross-sectional view taken along a line XCIX-XCIX of FIG. 97.

In the display region DA of the reflective display unit 633, multiple reflective elements 634 for reflecting the first light source light or the second light source light to the viewing side are disposed along the extension direction ED, that is, in the vertical and horizontal directions in which the light guide plate 630 is extended. As shown in FIGS. 95 and 96, each of the reflective elements 634 is set to a fine size, and is formed in a concave hole shape recessed from the back side plate surface 630*b* of the light guide plate 630 into the interior of the light guide plate 630. As shown in FIGS. 97 to 99, the reflective elements 634 are each provided with a reflection surface 635 for reflecting the first light source light or the second light source light to the viewing side. Each of the reflective elements 634 includes a first reflective element 634*a* having a first reflection surface 635*a* oriented in a direction corresponding to the incidence of the first light source light as the reflection surface 635, and a second reflective element 634*b* having a second reflection surface 635*b* oriented in a direction corresponding to the incidence of the second light source light as the reflection surface 635. In addition, each first reflective element 634*a* and each second reflective element 634*b* have an inclined back surface 636 and two side surfaces 637.

The first reflection surface 635*a* is disposed so as to face the outer edge portion 632 on which the first light source light is incident. Specifically, in the first reflective elements 634*a* disposed on the left half of the light guide plate 630, the first reflection surface 635*a* faces a left outer edge portion 632L corresponding to the first light source unit 650*a*, and in the first reflective elements 634*a* disposed on the right half of the light guide plate 630, the first reflection surface 635*a* faces a right outer edge portion 632R corresponding to the first light source unit 650*b*. The first reflection surface 635*a* has a substantially rectangular shape long in the extension direction ED. The first reflection surface 635*a* is formed in a plane shape inclined with respect to the plate thickness direction TD so as to move away from the corresponding first light source unit 650*a* or 650*b* from the back side toward the viewing side. An angle formed by the first reflection surface 635*a* and the plate thickness direction TD is preferably set in a range of 39 to 45 degrees, and particularly set at 45 degrees in the present embodiment. In this manner, the first reflection surface 635*a* reflects the first light source light of the first light source light and the second light source light to the viewing side.

The second reflection surface 635*b* is disposed facing the outer edge portion 632 on which the second light source light is incident. Specifically, in the second reflective elements 634*b* disposed in an upper half of the light guide plate 630, the second reflection surface 635*b* faces an upper outer edge portion 632T corresponding to the second light source units 660*a* to 660*c*, and in the second reflective elements 634*b* disposed in a lower half of the light guide plate 630, the second reflection surface 635*b* faces a right outer edge portion 632R corresponding to the second light source units 660*d* to 660*f*. The second reflection surface 635*b* has a substantially rectangular shape long in the extension direction ED. The second reflection surface 635*b* is formed in a plane inclined with respect to the plate thickness direction TD so as to move away from the corresponding second light source units 660*a* to 660*c* or 660*d* to 660*f* from the back side toward the viewing side. An angle formed by the second reflection surface 635*b* and the plate thickness direction TD is preferably set in a range of 39 to 45 degrees, and particularly set at 45 degrees in the present embodiment. In this manner, the second reflection surface 635*b* reflects the second light source light of the first light source light and the second light source light to the viewing side.

The inclined back surface 636 is provided to face the opposite side to the reflection surface 635, so that one reflective element 634 is provided back-to-back with the reflection surface 635. The inclined back surface 636 is formed in a plane shape inclined by, for example, 5 degrees with respect to the plate thickness direction TD. In other words, since the inclination angle of the inclined back surface 636 is set to be smaller than the inclination of the reflection surface 635, even if the first or second light source light is reflected on the inclined back surface 636, the light is reflected in a direction that is not visible to the occupant.

The two side surfaces 637 are disposed between a side end portion of the reflection surface 635 and a side end portion of the inclined back surface 636 in a single reflective element 634, and are formed in a planar shape. The inclination angle of the side surface 637 is set smaller than the inclination of the reflection surface 635, and is set to be substantially the same as the inclination of the inclined back surface 636 or smaller than the inclination of the inclined back surface 636. Therefore, even if the first light source light or the second light source light is reflected by the side surface 637, the light is reflected in a direction that is not visible to the occupant.

As shown in FIGS. 91, 95, and 96, the reflective elements 634*a* and 634*b* allow the reflective display unit 633 to have a first display region DA1 and a second display region DA2 as the display region DA. The first display region DA1 is configured by disposing multiple first reflective elements 634*a* in the reflective elements 634. In the first display region DA1, the first reflective elements 634*a* are disposed one by one with a distance from each other through a flat portion 638 formed flat along the extension direction ED. In particular, according to the present embodiment, in the first display region DA1, the first reflective elements 634*a* are disposed in two-dimensional directions in the vertical direction and the horizontal direction in accordance with the traveling direction PD1 and the traveling direction PD2 in the extension direction ED.

The second display region DA2 is configured by disposing multiple second reflective elements 634*b* in the reflective elements 634. In the second display region DA2, the second reflective elements 634*b* are disposed one by one with a distance from each other through a flat portion 638 formed flat along the extension direction ED. In particular, according to the present embodiment, in the second display region DA2, the second reflective elements 634*b* are disposed in two-dimensional directions in the vertical direction and the horizontal direction in accordance with the traveling direction PD1 and the traveling direction PD2 in the extension direction ED.

Such a reflective display unit 633 forms the scale pattern 639*a* described above as the pattern 639 at a position facing the pointer display unit 622 of the light guide plate 630, that is, at a position where the first light source light from the first light source unit 650*a* intersects with the second light source light from the second light sources 660*a* and 660*d*, and at a position where the first light source light from the first light source unit 650*b* intersects with the second light source light from the second light sources 660*c* and 660*f*. In addition, the reflective display unit 633 forms a frame pattern 639*b* enclosing the image display unit 627 as the pattern 639 at a portion of the light guide plate 630 facing the image display unit 627, that is, at a portion at which the first light source light from the first light source units 650*a* and 650*b* and the second light source light from the second light source units 660*b* and 660*e* intersect with each other.

In this example, since the two scale patterns 639*a* have the same configuration as each other, the left scale pattern 639*a* will be described as a representative. As shown in an enlarged view in FIG. 95, the scale pattern 639*a* is disposed in a partial ring shape corresponding to the positions of the characters 621*a* and the secondary scales 621*b* of the display plate 621. The scale pattern 639*a* is displayed by a combination of the first display region DA1 and the second display region DA2. The inner portion disposed inwardly of the scale pattern 639*a* is shaped to extend radially about the rotation shaft 623*a*, and is configured by the first display region DA1. In the inner portion, the inner peripheral side as the side of the pointer 624 has a tapered shape in which the width becomes smaller toward a tip.

The outer portion of the scale pattern 639*a* disposed on the outside has a U-shape surrounding the inner portion from the outer peripheral side opposite to the pointer 624, and is configured by the second display region DA2. In the outer portion, the inner peripheral side as the side of the pointer 624 has a tapered shape in which the width becomes smaller toward the tip. The reflective display unit 633 has a gap region CA provided only by the flat portion 638 between the first display region DA1 configuring the inner portion and the second display region DA2 configuring the outer portion.

An outer contour of each display region DA displaying the scale pattern 639*a* has a portion inclined with respect to the traveling direction PD 1 of the first light source light and the traveling direction PD2 of the second light source light for appropriate representation of the pattern 639. A sectional side surface 637*a* extending in a direction oblique to the traveling directions PD 1 and PD2 in accordance with the outer contour is formed on the reflective element 634 in contact with the inclined portion of the outer contour. In the present embodiment, the reflective element 634 in contact with the inclined portion of the outer contour includes a large reflective element 634*c* formed to be larger than the reflective element 634 disposed at the center of the display region DA (the first display region DA1 or the second display region DA2). With the provision of the large reflective element 634*c* in this manner, the reflective element 634 having the sectional side surface 637*a* is secured with the reflection surface 635 having a size equal to or larger than a predetermined size.

The frame pattern 639*b* shown in FIG. 96 is formed in a rectangular annular shape in which each side extends along the traveling direction PD1 or the traveling direction PD2 so as to surround the entire periphery of the display surface 628*a* of the image display unit 627. The frame pattern 639*b* is displayed by a combination of the first display region DA1 and the second display region DA2. In the frame pattern 639*b*, a rectangular annular middle frame portion disposed at the center is configured by the first display region DA1. A rectangular annular inner frame portion disposed on the inner peripheral side and a rectangular annular outer frame portion disposed on the outer peripheral side of the frame pattern 639*b* are configured by the second display region DA2. In the frame pattern 639*b*, a gap region CA is not provided between the first display region DA1 configuring the middle frame portion and the second display region DA2 configuring the inner frame portion and the outer frame portion.

In the display of such a pattern 639, each light emitting device 652 of the first light source units 650*a* and 650*b* and each light emitting device 652 of the second light source units 660*a* to 660*f* emit the light in colors different from each other. For example, when each light emitting device 652 of the first light source units 650*a* and 650*b* emits the light in red and each light emitting device 662 of the second light source units 660*a* to 660*f* emits the light in blue, the first display region DA1 is displayed in red and the second display region DA2 is displayed in blue. In other words, in the scale pattern 639*a*, the inner portion is displayed in red, and the outer portion is displayed in blue. In the frame pattern 639*b*, the middle frame portion is displayed in red, and the inner frame portion and the outer frame portion are displayed in blue.

On the other hand, when a sport mode is selected in the vehicle, each light emitting device 652 of the first light source units 650*a* and 650*b* and each light emitting device 662 of the second light source units 660*a* to 660*f* emit the light in the same color. For example, when each light emitting device 652 of the first light source units 650*a* and 650*b* and each light emitting device 662 of the second light source units 660*a* to 660*f* emit the light in red, the first display region DA1 and the second display region DA2 are displayed in red. The sports mode of the vehicle is a state in which a vehicle control is performed so that an occupant can enjoy sporty driving, and for example, the engine speed is controlled to be high.

In addition, depending on the circumstances, one of each light emitting devices 652 of the first light source units 650*a* and 650*b* and each light emitting device 652 of the second light source units 660*a* to 660*f* turns on and the other light emitting device turns off under the control. In this manner, a part of the scale pattern 639*a* and the frame pattern 639*b* can be displayed. In other words, the reflection surfaces 635*a* and 635*b* to which the light source light is not provided do not emit the light and display. Further, since each of the reflective elements 634 is formed with a fine size and through the flat portion 638, the reflective element 634 having the reflection surface 635 to which the light source light is not provided is hardly visible to the occupant.

In each of the drawings, only a part of the reflective elements 634 and the like is only partially denoted by reference symbols for ease of viewing.

According to the present embodiment, the first reflection surface 635*a* is oriented in a direction corresponding to the incident of the first light source light, and the second reflection surface 635*b* is oriented in a direction corresponding to the incident of the second light source light with respect to the first light source light and the second light source light intersecting with each other inside the light guide plate 630. With the above orientations, the first light source light is reflected by the first reflection surface 635*a*, and the second light source light is reflected by the second reflection surface 635*b*. Accordingly, various expressions can be realized by, for example, the combination of turning on and turning off of the first light source units 650*a* and 650*b* and the second light source units 660*a* to 660*f*, and the combination of luminance, for example, and the combination of colors. As described above, the vehicle display device 600 can be provided which is remarkably excellent in appearance in the display of the pattern 639.

According to the present embodiment, the multiple reflective elements 634*a* having the first reflection surface 635*a* oriented in the direction corresponding to the incidence of the first light source light are disposed in the first display region DA1. In the second display region DA2, the multiple reflective elements 634*b* having the second reflection surface 635*b* oriented in the direction corresponding to the incidence of the second light source light are disposed. Since the pattern 639 is displayed with the use of the first display region DA1 and the second display region DA2, a part of the pattern 639 can be shown in a different expression from the other parts, and the appearance of the pattern 639 in the display becomes remarkably excellent.

In addition, according to the present embodiment, since the gap region CA is provided between the first display region DA1 and the second display region DA2, a situation can be avoided in which only the boundary portion between the first display region DA1 and the second display region DA2 is visually recognized with a high luminance, for example, or is visually recognized with mixed colors, for example. Therefore, the appearance of the pattern 639 on the display becomes better.

Further, according to the present embodiment, the scale pattern 639*a* indicated by the pointer 624 is displayed by the display region DA. Since various expressions can be made in the display of the scale pattern 639*a* which is likely to be noticed by being indicated by the pointer 624, an impression of excellent appearance is easily given.

In a configuration in which the multiple reflective elements 634 formed in the concave hole shape concaved inward from the plate surface 630*b* of the light guide plate 630 are arrayed in the display region DA, if the reflective element 634 having the same size as that of the reflective element 634 disposed in the center is disposed in the outer contour of the display region DA, the reflective element 634 may protrude from the outer contour and the appearance of the pattern 639 may be deteriorated. On the other hand, if the size of the reflective element 634 in the outer contour is reduced so as not to protrude from the outer contour, the reflective element 634 may be like a point, and each light source light may be diffusely reflected and the appearance of the pattern 639 may be deteriorated. Therefore, in the present embodiment, the reflective elements 634 in contact with the outer contour of the display region DA include large reflective elements 634*c* formed to be larger than the reflective elements 634 disposed at the center of the display region. Even if an end portion of the large reflective elements 634*c* is cut so as to be in contact with the outer contour, the diffuse reflection of each light source light is inhibited, so that the appearance in the display of the pattern 639 becomes further excellent.

Further, according to the thirteenth embodiment, the first light source units 650*a* and 650*b* and the second light source units 660*a* to 660*f* are provided so as to provide the light of different colors from each other. Since the color representation of the pattern 639 is varied, the appearance becomes further excellent.

Figure 100:
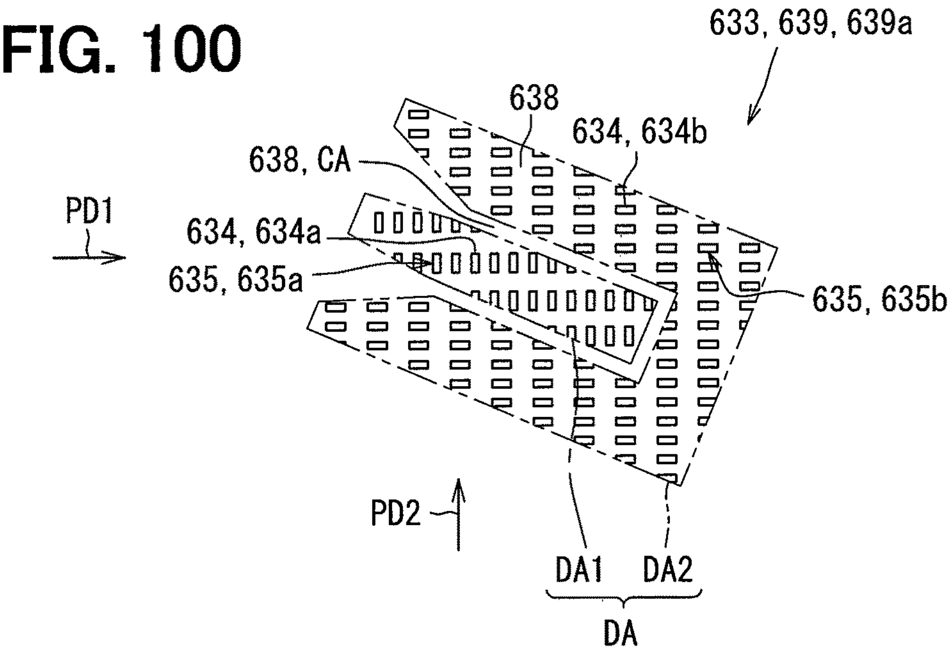
FIG. 100 is a diagram corresponding to FIG. 95 in Modification 1.

As Modification 1 of the thirteenth embodiment, as shown in FIG. 100, the large reflective elements 634*c* may not be included in the reflective elements 634 in contact with the outer contour of the display region DA.

Figure 101:
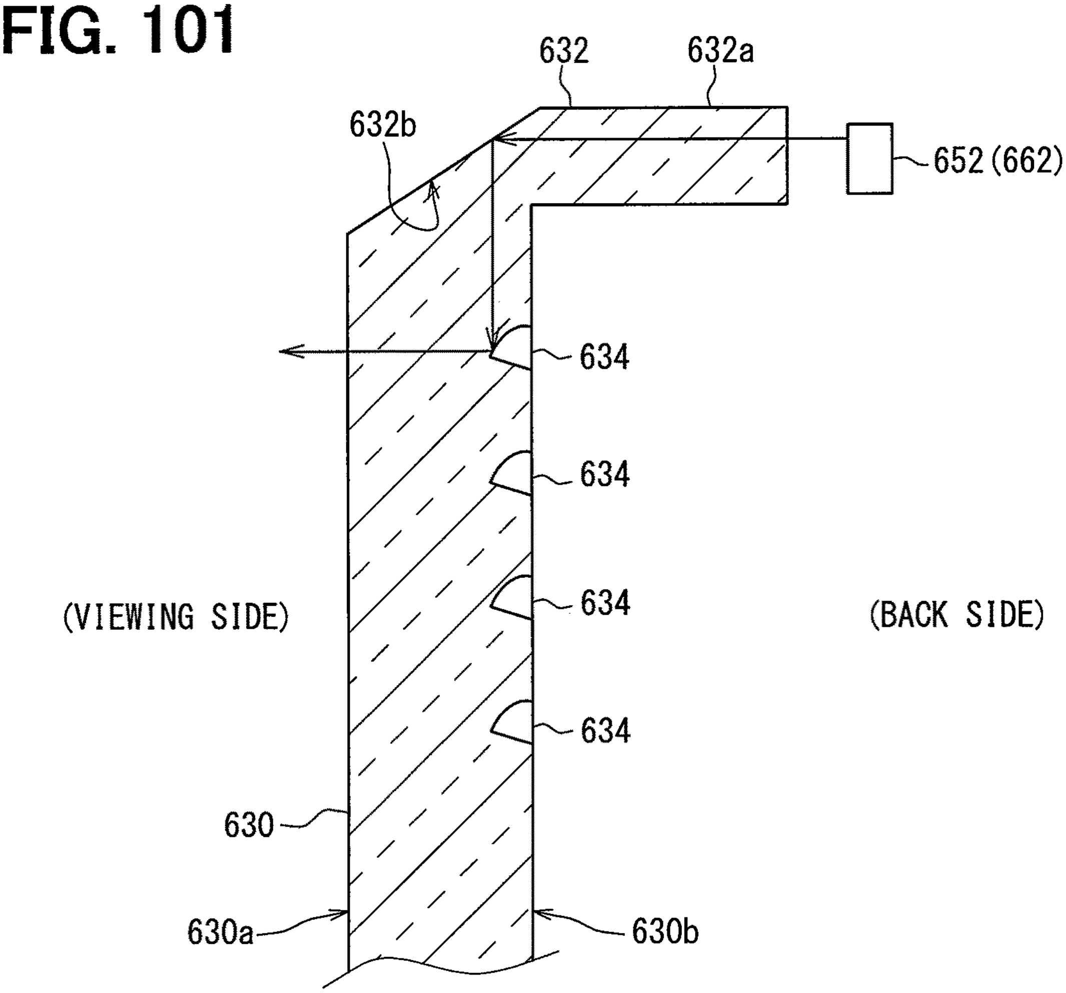
FIG. 101 is a diagram showing a relationship between an outer edge portion and a light source unit in Modification 2.

As Modification 2, as shown in FIG. 101, the light guide plate 630 may include, at the outer edge portion 632, a planar outer edge reflection surface 632*b* provided so as to be inclined to the back side toward the outside, and an outer edge light guide portion 632*a* extending from the outer edge reflection surface 632*b* to the back side. In an example of FIG. 101, multiple light emitting devices 652 or 662 of light source units 650*a*, 650*b* or 660*a* to 660*f* are disposed to face a tip end surface of the back side of the outer edge light guide portion 632*a*. The light source light emitted from the multiple light emitting devices 652 and 662 at positions different from each other is guided to the outer edge reflection surface 632*b* by the outer edge light guide portion 632*a*, and further reflected to the inside of the light guide plate 630 by the outer edge reflection surface 632*b*. In this manner, the first light source light and the second light source light are provided inside the light guide plate 630.

In Modification 3, the light emitting devices 662 of the second light source units 660*a* and 660*d*, the light emitting devices 662 of the second light source units 660*b* and 660*e*, and the light emitting devices 662 of the second light source units 660*c* and 660*f* may emit the light at different colors. In this manner, the scale patterns 639*a* and the frame patterns 639*b* can be displayed in different colors.

In Modification 3, the light emission amount of each light emitting device 652 of the first light source units 650*a* and 650*b* and the light emission amount of each light emitting device 662 of the second light source units 660*a* to 660*f* may be different from each other. In this manner, a part of the pattern 639 can be displayed with high luminance, and the expression of luminance contrast can be realized in one pattern 639.

In Modification 5, the reflection surface 635 may be formed in a curved shape.

The vehicle display device disclosed in JP 2016-121890 A, which is a prior art example of a vehicle display device according to the thirteenth embodiment, includes a light guide plate formed in a plate-shape having a light transmissive property, and a light source unit at one place for causing the light source light to enter the inside of the light guide plate through an outer edge portion of the light guide plate.

The light guide plate has a reflective display unit for displaying a pattern on the viewing side by a display region in which multiple reflective elements having a reflection surface for reflecting the light source light from the light source unit to the viewing side are aligned with each other along a direction in which the light guide plate extends. The reflection surface is oriented in a direction corresponding to the incidence of the light from the light source unit.

However, in the above configuration, the light from one light source unit is only reflected by the reflection surface oriented in the direction corresponding to the incident of the light from the light source unit, and the pattern is merely displayed. For that reason, only a single expression can be realized in the display of the pattern, and the appearance is not sufficient.

On the other hand, in accordance with a thirteenth embodiment, in order to provide a vehicle display device that is conspicuously visible and excellent in the display of a pattern, (1) a display device for a vehicle includes:

a light guide plate (630) that extends in a plate-shape that has a light transmissive property;

a first light source unit (650*a*, 650*b*) that provides a first light source light traveling in a direction in which a light guide plate extends inside the light guide plate; and a second light source unit (660*a*-660*f*) that provides a second light source light traveling in a direction in which the light guide plate extends so as to intersect with the first light source light inside the light guide plate.

The light guide plate has a reflective display unit (633) for displaying a pattern (639) on the display region side by multiple display regions (DA) disposed along an extending direction of a reflective element (634) provided with a reflection surface (635) for reflecting the first light source light or the second light source light on the viewing side extends at an intersection of the first light source light and the second light source light.

The reflective display unit has a first reflection surface (635*a*) which is oriented in a direction corresponding to the incidence of the first light source light as a reflection surface, and a second reflection surface (635*b*) which is oriented in a direction corresponding to the incidence of the second light source light as a reflection surface.

The features of the vehicle display device according to the thirteenth embodiment are as described above, but the features of the lower hierarchy are listed as follows. In order to show a relationship with the above-mentioned features, "the above" is added to each configuration in the description.

(2) The reflective display unit has as the display region, a first display region (DA1) in which multiple the reflective elements (634*a*) having the first reflection surface are disposed, and as the display region, a second display region (DA2) in which multiple the reflective elements (634*b*) having the second reflection surface are disposed.

(3) The reflective display unit includes a gap region (CA) between the first display region and the second display region.

(4) The vehicle display device further includes a rotating pointer (624), and the reflective display unit displays a scale pattern (639*a*) indicated by the pointer as the pattern.

(5) Each of the reflective elements is formed in a concave hole shape recessed inward from the plate surface of the light guide plate, and aligned with each other in the display region, and the reflective element in contact with the outer contour of the display region includes a large reflective element (634*c*) formed to be larger than the reflective element disposed in the center portion of the display region.

(6) The first light source unit and the second light source unit are provided so as to be able to provide lights of different colors from each other.

According to the above configuration, the first reflection surface is oriented in the direction corresponding to the incident of the first light source light, and the second reflection surface is oriented in the direction corresponding to the incident of the second light source light, with respect to the first light source light and the second light source light intersecting with each other inside the light guide plate. With the above orientations, the first light source light is reflected by the first reflection surface, and the second light source light is reflected by the second reflection surface. Therefore, various expressions can be realized by, for example, a combination of turning on and turning off of the first light source unit and the second light source unit, a combination of, for example, luminance, or a combination of, for example, colors. As described above, a vehicle display device can be provided which is remarkably excellent in appearance in the display of a pattern.

Fourteenth Embodiment

Figure 102:
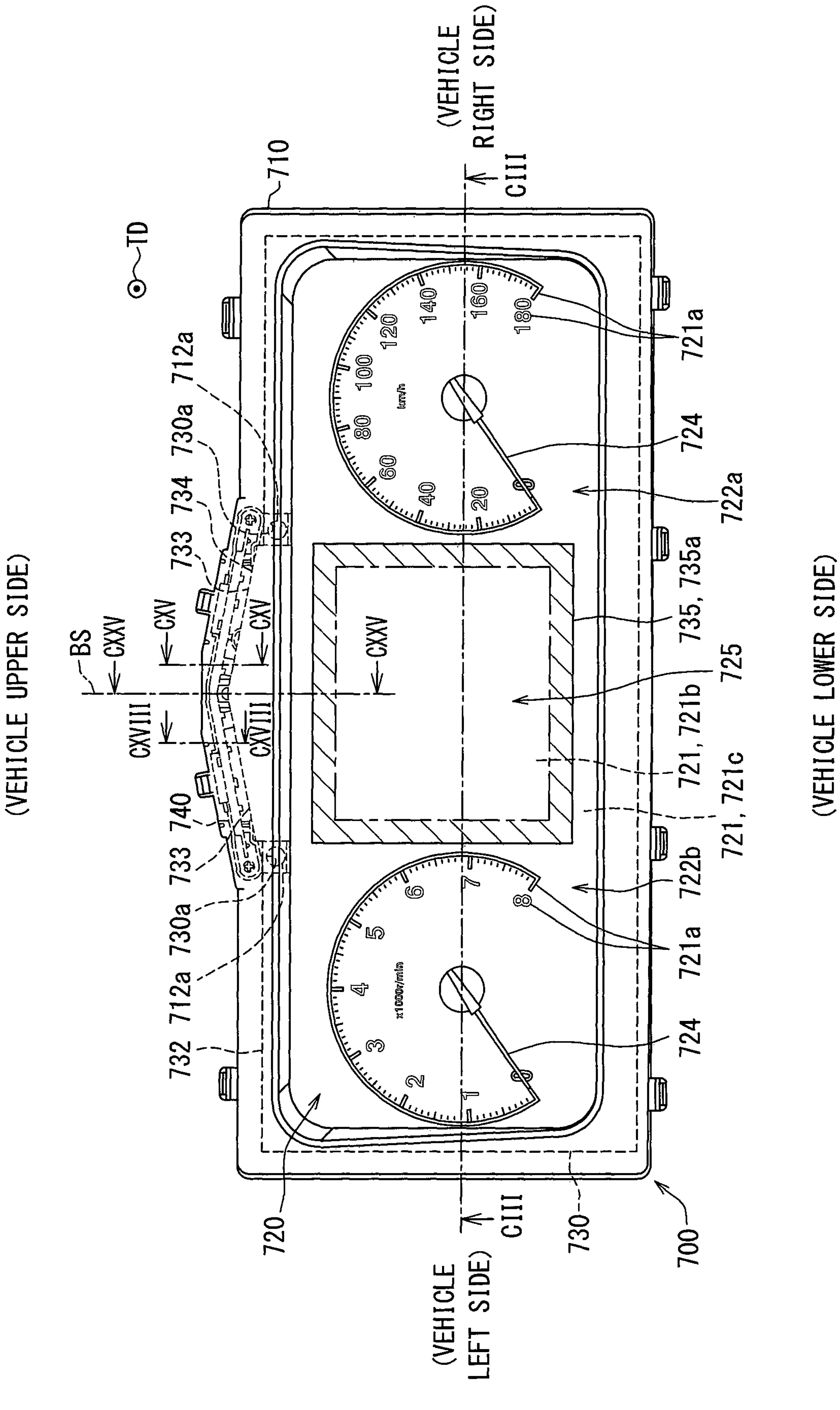
FIG. 102 is a front view of a display device for a vehicle according to a fourteenth embodiment.

As shown in FIG. 102, a vehicle display device 700 according to a fourteenth embodiment is mounted on a vehicle, and is installed on an instrument panel facing a seat on which an occupant who visually recognizes the device 700 is seated. The vehicle display device 700 is capable of displaying vehicle information toward the viewing side where the occupant is to be positioned. In the instrument panel, an upper surface portion is formed in a gentle curved surface shape projected to the upper side of the vehicle.

In the present embodiment, a lower side of the vehicle indicates the side on which gravity is generated in the vehicle on the horizontal plane. The upper side of the vehicle indicates an opposite side of the lower side of the vehicle. A left side of the vehicle or a right side of the vehicle indicates a left side or a right side with respect to the occupant seated in the seat.

Figure 103:
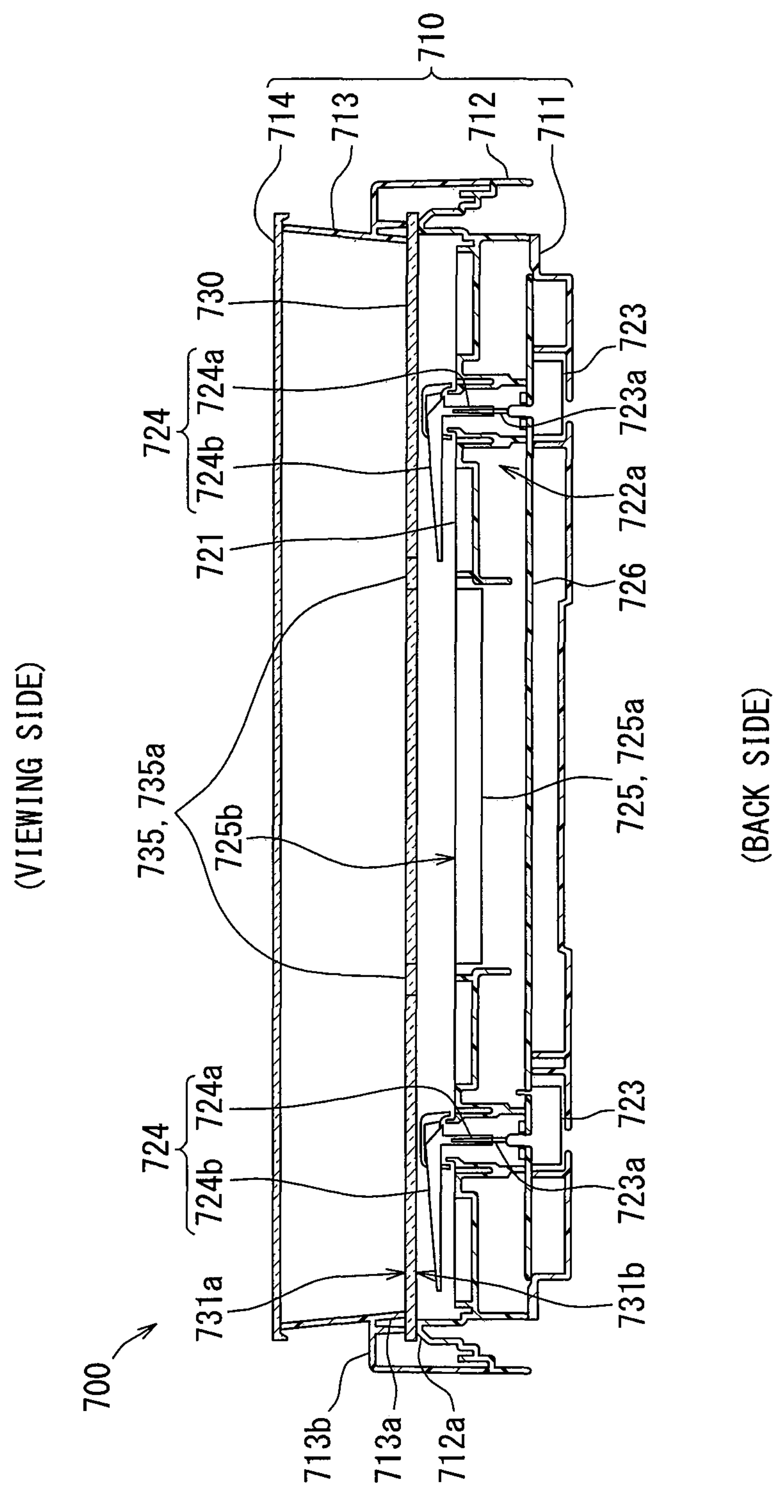
FIG. 103 is a cross-sectional view taken along a line CIII-CIII of FIG. 102.

As shown in FIG. 103, such a vehicle display device 700 includes a case portion 710, a main body display unit 720, a light transmissive display plate 730, a light irradiation unit 740, and the like.

The case portion 710 includes a rear case 711, a holding case 712, a plate window member 713, and a smoke plate 714. The rear case 711 is made of, for example, synthetic resin to have a light shielding property, and covers the main body display unit 720 from the back side opposite to the viewing side.

The holding case 712 disposed on the viewing side of the rear case 711 is made of, for example, synthetic resin with a light shielding property, and is formed in the shape of an outer frame case that surrounds the main body display unit 720 from the outer peripheral side. The holding case 712 holds the light transmissive display plate 730 and the light irradiation unit 740.

The plate window member 713 is made of, for example, a synthetic resin with a light shielding property, and is disposed on the viewing side of the main body display unit 720. The plate window member 713 is formed in a cylindrical shape having opening portions on the viewing side and the back side along an outer peripheral contour of the device 700.

The smoke plate 714 is made of a semi-light transmissive resin such as colored acrylic resin or polycarbonate resin, for example, and is formed in a curved plate-shape that closes the entire surface of the viewing-side opening portion of the plate window member 713. As a result, the main body display unit 720 and the light transmissive display plate 730 are visually recognized by the occupant through the smoke plate 714. The transmittance of the smoke plate 714 according to the present embodiment is set to about 30% by the smoke-like coloring, but may be set to an arbitrary value of 30% or more.

The main body display unit 720 includes a back side display plate 721, multiple pointer display units 722*a* and 722*b*, and an image display unit 725. The back side display plate 721 is also generally called a dial plate, and is disposed between the rear case 711 and the light transmissive display plate 730. The back side display plate 721 is formed in a flat plate-like shape by partially applying semi-light transmissive or light shielding printing on the surface on the viewing side of a light transmissive base material such as an acrylic resin or a polycarbonate resin, for example. The printing may be replaced with coating.

In the present embodiment, two of the multiple pointer display units 722*a* and 722*b* are provided, and are disposed in a region on the left side of the vehicle and a region on the right side of the vehicle of the back side display plate 721, respectively. In this example, since the two pointer display units 722*a* and 722*b* have the same configuration as each other, the pointer display unit 722*a* on the right side of the vehicle will be described as a representative.

The pointer display unit 722*a* includes a stepping motor 723 and a pointer 724. The stepping motor 723 is held by a main circuit board 726 disposed between the rear case 711 and the rear display plate 721, that is, on the back side further than the back side display plate 721.

The pointer 724 integrally includes a coupling portion 724*a* and an indicating portion 724*b*. The coupling portion 724*a* is disposed through a through hole 744 provided in the back side display plate 721, and is coupled to a rotation shaft 723*a* of the stepping motor 723. The indicating portion 724*b* is disposed on the viewing side of the back side display plate 721 and on the back side of the light transmissive display plate 730, and has a needle shape. The pointer 724 rotates in accordance with an output of the stepping motor 723, and information on the vehicle corresponding to the indicated position is displayed by indicating the indicator 721*a*.

The indicator 721*a* is formed by arraying scales and characters corresponding to the scales in a partial ring shape by printing on the back side display plate 721. In the present embodiment, the indicator 721*a* in the pointer display unit 722*a* on the right side is an indicator for displaying a speed of the vehicle. On the other hand, the indicator 721*a* in the pointer display unit 722*b* on the left side is an indicator for displaying an engine speed of the vehicle.

The image display unit 725 is disposed in a central region of the back side display plate 721. The image display unit 725 includes a liquid crystal display device 725*a* disposed between the back side display plate 721 and the main circuit board 726 and in close proximity to the back side display plate 721. The liquid crystal display device 725*a* according to the present embodiment employs a transmissive TFT liquid crystal panel using thin film transistors (TFTs) which is an active matrix liquid crystal panel formed of multiple liquid crystal pixels disposed in two dimensions. The liquid crystal display device 725*a* has a rectangular display surface 725*b* for displaying an image on the viewing side.

Further, in a region of the back side display plate facing the display surface 725*b*, a light transmissive region 721*b* having a transmissive property by not printing is formed in a rectangular shape by being surrounded by a light shielding region 721*c* having a light shielding property by printing. The light transmissive region 721*b* is formed in a size slightly smaller than the display surface 725*b*. The light of the image thus displayed on the display surface 725*b* passes through the light transmissive region 721*b* of the display plate 721 to the viewing side, and further passes through the light transmissive display plate 730.

The light transmissive display plate 730 is made of a synthetic resin such as an acrylic resin or a polycarbonate resin so as to be light transmissive, and has a flat plate-like shape having a viewing side plate surface 731*a* and a back side plate surface 731*b*. The light transmissive display plate 730 is provided substantially in parallel with the back side display plate 721. The viewing side plate surface 731*a* is formed to face the viewing side, and the back side plate surface 731*b* is formed to face the back side. In particular, the light transmissive display plate 730 according to the present embodiment is disposed with the inclusion of a region overlapping with the image display unit 725 in a region facing the back side display plate 721. In particular, the light transmissive display plate 730 according to the present embodiment covers the entire surface of the back side display plate 721 from the viewing side. The light transmissive display plate 730 is capable of transmissively displaying the display by the image display unit 725 of the main body display unit 720 on the viewing side by light transmission.

The light source light from the light irradiation unit 740 is introduced into the light transmissive display plate 730 through the outer edge portion 732 of the light transmissive display plate 730. In particular, in the present embodiment, the light source light is irradiated from the outer edge portion 732 on the upper side of the vehicle toward the lower side of the vehicle, and the light source light travels from the upper side of the vehicle toward the lower side of the vehicle even inside the light transmissive display plate 730.

In particular, in the outer edge portion 732 of the present embodiment, a pair of outer edges 733 are provided at positions facing the light irradiation unit 740. The pair of outer edge edges 733 are connected to the inside of the light transmissive display plate 730 at an obtuse angle. With the pair of outer edge edges 733, the light transmissive display plate 730 has an outer edge protrusion portion 734 protruding to the light irradiation unit 740 side above the vehicle at a position facing the light irradiation unit 740 of the outer edge portion 732.

Figure 104:
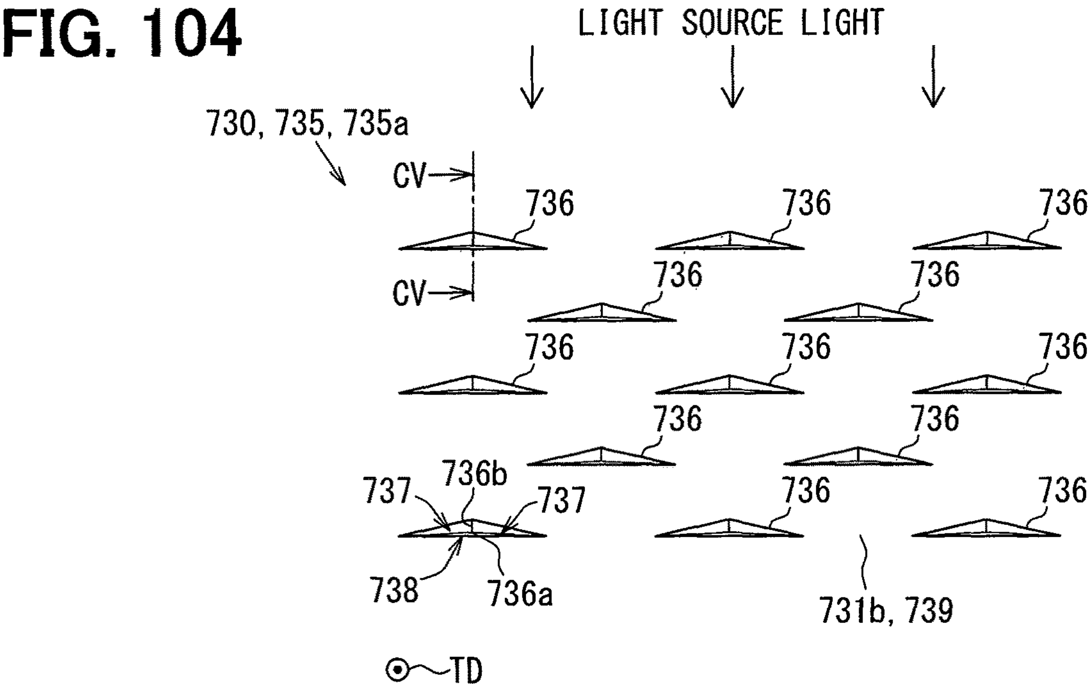
FIG. 104 is an enlarged view of a pattern portion of a reflective display unit of FIG. 102.

The light transmissive display plate 730 includes a reflective display unit 735. As shown in FIGS. 102 and 104, the reflective display unit 735 forms a pattern 735*a* which can be visually recognized macroscopically by arraying multiple reflective elements 736 of a fine size having a recess depth of about 5 to 20 μm two-dimensionally. Each of the reflective elements 736 reflects the light source light introduced into the light transmissive display plate 730 to the viewing side, so that the pattern 735*a* is displayed in a bright manner. In particular, in the present embodiment, the pattern 735*a* is disposed in a region of the light transmissive display plate 730 which faces the image display unit 725 across the back side display plate 721. More specifically, the pattern 735*a* according to the present embodiment is a frame pattern formed in a rectangular annular shape so as to border the entire periphery of the display surface 725*b* of the image display unit 725.

A receiving portion 712*a* of the holding case 712 receives the outer edge portion 732 of the light transmissive display plate 730 over the entire circumference, for example, so that the light transmissive display plate 730 is in contact with the holding case 712. Further, multiple holding pins 712*e* protruding from the receiving portion 712*a* are inserted into the holding holes 730*a* on the side of the light transmissive display plate 730, whereby the light transmissive display plate 730 is positioned with respect to the holding case 712. In this manner, the light transmissive display plate 730 is held by the holding case 712. At the same time, a protrusion portion 713*a* projecting toward the back side of the plate window member 713 presses the outer edge portion 732 of the light transmissive display plate 730, to thereby regulate a positional deviation of the light transmissive display plate 730.

Figure 105:
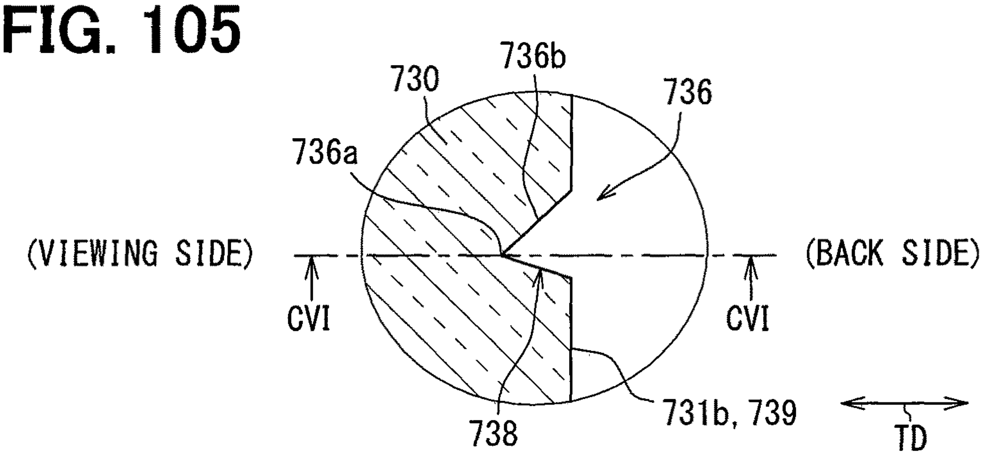
FIG. 105 is a cross-sectional view taken along a line CV-CV of FIG. 104.
Figure 106:
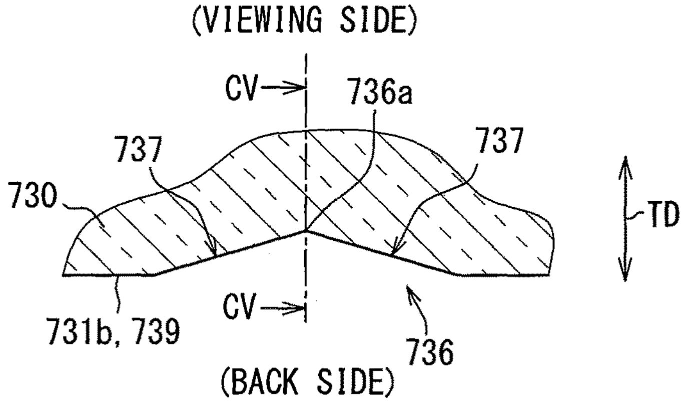
FIG. 106 is a cross-sectional view taken along a line CVI-CVI of FIG. 105.

As shown in FIGS. 104 to 106, each of the reflective elements 736 is formed as a triangular pyramid-shaped recess portion concaved from the back side plate surface 731*b* of the light transmissive display plate 730 toward the viewing side plate surface 731*a*. In particular, as shown in FIG. 104, each reflective element 736 has an isosceles triangle shape in a plan view seen along the plate thickness direction TD perpendicular to the plate surface 731*b*. Each reflective element 736 has two reflection surfaces 737 and an element back surface 738.

The two reflection surfaces 737 are respectively disposed at positions corresponding to isosceles in an isosceles triangle shape on a plan view, and are formed so as to face the outer edge portion 732 side above the vehicle into which the light source light is introduced. Each of the reflection surfaces 737 is formed in a triangular planar shape, and faces obliquely outward from each other along the isosceles in the isosceles triangle shape in the plan view.

Each reflective element 736 has a straight connecting edge 736*b* that connects two reflection surfaces 737 along a cross section that bisects an apex angle (or base) of the isosceles triangle in the plan view. The connecting edge 736*b* is inclined so as to be away from the outer edge portion 732 above the vehicle in which the light source light is introduced, as the connecting edge 736*b* goes from the back side plate surface 731*b* toward the viewing side plate surface 731*a*, and has an inclination angle of, for example, 745 degrees with respect to the plate thickness direction TD, particularly as shown in FIG. 105. Also in each reflection surface 737, an inclination angle of, for example, 45 degrees with respect to the plate thickness direction TD is formed on a cross section parallel to the cross-section bisecting the apex angle described above, similarly to the connecting edge 736*b*.

In each of the triangular pyramid-shaped reflective elements 736, each reflection surface 737 has an inclination angle of 10 degrees with respect to the back side plate surface 731*b* on a vertical cross section perpendicular to the cross-section which includes a recess bottom portion 736*a* having the deepest recess depth and bisects the apex angle described above, as particularly shown in FIG. 106.

The element back surface 738 is disposed at a position corresponding to a base in the isosceles triangle shape on the plan view, and is formed to face away from the outer edge portion 732 above the vehicle into which the light source light is introduced. The element back surface 738 is formed in a triangular planar shape. The element back surface 738 is inclined so as to approach the outer edge portion 732 above the vehicle into which the light source light is introduced from the back side plate surface 731*b* toward the viewing side plate surface 731*a* side, and forms an inclination angle of, for example, 5 degrees with respect to the plate thickness direction TD.

As shown in FIG. 104, when the light source light enters each of the reflective elements 736 from above the vehicle to below the vehicle, the light source light is reflected to the viewing side by each of the reflection surfaces 737 having the inclination angle of 45 degrees described above. In this manner, each of the reflective elements 736 is visually recognized by the occupant on the viewing side in a bright manner.

In the present embodiment, the multiple reflective elements 736 are disposed one by one with a predetermined alignment pitch apart from each other through the flat portion 739 formed flat on the back side plate surface 731*b*. The multiple reflective elements 736 are arrayed in a so-called staggered pattern in which the positions of the recess bottom portions 736*a* are shifted by half the alignment pitch for each row.

The reflective display unit 735 in which the reflective elements 736 are arrayed reflects the light source light by the reflection surfaces 737 as described above, so that the pattern 735*a* can be displayed with brightness in the shape of a surface light source as a whole. More specifically, since the degree of reflection by each reflection surface 737 changes depending on the viewing angle, the pattern 735*a* is visually recognized as chirality in accordance with the movement of the position of eyes of the occupant.

The pattern 735*a* is superimposed on the display by the main body display unit 720. On the other hand, when the light irradiation unit 740 does not introduce the light source light into the inside of the light transmissive display plate 730 by turning off the light, the reflective elements 736 are formed in a fine size and through the flat portion 739, so that the light source light is not visually recognized.

The light irradiation unit 740 shown in FIGS. 107 to 126 is a unit for irradiating the light transmissive display plate 730 with the light source light through the outer edge portion 732 of the light transmissive display plate 730. The light irradiation unit 740 is held by the holding case 712, and is formed as a separate body detachably attachable to the holding case 712. The light irradiation unit 740 includes a holding member 741, a pair of mounting substrates 760, multiple light emitting devices 770, a pair of optical sheet members 780, and the like.

The holding member 741 is formed in a plate-shape having a front surface 743*a* made of a light shielding base material of, for example, a synthetic resin, and is disposed to face the outer edge portion 732 (in particular, outer edge protrusion portion 734) of the light transmissive display plate 730, and a back surface 743*b* on the opposite side to the front surface 743*a*. In particular, in the present embodiment, corresponding to a pair of obtuse outer edges 733 at the outer edge protrusion portions 734, the holding member 741 has a pair of flat plate portions 742 that are elongated along each other at an obtuse angle.

In the present embodiment, the front surface 743*a* side of the pair of flat plate portions 742 forms an obtuse angle of less than 180 degrees in accordance with the shape of the outer edge protrusion portion 734 of the light transmissive display plate 730. Since the pair of flat plate portions 742 forms an angle substantially equal to the pair of outer edge edges 733, the holding member 741 and the outer edge protrusion portion 734 are opposed to each other in a state of being separated from each other by a substantially equal distance over the whole. In this manner, the holding member 741 is disposed such that the longitudinal direction LD of each flat plate portion 742 is along a direction along which the light transmissive display plate 730 is disposed. Since the holding member 741 is bent in this manner, the vehicle display device 700 can be disposed in a state in which a dead space is small with respect to a curved upper surface portion of the instrument panel.

Each of the flat plate portions 742 has multiple through holes 744 extending between the front surface 743*a* and the back surface 743*b* (that is, the outer peripheral wall 746). The through holes 744 are aligned in a longitudinal direction LD to form a grid, each having a rectangular shape. A thickness of a hole partition wall 745 that separates the through holes 744 from each other is set to be smaller than the thickness of the outer peripheral wall 746 that surrounds the array of the through holes 744. More specifically, the hole partition wall 745 is disposed closer to the back surface 743*b* than the outer peripheral wall 746, thereby forming a part of the back surface 743*b* together with the outer peripheral wall 746, and is slightly recessed relative to the front surface 743*a*.

In the present embodiment, the through holes 744 are provided with a total of 18 holes, 9 holes per flat plate portion 742, and the hole partition wall 745 between the through holes 744 is provided with a total of 16 holes, 8 holes per plate portion 742.

Figure 107:
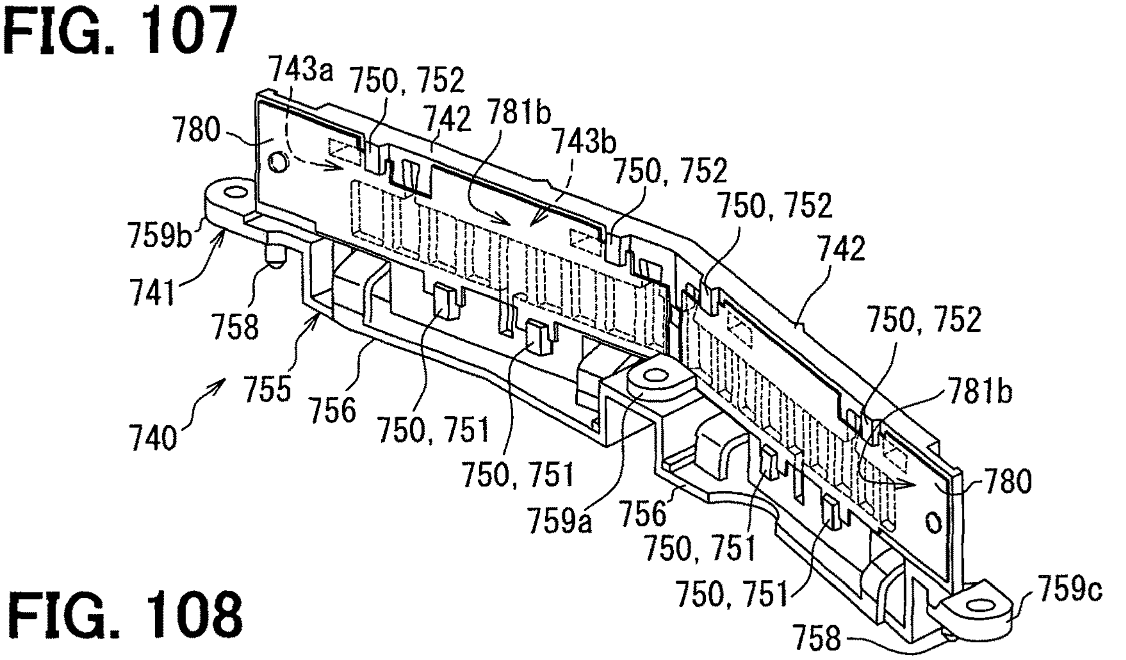
FIG. 107 is a perspective view showing a front surface side of a light irradiation unit according to a fourteenth embodiment.
Figure 110:
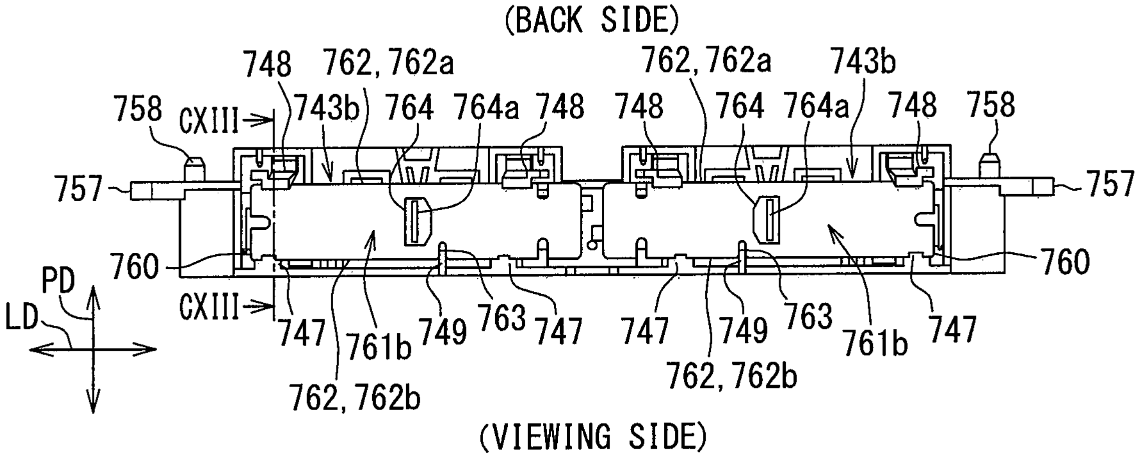
FIG. 110 is a side view showing the back side of the light irradiation unit according to the fourteenth embodiment.

As shown in FIGS. 107 and 110, a pair of mounting substrates 760 is provided corresponding to the pair of flat plate portions 742. Each mounting substrate 760 is made of, for example, synthetic resin and formed in an elongated flat plate-like shape. Each mounting substrate 760 has a mounting surface 761*a* on which the multiple light emitting devices 770 are mounted, and a connector placement surface 761*b* on which a power supply connector 764 for connecting to a power supply is disposed on an opposite side of the mounting surface 761*a*. Each mounting substrate 760 is held by the holding member 741 by bringing the mounting surface 761*a* into contact with the back surface 743*b* of the holding member 741.

In this example, the holding of the mounting substrate 760 by the holding member 741 will be described in detail with reference to FIGS. 110 and 113 to 116. The holding member 741 has multiple substrate supporting ribs 747, multiple elastic protrusions 748, and multiple positioning ribs 749 on the back surface 743*b* side of the holding member 741.

The substrate support ribs 747 are provided by a total of four, that is, two for each flat plate portion 742, corresponding to the viewing side edge 762*b* of the edge portion 762 of each mounting substrate 760. Each of the substrate support ribs 747 has an abutment surface 747*a* and a small protrusion piece portion 747*b*. The abutment surface 747*a* comes in contact with the corresponding edge portion 762*b* in a direction along which the mounting substrate 760 is disposed. The small protrusion piece portion 747*b* has a rectangular piece shape protruding from the abutment surface 747*a* toward the connector placement surface 761*b*. The substrate support rib 747 supports the edge 762*b* by sandwiching the edge portion 762*b* of the mounting substrate 760 between the back surface 743*b* and the small protrusion piece portion 747*b* while regulating positional deviation of the mounting substrate 760 in the direction along which the mounting substrate 760 is disposed by the abutment surface 747*a*.

Four elastic protrusions 748 in total (that is, the same number as that of the substrate support ribs 747), that is, two elastic protrusions for one flat plate portion 742 are provided in correspondence with the edge portion 762*a* opposite to the edge portion 762*b* supported by the substrate support rib 747 across the central portion of the mounting substrate 760, that is, the edge 762*a* on the back side, in the edge portion 762 of each mounting substrate 760. In particular, according to the present embodiment, the elastic protrusions 748 are disposed at positions facing each other across the substrate support rib 747 and the mounting substrate 760. The elastic protrusion 748 is formed in a protrusion shape having a flexible arm 748*a*, a tip end surface 748*b*, and a small protrusion piece portion 748*c*.

The flexible arm 748*a* is formed to protrude from the viewing side and the front surface 743*a* side of the contact plate 756 in a pedestal portion 755 (which will be described later in detail) of the holding member 741 and passes through an arm through hole 748*d* opened to pass through the front surface 743*a* and the back surface 743*b* at a position deviated from the through hole 744 toward the abutment portion side, thereby reaching the back surface 743*b* side. The flexible arm 748*a* has flexibility due to resin elasticity, for example. The tip end surface 748*b* is provided on the tip side of the flexible arm 748*a*, and abuts against the edge portion 762*a* of the corresponding mounting substrate 760 in the direction along which the mounting substrate 760 extends. The small protrusion piece portion 748*c* is formed in a rectangular piece shape protruding from the tip end surface 748*b* toward the connector placement surface 761*b*. The elastic protrusion 748 presses the edge 762*a* of the mounting substrate 760 on the side opposite to the support side of the substrate support rib 747 toward the substrate support rib 747 by an elastic reaction force of the elastically deformable flexible arm 748*a*, and sandwiches the edge portion 762*a* between the small protrusion piece portion 748*c* and the back surface 743*b*. The mounting substrate 760 is held by the holding member 741 with the result that the mounting surface 761*a* of each mounting substrate 760 is in close contact with the back surface 743*b*.

One positioning rib 749 is provided for each flat plate portion 742. Each positioning rib 749 is formed in a protrusion shape protruding from the back surface 743*b*. A slit portion 763 recessed in a slit shape from the edge portion 762 is formed in a portion corresponding to the positioning rib 749 in each mounting substrate 760. The positioning ribs 749 fit into the slit portions 763 to position the mounting substrates 760 relative to the holding members 741.

The number of the light emitting devices 770 mounted on the mounting surface 761*a* of the mounting substrate 760 is the same as the number of the through holes 744. The light emitting devices 770 are individually disposed within the respective through holes 744 one by one and are aligned with each other along a longitudinal direction LD (in other words, along the direction of the light transmissive display plate 730) of each flat plate portion 742. In particular, each light emitting device 770 according to the present embodiment is disposed in alignment with the center of the corresponding through hole 744. Each of the light emitting devices 770 employs a light emitting diode, and each of the light emitting devices 770 emits the light by being connected to a power supply through a conduction pattern on the mounting substrate 760. The multiple light emitting devices 770 are provided so as to be switchable to be turned on or off at the same time, and emit the light source light in the same color as each other. In particular, according to the present embodiment, each of the light emitting devices 770 emits a white light source light.

Figure 108:
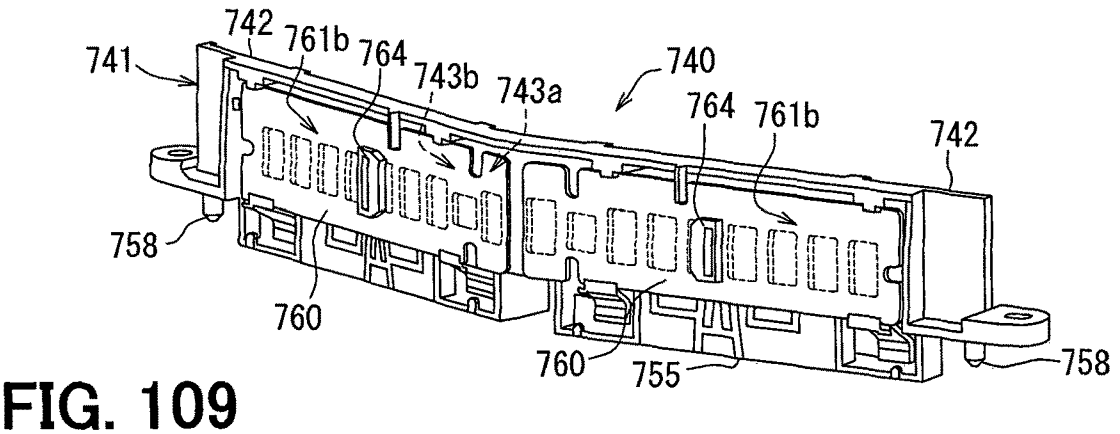
FIG. 108 is a perspective view showing a back side of the light irradiation unit according to the fourteenth embodiment.
Figure 109:
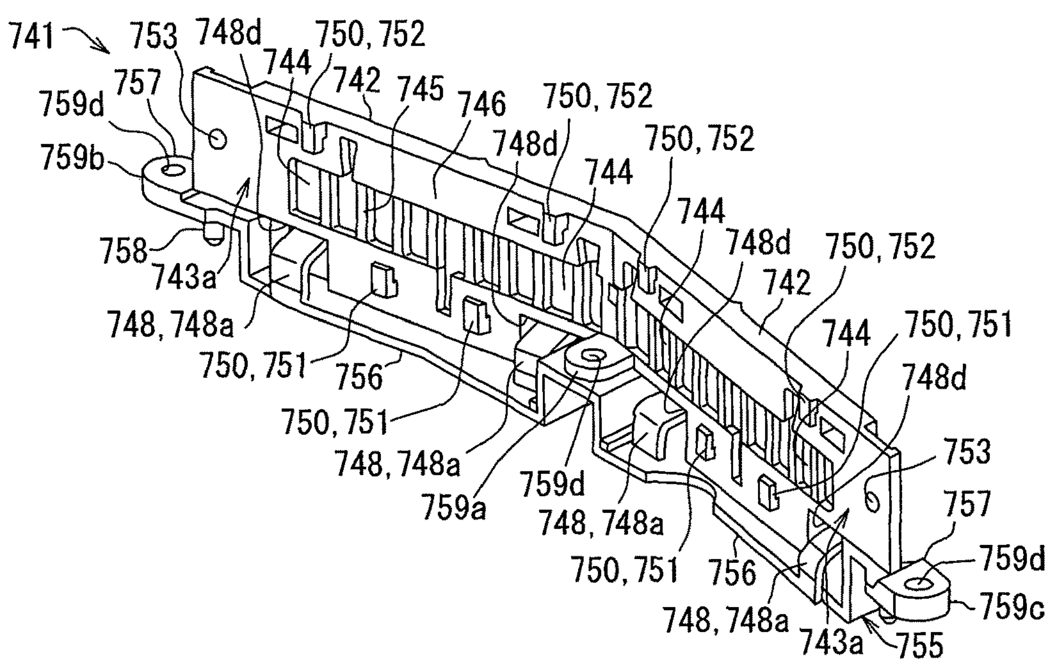
FIG. 109 is a perspective view showing a front surface side of a holding member according to the fourteenth embodiment.
Figure 112:
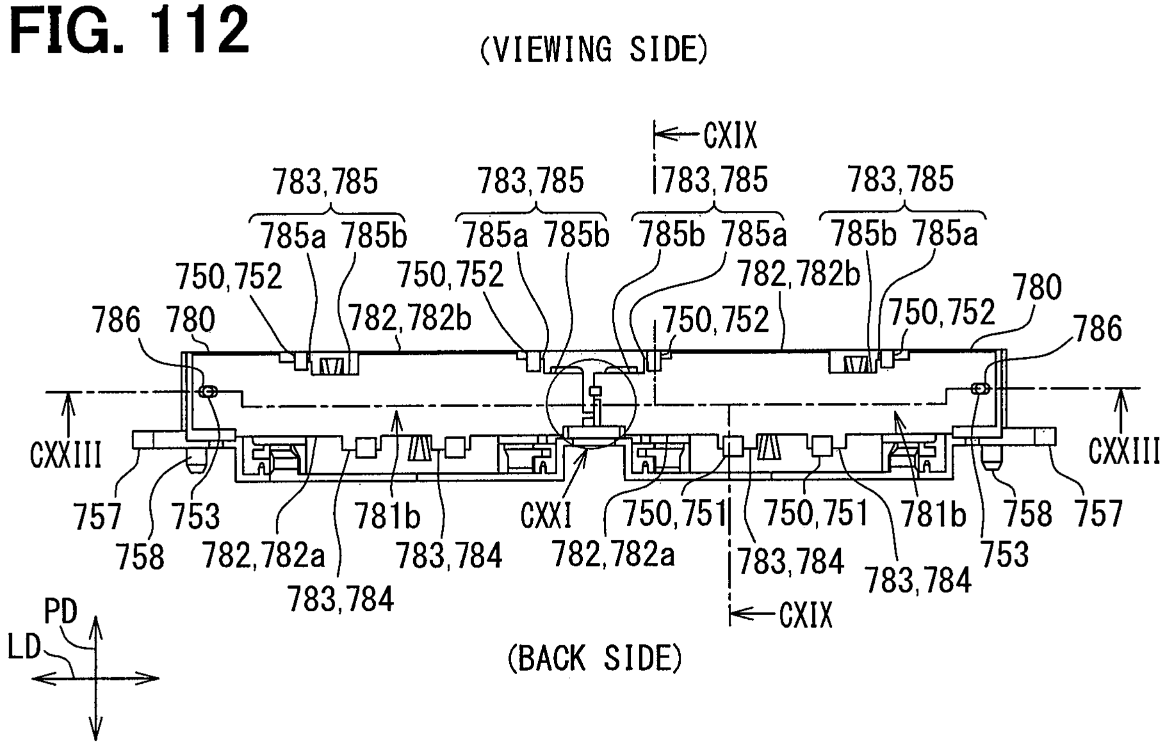
FIG. 112 is a side view showing the front surface side of the light irradiation unit according to the fourteenth embodiment.
Figure 113:
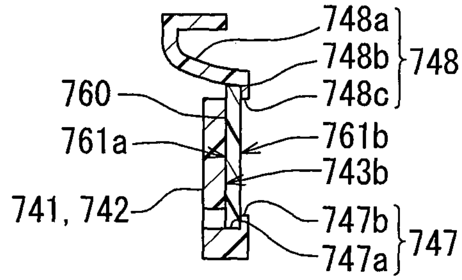
FIG. 113 is a cross-sectional view taken along a line CXIII-CXIII of FIG. 110.
Figure 114:
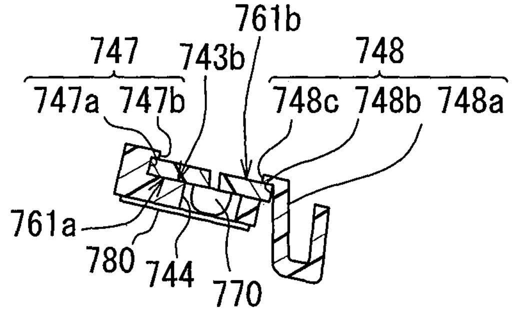
FIG. 114 is a cross-sectional view taken along a line CXIV-CXIX of FIG.
Figure 115:
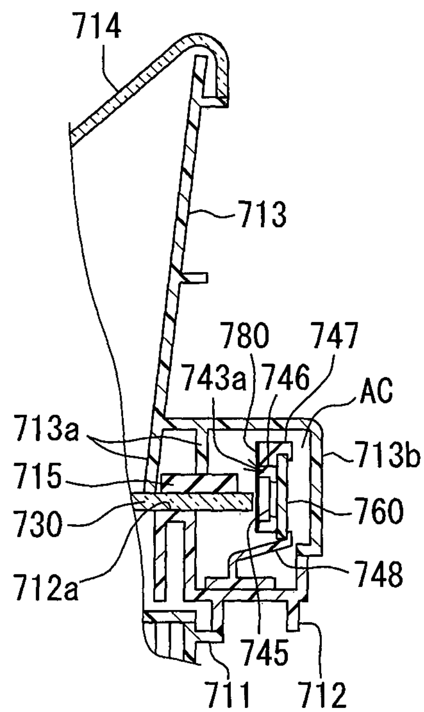
FIG. 115 is a cross-sectional view taken along a line CXV-CXV of FIG. 102.
Figure 116:
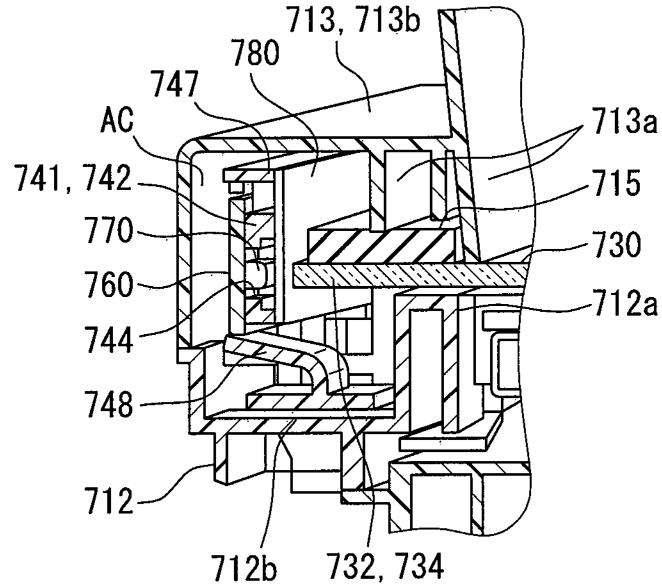
FIG. 116 is a cross-sectional perspective view showing a periphery of the light irradiation unit according to the fourteenth embodiment.

As shown in FIGS. 108 and 112, a pair of optical sheet members 780 is provided corresponding to the pair of flat plate portions 742. Each of the optical sheet members 780 has an optical effect on the light source light emitted from each of the light emitting devices 770. Each optical sheet member 780 according to the present embodiment is formed in an elongated flat plate-like shape having a thickness of, for example, about 0.5 mm by subjecting one entire surface made of a light transmissive base material such as an acrylic resin or a polycarbonate resin to semi-light transmissive printing. With execution of the semi-transmissive printing, each of the optical sheet members 780 is colored in a semi-light transmissive color, for example, blue, and serves as a color filter which exerts, as an optical action, a wavelength selecting action for selecting a wavelength that is transmittable with respect to the light source light.

The optical sheet member 780 includes a hole facing surface 781*a* which faces each through hole 744 and on which the light source light from each light emitting device 770 is incident, and a projection surface 781*b* for projecting the light source light that has been converted into a blue light by an optical action toward the outer edge portion 732 of the light transmissive display plate 730, on the opposite side of the hole facing surface 781*a*. Each of the optical sheet members 780 is held by the holding member 741 by bringing the hole facing surface 781*a* into contact with the front surface 743*a* of the holding member 741.

In this example, the holding of the optical sheet member 780 by the holding member 741 will be described in detail with reference to FIGS. 111, 113, and 117 to 122. The holding member 741 has, on the front surface 743*a* side, multiple sheet support ribs 750, multiple insertion pins 753, and a pair of abutting portions 754 at positions where the pair of flat plate portions 742 are connected. On the other hand, the optical sheet member 780 has multiple key-shaped protrusion and recess portions 783 corresponding to the sheet support ribs 750, and multiple positioning holes 786 corresponding to the insertion pins 753.

The sheet support ribs 750 include two types of ribs including back side ribs 751 corresponding to the edge 782*a* on the back side and viewing side ribs 752 corresponding to the edge portion 782*b* on the viewing side, in the edges 782 of each optical sheet member 780. The back side ribs 751 are provided with a total of four, that is, two for each of the flat plate portions 742. The viewing side ribs 752 are provided with a total of four, that is, two for each of the flat plate portions 742. The back side ribs 751 and the viewing side ribs 752 are disposed at positions shifted from each other in the longitudinal direction LD of the flat plate portion 742 so as not to face each other.

On the other hand, the key-shaped protrusion and recess portions 783 of the optical sheet member 780 include two types of key-shaped protrusion portions 784 corresponding to the back side ribs 751 and key-shaped recess portions 785 corresponding to the viewing side ribs 752. The key-shaped protrusion portions 784 are provided in total of four (that is, the same number as that of the back side ribs 751), that is two for each of the flat plate portions 742. Each of the key-shaped protrusion portions 784 is formed in a convex shape projecting from the edge portion 782*a* on the back side of the optical sheet member 780 further to the back side in a key-like manner.

The key-shaped recess portions 785 are provided with a total of four (that is, the same number as the number of viewing side ribs 752), that is, two for each of the flat plate portions 742. Each of the key-shaped recess portions 785 is formed in a concave shape that is recessed from the edge portion 782*b* on the viewing side of the optical sheet member 780 to the back side in the key-like manner. In particular, each of the key-shaped recess portions 785 according to the present embodiment is recessed in two stages by having small recess portions 785*a* slightly recessed from the edge portion 782*b* on the viewing side and large recess portions 785*b* adjacent to the small recess portions 785*a* and recessed to a greater extent than the small recess portion 785*a*.

The back side rib 751 is disposed so as to engage with the key-shaped protrusion portion 784. The back side rib 751 is an L-shaped rib having an abutment surface 751*a* and a large protrusion piece portion 751*b*. The abutment surface 751*a* comes in contact with a tip of the corresponding key-shaped protrusion portion 784 in the direction along which the optical sheet member 780 extends. The large protrusion piece portion 751*b* has a rectangular piece shape that protrudes from the abutment surface 751*a* toward the projection surface 781*b* side so as to come into contact with the projection surface 781*b*.

The viewing side rib 752 is disposed so as to mate with the small recess portion 785*a* of the key-shaped recess portion 785. In particular, according to the present embodiment, the large recess portion 785*b* belonging to the same key-shaped recess portion 785 is disposed adjacent to the small recess portion 785*a* on the center side of the holding member 741 in which the pair of flat plate portions 742 are connected to each other with respect to the viewing side rib 752. The viewing side rib 752 is an L-shaped rib having an facing surface 752*a*, a large protrusion piece portion 752*b*, and a deformation protrusion 752*c*. The facing surface 752*a* faces the corresponding small recess portion 785*a* in the direction along which the optical sheet member 780 is disposed. The large protrusion piece portion 752*b* has a rectangular piece shape protruding from the facing surface 752*a* toward the projection surface 781*b*. The projection dimension of the large protrusion piece portion 752*b* is set to be larger than the recess dimension of the small recess portion 785*a* and smaller than the recess dimension of the large recess portion 785*b*. Further, in the holding member 741, the large protrusion piece portions 751*b* and 752*b* on the front surface 743*a* side are formed in a size larger than the small protrusion piece portions 747*b* and 748*c* on the back surface 743*b* side.

Thus, the sheet support rib 750 supports the edge portion 782 of the optical sheet member 780 from both sides of the flat plate portion 742 in the short direction PD.

Figure 120:
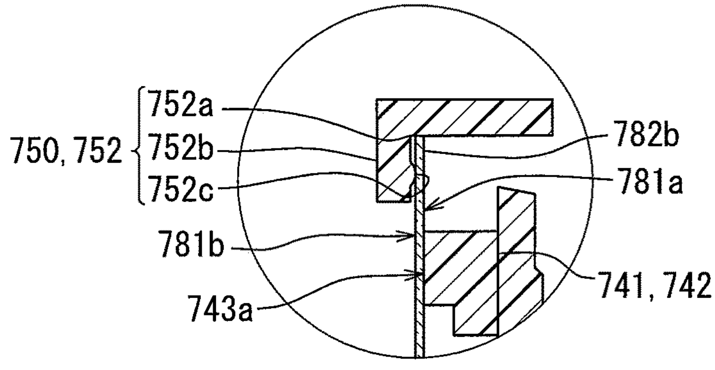
Figure 121:
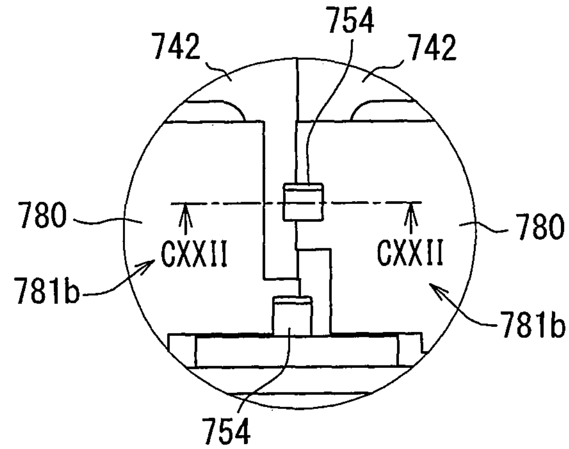
Figure 122:
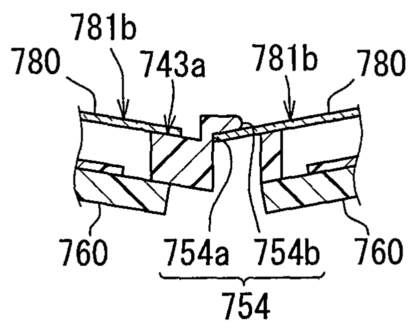

As particularly shown in FIG. 120, the deformation protrusion 752*c* is a minute protrusion having a spherical tip and protruding, for example, about 0.2 to 0.3 mm from a surface of the large protrusion piece portion 752*b* facing the projection surface 781*b* toward the projection surface 781*b* side. When the tip of the deformation protrusion 752*c* comes in contact with the projection surface 781*b*, the entire optical sheet member 780 is bent and becomes an elastically deformed state like a spring. With the above elastic deformation state, a gap between the surface of the optical sheet member 780 and the large protrusion piece portion 751*b* in the thickness is filled, and stable holding of the optical sheet member 780 by the holding member 741 is realized.

Figure 111:
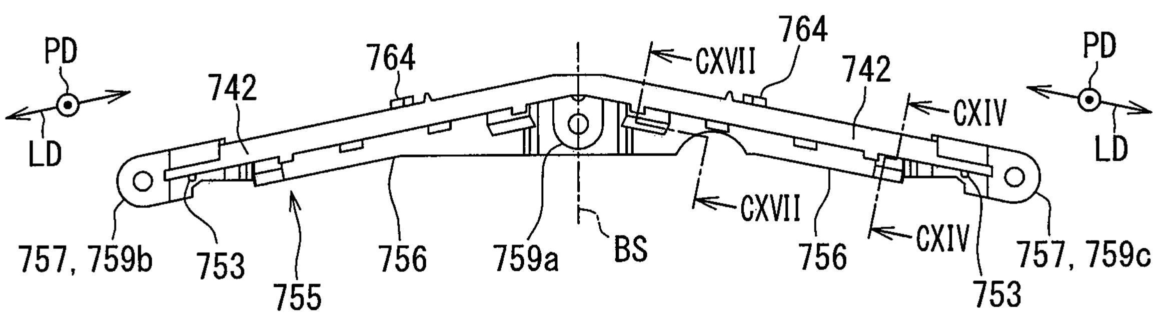
FIG. 111 is a front view of the light irradiation unit according to the fourteenth embodiment.

As shown in FIGS. 111 and 112, in particular, one insertion pin 753 for each of the flat plate portions 742, that is, a total of two insertion pins 753 are provided. The insertion pins 753 are disposed on a side of the flat plate portion 742 opposite to the central portion of the holding member 741 (that is, the outside of the holding member 741). Each of the insertion pins 753 has a pin shape protruding from the front surface 743*a* in a direction different from the normal direction of the front surface 743*a*. In more detail, each insertion pin 753 protrudes in parallel with the bisector BS of an obtuse angle formed by the pair of flat plate portions 742, so that the insertion pins 753 are also in a parallel with each other.

On the other hand, the positioning holes 786 of the optical sheet member 780 are provided in the same number as that of the insertion pins 753, and are opened through the hole facing surface 781*a* and the projection surface 781*b*. In each positioning hole 786, the diameter of the flat plate portion 742 in the short direction PD is set to be approximately the same as the diameter of the insertion pin 753, and the diameter of the flat plate portion 742 in the longitudinal direction LD is set to be larger than the diameter of the insertion pin 753. Since the insertion pin 753 is inserted into the positioning hole 786, positional deviation of the optical sheet member 780 is regulated.

Figure 119:
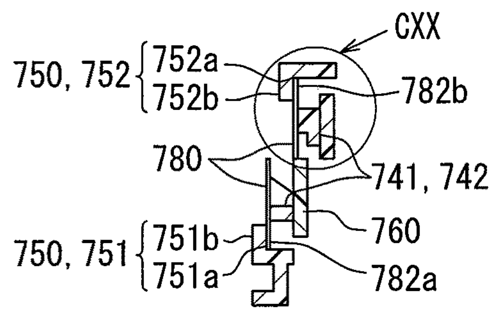
FIG. 119 is a cross-sectional view taken along a line CXIX-CXIX of FIG. 112.

As shown in FIGS. 119 and 120, a pair of the abutment portions 754 is provided in the central portion of the holding member 741 to which the pair of flat plate portions 742 are connected. The abutting portion 754 is an L-shaped rib that protrudes from the end portion of the front surface 743*a* of one of the flat plate portions 742 toward the light transmissive display plate 730 and extends toward the other flat plate portion 742. The abutting portion 754 has an abutting surface 754*a* and an extension portion 754*b*. The abutting surface 754*a* restricts positional deviation of the optical sheet member 780 by abutting an end portion on the center portion side of the optical sheet member 780 abutting on the front surface 743*a* of the other flat plate portion 742. The extension portion 754*b* extends from the abutting surface 754*a* to the projection surface 781*b* side of the optical sheet member 780, thereby sandwiching the optical sheet member 780 between the extension portion 754*b* and the front surface 743*a*.

Figure 123:
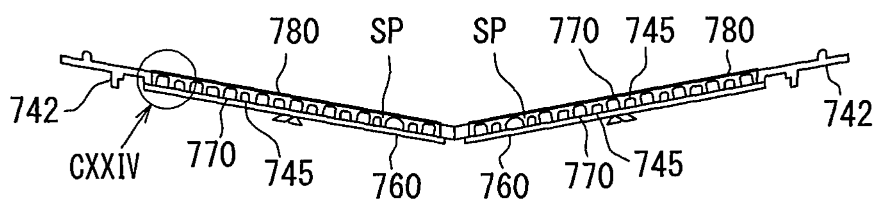
Figure 124:
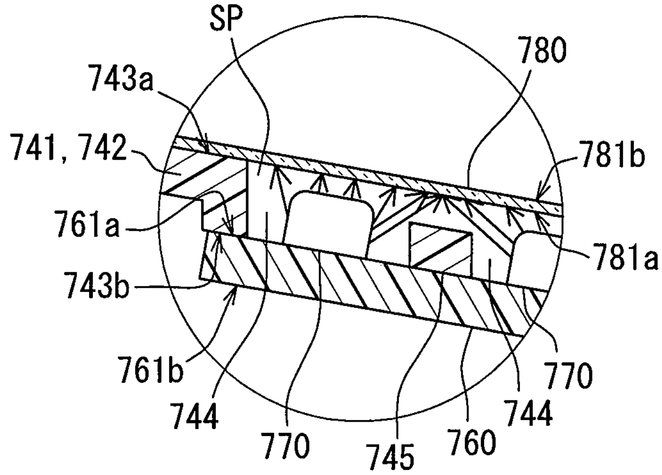

Thus, as shown in FIGS. 123 and 124, in each of the flat plate portions 742, the mounting substrate 760 comes into contact with the back surface 743*b* in a close contact state, and the optical sheet member 780 comes into contact with the front surface 743*a* in the close contact state, whereby a space SP provided by the multiple through holes 744 in which the multiple light emitting devices 770 are disposed is optically closed with a high sealing property. The space SP provided by the through holes 744 communicates between the through holes 744 because the hole partition wall 745 described above is recessed from the front surface 743*a*. With the communication of the space SP in which the multiple light emitting devices 770 are disposed, the light source light is projected in the form of a surface light source from the entire region of the optical sheet member 780 in contact with the space SP. The large protrusion piece portions 751*b* and 752*b* described above are disposed corresponding to a region of the optical sheet member 780 on the outer peripheral side of a region in contact with the space SP.

Figure 117:
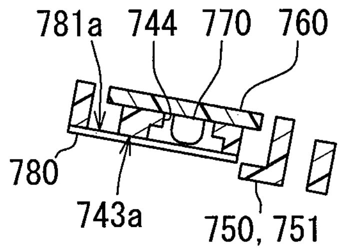
FIG. 117 is a cross-sectional view taken along a line CXVII-CXVII of FIG. 111.
Figure 118:
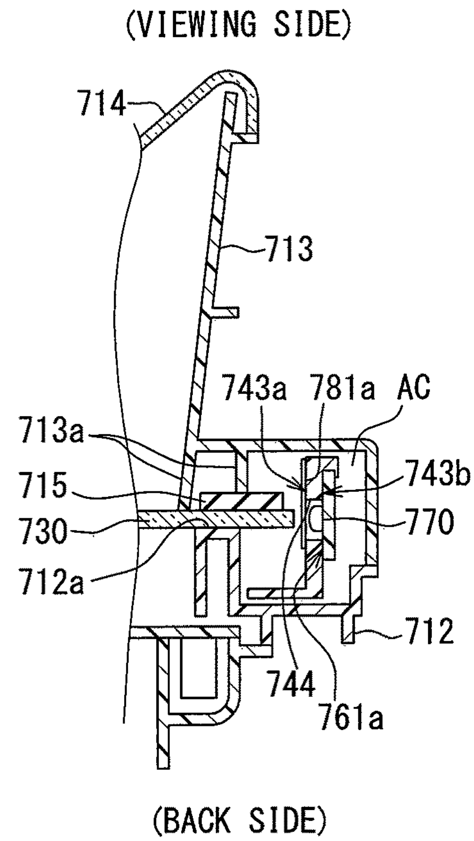
FIG. 118 is a cross-sectional view taken along a line CXVIII-CXVIII of FIG. 102.

A lap margin between the optical sheet member 780 and the front surface 743*a* is set to be larger on the viewing side of on the back side, as shown in, for example, FIG. 117. In particular, according to the present embodiment, the lap margin on the viewing side is set to three times or more the lap margin on the back side.

As shown in FIGS. 109 to 112, a pedestal portion 755 of the holding member 741 is provided on the back side of the pair of flat plate portions 742. The pedestal portion 755 includes a pair of contact plates 756, a pair of positioning pins 758, and multiple fastening pedestals 759*a*, 759*b*, and 759*c*. The pair of contact plates 756 is provided corresponding to the pair of flat plate portions 742, and is disposed on the most back side of the holding member 741. Each of the contact plates 756 is formed in a flat plate-like shape. On the other hand, the holding case 712 has an opposing portion 712*b* having a shape corresponding to the pedestal portion 755, so that the contact plate 756 of the holding member 741 and the facing portion 712*b* of the holding case 712 abut against each other.

The pair of positioning pins 758 are provided so as to protrude from a flange portion 757 outside the pair of contact plates 756 in the pedestal portion 755 toward the back side. Corresponding holes (not shown) are provided at positions corresponding to the positioning pins 758 in the opposing portion 712*b* of the holding case 712, and the holding member 741 is positioned with respect to the holding case 712 in a state in which the positioning pins 758 are inserted into the respective holes.

Figure 125:
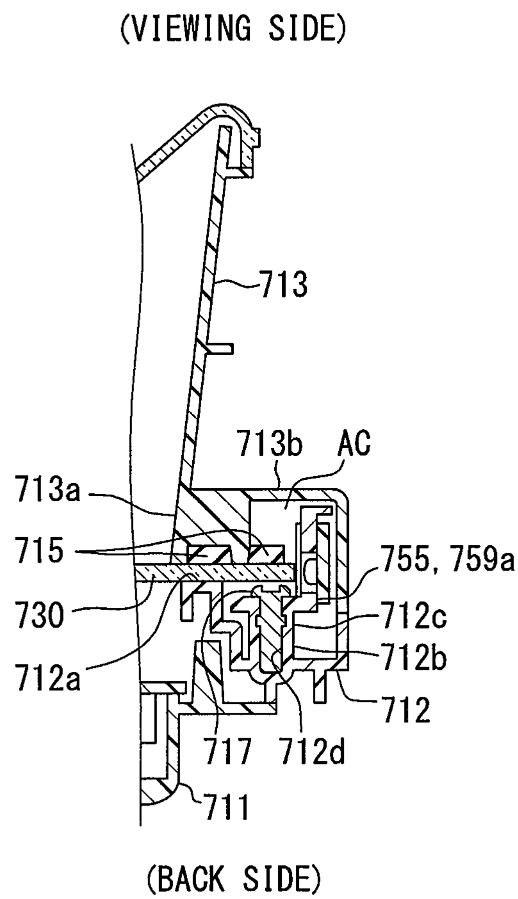

According to the present embodiment, a total of three fastening pedestals 759*a*, 759*b*, and 759*c* are provided. The fastening pedestal 759*a* is disposed at the center of the holding member 741 so as to be sandwiched between the pair of abutting plates 756. The fastening pedestal 759*a* is disposed on the viewing side of the pair of flat plate portions 742 and on the back side of the through hole 744, and thus is recessed on the viewing side with respect to the pair of contact plates 756. As shown in FIG. 125, the fastening pedestal 759*a* has a screw passage hole 759*d* through which a screw 717 passes. On the other hand, a protrusion pedestal 712*c* protruding along a recess of the fastening pedestal 759*a* and a screw fastening hole 712*d* opened in the protrusion pedestal 712*c* are provided at a position facing the fastening pedestal 759*a* in the opposing portion 712*b* of the holding case 712. In the fastening pedestal 759*a*, a screw 717 passes through a screw hole 759*d* and is then fastened to the screw fastening hole 712*d*.

The fastening pedestals 759*b* and 759*c* are disposed on the flange portion 757. The fastening pedestals 759*b* and 759*c* are disposed on the viewing side of the pair of flat plate portions 742 and on the back side of the through hole 744, and thus are recessed on the viewing side with respect to the pair of contact plates 756. Similar to the fastening pedestal 759*a*, the screw through hole 759*d*, the screw fastening hole 712*d*, and the like are provided corresponding to the fastening pedestals 759*b* and 759*c*. In the fastening pedestals 759*b* and 759*c*, the screw 717 passes through the screw hole 759*d* and is then fastened to the screw fastening hole 712*d*.

In this manner, the holding member 741 is fastened to the holding case 712 at multiple positions by the screws 717. In this manner, at the time of fastening, each of the contact plates 756 of the holding member 741 is in close contact with the opposing portion 712*b* of the holding case 712, so that the holding member 741 is stably held by the holding case 712. On the other hand, the light irradiation unit 740 including the holding member 741 is formed as a separate body detachably attachable to the holding case 712. With the above configuration, the parts of the light irradiation unit 740 can be easily replaced (for example, the color of a color filter of the optical sheet member 780 is changed, or the like).

Figure 126:
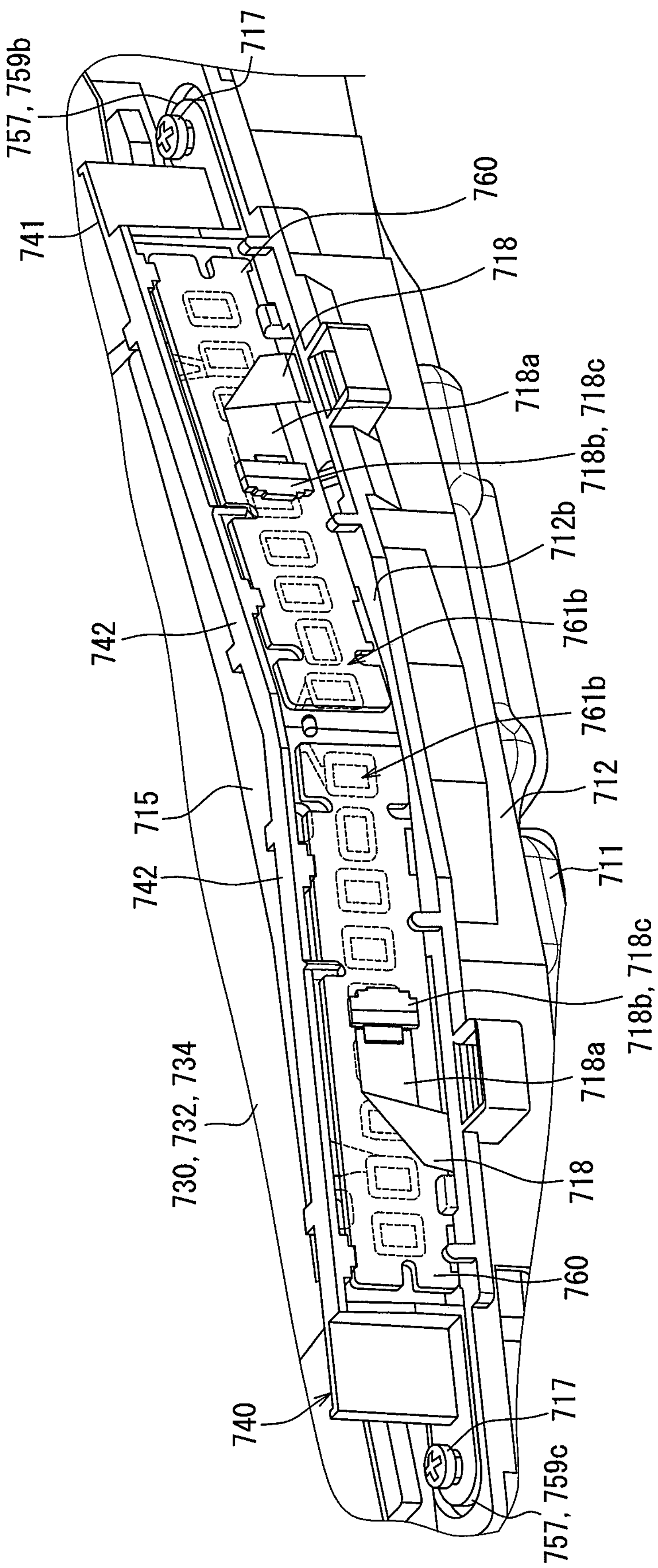

The power supply from the holding case 712 side to the light emitting devices 770 is realized through power supply connectors 764 and power supply cables 718 as shown in FIGS. 110 and 126. The power supply connectors 764 are provided one by one on each mounting substrate 760, and are disposed at the center of the connector placement surfaces 761*b* of the respective mounting substrates 760. Each power supply connector 764 has a width in the short direction PD of the flat plate portion 742, and has an insertion port 764*a* opened in a direction perpendicular to the connector placement surface 761*b*.

The power supply cables 718 are provided for each of the power supply connectors 764 one by one, and each have a belt-like portion 718*a* formed in a belt shape having flexibility. One end portion of the power supply cable 718 is connected to the power supply connector 764, and the other end portion is connected to the power supply side of, for example, the main circuit board 726. The power supply cable 718 has a movable mechanism 718*c* at a connection portion 718*b* connected to the insertion port 764*a*. The power supply cable 718 can be changed by the movable mechanism 718*c* between a posture in which the belt-like portion 718*a* extends vertically to the insertion port 764*a* and a posture in which the belt-like portion 718*a* extends in parallel to the insertion port 764*a*. In other words, when the power supply cable 718 is inserted into the power supply connector 764 in the posture in which the belt-shaped portion 718*a* extends in parallel, and then, the belt-shaped portion 718*a* is laid down with the use of the movable mechanism 718*c* to change to a posture in which the belt-shaped portion 718*a* extends vertically. In the posture in which the belt-shaped portion 718*a* is extended vertically, the power supply cable 718 is disposed along the mounting substrate 760, so that the light irradiation unit 740 can be accommodated compactly.

As shown in FIGS. 115, 116, 118, and 125, according to the present embodiment, the plate window member 713 has an accommodation wall 713*b*. The opposing portion 712*b* of the holding case 712 and the accommodation wall 713*b* of the plate window member 713 are combined together to form an accommodation chamber AC in which the light irradiation unit 740 is accommodated. A light leakage of the light source light projected from the light irradiation unit 740 is regulated by the accommodation chamber AC, so that the light source light is efficiently introduced into the light transmissive display plate 730.

In the accommodation chamber AC in which the light irradiation unit 740 is accommodated, a dustproof member 715 is interposed between a plate surface 731*a* of the outer edge protrusion portion 734 of the light transmissive display plate 730 and the protrusion 713*a* of the plate window member 713. The dustproof member is formed in a flat plate-like shape having elasticity by, for example, an elastomer material, and exhibits a dustproof function by enhancing an adhesion between the light transmissive display plate 730 and the plate window member 713. More specifically, the dustproof member 715 inhibits small foreign matter such as dirt, dust, and debris on the accommodation chamber AC side from adhering to the outside of the accommodation chamber AC, in particular, to the visible area of the light transmissive display plate 730 held by the holding case 712. At the same time, the elasticity of the dustproof member 715 is utilized to reduce the occurrence of abnormal noise due to vibration or the like of the vehicle.

Now, a method of manufacturing the vehicle display device 700, particularly, assembling each component in the light irradiation unit 740 will be described partially and briefly.

The holding member 741 is molded by molding using a pair of molding dies. Specifically, a molding die on the front surface 743*a* side and a molding die on the back surface 743*b* side are combined together, and a synthetic resin material in a state of being heated and fluidized is injected between both of the molding dies. After the synthetic resin material is cooled, both of the molding dies are released by being pulled out along the bisector line BS of the obtuse angle formed by the pair of flat plate portions 742. Thus, the holding member 741 is formed.

Each mounting substrate 760 is assembled on the back surface 743*b* side of the corresponding flat plate portion 742. More specifically, the elastic protrusions 748 of the holding member 741 are opened to the back side by a jig having a tension spring, and the edge portion 762*b* on the viewing side of the mounting substrate 760 is hooked to the substrate support ribs 747 while aligning the positioning ribs 749 of the holding member 741 with the slit portions 763 of the mounting substrate 760. Thereafter, when the jig is removed, each of the elastic protrusions 748 comes into contact with the edge portion 762*b* on the back side of the mounting substrate 760 by an elastic reaction force. In this manner, each mounting substrate 760 is in close contact with the back surface 743*b* of the holding member 741.

Each of the optical sheet members 780 is assembled on the front surface 743*a* side of the corresponding flat plate portion 742. More specifically, the optical sheet member 780 is disposed slightly outside the holding member 741 as compared with a completed time, in a slightly bent state. In this manner, the viewing side rib 752 can just overlap with the large recess portion 785*b* of the key-shaped recess portion 785 to allow the optical sheet member 780 to come in contact with the front surface 743*a*. In this state, when the optical sheet member 780 is slid from the outside of the holding member 741 to the center side, the viewing side rib 752 overlaps with the small recess portion 785*a* of the key-shaped recess portion 785, and the back side rib 751 overlaps with the key-shaped protrusion portion 784. Further, the bending of the optical sheet member 780 is returned, and the insertion pin 753 is inserted into the positioning hole 786. In this manner, each optical sheet member 780 is in close contact with the front surface 743*a* of the holding member 741.

Through the above steps, the holding member 741, the mounting substrate 760 on which the multiple light emitting devices 770 are mounted, and the optical sheet member 780 complete the light irradiation unit 740 which is formed as an integral body.

In addition, the assembly of the light irradiation unit 740 to the holding case 712 will be briefly described. First, the pair of positioning pins 758 of the holding member 741 are inserted into the respective holes of the holding case 712. In a state in which the light irradiation unit 740 is positioned with respect to the holding case 712 in this manner, the pedestal portion 755 of the holding member 741 is fastened to the holding case 712 by the screws 717. In this manner, the light irradiation unit 740 as the integral body can be assembled together to the holding case 712, and can be freely attached and detached.

In each of the drawings, in order to ensure the visibility of the drawings, all of the through holes 744, the hole partition walls 745, the light emitting devices 770, and the like are not denoted by reference numerals, and some of the reference numerals are omitted.

According to the present embodiment, the light irradiation unit 740 is configured by the multiple light emitting devices 770, the mounting substrate 760, the holding member 741, and the like. Since the light irradiation unit 740 is formed as a separate body detachable from the holding case 712, the light irradiation unit 740 can be assembled together with the holding case 712 at the time of manufacturing the vehicle display device 700. Therefore, since the number of assembling of the components to the holding case 712 can be reduced, small foreign matter such as dirt, dust, and debris can be inhibited from being caught in the holding case 712 along with the assembling. Therefore, even if the light transmissive display plate 730 is held by the holding case 712, the adhesion of foreign matter to the plate surfaces 731*a* and 731*b* of the light transmissive display plate 730 is reduced. As a result, even if the light irradiation unit 740 irradiates the light transmissive display plate 730 with the light source light with the use of the multiple light emitting devices 770, a situation in which the foreign matter and the pattern 735*a* emit the light at the same time can be inhibited. As described above, the vehicle display device 700 can be provided in which the appearance of the display by the light transmissive display plate 730 is excellent.

According to the present embodiment, the mounting substrate 760 is held by the holding case 712 by bringing the mounting surface 761*a* on which the light emitting devices 770 are mounted in contact with the back surface 743*b*. The light emitting devices 770 mounted on the mounting substrate 760 are individually disposed inside the through holes 744. With the above configuration, leakage of the light source light emitted from each light emitting device 770 from between the back surface 743*b* and the mounting substrate 760 is reduced, and the light is surely guided to the front surface 743*a* side. For that reason, since the light source light can be efficiently irradiated to the outer edge portion 732 of the light transmissive display plate 730 facing the front surface 743*a*, the pattern 735*a* can be brightened by increasing a luminance efficiency, and the appearance can be improved.

Further, according to the present embodiment, the mounting substrate 760 is supported by the holding member 741 in such a manner that the edge portions 762*b* are supported by the substrate support ribs 747, and the mounting substrate 760 is pushed toward the substrate support ribs 747 side by the elastic reaction force of the elastic protrusions 748 from the side opposite to the edge 762*b*. A relative positional variation of the mounting substrate 760 due to vehicle vibration is absorbed by the holding using the elastic reaction force. Therefore, the light irradiation unit 740 can surely irradiate the light source light onto the light transmissive display plate 730.

According to the present embodiment, the light irradiation unit 740 further includes an optical sheet member 780 that exerts an optical action on the irradiation light. The light source light source is subjected to the optical action by the optical sheet member 780, whereby the pattern 735*a* can be brightened with a more excellent appearance.

Further, according to the present embodiment, the optical sheet member 780 is held by the holding member 741 by being supported by the sheet supporting rib 750 while being positioned in a state in which the insertion pin 753 is inserted into the positioning hole 786. Since the mounting substrate 760 is held by insertion of the insertion pins 753, the optical sheet member 780 can be easily assembled while being bent, and a relative positional variation of the mounting substrate 760 due to vehicle vibration is absorbed. Therefore, the light irradiation unit 740 can surely irradiate the light source light onto the light transmissive display plate 730.

According to the present embodiment, the tip of the deformation protrusions 752*c* protruding from the optical sheet member 780 toward the sheet support ribs 750 abuts on the sheet support ribs 750. With the above contact, the optical sheet member 780 itself bends and becomes elastically deformed. The optical sheet member 780 functions like a spring, and relative positional fluctuation due to vehicle vibration is absorbed. In addition, since the optical sheet member 780 can be assembled in the holding space of the optical sheet member 780 premised on bending of the optical sheet member 780 in a state where the optical sheet member 780 is less flexible than the elastic deformation state described above, a loose space can be provided. Therefore, the optical sheet member 780 can be easily assembled in the space.

According to the present embodiment, the holding member 741 is fastened to the holding case 712 by the screws 717 so that the front surface 743*a* faces the outer edge portion 732 of the light transmissive display plate 730.

Since the fastening using the screw 717 reduces the deviation of the light irradiation unit 740 in all directions, the relative positional relationship between the light irradiation unit 740 and the light transmissive display plate 730 can be maintained even by the vehicle vibration. Therefore, since the light source light is stably provided to the pattern 735*a*, the appearance can be reliably maintained.

Figure 127:
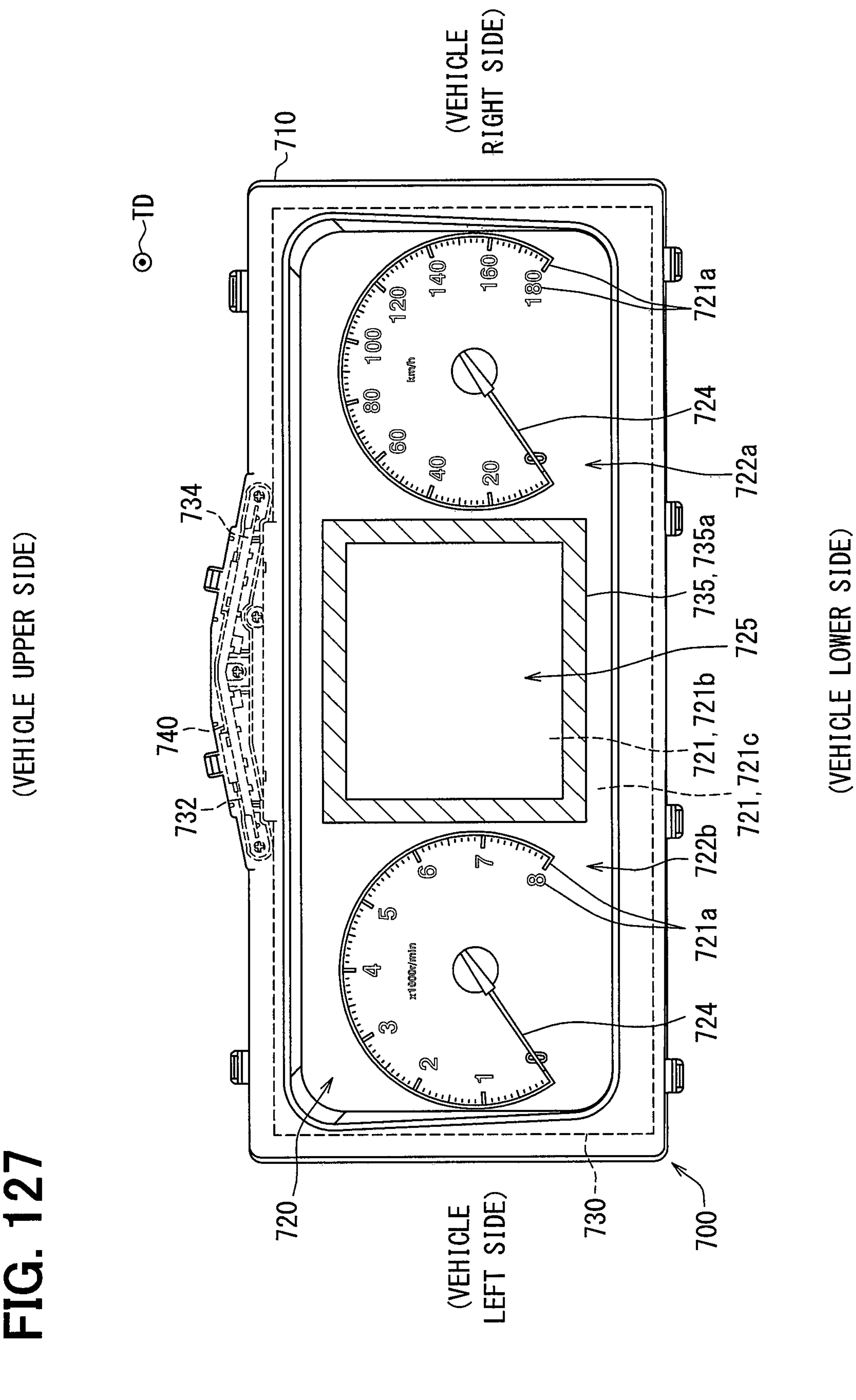

As Modification 1 of the fourteenth embodiment, in the light transmissive display plate 730, the outer edge portion 732 into which the light source light from the light irradiation unit 740 is introduced may not be formed so as to project toward the light irradiation unit 740 side like the outer edge protrusion portion 734, and for example, as shown in FIG. 127, a portion of the outer edge portion 732 corresponding to the light irradiation unit 740 may be formed linearly.

As Modification 2, various shapes can be adopted for the reflective elements 736. For example, in the reflective element 736, a single curved reflection surface formed in a curved shape may be used instead of the pair of reflection surfaces 737 formed in a triangular planar shape. Further, for example, instead of the pair of reflection surfaces 737 formed in a triangular planar shape, one reflection surface formed in a rectangular planar shape may be employed. The inclination angle of the reflection surface 737 can be appropriately set within a range in which the function of reflecting the light source light to the viewing side is maintained.

As Modification 3, the light transmissive display plate 730 does not need to have a configuration in which the pattern 735*a* is brightened by the reflective elements 736 of a minute size of the reflective display unit 735 as long as the pattern 735*a* is brightened and displayed by introducing the light source light into the interior. For example, instead of the reflective elements 736, a diffusing element that diffuses the light source light may be used to brighten the pattern. For example, instead of the reflective elements 736, a concave hole having a visible size concaved from the back side plate surface 731*b* to the side of the viewing side plate surface 731*a* may be provided, and the side wall surface of the concave hole may be illuminated by the light source light so that the contour of the side wall surface is brightened.

As Modification 4, the light transmissive display plate 730 may be disposed so as to cover a part of the back side display plate 721 from the viewing side.

As Modification 5, any of various patterns such as an indicator indicated by a pointer can be adopted as the pattern 735*a*.

In Modification 6, the holding member 741 may have a single flat plate portion instead of the pair of flat plate portions 742, or may have three or more flat plate portions.

In Modification 7, various configurations can be adopted as the main body display unit 720. For example, instead of providing the pointer display units 722*a* and 722*b*, an image display unit 725 may be employed on the entire surface.

In this example, the vehicle display device disclosed in JP 2016-121890 A, which is a prior art example of the vehicle display device according to the fourteenth embodiment, includes a light transmissive display plate (transparent light guide plate) and multiple light emitting devices (light sources). The light transmissive display plate is pressed by facing plates, has a light transmissive property, and is formed in a plate-shape on which a pattern is formed. The light source light emitted by the multiple light emitting devices is introduced into the inside of the light transmissive display plate, so that the pattern is displayed in a bright manner. There is no disclosure of how the multiple light emitting devices are held.

JP 2013-170993 A, which is a prior art example of a vehicle display device according to a fourteenth embodiment, discloses holding of multiple light emitting devices (light sources) for introducing a light source light into liquid crystal display elements held by a holding case (frame body). The multiple light emitting devices are mounted on a conductive path provided on a flexible wiring board fixed on an inner wall surface of a peripheral wall portion of the holding case. The present inventors have conducted a detailed study on holding multiple light emitting devices that emit a light source light that irradiates a light transmissive display plate. As a result, it has been found that the following issues arise when a configuration in which multiple light emitting devices are fixed to the same holding case, such as the configuration of JP 2013-170993 A, is applied to a light transmissive display plate held to the holding case.

The issue is that when multiple light emitting devices are directly assembled to a holding case at the time of manufacturing a vehicle display device, the number of assembling times to the holding case tends to increase, and small foreign matter such as dirt, dust, and debris is caught in the holding case at the time of assembling. Since the light transmissive display plate is also held by the holding case, those foreign matters adhere to the plate surface of the light transmissive display plate, and when displaying a pattern, those foreign matters are also brightened at the same time, and there is a concern that the appearance of the display by the light transmissive display plate is remarkably deteriorated.

On the other hand, according to the fourteenth embodiment, the object is to provide a vehicle display device in which the appearance of display by a light transmissive display plate is excellent, (1) a display device for a vehicle includes:

a holding case (712);

a light transmissive display plate (730) which is held by the holding case and which is formed in a plate-shape having a light transmissive property and a design (735*a*) formed on the light transmissive display plate, and which brightens and displays the pattern by introducing the light source light into the interior of the transparent display plate; and a light irradiation unit (740) that includes: a plurality of light emitting devices (770) which emits the light source light; a mounting substrate (760) on which the multiple light emitting devices are mounted; and a holding member (741) which holds the mounting substrate, to emit the light source light to the light transmissive display plate through an outer edge portion (732) of the light transmissive display plate, and being formed as a separate body which can be detachably attached to the holding case.

The features of the vehicle display device according to the fourteenth embodiment are as described above, but the features of the lower hierarchy are listed as follows. In order to show a relationship with the above-mentioned features, "the above" is added to each configuration in the description.

(2) The holding member is made of a light shielding base material and formed in a plate-shape having a front surface (743*a*) and a back surface (743*b*) on the opposite side to the front surface, provides multiple through holes (744) penetrating between the front surface and the back surface, and is disposed such that the front surface faces the outer edge portion, the mounting substrate is held by the holding member by bringing a mounting surface (761*a*) on which the light emitting device is mounted into contact with the back surface, and each of the light emitting devices is individually disposed inside each of the through holes.

(3) The holding member includes:

a substrate support rib (747) that supports an edge portion (762) of the mounting substrate, on the back side; and an elastic protrusion (748) that is formed in an elastically deformable protrusion shape for pushing an opposite edge portion (762*a*) toward the substrate support rib by an elastic reaction force, the opposite edge portion being opposite to the edge portion (762*b*) supported by the substrate support rib across the center portion of the mounting substrate.

(4) The light irradiation unit further includes an optical sheet member (780) that exerts an optical effect on the light source light.

(5) The holding member includes:

a sheet support rib (750) that supports an edge portion (782) of the optical sheet member, and an insertion pin (753) inserted into a positioning hole (786) provided in the optical sheet member.

(6) The sheet support rib has a deformation protrusion (752*c*) that projects toward the optical sheet member and bends the optical sheet member into an elastically deformed state by bringing a tip of the deformation protrusion into contact with the sheet support rib.

(7) The holding member is fastened to the holding case by screws (717).

According to the vehicle display device described above, the light irradiation unit is configured by the multiple light emitting devices, the mounting substrate, the holding member, and the like. Since the light irradiation unit described above is formed as a separate body detachably attached to the holding case, the light irradiation unit can be assembled to the holding case collectively at the time of manufacturing the vehicle display device. Therefore, since the number of assembling of the parts to the holding case can be reduced, the small foreign matter such as dirt, dust, and debris is inhibited from being caught in the holding case along with the assembling. Therefore, even if the light transmissive display plate is held to the holding case, the adhesion of the foreign matter to the plate surface of the light transmissive display plate is reduced. As a result, even if the light irradiation unit irradiates the light transmissive display plate with the light source light with the use of the multiple light emitting devices, a situation in which the foreign matter emits the light simultaneously with the pattern can be inhibited. As described above, a vehicle display device can be provided in which the appearance of the display by the light transmissive display plate is excellent.

Fifteenth Embodiment

As shown in FIGS. 128 to 134, a fifteenth embodiment is a modification of the first embodiment. The fifteenth embodiment will be described focusing on configurations different from the first embodiment.

Figure 128:
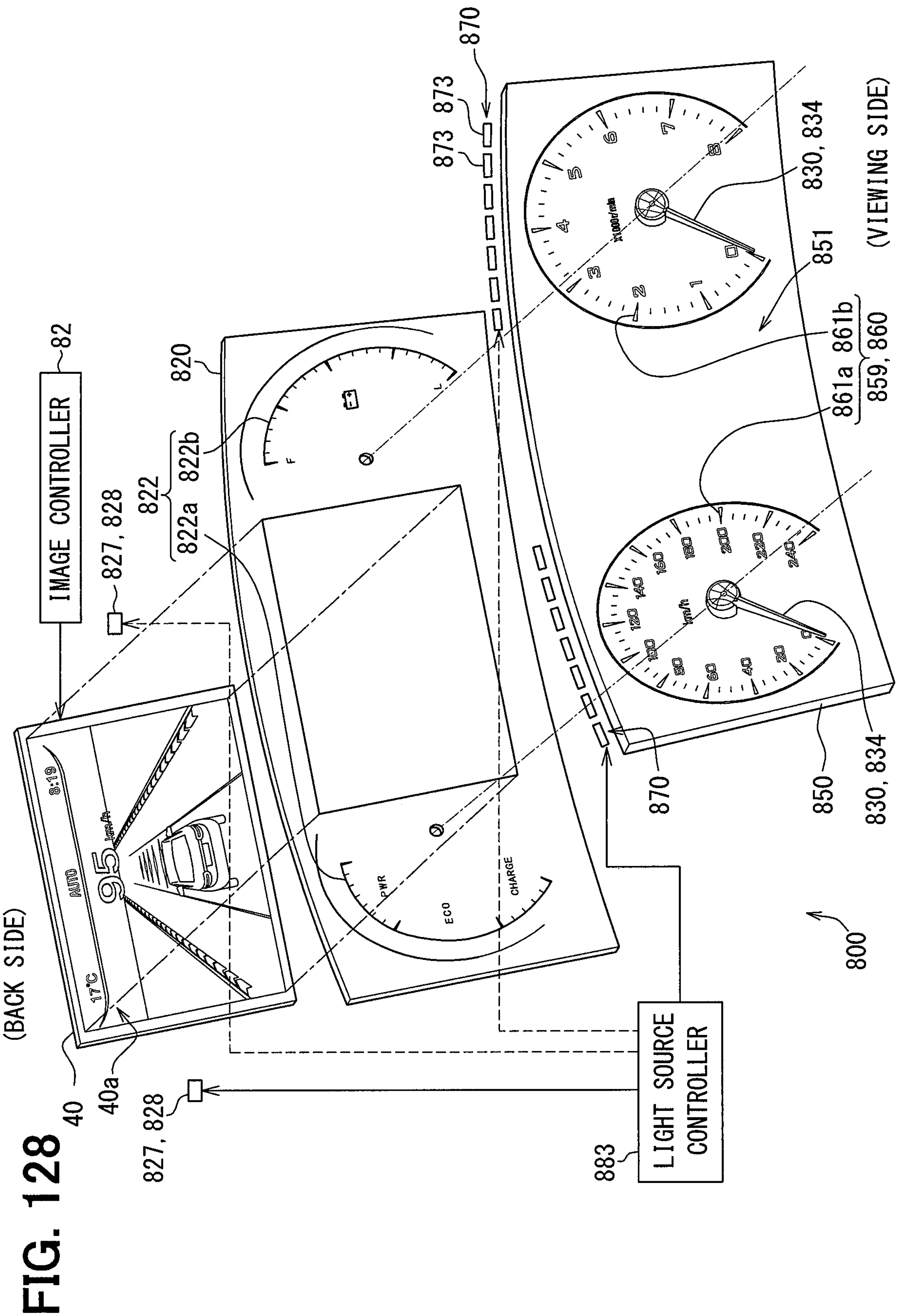
Figure 129:
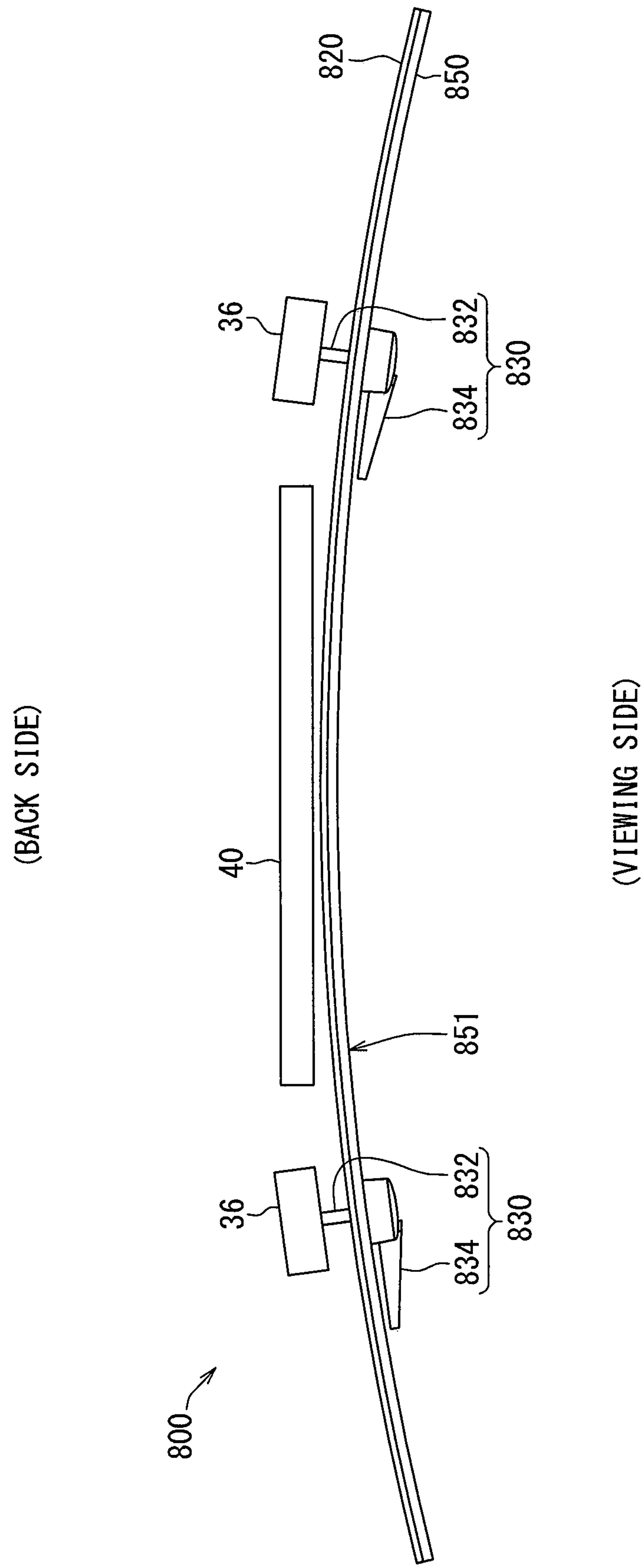

In a vehicle display device 800 according to a fifteenth embodiment, as shown in FIGS. 128 and 129, a light transmissive display plate 850 is formed in a curved plate-shape and made of, for example, a synthetic resin having a light transmission property. More specifically, a surface 851 of the light transmissive display plate 850 on a viewing side is formed in a curved surface shape in which the center portion is recessed toward a back side. In particular, the surface 851 on the viewing side according to the present embodiment has a cylindrical surface shape curved in the lateral direction of the vehicle.

Figure 130:
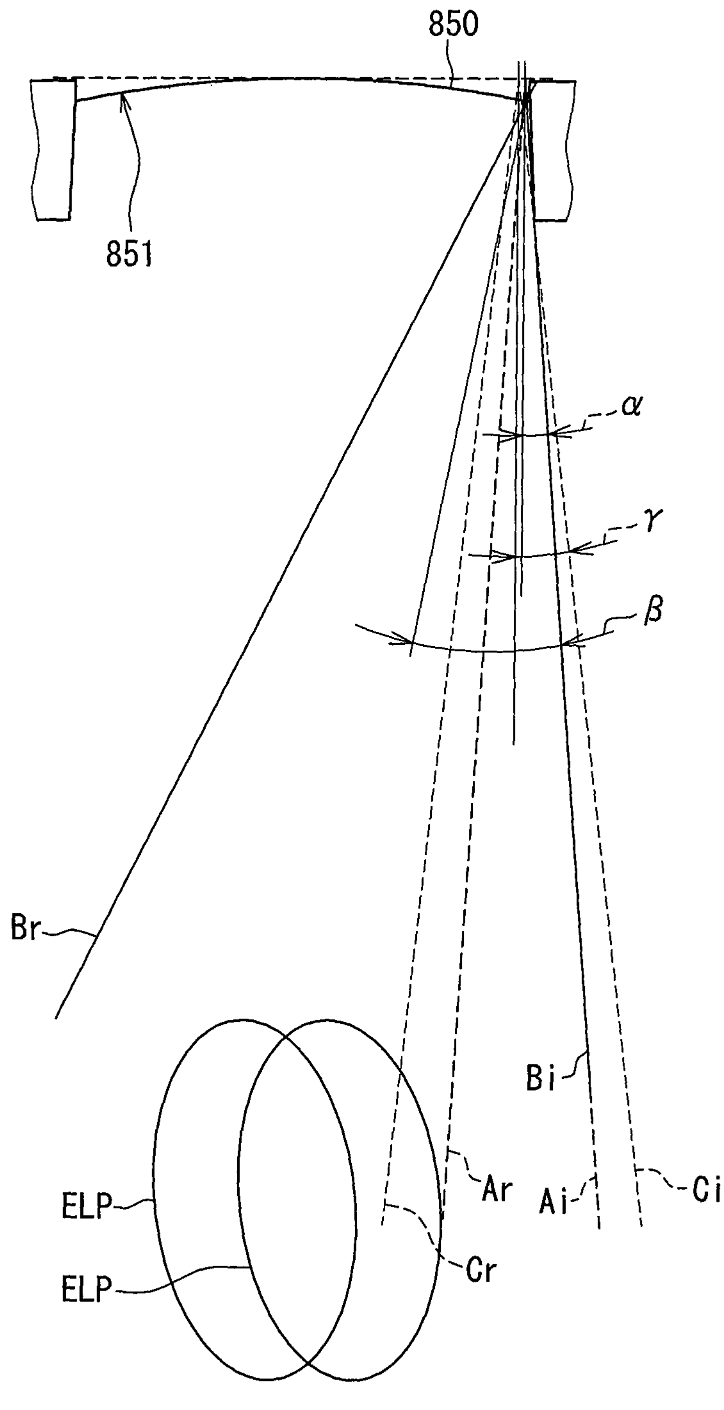

An external light such as sunlight, light from a light source in a vehicle, or the like may be incident on the light transmissive display plate 850 from the viewing side, and these external light may be reflected by the light transmissive display plate 850. In this example, differences in a reflection direction of light between the case where the light transmissive display plate has a flat plate-like shape and the case where the light transmissive display plate has a curved plate-shape will be described with reference to FIG. 130. FIG. 130 shows a cross section of the vehicle display device 800 in the lateral direction. In FIG. 130, an area indicated by an ellipse is called an eyelips ELP. The eyelips ELP represents, as oval circles, eye ranges that statistically represent distributions of the positions of the eyes of the driver as occupants (refer to JISD0021: 1998 in more detail).

In the case of a flat plate-like shaped light transmissive display plate (refer to broken lines in FIG. 130), a case is considered in which a predetermined external light Ai is incident on the outer peripheral portion in a right side region of the light transmissive display plate. The incident angle of the external light Ai on the flat plate-like shaped light transmissive display plate is a, and the trajectory of the reflected light Ar circumscribes the eyelips ELP of the right eye. A reflected light Cr of the external light Ci incident at an incident angle γ slightly larger than the incident angle α of the external light Ai passes through the left side of the reflected light Ar, and therefore passes through the inside of the eyelips ELP. In other words, there is a high possibility that the external light incident on the right region at an incident angle larger than an incident angle α is visually recognized by the driver as the occupant.

On the other hand, in the case of the curved plate-shaped light transmissive display plate 850 (refer to solid lines in FIG. 130), a case is considered in which an external light Bi having the same trajectory as that of the external light Ai is incident on the outer peripheral portion in the right side region of the light transmissive display plate 850. In that case, since a surface 851 on the viewing side is slightly inclined toward the central side in the right side region by the curvature of the surface 851 on the viewing side, an angle of incidence of the external light Ai relative to the curved plate-shape light transmissive display plate 850 is β, and the incident angle β is considerably larger than the angles of incidence α and γ. For that reason, the trajectory of the reflected light Br passes further to the left of the eyelips ELP of the left eye. Further, even if the incident light of external light having the same trajectory as that of the external light Ci is incident, the reflected light passes further to the left side of the reflected light Br, so that the possibility of being visually recognized by the driver as the occupant is lowered as compared with the case of a flat plate-like light transmissive display plate.

The light transmissive display plate 850 according to the fifteenth embodiment is provided with a through hole corresponding to the pointer 830. Since the coupling portion 832 of the pointer 830 penetrates through the through hole of the light transmissive display plate 850, as shown in FIGS. 128 and 129, the indicating portion 834 of the pointer 830 is disposed than the viewing side of the light transmissive display plate 850.

The dial plate 820 according to the fifteenth embodiment is formed in a curved plate-shape having substantially the same curved shape as that of the light transmissive display plate 850. The dial plate 820 and the light transmissive display plate 850 are disposed close to each other with a small gap.

The dial plate 820 is formed with the same indicator portion 822 as in the first embodiment. As shown in FIG. 128, in the present embodiment, scales and characters are disposed in the left region of the dial plate 820 as an indicator 822*a* representing a situation corresponding to a current value of the electric motor of the vehicle. In the right region of the dial plate 820, scales and characters are disposed as an indicator 822*b* for displaying a voltage value of a power supply battery of an electric motor of the vehicle.

A pattern 860 according to the fifteenth embodiment has a different indicator portions 859 provided in a region facing the indicator portions 822 in the left and right regions. The different indicator portion 859 is the same as the indicator portion 822 in that the indicator portion displays information by being indicated by the indicating portion 834 of the pointer 830, but displays information different from the information displayed by the indicator portion 822.

Figure 131:
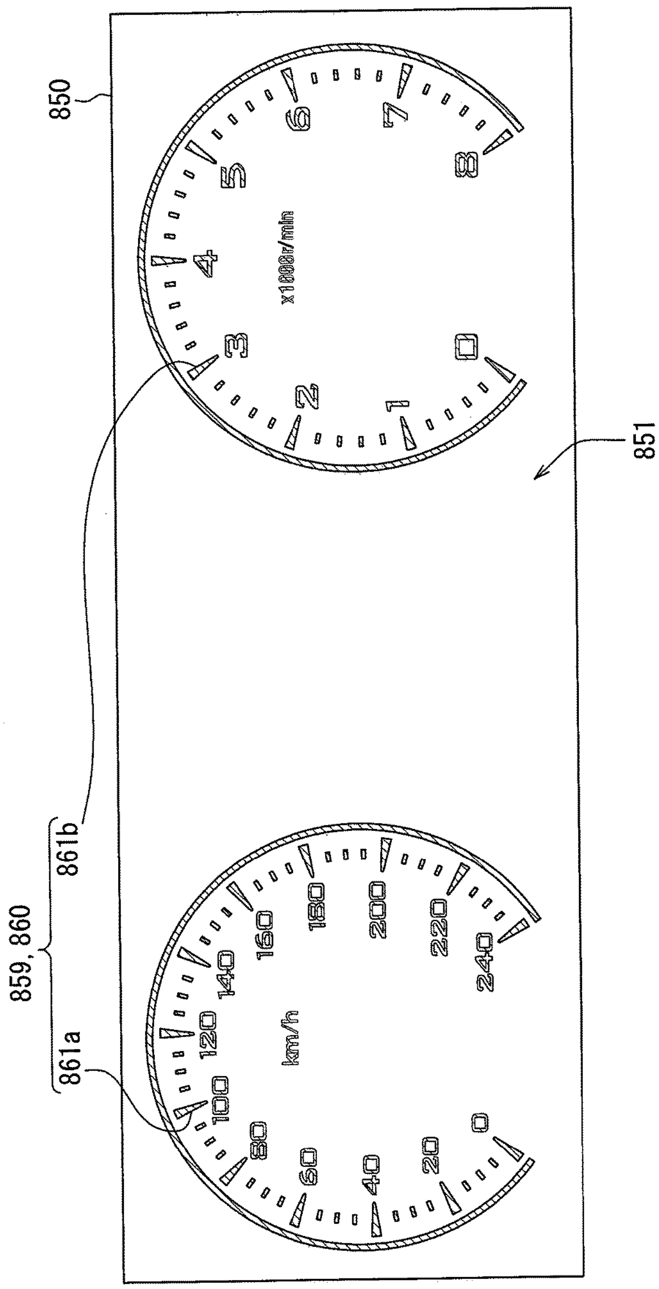

As shown in FIGS. 128 and 131, the different indicator portion 859 of the present embodiment has an indicator pattern 861*a* in a region facing the indicator 822*a*, and an indicator pattern 861*b* in a region facing the indicator 822*b*. The indicator pattern 861*a* has scales and characters representing a speed of the vehicle. The indicator pattern 861*b* has scales and characters representing an engine speed of the vehicle.

A light source controller 883 according to the fifteenth embodiment can control an indicator illumination light source 827 together with the display plate light source 870. The indicator illumination light source 827 is configured by providing multiple indicator illumination light emitting devices 828 similar to those of the first embodiment. More specifically, the light source controller 883 switches on and off the light emitting devices 873 in the display plate light source 870, and switches on and off the light emitting devices 828 of the indicator illumination light source 827.

Similar to the first embodiment, the pattern 860 is in a display state when each of the light emitting devices 873 is lighted, and can be visually recognized from the viewing side. However, when each of the light emitting devices 873 is turned off, the pattern 860 is in a non-display state, and is hardly visible from the viewing side.

The indicator portion 822 of the dial plate 820 is in a display state when each of the light emitting devices 828 is lighted, and can be visually recognized from the viewing side. However, when each of the light emitting devices 828 is turned off, the indicator portion 822 is in a non-display state and is less likely to be visually recognized from the viewing side.

The light source controller 883 turns on one of the light emitting devices 873 of the display plate light source 870 and the light emitting devices 828 of the indicator illumination light source 827, and turns off the other. As a result, only one of the different indicator portion 859 of the light transmissive display plate 850 and the indicator portion 822 of the dial plate 820 is in the display state. The pointer 830 rotates in accordance with one of the different indicator portion 859 and the indicator portion 822 which is in the display state. In other words, the light source controller 883 switches an indication target indicated by the indicating portion 834 of the pointer 830 between the indicator portion 822 and the different indicator portion 859.

The processing executed by the vehicle display device 800 (mainly, the light source controller 883) according to the fifteenth embodiment will be described with reference to a flowchart of FIG. 132. The flowchart is executed at a predetermined trigger or every predetermined time.

First, in Step S810, the light source controller 883 determines whether or not to display the different indicator portion 859. A condition for the determination can be appropriately set. For example, the determination can be made with reference to an on/off-state of an operation switch operated by the occupant. Further, for example, at the time of determination, it can be determined which of the engine and the electric motor mainly drives the vehicle. When an affirmative determination is made in Step S810, the process proceeds to Step S820. When a negative determination is made in Step S810, the process proceeds to Step S830.

In Step S820, the light source controller 883 turns on the light emitting devices 873 of the display plate light source 870 and turns off the light emitting devices 828 of the indicator illumination light source 827. As a result, as shown in FIG. 133, the indicator patterns 861*a* and 861*b* of the different indicator portion 859 are in the display state, and the indicator portion 822 is in the non-display state. Therefore, the indication target indicated by the indicating portion 834 is set in the different indicator portion 859. The images of the indicator portion 862 and the image display panel 40 are displayed in a partially superimposed manner. A series of processing is completed in Step S820.

In Step S830, the light source controller 883 turns off the light emitting devices 873 of the display plate light source 870 and turns on the light emitting devices 828 of the indicator illumination light source 827. As a result, as shown in FIG. 134, the indicator patterns 861*a* and 861*b* of the different indicator portion 859 are in a non-display state, and the indicator portion 822 is in a display state. Therefore, the indication target indicated by the indicating portion 834 is set to the indicator portion 822. A series of processing is completed in Step S830.

As shown in FIG. 133, a red zone indicator 829 corresponding to the indicator pattern 861*b* is formed on the dial plate 820. The red zone indicator 829 is controlled independently of the indicator portion 822. Specifically, when the indicator portion 822 is in the non-display state, the red zone indicator 829 is in the display state by illumination from the back side (refer to FIG. 133), and when the indicator portion 822 is in the display state, illumination from the back side is stopped and the indicator portion 822 becomes in the non-display state (refer to FIG. 134).

According to the fifteenth embodiment described above, the light transmissive display plate 850 is formed in a curved plate-shape. In this manner, a part of the light transmissive display plate 850 protrudes toward the viewing side relative to the other regions, so that a stereoscopic effect can be generated in the light transmissive display plate 850.

In addition, according to the fifteenth embodiment, the surface 851 of the light transmissive display plate 850 on the viewing side is formed in a curved surface shape in which the center portion is recessed toward the back side. In this manner, a stereoscopic effect is generated between the central portion and the outer peripheral portion of the light transmissive display plate 850. At the same time, since the occupant can be inhibited from visually recognizing the reflected light when the external light is reflected on the surface 851, the visibility of each display is enhanced, and the relative stereoscopic effect of the combination of those displays can be emphasized.

According to the fifteenth embodiment, the display state of the pattern 860 is changed according to the lighting state of the display plate light source 870, and the indication target indicated by the indicating portion 834 is switched between the indicator portion 822 and the different indicator portion 859. In such switching, a range of the display can be widened by switching the indication object by the same pointer 830.

While the present disclosure has been described with reference to embodiments thereof, it is to be understood that the disclosure is not limited to the embodiments and constructions. The present disclosure is intended to cover various modification and equivalent arrangements. In addition, while various combinations and configurations are shown in the present disclosure, other combinations and configurations, including more, less or only a single element, are also within the spirit and scope of the present disclosure.

What is claimed is:

1. A display device to be mounted on a vehicle, comprising:

a dial plate having an indicator portion corresponding to vehicle information on a viewing side;

an image display panel that is disposed on a back side of the dial plate opposite to the viewing side to luminescently display an image; and a light transmissive display plate that includes a reflective portion disposed on the viewing side of the dial plate to reflect a light from a light source to the viewing side, wherein a region of the dial plate, which faces the image display panel, is set to have a light transmission property to transmit the image of the image display panel through the region of the dial plate, the reflective portion includes a plurality of reflective elements that reflect the light from the light source to the viewing side, and are arrayed along an extending direction of the light transmissive display plate to configure a pattern, the reflective portion is one of a plurality of reflective portions to configure the patterns different from each other in the same light transmissive display plate, in the same reflective portion, each of the reflective elements has a reflection surface facing in the same direction as each other, and the reflection surface of each of the reflective elements faces in different directions between the different reflective portions, the light source includes a plurality of light emitting portions disposed along an outer edge portion of the light transmissive display plate, and each of the light emitting portions corresponds to each of the reflective portions, individually, and is disposed at a position of the outer edge portion, which faces the reflection surface of the corresponding reflective portion to emit the light toward the facing reflection surface.

2. The display device according to claim 1, wherein the pattern includes an outer peripheral pattern that is linearly formed in a region of the light transmissive display plate, which corresponds to an outer peripheral portion of the indicator portion to border the indicator portion, an end portion of the outer peripheral pattern extends to a region of the light transmissive display plate, which faces the image display panel, and the image display panel displays an extended image linearly provided to further extend the end portion of the outer peripheral pattern as the image.

3. A display device to be mounted on a vehicle, comprising:

a dial plate having an indicator portion corresponding to vehicle information on a viewing side;

an image display panel that is disposed on a back side of the dial plate opposite to the viewing side to luminescently display an image; and a light transmissive display plate that includes a reflective portion disposed on the viewing side of the dial plate to reflect a light from a light source to the viewing side, wherein a region of the dial plate, which faces the image display panel, is set to have a light transmission property to transmit the image of the image display panel through the region of the dial plate, the reflective portion includes a plurality of reflective elements that reflect the light from the light source to the viewing side, and are arrayed along an extending direction of the light transmissive display plate to configure a pattern, the pattern includes a contour pattern representing an exterior contour of a display object, and the image display panel displays, as the image, an internal image representing an internal state of the display object by superimposing the internal image on the contour pattern.

4. A display device to be mounted on a vehicle, comprising:

an image display panel that luminescently displays an image on a viewing side; and a light transmissive display plate that includes a reflective portion which is disposed on the viewing side of the image display panel and reflects a light from a light source to the viewing side, wherein the reflective portion includes a plurality of reflective elements that reflect the light from the light source to the viewing side, and are arrayed along an extending direction of the light transmissive display plate to configure a pattern, the pattern includes a contour pattern representing an exterior contour of a display object, and the image display panel displays an internal image representing an internal state of the display object as the image by superimposing the internal image of the display object on the contour pattern.

5. A display device to be mounted on a vehicle, comprising:

a dial plate that displays an indicator portion corresponding to vehicle information on a viewing side;

an image display panel that luminescently displays an image on the viewing side;

a light transmissive display plate that includes a reflective portion which is disposed on the viewing side of the dial plate and the image display panel to reflect a light from a light source to the viewing side; and a light source controller configured to control the light source on or off, wherein the reflective portion includes a plurality of reflective elements that reflect the light from the light source to the viewing side, and are arrayed along an extending direction of the light transmissive display plate to configure a pattern, the pattern includes an outer peripheral pattern that is linearly formed in a region of the light transmissive display plate, which corresponds to an outer peripheral portion of the indicator portion to border the indicator portion, the light source controller controls the light source on or off to switch the outer peripheral pattern to be in a display state or a non-display state, an end portion of the outer peripheral pattern extends to a region of the light transmissive display plate, which faces the image display panel, the image display panel displays an extended image linearly provided to further extend the end portion of the outer peripheral pattern as the image, the extended image is in a display state on the image display panel when the light source is turned on, and at least a part of the extended image is in a non-display state on the image display panel when the light source is turned off.

6. The display device according to claim 5, wherein the light source includes a color light source capable of changing a color of the pattern.

7. The display device according to claim 5, wherein the reflective portion is one of a plurality of reflective portions to configure the patterns different from each other in the same light transmissive display plate, in the same reflective portion, each of the reflective elements has a reflection surface facing in the same direction as each other, and the reflection surface of each of the reflective elements faces in different directions between the different reflective portions, the light source includes a plurality of light emitting portions disposed along an outer edge portion of the light transmissive display plate, and each of the light emitting portions corresponds to each of the reflective portions, individually, and is disposed at a position of the outer edge portion, which faces the reflection surface of the corresponding reflective portion to emit the light toward the facing reflection surface.

8. The display device according to claim 5, wherein the pattern includes a contour pattern representing an exterior contour of a display object, and the image display panel displays, as the image, an internal image representing an internal state of the display object by superimposing the internal image on the contour pattern.

9. The display device according to claim 5, wherein the reflective portion has a gradation region in which a display luminance of the pattern is changed into a gradation manner by gradually changing a shape or a density of the reflective elements.

10. The display device according to claim 5, further comprising a light source controller that controls the light source, wherein the light source includes a plurality of light emitting devices, each of which is to be turned on or off individually, each of the light emitting devices emits the light toward a part of the pattern which is shifted from each other, and the light source controller switches the light emitting device which is to be lighted among the light emitting devices.

11. The display device according to claim 10, wherein the image display panel displays a moving object image representing a moving object as the image, the pattern is a ground pattern representing a ground, and the light source controller switches the light emitting device to be lighted sequentially to an adjacent light emitting device in accordance with the moving object image.

12. The display device according to claim 10, wherein the vehicle includes a moving obstacle detection unit that detects a moving obstacle, the pattern is a moving obstacle motion pattern represented by arraying a plurality of the moving obstacles, and the light source controller switches the light emitting device to be lighted sequentially to an adjacent light emitting device in accordance with the moving obstacle when the moving obstacle detection unit detects the moving obstacle.

13. The display device according to claim 5, wherein the light transmissive display plate is formed in a curved plate shape.

14. The display device according to claim 13, wherein a surface of the light transmissive display plate on the viewing side is formed in a curved surface shape in which a center portion of the surface is recessed toward the back side.

15. The display device according to claim 5, further comprising a pointer that is disposed on the viewing side of the light transmissive display plate and has an indicating portion that displays information corresponding to an indicated position by rotating.

16. The display device according to claim 5, further comprising:

a pointer that includes a rotating indicating portion, wherein the pattern has a different indicator portion that displays information different from information displayed by the indicator portion in a region facing the indicator portion, and the light source controller changes a display state of the pattern according to a lighting state of the light source, and switches an indication object indicated by the indicating portion between the indicator portion and the different indicator portion.

17. The display device according to claim 5, wherein the light source includes two independent light emitting sources separated from each other at opposite ends along an outer edge lower side of the light transmissive display plate.

18. The display device according to claim 17, wherein the outer peripheral pattern and the extended image are in the display state on the image display panel when each of the two independent light emitting sources are turned on, and at least a part of the outer peripheral pattern and at least the part of the extended image are in the non-display state on the image display panel when one of the two independent light emitting sources is turned off.

* * * * *